(12) United States Patent
Van Engelhoven et al.

(10) Patent No.: US 11,654,546 B2
(45) Date of Patent: May 23, 2023

(54) ARM SUPPORTING EXOSKELETON WITH A VARIABLE FORCE GENERATOR

(71) Applicant: The Regents of the University of California, Oakland, CA (US)

(72) Inventors: Logan Van Engelhoven, Berkeley, CA (US); Homayoon Kazerooni, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 135 days.

(21) Appl. No.: 17/221,121

(22) Filed: Apr. 2, 2021

(65) Prior Publication Data

US 2021/0220987 A1 Jul. 22, 2021

Related U.S. Application Data

(63) Continuation of application No. 16/997,742, filed on Aug. 19, 2020, now Pat. No. 10,994,409, which is a
(Continued)

(51) Int. Cl.
*B25J 9/00* (2006.01)
*B25H 1/10* (2006.01)
*B65H 1/10* (2006.01)

(52) U.S. Cl.
CPC .............. *B25J 9/0006* (2013.01); *B25H 1/10* (2013.01); *B65H 1/10* (2013.01)

(58) Field of Classification Search
CPC ............. B25J 9/0006; B25H 1/10; B65H 1/10
See application file for complete search history.

(56) References Cited

U.S. PATENT DOCUMENTS 6,301,526 B1 10/2001 Kim et al.
7,410,338 B2 * 8/2008 Schiele .............. A63B 23/1263
414/4

(Continued)

FOREIGN PATENT DOCUMENTS

| WO | 2013186701 A1 | 12/2013 |
| WO | 2013186705 A2 | 12/2013 |
| WO | 2019136465 A1 | 7/2019 |

OTHER PUBLICATIONS

U.S. Appl. No. 16/242,875, Corrected Notice of Allowance dated Jun. 10, 2019, 4 pgs.
(Continued)

*Primary Examiner* — Anita M King
(74) *Attorney, Agent, or Firm* — Sterne, Kessler, Goldstein & Fox P.L.L.C.

(57) ABSTRACT

Described herein is an arm supporting exoskeleton, comprising an arm link mechanism. The arm link mechanism comprises a proximal link, a distal link, an arm coupler, and a variable force generator. The distal link is rotatable relative to the proximal link. The arm coupler is adapted to couple an upper arm of a person to the distal link. The variable force generator comprises a first spring and a second spring, configured to create a torque between the proximal link and the distal link. In the first force mode, the variable force generator exhibits a first stiffness rate defined by the first spring that supports the upper arm of the person against gravity forces and. In the second force mode, the variable force generator exhibits a second stiffness rate defined by the first spring and the second spring that supports the upper arm of the person against the gravity forces.

30 Claims, 110 Drawing Sheets

Related U.S. Application Data continuation of application No. 16/834,647, filed on Mar. 30, 2020, now Pat. No. 10,786,896, which is a continuation of application No. 16/455,899, filed on Jun. 28, 2019, now Pat. No. 10,639,785, which is a continuation of application No. 16/242,875, filed on Jan. 8, 2019, now Pat. No. 10,391,627, which is a continuation-in-part of application No. 16/157,417, filed on Oct. 11, 2018, now Pat. No. 10,369,690, which is a continuation of application No. 15/848,487, filed on Dec. 20, 2017, now Pat. No. 10,124,485, which is a continuation of application No. 15/158,113, filed on May 18, 2016, now Pat. No. 9,889,554.

(60) Provisional application No. 62/614,841, filed on Jan. 8, 2018, provisional application No. 62/162,871, filed on May 18, 2015.

(56) References Cited

U.S. PATENT DOCUMENTS

| | | | |
|---|---|---|---|
| 7,618,016 B2 * | 11/2009 | Brown | G03B 17/561 248/584 |
| 8,066,251 B2 | 11/2011 | Brown | |
| 8,641,782 B2 | 2/2014 | Kim et al. | |
| 9,204,730 B2 * | 12/2015 | Brown | A47C 7/52 |
| 9,205,017 B2 * | 12/2015 | Doyle | A61F 5/013 |
| 9,427,865 B2 | 8/2016 | Doyle | |
| 9,737,374 B2 | 8/2017 | Doyle | |
| 9,889,554 B2 | 2/2018 | Van Engelhoven et al. | |
| 10,058,994 B2 | 8/2018 | Angold et al. | |
| 10,071,477 B2 | 9/2018 | Van Engelhoven et al. | |
| 10,124,485 B2 | 11/2018 | Van Engelhoven et al. | |
| 10,369,690 B2 | 8/2019 | Van Engelhoven et al. | |
| 10,391,627 B2 | 8/2019 | Van Engelhoven et al. | |
| 10,463,560 B2 | 11/2019 | Deshpande et al. | |
| 10,639,785 B2 | 5/2020 | Engelhoven et al. | |
| 10,786,896 B2 | 9/2020 | Van Engelhoven et al. | |
| 10,994,409 B2 | 5/2021 | Engelhoven et al. | |
| 2008/0009771 A1 | 1/2008 | Perry et al. | |
| 2010/0204804 A1 | 8/2010 | Garrec | |
| 2011/0127390 A1 | 6/2011 | Brown | |
| 2011/0266323 A1 | 11/2011 | Kazerooni et al. | |
| 2012/0172769 A1 | 7/2012 | Garrec | |
| 2014/0158839 A1 | 6/2014 | Doyle | |
| 2019/0143503 A1 | 5/2019 | Engelhoven et al. | |
| 2019/0321965 A1 | 10/2019 | Engelhoven et al. | |
| 2020/0223057 A1 | 7/2020 | Van Engelhoven et al. | |
| 2020/0281796 A1 | 9/2020 | Lakany et al. | |
| 2020/0376651 A1 | 12/2020 | Van et al. | |

OTHER PUBLICATIONS

U.S. Appl. No. 16/242,875, Notice of Allowance dated Apr. 9, 2019, 8 pgs.
U.S. Appl. No. 16/834,647, Notice of Allowance dated May 22, 2020, 7 pgs.
U.S. Appl. No. 16/997,742, Non-Final Rejection dated Oct. 26, 2020, 7 pgs.
U.S. Appl. No. 16/997,742, Notice of Allowance dated Jan. 8, 2021, 5 pgs.
International Application Serial No. PCT/US19/12744, Preliminary Report on Patentability dated Jul. 23, 2020 5 pgs.
Int'l Application Serial No. PCT/US19/12744, Int'l Search Report and Written Opinion dated Apr. 18, 2019, 6 pgs.

* cited by examiner

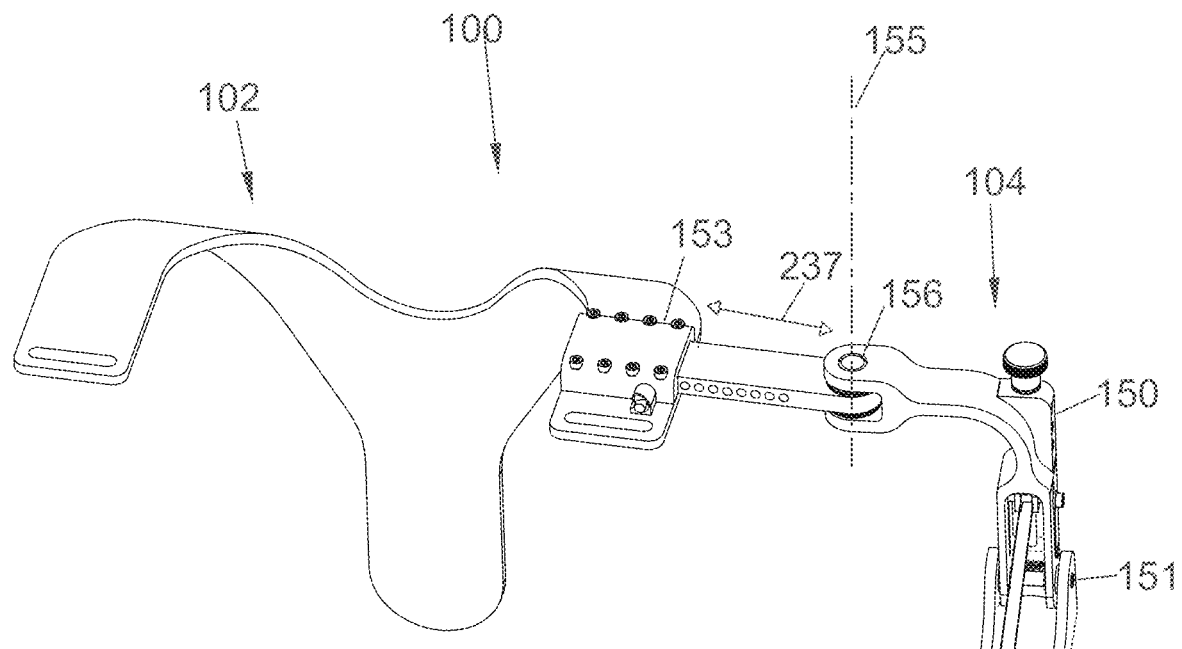
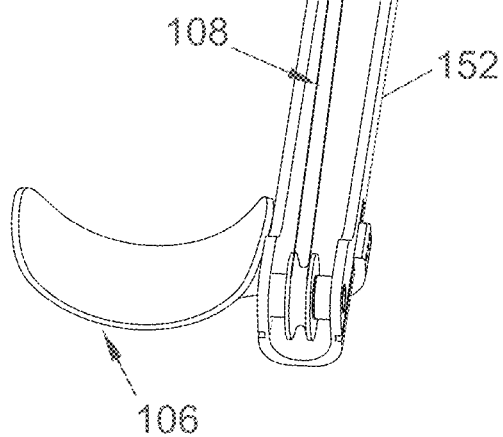
Fig. 32

ARM SUPPORTING EXOSKELETON WITH A VARIABLE FORCE GENERATOR

CROSS-REFERENCE TO RELATED APPLICATIONS

This application is a continuation of U.S. patent application Ser. No. 16/997,742, filed on 2020 Aug. 19, which is a continuation of U.S. patent application Ser. No. 16/834,647, filed on 2020 Mar. 30, and issued as U.S. Pat. No. 10,786,896 on 2020 Sep. 29, which is a continuation of U.S. patent application Ser. No. 16/455,899, filed on 2019 Jun. 28, and issued as U.S. Pat. No. 10,639,785 on 2020 May 5, which is a continuation of U.S. patent application Ser. No. 16/242,875, filed on 2019 Jan. 8, and issued as U.S. Pat. No. 10,391,627 on 2019 Aug. 27, which claims the benefit under 35 U.S.C. § 119(e) of U.S. Provisional Patent Application No. 62/614,841, filed on 2018 Jan. 8.

U.S. patent application Ser. No. 16/242,875 is also a continuation-in-part (CIP) application, claiming priority to U.S. patent application Ser. No. 16/157,417, filed on 2018 Oct. 11, and issued as U.S. Pat. No. 10,369,690 on 2019 Aug. 6, which is a continuation of U.S. application Ser. No. 15/848,487, filed on 2017 Dec. 20, and issued as U.S. Pat. No. 10,124,485 on 2018 Nov. 13. U.S. application Ser. No. 15/848,487 is a continuation of U.S. application Ser. No. 15/158,113, filed on 2016 May 18, and issued as U.S. Pat. No. 9,889,554 on 2018 Feb. 13. U.S. application Ser. No. 15/158,113 claims the benefit under 35 U.S.C. § 119(e) of U.S. Provisional Patent Application 62/162,871, filed on 2015 May 18. All of the above-referenced applications are incorporated herein by reference in their entirety for all purposes.

TECHNICAL FIELD

The present disclosure pertains to the art of support devices for the human arm and, more particularly, to an arm support device configured to reduce the moment on a person's shoulder during arm elevation. The present disclosure is further directed to a variable force generator applied to an arm supporting exoskeleton capable of being selectively transitioned between at least two stiffness rates. Depending on the configuration, these stiffness rates may correspond to high and low stiffness or an on and off mode, wherein on provides a noticeable stiffness, and off provides a substantially small stiffness that just compensates for the mass and friction of the device.

BACKGROUND

Conventional passive lift devices, mounted to the torso of a person and configured to support the weight of the arm, are not able to automatically cut or substantially reduce assistance when the person intends to rest his/her upper arm at his/her side, or pick a tool from his/her tool belt. Such devices do not provide a sustained range of position where support torque automatically reduces to zero. Except for a few position points, these devices continuously apply lifting forces to a person's upper arm, potentially inhibiting motion and creating discomfort during non-working postures when assist is not desired.

SUMMARY

Methods and devices describes herein provide the person a supporting torque to raise his/her upper arm thereby reducing the human shoulder forces and torques required to raise the upper arm. However, when the person intends to rest his/her upper arm at his/her sides or pick a tool from his/her tool belt, the device here automatically reduces the lifting force to zero (or substantially small value) allowing the wearer to move her/his upper arm freely. During non-working postures, zero (or substantially small) torque is desired to allow free motion of person's upper arm or to allow person's upper arm to rest without the impedance of an applied torque from the assist device. This creates a greater overall comfort for person during non-working postures.

In embodiments, an arm supporting exoskeleton configured to be coupled to a person comprises: a shoulder base configured to be coupled to a trunk of the person; and an arm link mechanism configured to be coupled to the shoulder base. The arm link mechanism comprises: a proximal link and a distal link configured to rotate relative to each other about a rotating joint and along a first rotational axis substantially orthogonal to a gravity line when the person is standing upright; at least one arm-coupler adapted to couple an upper arm of the person to the distal link; a tensile force generator coupled to the proximal link at a first end of the tensile force generator and coupled to the distal link at a second end of the tensile force generator, the tensile force generator providing a torque to flex the distal link relative to the proximal link; and a protrusion located substantially at the rotating joint. When the distal link extends pasta toggle angle, the protrusion constrains the tensile force generator, and the torque provided by the tensile force generator remains substantially small, and when the protrusion does not constrain the tensile force generator, the torque has the tendency to flex the distal link relative to the proximal link, thereby reducing human shoulder forces and torques required to raise the upper arm of the person.

In embodiments, an arm supporting exoskeleton configured to be coupled to a person comprises: a shoulder base configured to be coupled to a trunk of the person; and an arm link mechanism configured to be coupled to the shoulder base. The arm link mechanism comprises: a proximal link and a distal link configured to rotate relative to each other about a rotating joint and along a first rotational axis substantially orthogonal to a gravity line when the person is standing upright; at least one arm-coupler adapted to couple an upper arm of the person to the distal link; and a tensile force generator coupled to the proximal link at a first end of the tensile force generator and coupled to the distal link at a second end of the tensile force generator, the tensile force generator providing a torque to flex the distal link relative to the proximal link. When the arm support exoskeleton is coupled to the person and an angle between the proximal link and the distal link is smaller than a toggle angle, the torque has the tendency to flex the distal link relative to the proximal link, thereby reducing human shoulder forces and torques required to raise the upper arm of the person and imposing reaction forces and torques on the shoulder base. When the angle between the proximal link and the distal link is larger than the toggle angle, the tensile force generator provides a substantially small torque between the proximal link and the distal link, allowing the person to move the upper arm of the person freely.

In one embodiment, a variable force generator is used at the tensile force generator, or torque generator, attached to an arm link mechanism of an arm supporting exoskeleton to create a torque about a rotating joint that allows for elevation of a person's arm. When a base of the arm supporting exoskeleton is attached to a person's torso and an arm of the arm supporting exoskeleton is attached to a person's arm, the torque created from the variable force generator serves to flex the person's arm and support it against the force of gravity. The variable force generator is configured to create at least two different stiffness rates. When the variable force generator creates a first stiffness, a first torque is applied to the person's arm that is substantially small and allows the person to flex and extend the upper arm with minimal inhibition from the created first torque throughout the range of motion of person's arm. When the variable force generator creates a second stiffness, a second torque is applied to the person's arm that is substantially higher than the first torque mode and serves to support the person's arm against the forces of gravity.

It can be appreciated that while described as a part of an arm supporting exoskeleton, the variable force generator can be applied to create forces and torques across a multitude of joints and in many different applications.

BRIEF DESCRIPTION OF DRAWINGS

FIG. 32 is a perspective view of a shoulder bracket allowing shoulder width adjustment of an arm supporting exoskeleton.

DETAILED DESCRIPTION

Figure 1:
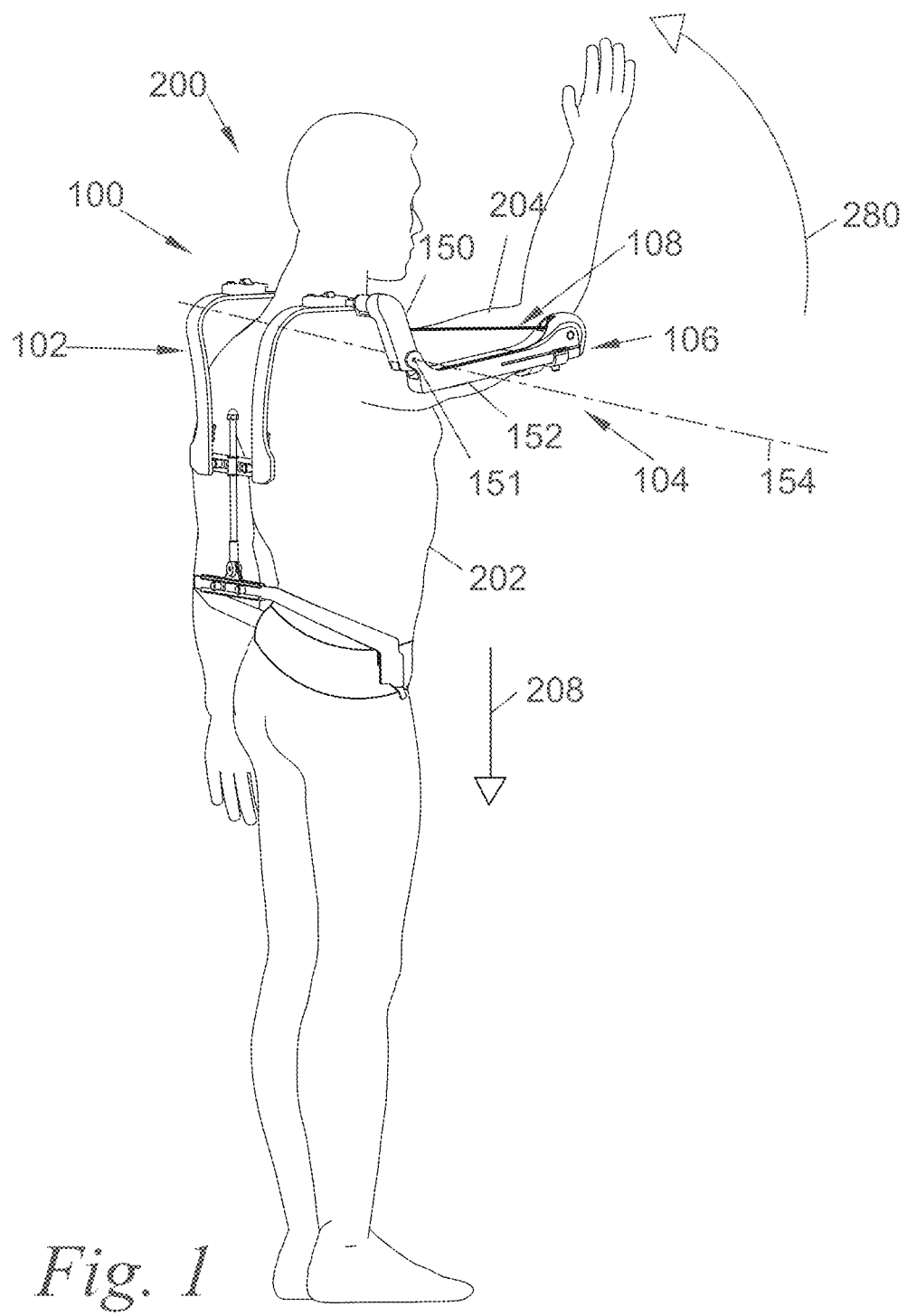
FIG. 1 is a rear perspective view of an assist device, with a person's arm outstretched.
Figure 2:
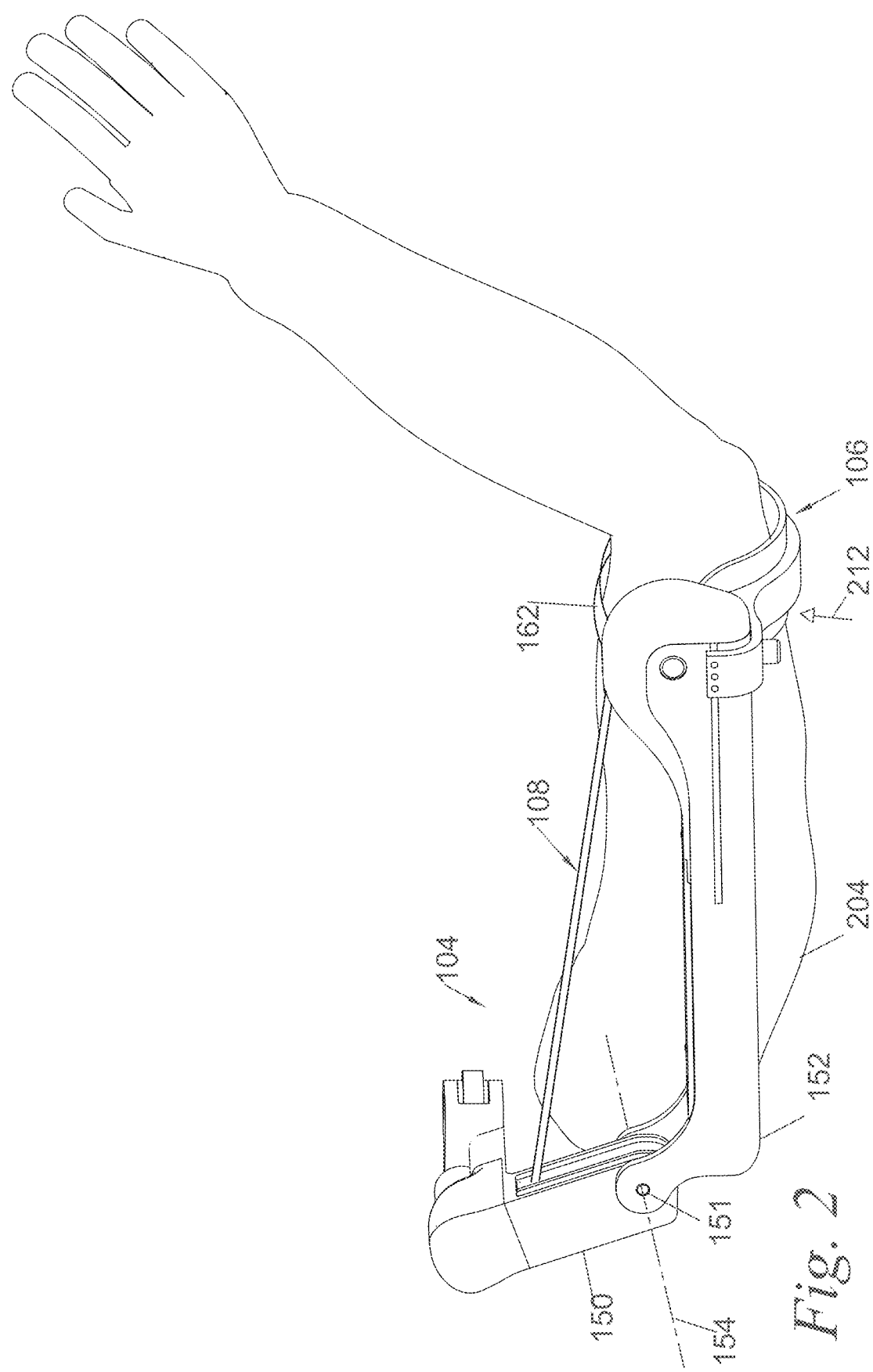
FIG. 2 is a close-up view of an arm link mechanism.
Figure 3:
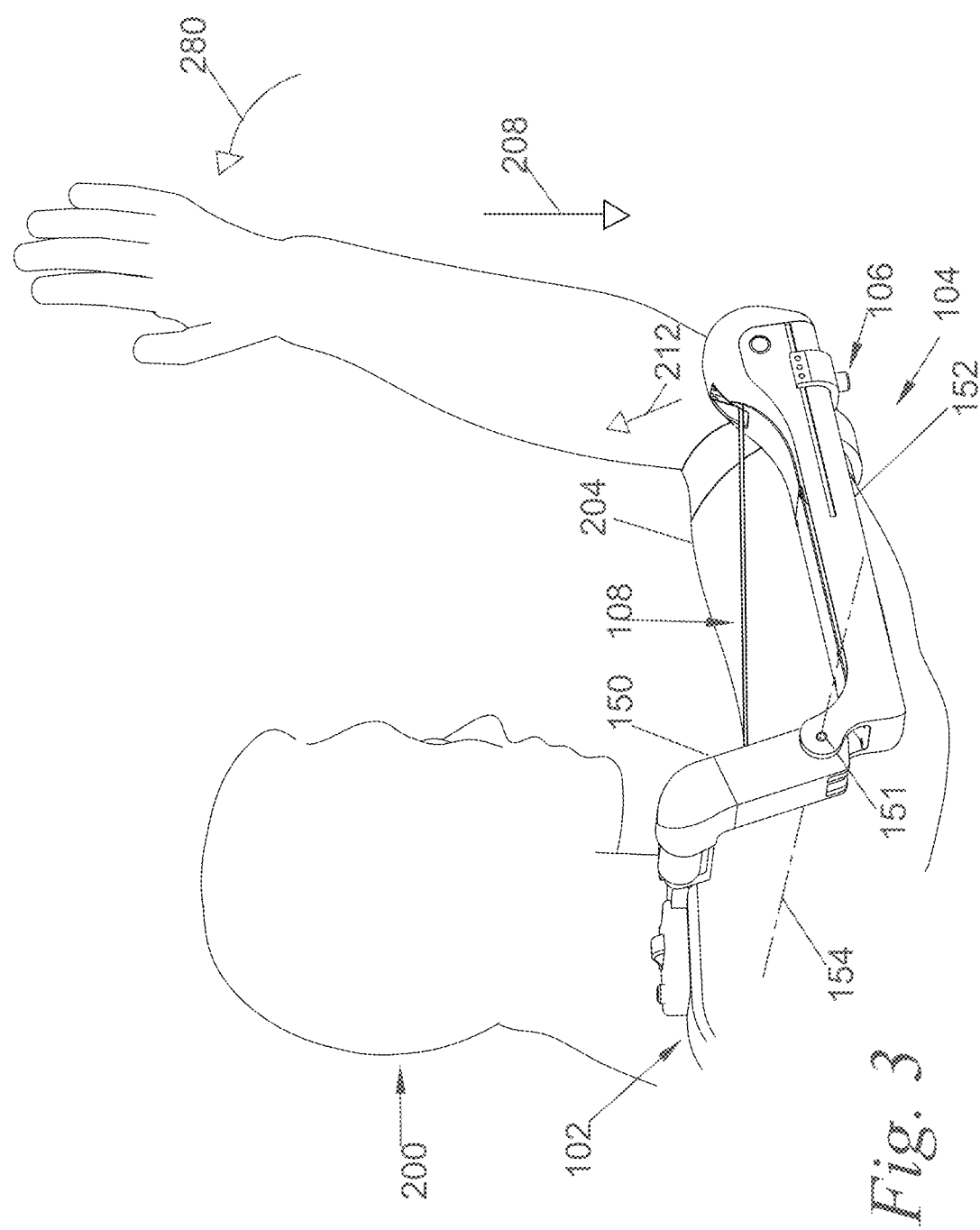
FIG. 3 is a close up rear perspective view of an arm link mechanism.
Figure 4:
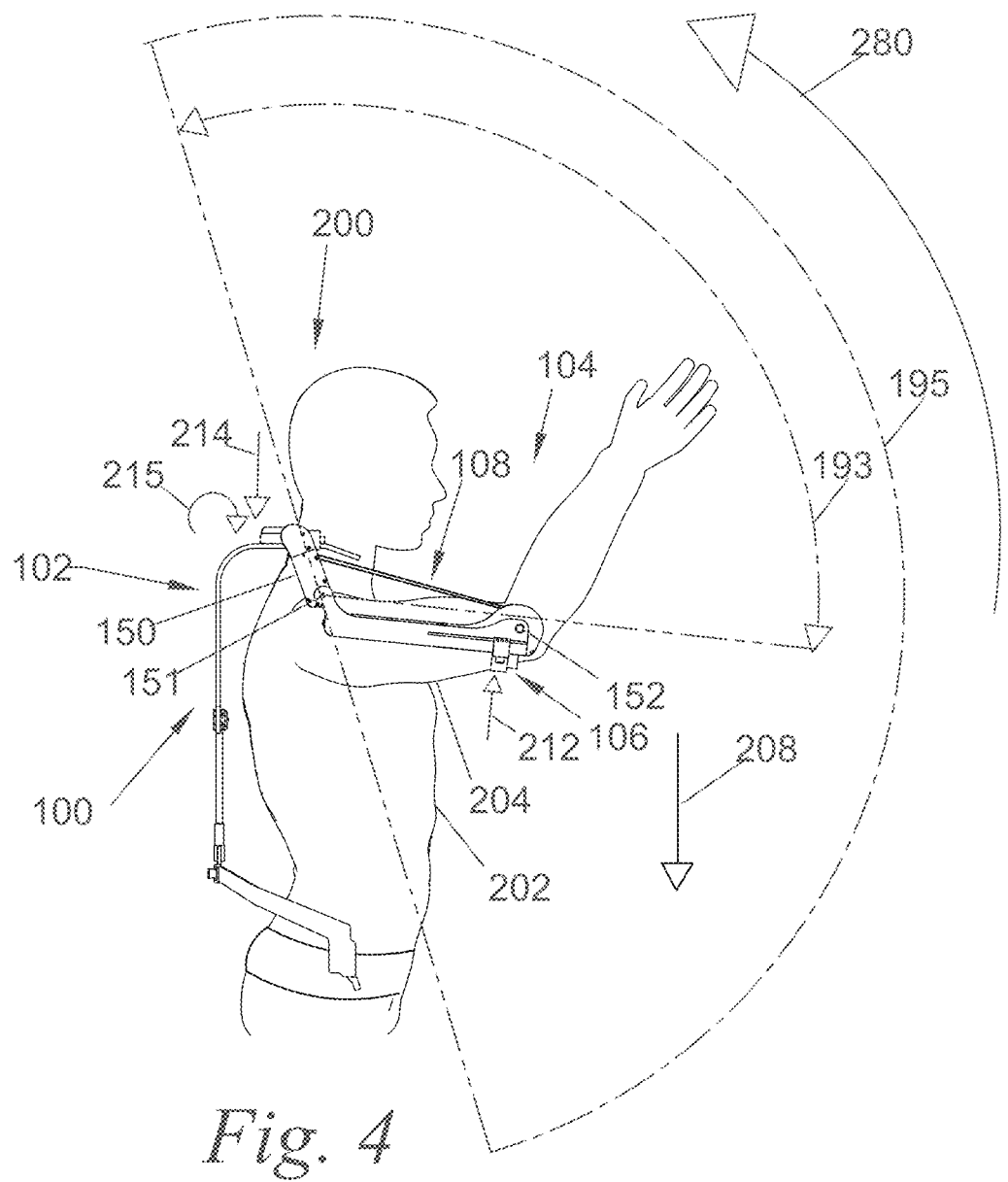
FIG. 4 is a side view of an assist device, wherein a first angle is less than a toggle angle.

FIG. 1 depicts an embodiment of arm support exoskeleton 100, which may be also referred to as an assist device. Arm support exoskeleton 100 comprises shoulder base 102, which is configured to be coupled to trunk 202 of person 200. In some embodiments, shoulder base 102 is substantially located behind person 200, which may be also referred to as a user. Arm support exoskeleton 100 additionally comprises at least one arm link mechanism 104 that is coupled to shoulder base 102. Arm link mechanism 104 comprises at least proximal link 150 and distal link 152 capable of rotation relative to each other along first rotational axis 154. In some embodiments, first rotational axis 154 is orthogonal to the gravity line 208 when person 200 in standing upright. The term "gravity line" should be understood to mean the direction in which gravity acts. First joint 151 represents a hinge, where distal link 152 rotates relative to proximal link 150. Arm support exoskeleton 100 additionally comprises at least one arm coupler 106 that couples upper arm 204 (of person 200) to distal link 152 of arm link mechanism 104. Arm coupler 106 is depicted in FIG. 2. Arm support exoskeleton 100 additionally comprises at least one torque generator 108 configured to create torque 280 between proximal link 150 and distal link 152. A close up view of arm link mechanism 104 is depicted in FIG. 3. Torque 280 in FIG. 1 and FIG. 3 shows the torque imposed on distal link 152 from proximal link 150. As shown in FIG. 4, first angle 193 represents an angle between proximal link 150 and distal link 152. When first angle 193 is smaller than toggle angle 195, as depicted in FIG. 4, torque generator 108 generates torque 280 that has the tendency to flex distal link 152 relative to proximal link 150. The term "toggle angle" should be understood to mean the angle between a first position (e.g., arm is raised) in which proximal link 150 and distal link 152 are collinear, and a second position (e.g., arm is lowered) in which the proximal link 150 and distal link 152 become collinear. The term "flex" should be understood to mean a movement of distal link 152 resulting in the decrease of first angle 193, while the term "extend" as used herein should be understood to mean a movement of distal link 152 resulting in the increase of first angle 193. The torque 280 produces supporting force 212 (shown in FIG. 2 and FIG. 4) onto upper arm 204 by arm coupler 106. This reduces the human shoulder forces and torques required to raise upper arm 204 and imposes set reaction force 214 and reaction torque 215 on shoulder base 102.

Figure 5:
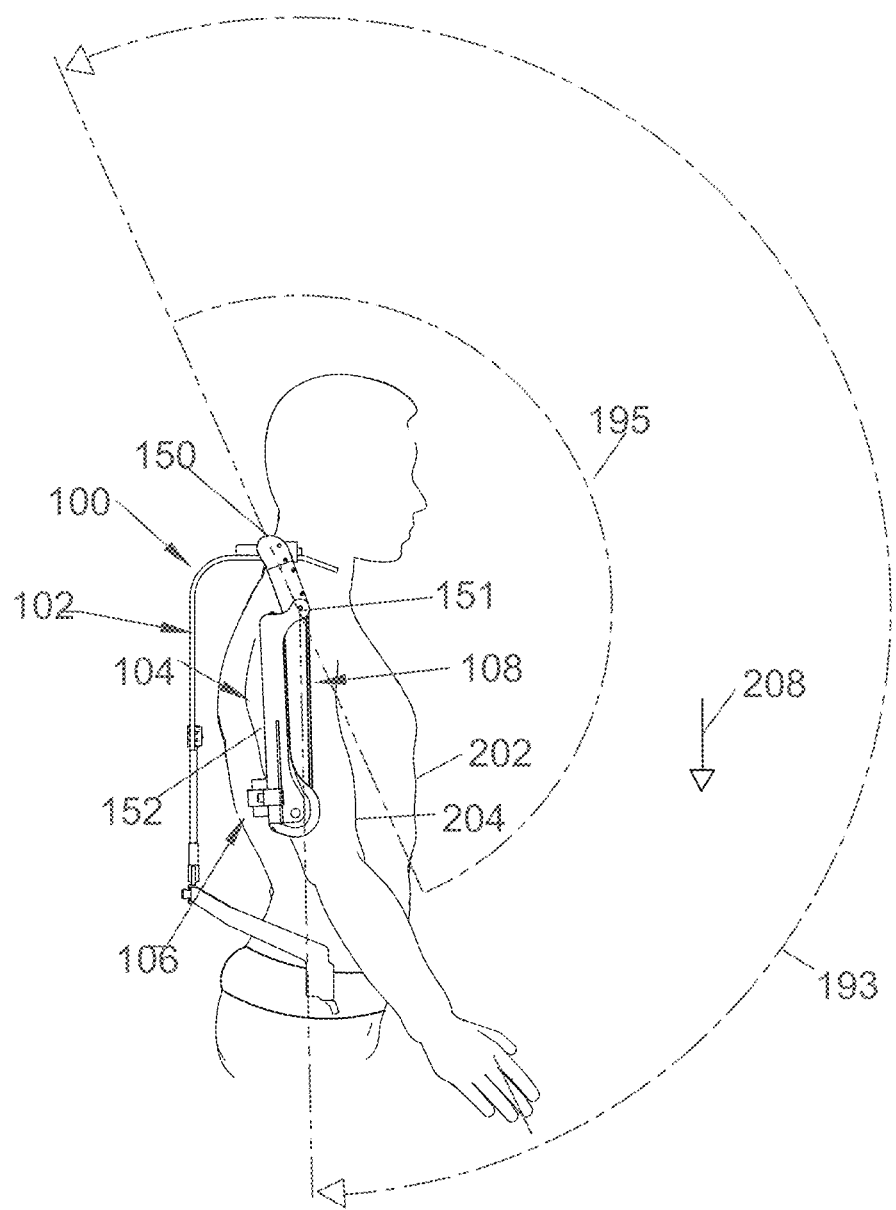
FIG. 5 is a side view of an assist device, wherein a first angle is greater than a toggle angle.

When angle 193 is larger than toggle angle 195 as depicted in FIG. 5, torque generator 108 provides a substantially small torque between proximal link 150 and distal link 152. The term "substantially small torque" should be understood to mean a torque value which does not cause substantial inhibition or discomfort of upper arm 204. This allows person 200 to move her/his upper arm 204 freely. In the Example shown in FIG. 5, when upper arm 204 (of person 200) is lowered, a position of distal link 152 moves past a position of collinear alignment with proximal link 150, and torque generator 108 provides substantially small torque between proximal link 150 and distal link 152 such that the person can easily maneuver their upper arm 204 in this lowered position.

Figure 6:
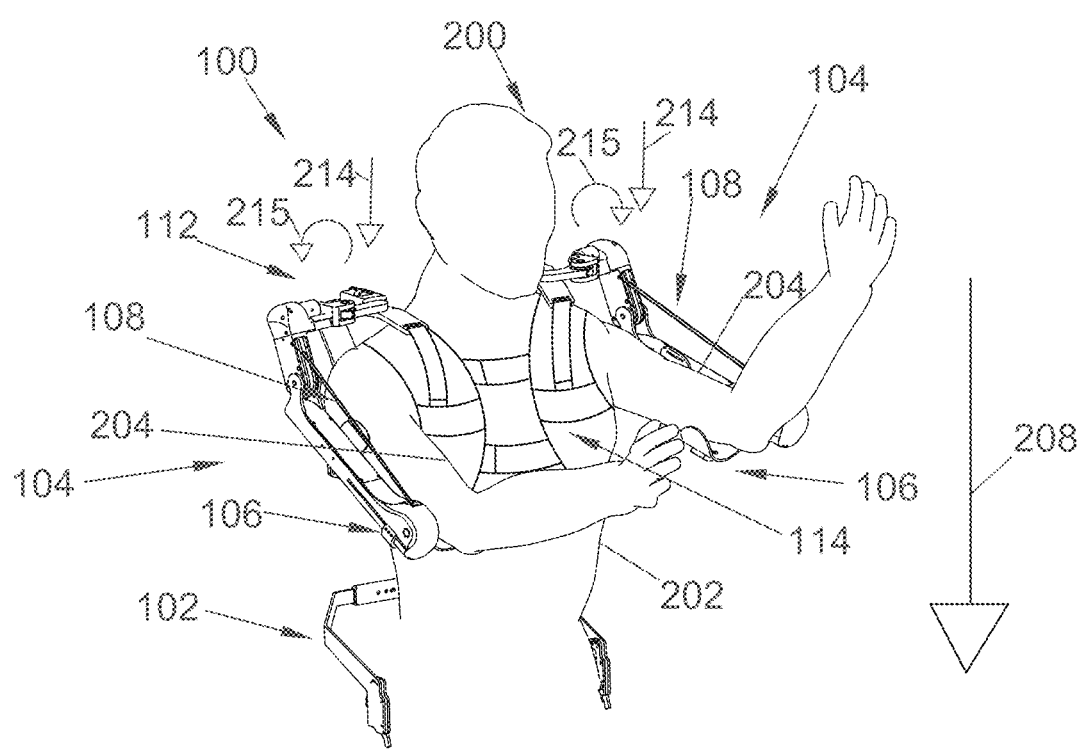
FIG. 6 is a front perspective view of an arm support exoskeleton, including two arm link mechanisms.

FIG. 6 depicts another embodiment of arm support exoskeleton 100 including two arm link mechanisms 104 connected to shoulder base 102, each including at least one torque generator 108 and at least one arm coupler 106. In some embodiments, distal link 152 moves in such a manner that it remains substantially parallel with upper arm 204.

Figure 65:
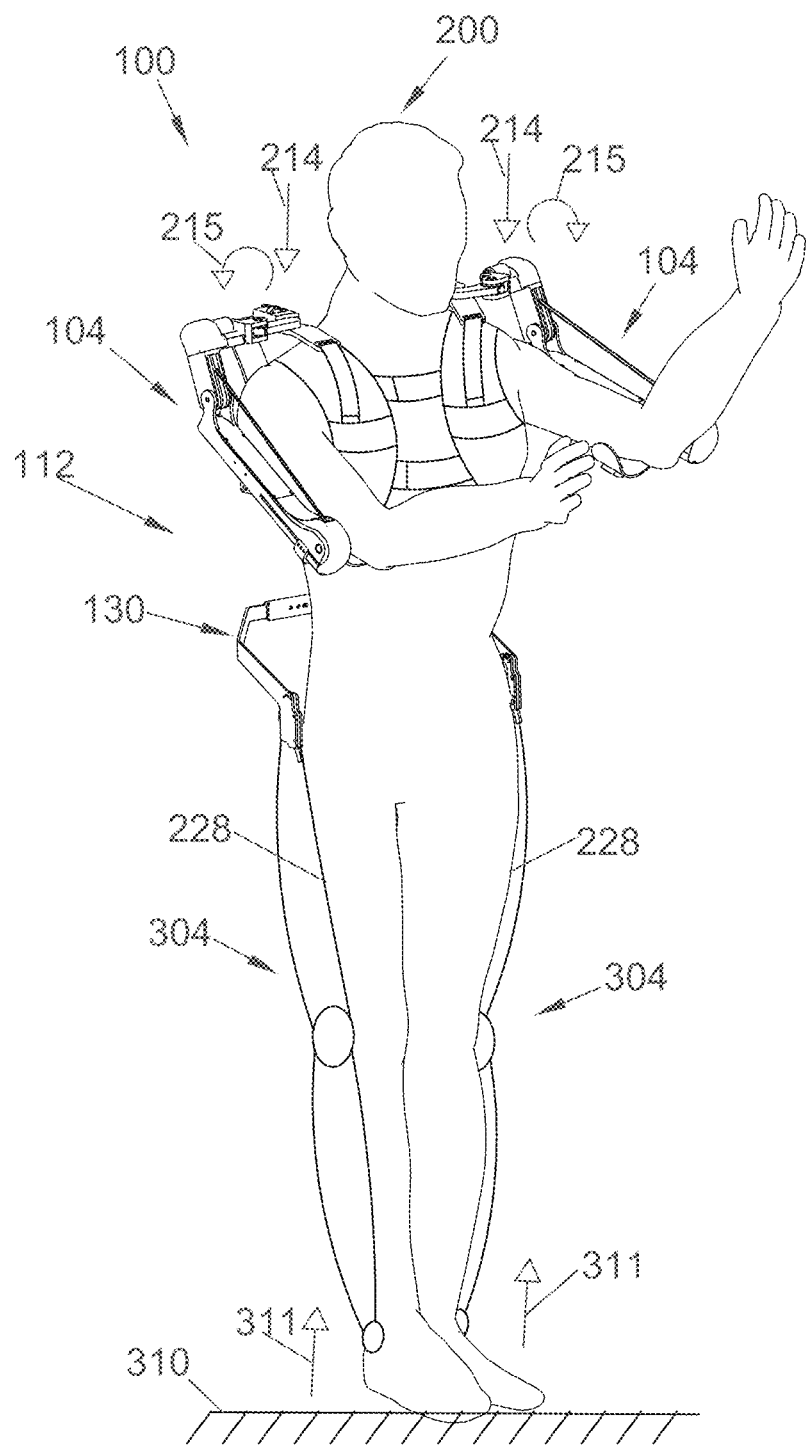
FIG. 65 is a front perspective view of a back frame coupled to a lower extremity exoskeleton.

In some embodiments, as depicted in FIG. 6, shoulder base 102 of arm supporting exoskeleton 100 comprises load bearing structure 112 coupled to arm link mechanism 104 and coupling mechanism 114 that attaches shoulder base 102 to trunk 202 of person 200. Load bearing structure 112 supports reaction forces 214 and reaction torques 215 from arm link mechanisms 104. In some embodiments, as depicted in FIG. 10 through FIG. 13, reaction forces 214 and reaction torques 215 transfer to person 200. In some embodiments, as depicted in FIG. 65, reaction forces 214 and reaction torques 215 transfer to a support surface (e.g., ground 310). Various embodiments of load bearing structure 112 and coupling mechanism 114 are described below.

Figure 7:
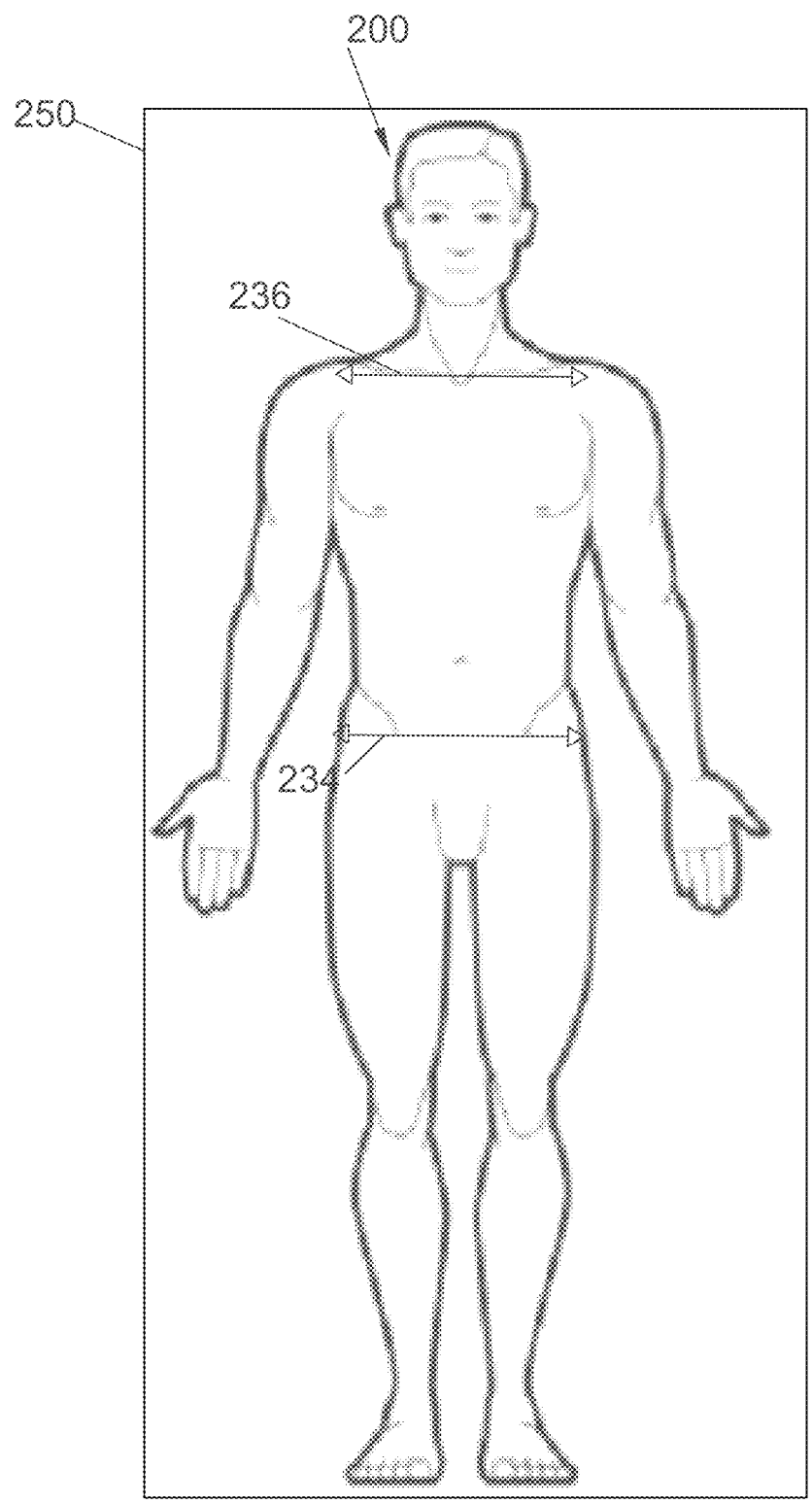
FIG. 7 is a front view of a person showing frontal plane and width dimensions.
Figure 8:
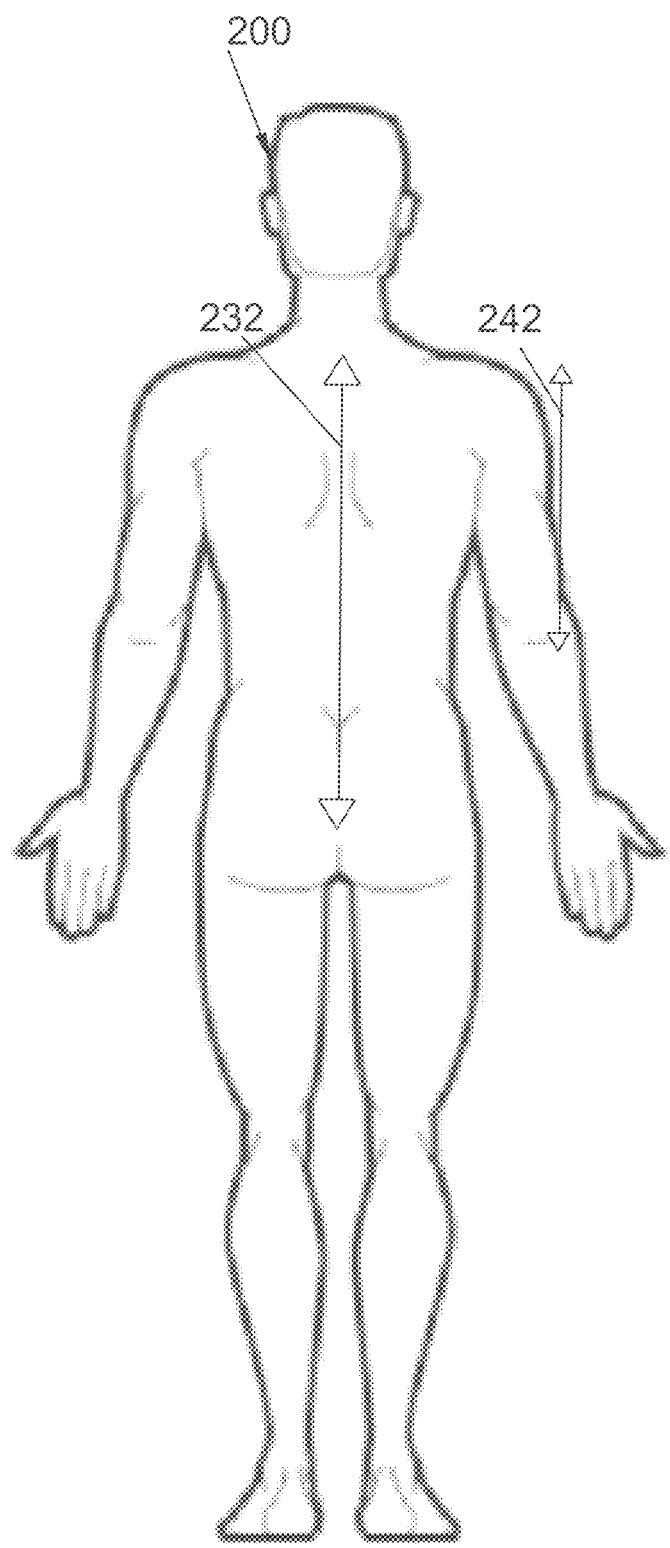
FIG. 8 is a back view of a person showing length dimensions.
Figure 9:
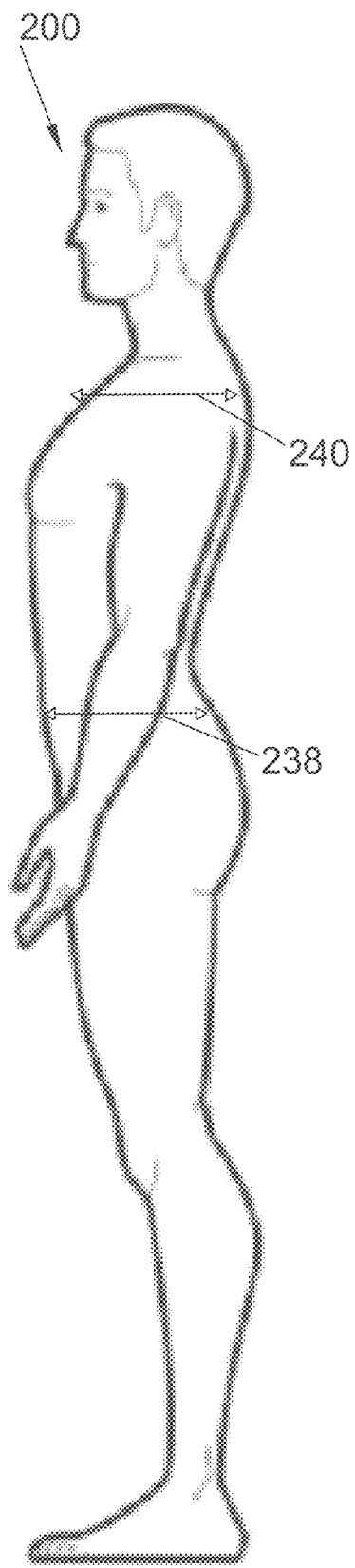
FIG. 9 is a side view of a person showing width dimensions.

FIGS. 7, 8, and 9 are presented here to describe various dimensions used herein in the description of load bearing structure 112. FIG. 7 depicts a front view of person 200 including hip width 234, shoulder width 236, and frontal plane 250 of person 200. FIG. 8 depicts a back view of person 200, including torso height 232 and upper arm length 242. FIG. 9 depicts a side view of person 200 including hip depth 238 and shoulder depth 240.

Figure 10:
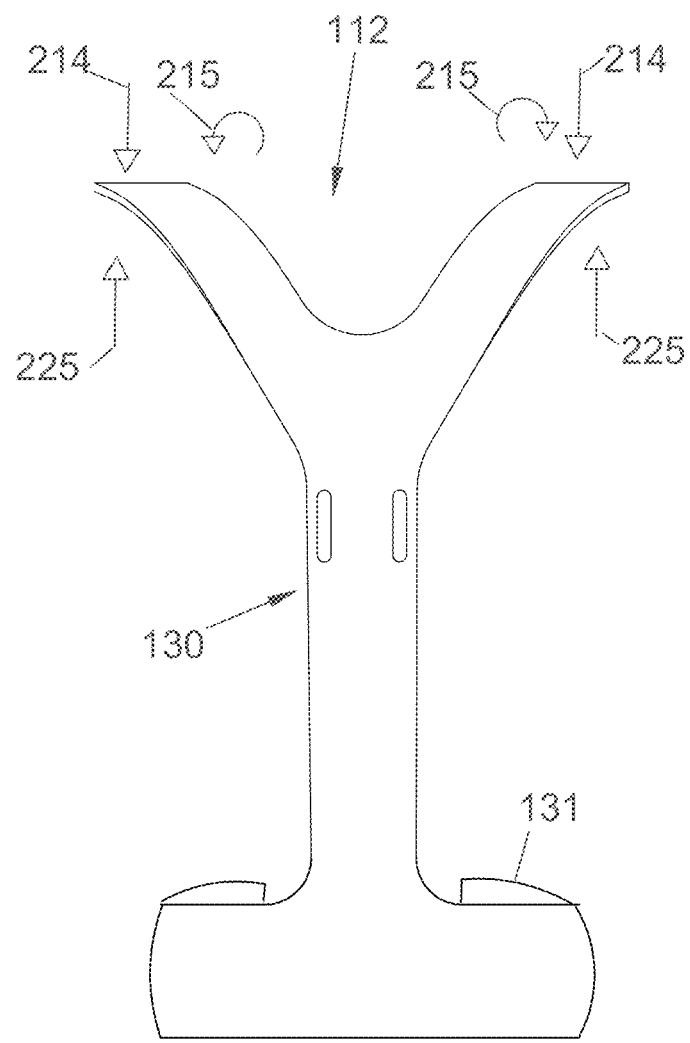
FIG. 10 is a rear view of a load bearing structure including a back frame and a hip loading belt.

FIG. 10 through FIG. 13 depict various embodiments of load bearing structures 112. As depicted in FIG. 10, in embodiments, load bearing structure 112 comprises back frame 130 supporting reaction forces 214 and torques 215 from arm link mechanisms 104 (not shown) and hip loading belt 131. Hip loading belt 131 transfers at least a portion of the reaction forces 214 and reaction torques 215 to hips 220 of person 200 (shown in FIG. 14), resulting in hip reaction force 221. Back frame 130 may also transfer at least a portion of the reaction forces 214 to shoulders 224 of person 200 (depicted in FIG. 14), as illustrated by shoulder reaction forces 225. Back frame 130 can be custom made, or incrementally sized, to accommodate torso height 232, hip width 234, shoulder width 236, hip depth 238, shoulder depth 240, or any combination thereof. In some embodiments, hip loading belt 131 and back frame 130 are constructed as one item.

Figure 11:
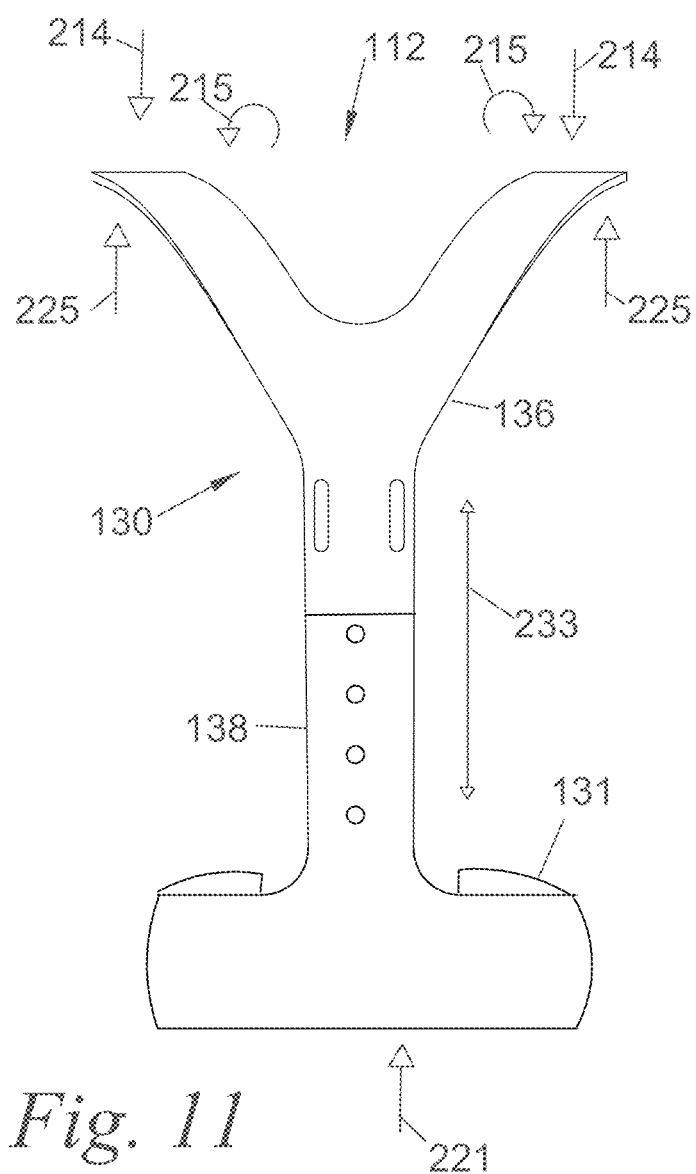
FIG. 11 is a rear view of a back frame including an upper frame and a lower frame.

FIG. 11 depicts a further embodiment of load bearing structure 112 wherein back frame 130 comprises upper frame 136 coupled to arm link mechanisms 104 (not shown) and lower frame 138 translationally coupled to upper frame 136 to provide desirable torso height adjustment 233 for torso height 232. Lower frame 138 is coupled to, or part of, hip loading belt 131. Reaction forces 214 from arm link mechanisms 104 are supported by upper frame 136, at least a portion of which are transferred to hips 220 by hip loading belt 131 via lower frame 138, resulting in hip reaction force 221. Upper Frame 136 may also transfer at least a portion of the reaction forces 214 to shoulders 224, as depicted by shoulder reaction forces 225. Upper frame 136 can be custom made, or incrementally sized, to accommodate shoulder width 236 and shoulder depth 240. Lower frame 138 can be custom made, or incrementally sized, to accommodate hip width 234 and hip depth 238.

Figure 12:
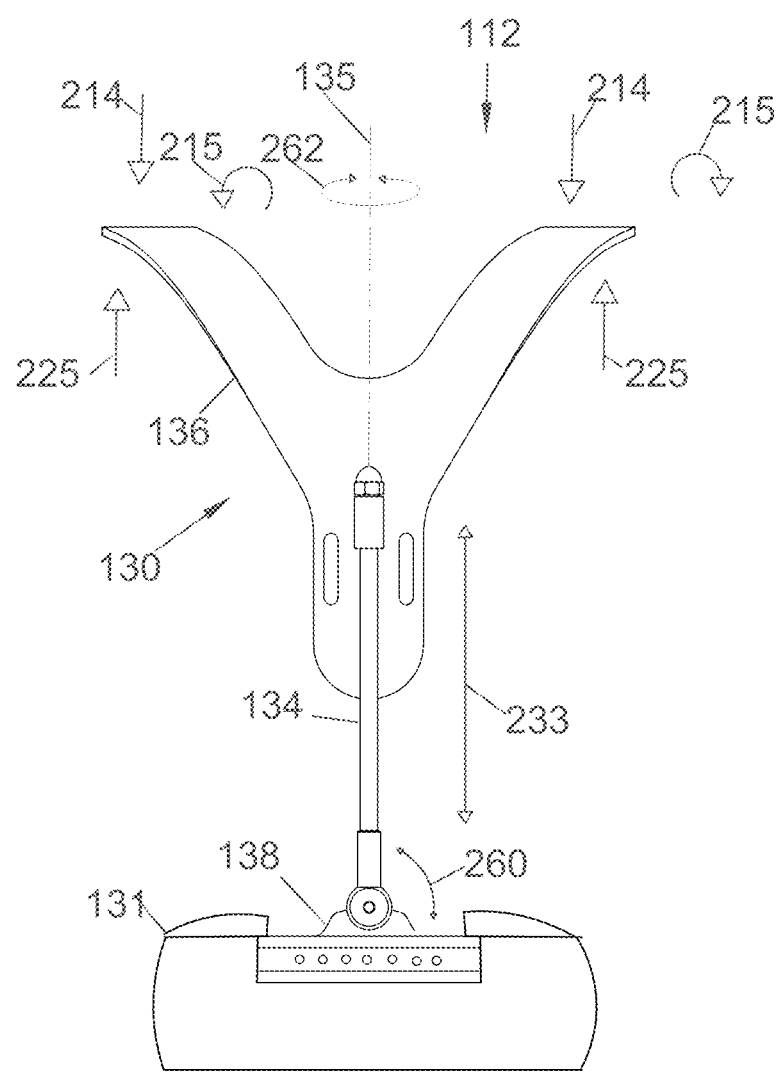
FIG. 12 is a rear view of a back frame including a spine frame.

FIG. 12 depicts a further embodiment of load bearing structure 112 wherein back frame 130 further comprises spine frame 134 connecting upper frame 136 to lower frame 138. Spine frame 134 is rotatably coupled to lower frame 138 on its lower end allowing for rotation of spine frame 134 relative to lower frame 138 in frontal plane 250 (FIG. 7) of person 200. Mediolateral flexion motion 260 shows the direction of movement between spine frame 134 and lower frame 138. Spine frame 134 is rotatably coupled to upper frame 136 along spine frame axis 135. Spinal twisting motion 262 shows the direction of movement between spine frame 134 and upper frame 136. Upper frame 136 may also translate relative to spine frame 134 along spine frame axis 135 to provide torso height adjustment 233 for torso height 232 of person 200. Degrees of freedom of spinal twisting motion 262 between upper frame 136 and spine frame 134 and mediolateral flexion motion 260 between lower frame 138 and spine frame 134 allow upper frame 136 to substantially move in unison with chest 222 of person 200 (depicted in FIG. 14), and lower frame 138 to substantially move in unison with hips 220 of person 200.

Figure 13:
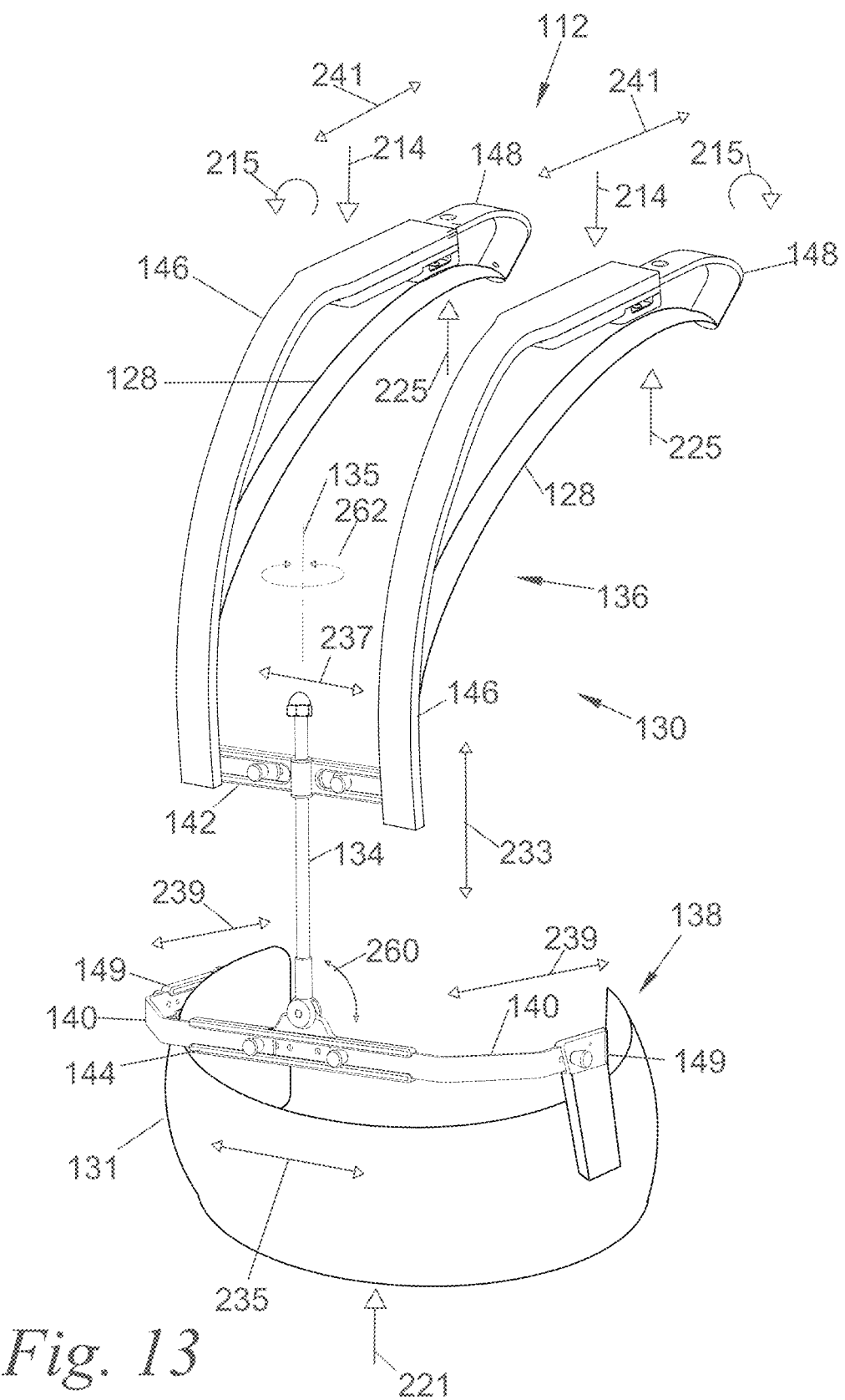
FIG. 13 is a rear view of an upper frame and a lower frame including width and depth adjusters.

FIG. 13 depicts another embodiment of load bearing structure 112 wherein lower frame 138 further comprises lower middle bar 144 and two lower corner bars 140 wherein each lower corner bar 140 can be coupled to lower middle bar 144 at various locations on the lower middle bar 144 to provide desirable hip width adjustment 235 to accommodate hip width 234 of person 200. Lower frame 138 may further comprise two lower side brackets 149 wherein each lower side bracket 149 can be coupled to lower frame 138 at various locations on lower frame 138 to provide desirable hip depth adjustment 239 to accommodate hip depth 238 of person 200. Upper frame 136 further comprises upper middle bar 142 and two upper corner bars 146 wherein each upper corner bar 146 can be coupled to upper middle bar 142 at various locations on upper middle bar 142 to provide desirable shoulder width adjustment 237 to accommodate shoulder width 236 of person 200. Upper frame 136 may also comprise two upper side brackets 148 wherein each upper side bracket 148 can be coupled to upper frame 136 at various locations on upper frame 136 to provide desirable shoulder depth adjustment 241 to accommodate shoulder depth 240 of person 200. Upper frame 136 may also comprise hammocks 128 spanning curves in upper frame 136 to more evenly distribute respective shoulder reaction force 225 (depicted in FIG. 13) to shoulders 224 of person 200 (depicted in FIG. 14). Adjustment of upper side brackets, upper corner bars, lower side brackets, and lower corner bars may include the use of plunger pins, screws, clamps, friction locks, rack and pinions, or any combination thereof.

FIG. 14 through FIG. 22 depict various embodiments where coupling mechanism 114 includes belt 116 that attaches to load bearing structure 112 at belt attachment points 115 and at least partially encircles hips 220 of person 200. Belt 116 can move in unison with hips 220 of person 200. In some embodiments, belt 116 can change length to allow secure attachment to hips 220.

Figure 14:
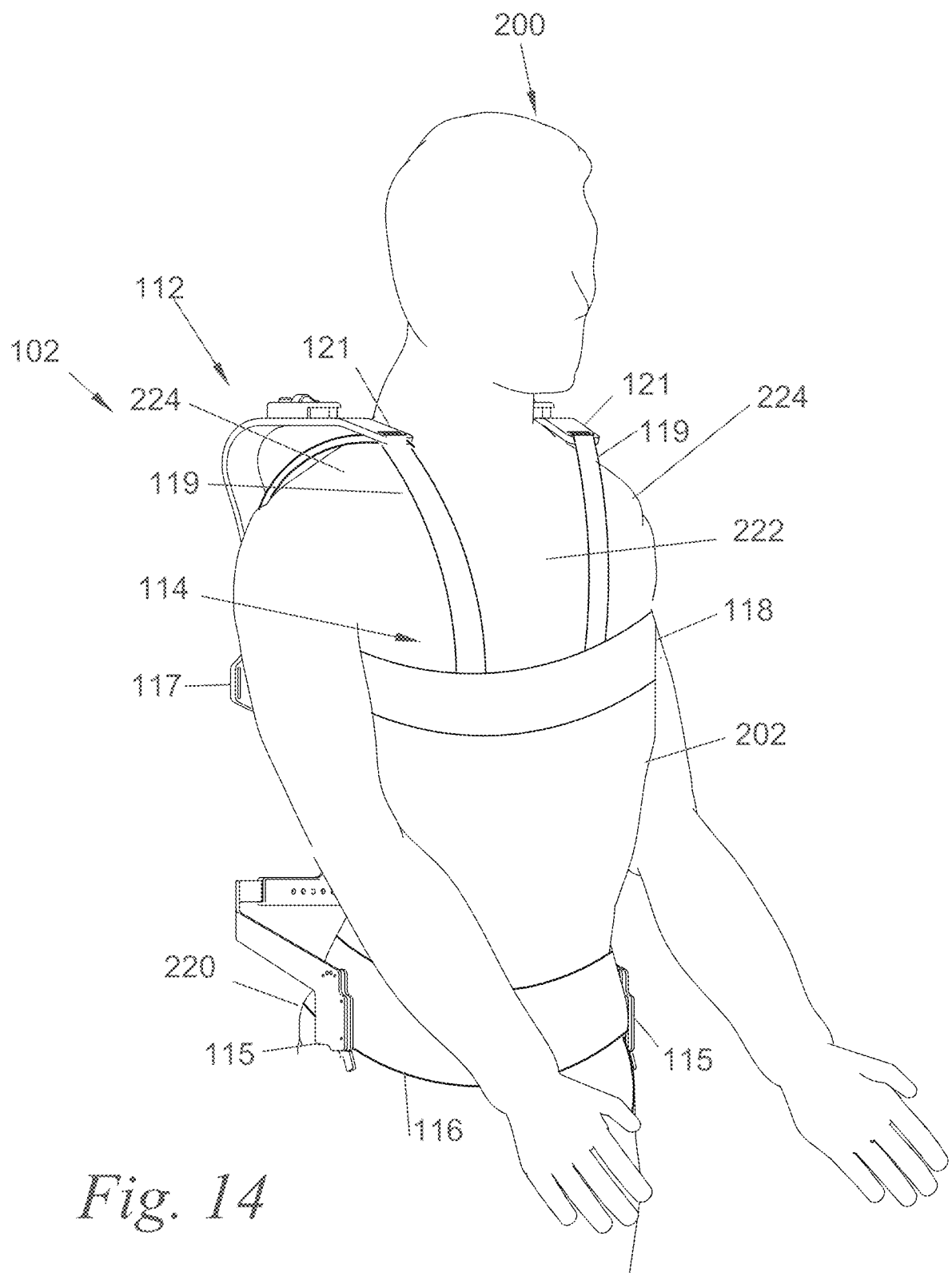
FIG. 14 is a front perspective view of a coupling mechanism including a belt, a chest strap, and an anchor strap.
Figure 15:
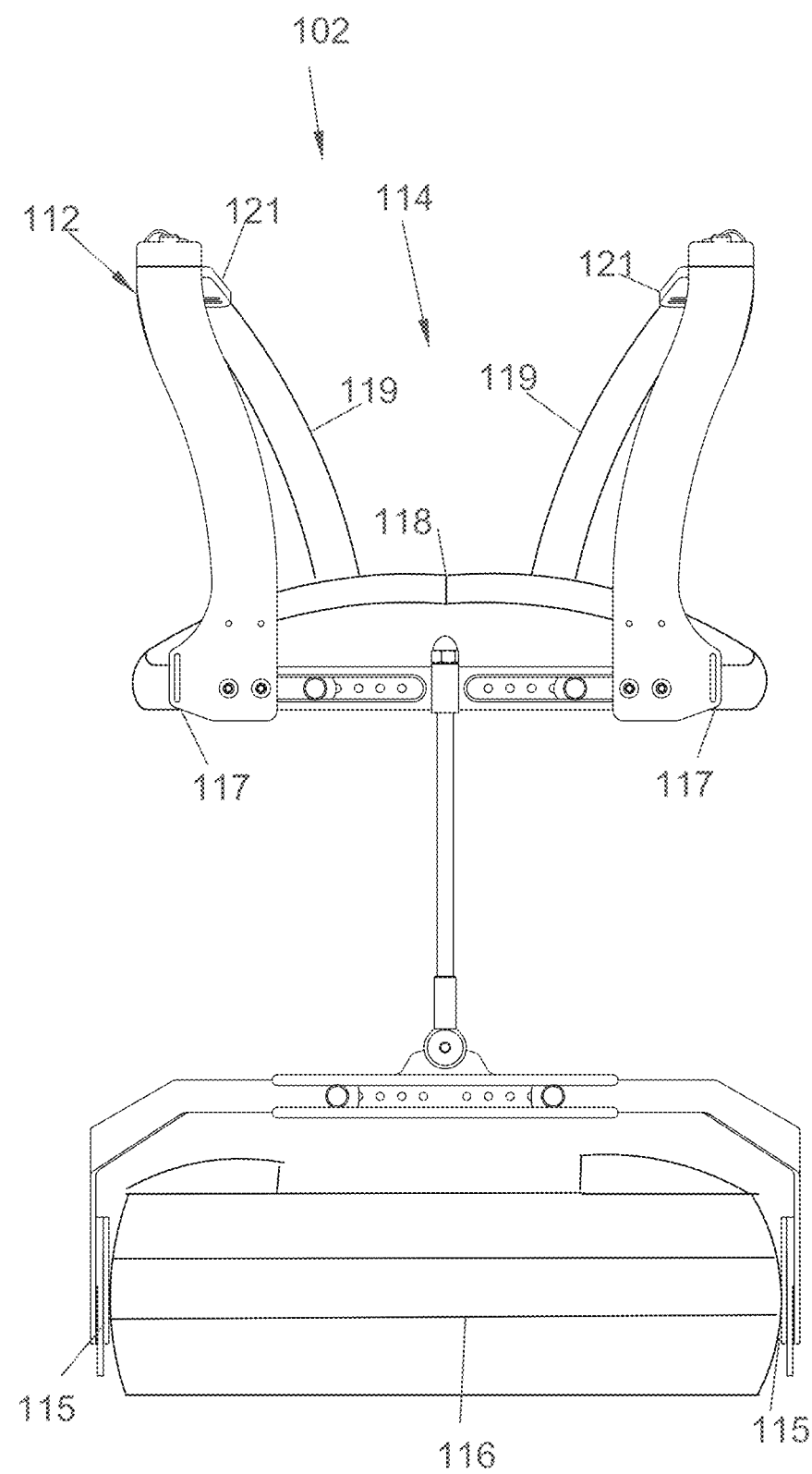
FIG. 15 is rear view of a coupling mechanism including a belt, a chest strap, and an anchor strap.
Figure 16:
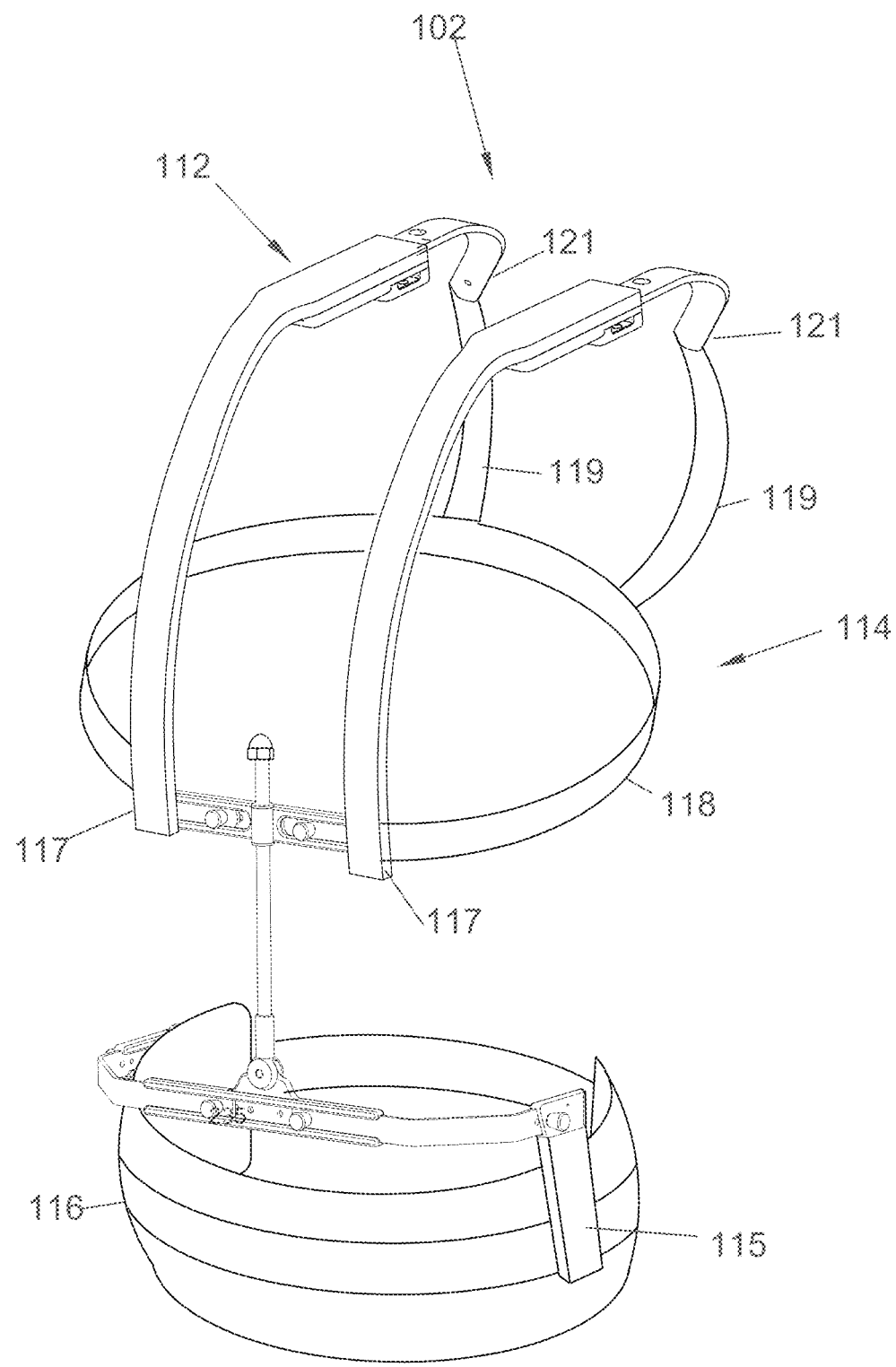
FIG. 16 is a back perspective view of a coupling mechanism including a belt, a chest strap, and an anchor strap.

FIGS. 14, 15 and 16 depict various embodiments of the shoulder base 102. FIG. 14 shows a front perspective view of shoulder base 102 with person 200. FIG. 15 shows a rear view of shoulder base 102 without person 200. FIG. 16 shows a rear perspective view of shoulder base 102 without person 200. In this embodiment, a coupling mechanism 114 includes chest strap 118. Chest strap 118 at least partially encircles chest 222 of person 200. Chest strap 118 is mounted to load bearing structure 112 at mid-dorsal attachment points 117 approximately at the level of chest 222. In some embodiments, coupling mechanism 114 includes at least one anchor strap 119 mounted to load bearing structure 112 at upper ventral attachment points 121 at its first end, and attaches to chest strap 118 at its second end. Chest strap 118 and anchor strap 119 move in unison with chest 222. In some embodiments, chest strap 118 and anchor strap 119 can change length to allow secure attachment to chest 222. In some embodiments, chest strap 118 is rigid to prevent deflection due to the tightening of anchor straps 119.

Figure 17:
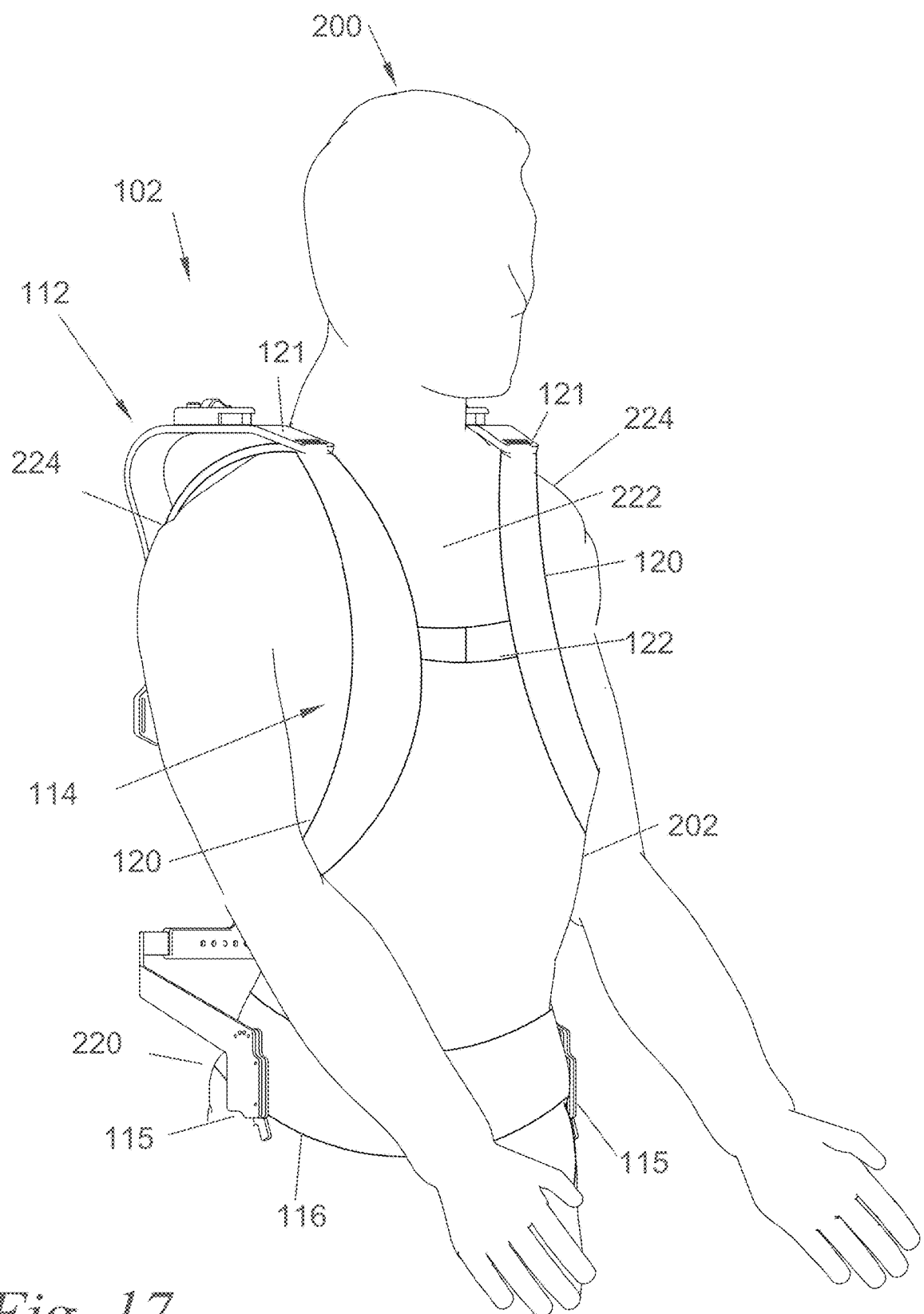
FIG. 17 is a front perspective view of a coupling mechanism including a belt, a shoulder strap, and a sternum strap.
Figure 18:
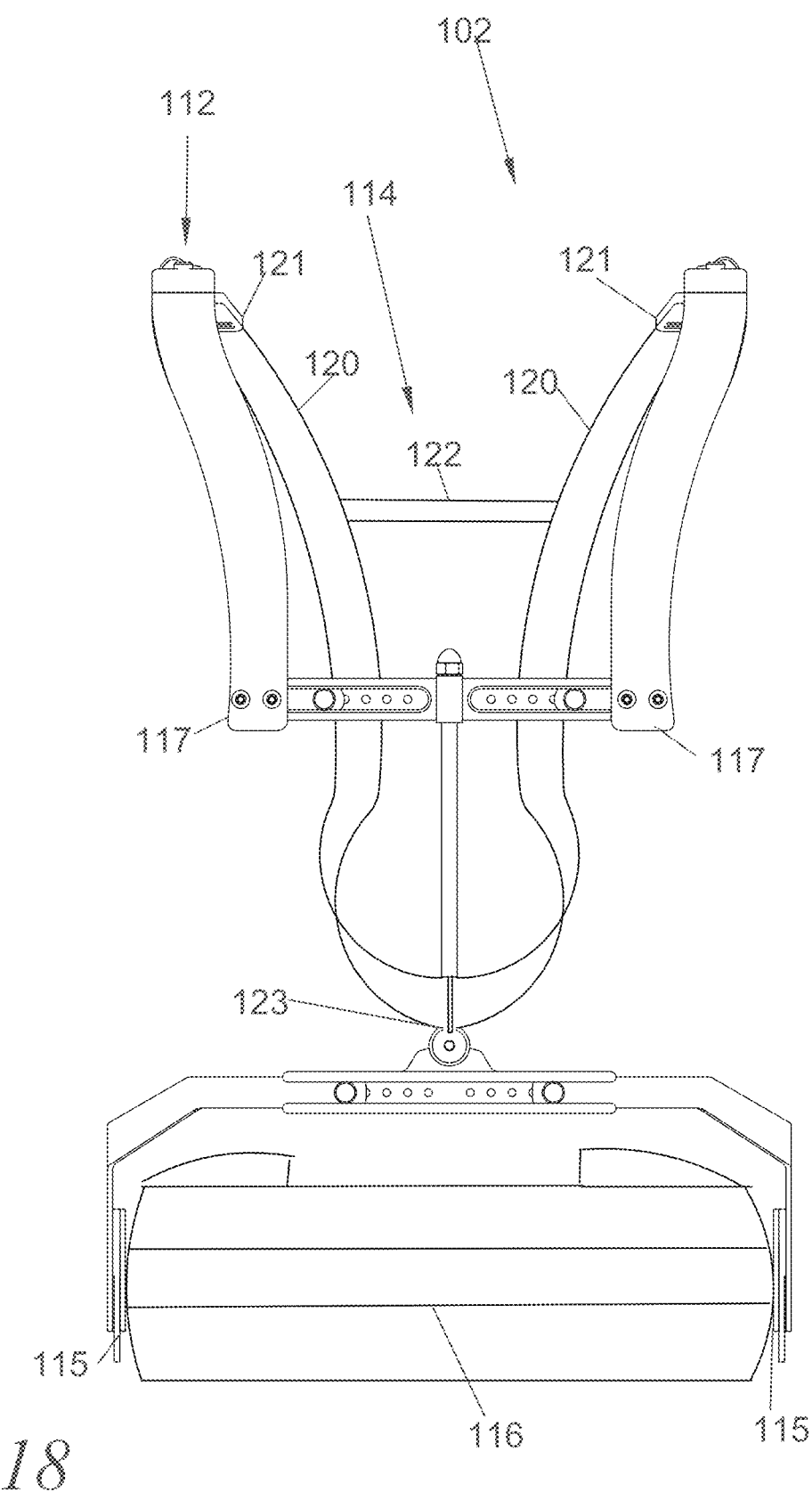
FIG. 18 is a rear view of a coupling mechanism including a belt, a shoulder strap, and a sternum strap.
Figure 19:
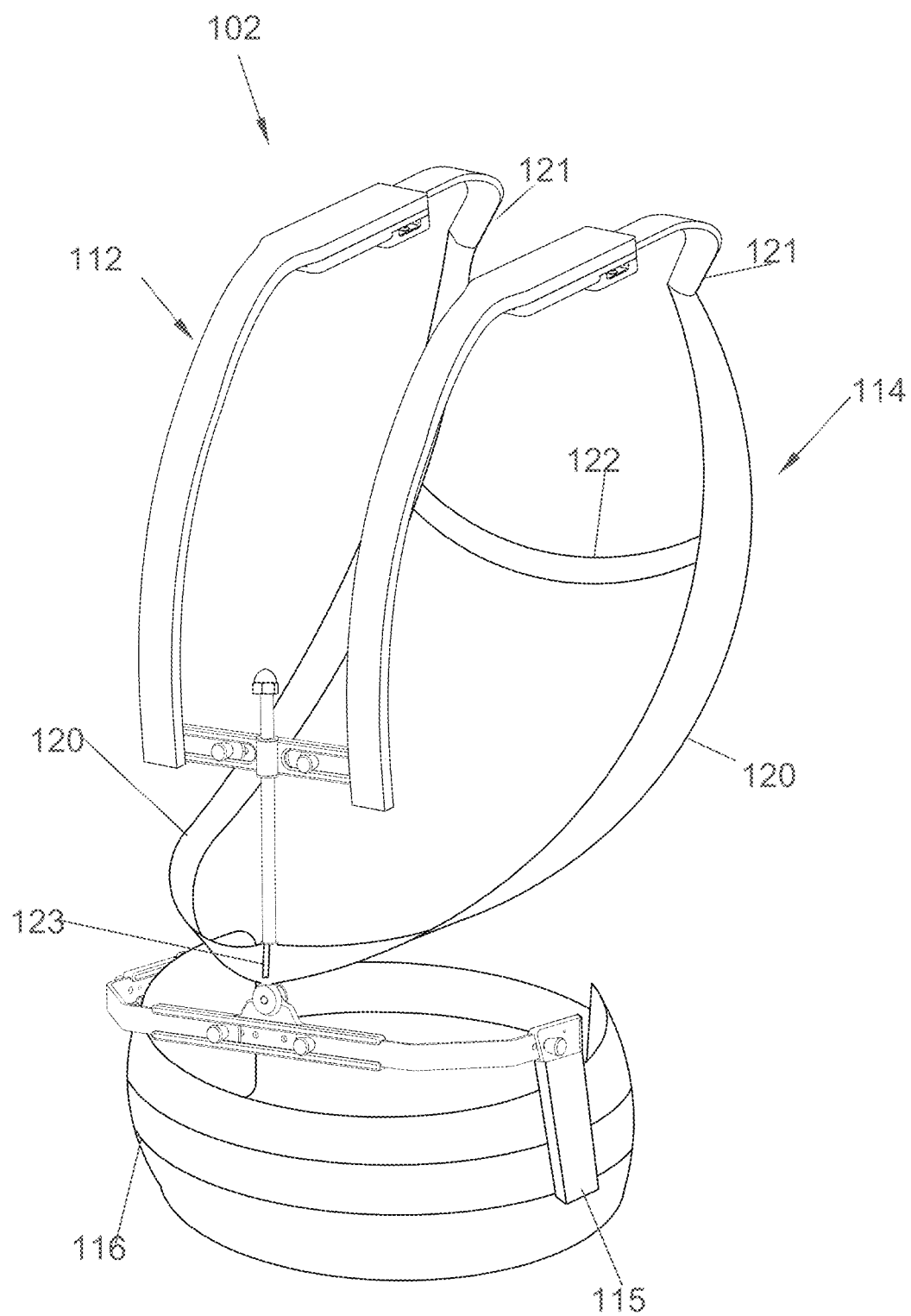
FIG. 19 is a back perspective view of a coupling mechanism comprising a belt, a shoulder strap, and a sternum strap.

FIGS. 17, 18 and 19 depict various embodiments of the shoulder base 102. FIG. 17 shows a front perspective view of shoulder base 102 with person 200. FIG. 18 shows a rear view of shoulder base 102 without person 200. FIG. 19 shows a rear perspective view of shoulder base 102 without person 200. In this embodiment, coupling mechanism 114 includes at least two shoulder straps 120. Two shoulder straps 120 at least partially encircle shoulders 224. Each shoulder strap 120 is mounted to load bearing structure 112 at respective upper ventral attachment points 121 on a first end and at lower dorsal attachment points 123 on a second end. In some embodiments, sternum strap 122 connects to one shoulder strap 120 at its first end and another shoulder strap 120 at its second end. Shoulder strap 120 and sternum strap 122 move in unison with chest 222. In some embodiments, shoulder strap 120 and sternum strap 122 can change length to allow secure attachment to chest 222. In some embodiments, shoulder strap 120 is mounted to load bearing structure 112 at upper ventral attachment point 121 on its first end and middle dorsal attachment points 117 at its second end.

Figure 20:
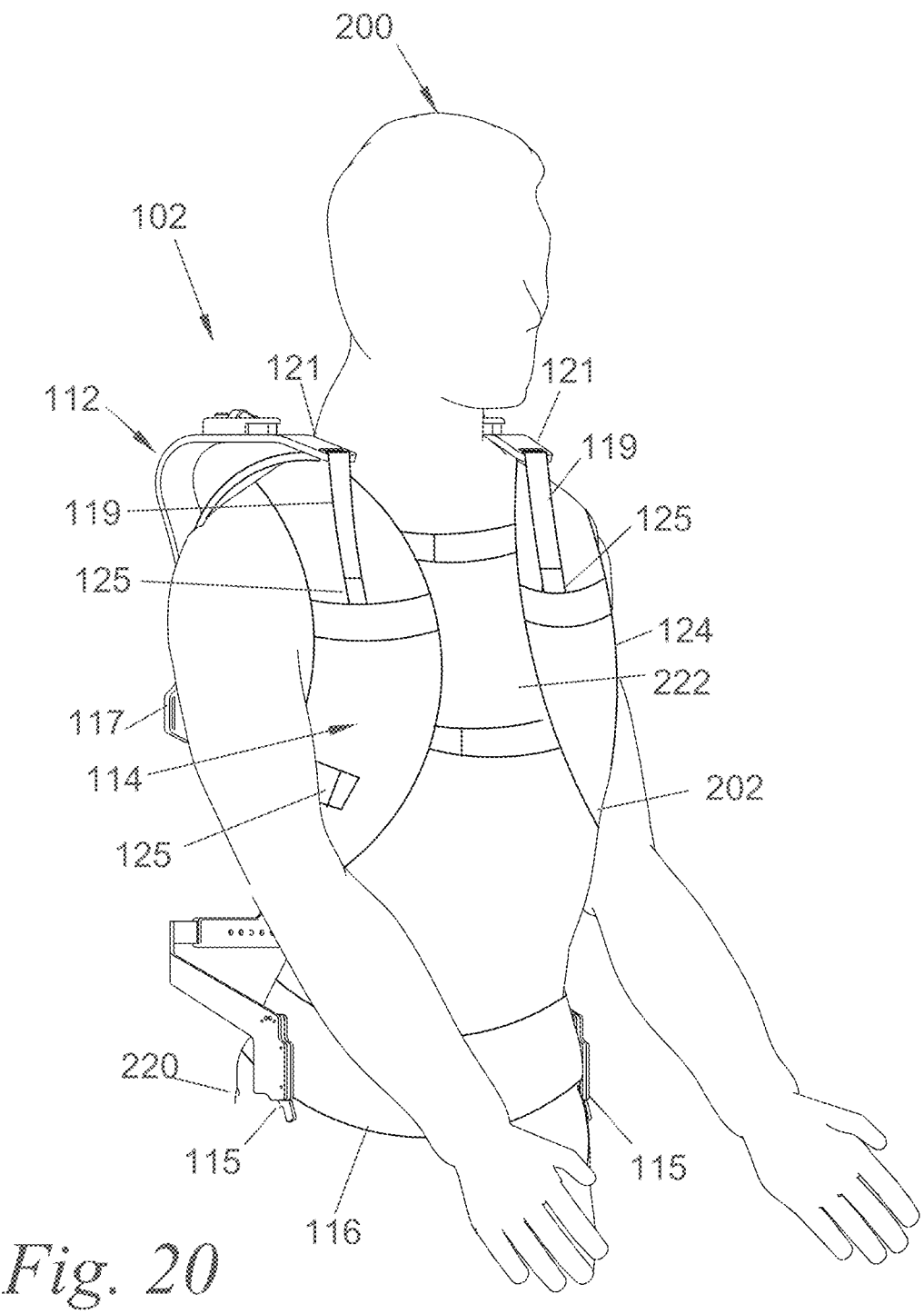
FIG. 20 is a front perspective view of a coupling mechanism including a belt and a vest.
Figure 21:
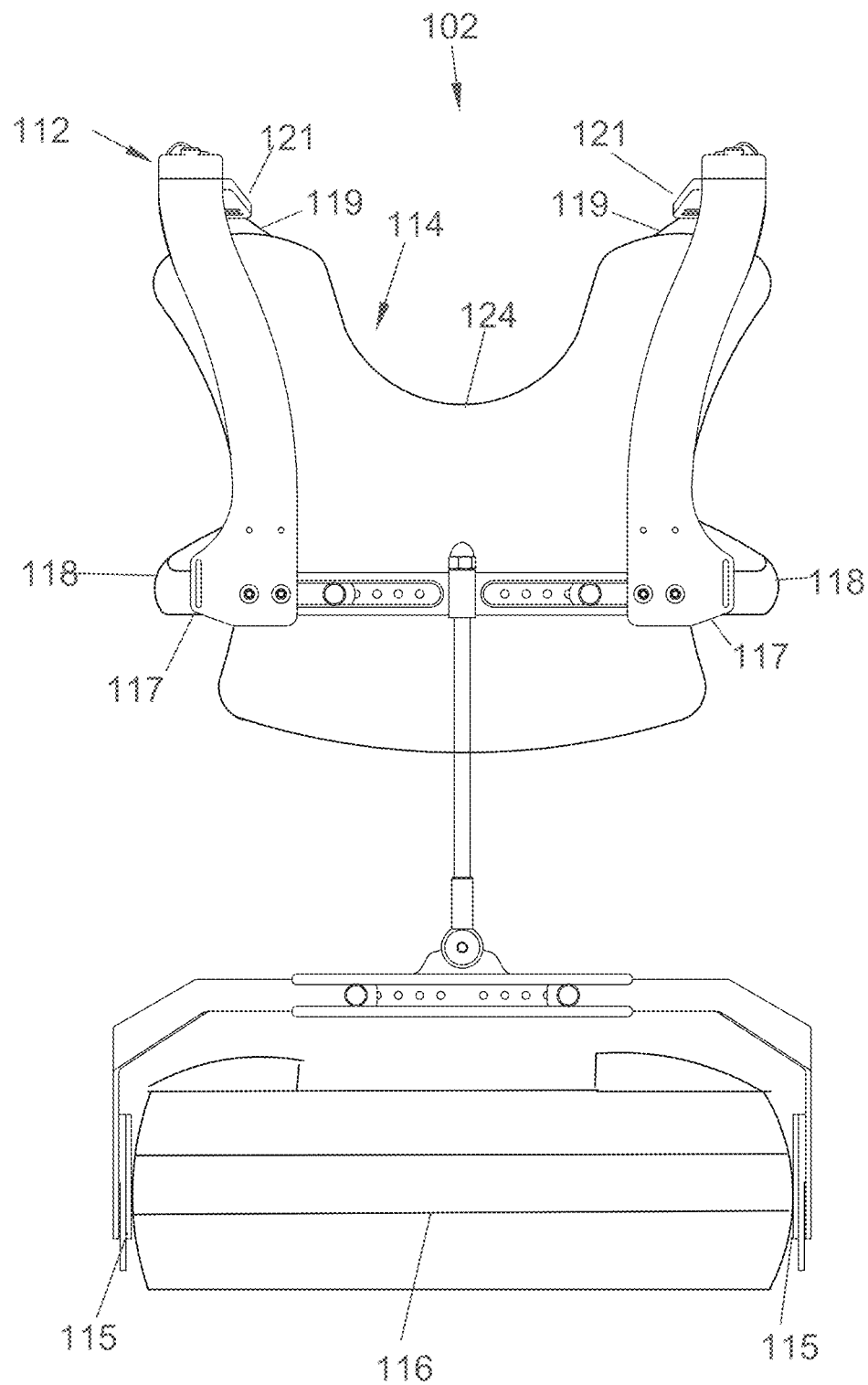
FIG. 21 is a rear view of a coupling mechanism including a belt and a vest.
Figure 22:
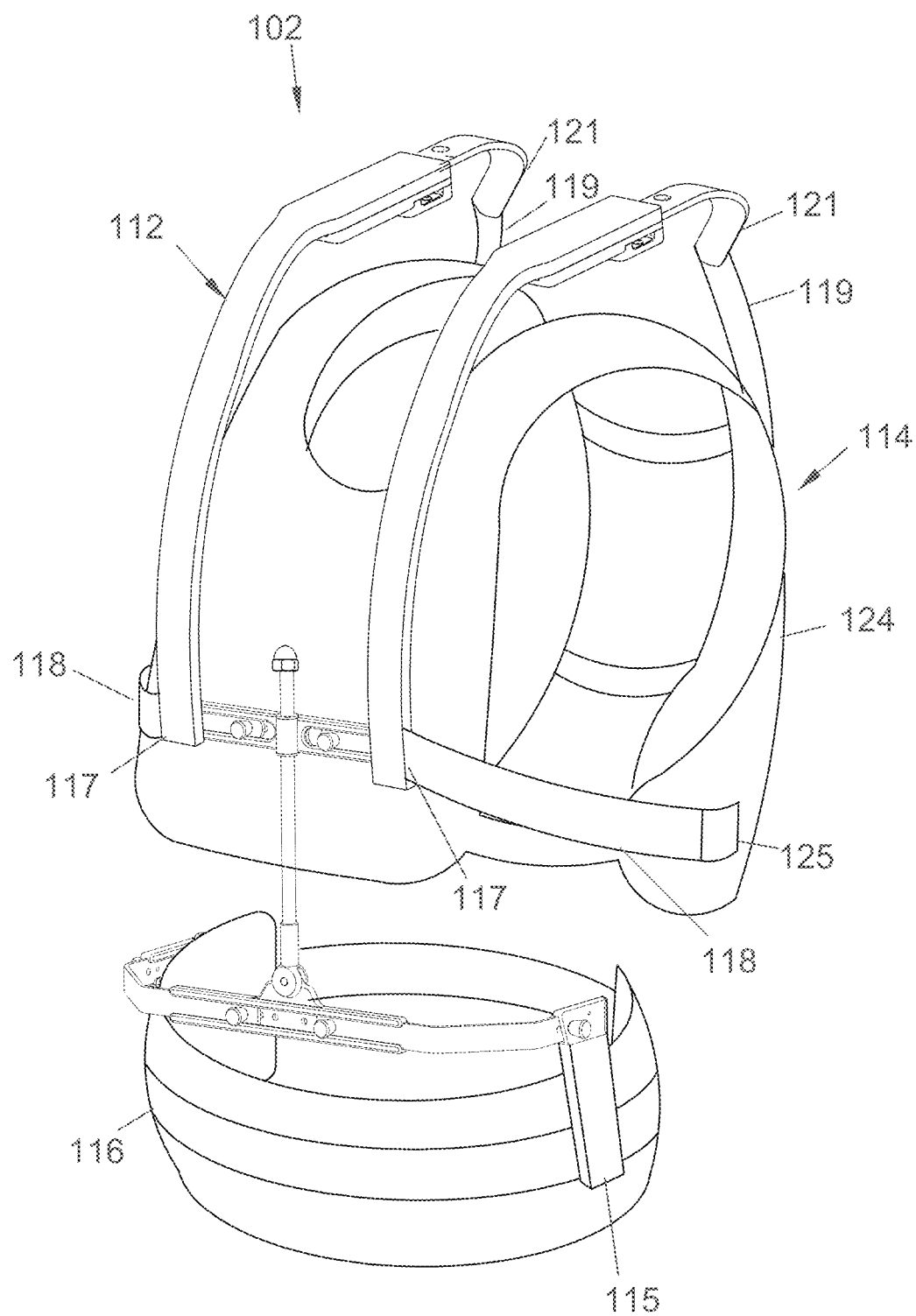
FIG. 22 is a back perspective view of a coupling mechanism including a belt and a vest.

FIGS. 20, 21 and 22 depict various embodiments of the shoulder base 102. FIG. 20 shows a front perspective view of shoulder base 102 with person 200. FIG. 21 shows a rear view of shoulder base 102 without person 200. FIG. 22 shows a rear perspective view of shoulder base 102 without person 200. In this embodiment, coupling mechanism 114 includes vest 124 that securely attaches to chest 222. Vest 124 can move in unison with chest 222. In some embodiments, vest 124 is connected to shoulder base 102 by a plurality of vest attachment points 125. In some embodiments, vest attachment points 125 attach to chest straps 118, anchor straps 119, shoulder straps 120, sternum straps 122, or any combination thereof.

Figure 23:
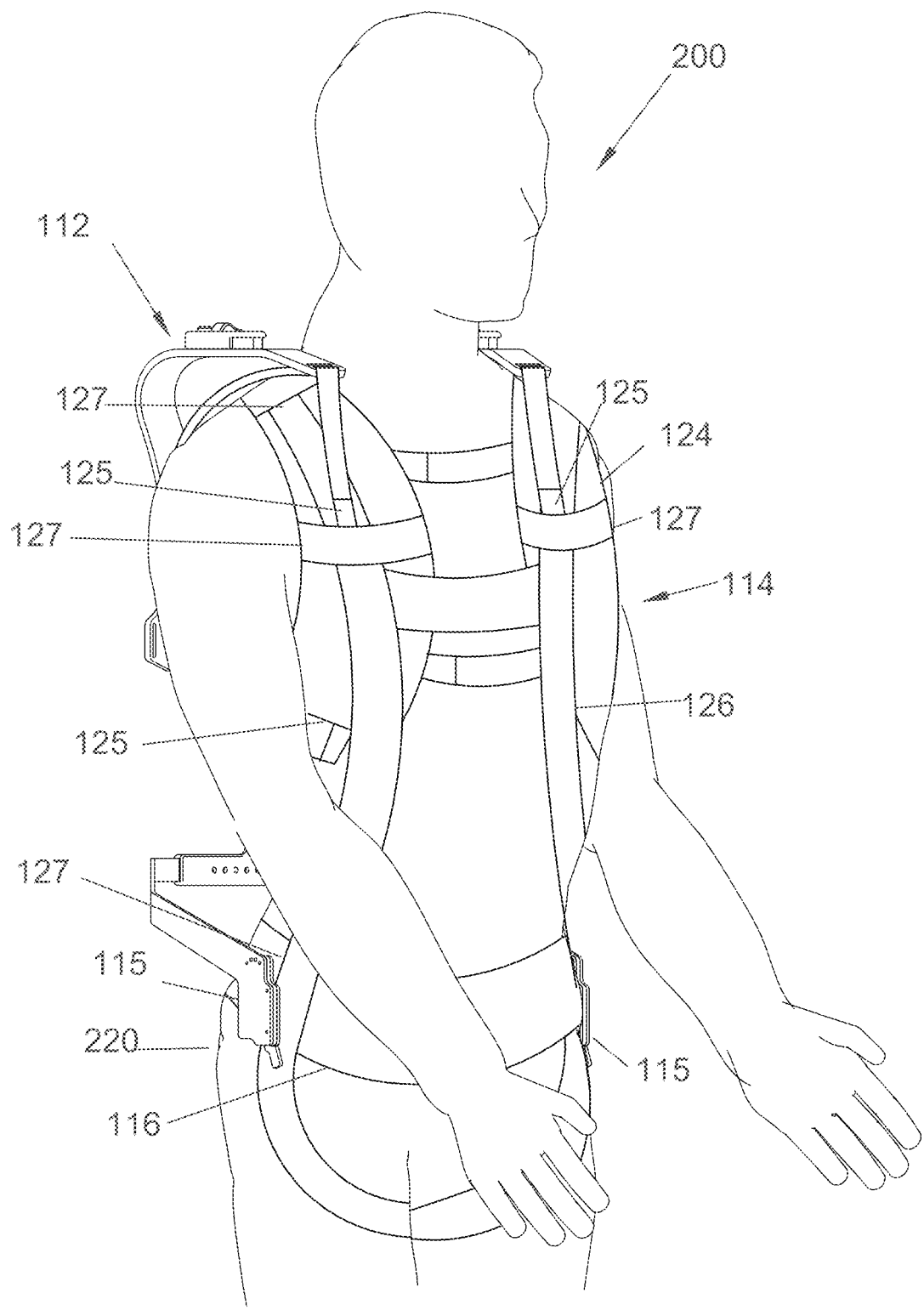
FIG. 23 is a front perspective view of a coupling mechanism including a vest connected to a safety harness.
Figure 24:
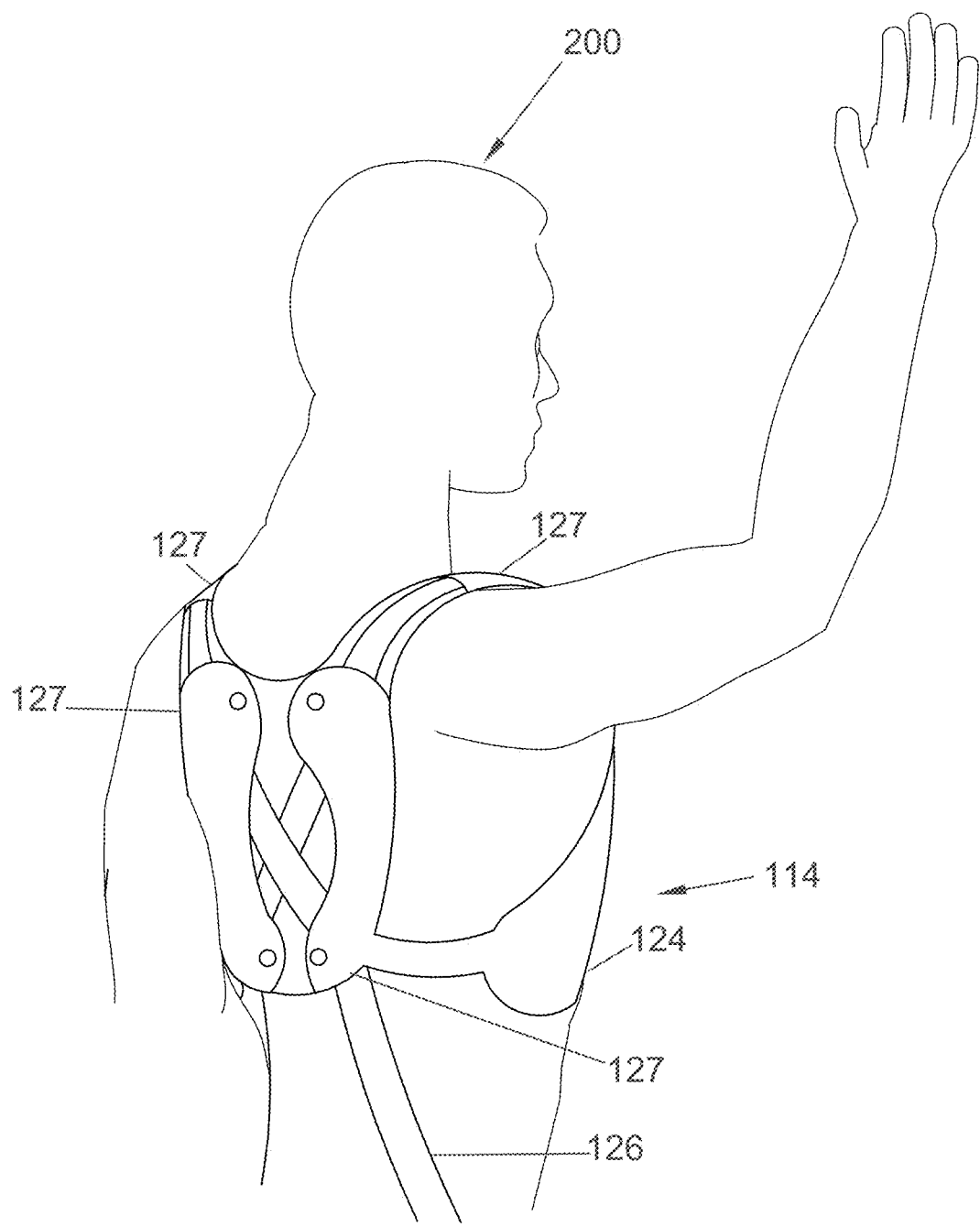
FIG. 24 is a rear perspective view of a coupling mechanism including a vest connected to a safety harness.
Figure 25:
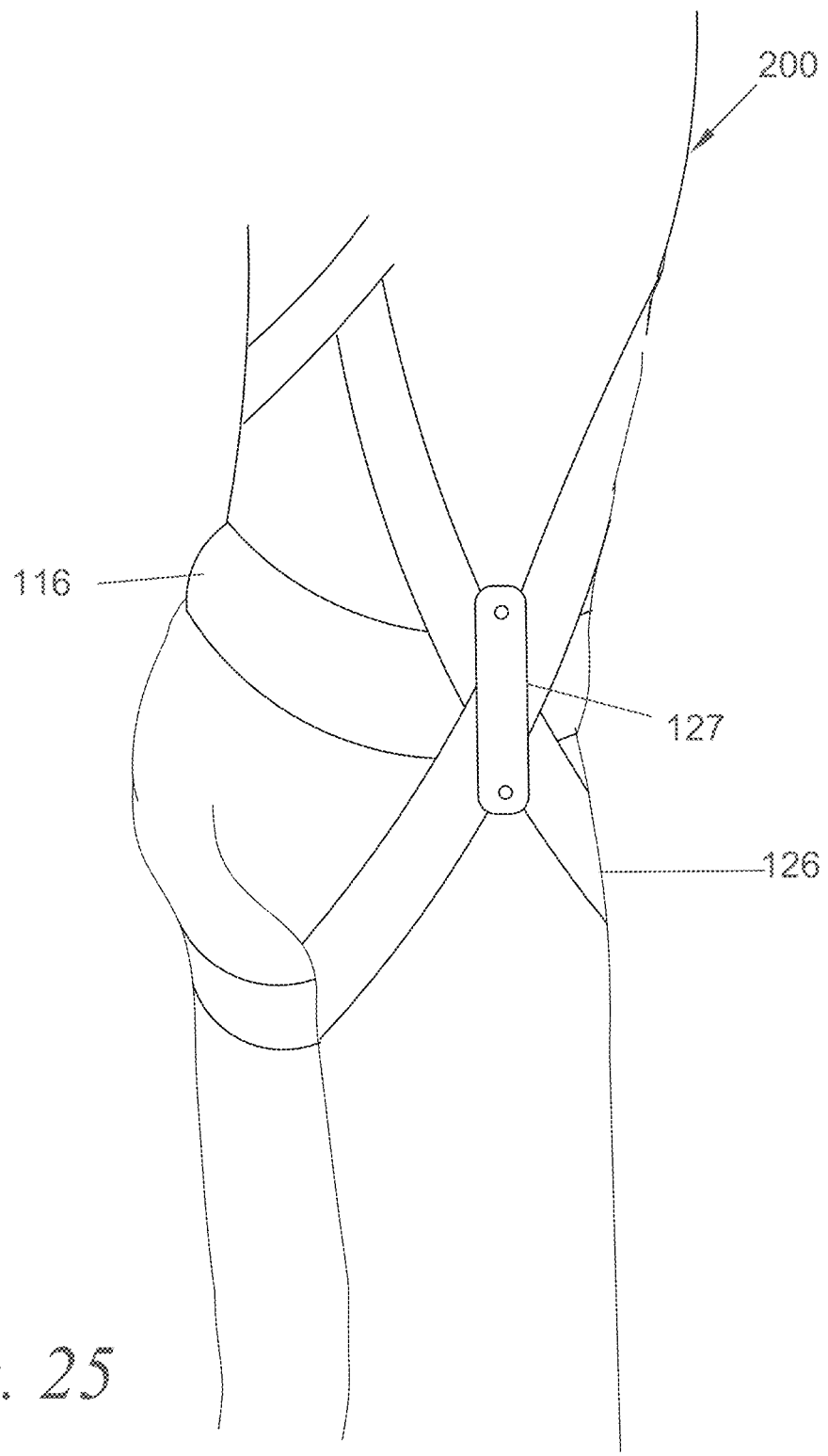
FIG. 25 is a rear perspective view of a coupling mechanism including a belt connected to a safety harness.

FIG. 23 through FIG. 25 depict embodiments of shoulder base 102 wherein coupling mechanism 114 can be coupled to safety harness 126 worn by person 200 by at least one safety harness attachment point 127 without modification of safety harness 126. FIG. 23 and FIG. 24 depict an embodiment wherein vest 124 contains at least one safety harness attachment point 127. Safety harness attachment points 127 allow vest 124 to attach to safety harness 126 without modification of safety harness 126. Safety harness attachment points 127 may be located on the front, shoulder, or back of vest 124. FIG. 23 shows a front perspective view of safety harness attachment points 127 on the front and shoulders of vest 124. FIG. 24 depicts a close up back perspective view of the embodiment (without load bearing structure 112), including safety harness attachment points 127 on a back and shoulders of vest 124. Safety harness attachment points 127 may be formed by VELCRO® loops, buttoned flaps, straps, buckles, clips, clamps, or any combination thereof. FIG. 25 depicts an embodiment wherein belt 116 contains at least one safety harness attachment point 127. Safety harness attachment point 127 allows safety harness 126 to be attached to belt 116 without modification of safety harness 126. In some embodiments, safety harness attachment points 127 are located on the sides of belt 116. Safety harness attachment points 127 may be formed by VELCRO® loops, buttoned flaps, straps, buckles, clips, clamps, or any combination thereof.

Figure 26:
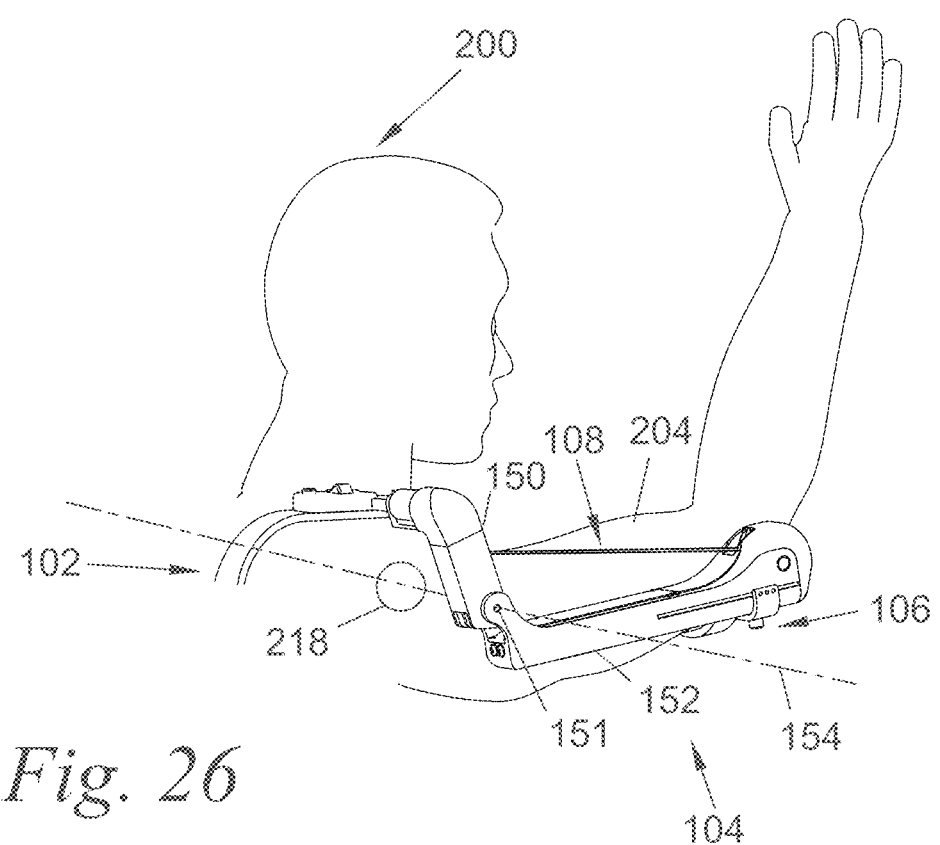
FIG. 26 is a rear perspective close up view of an assist device showing a first rotational axis aligning with a person's glenohumeral joint.
Figure 27:
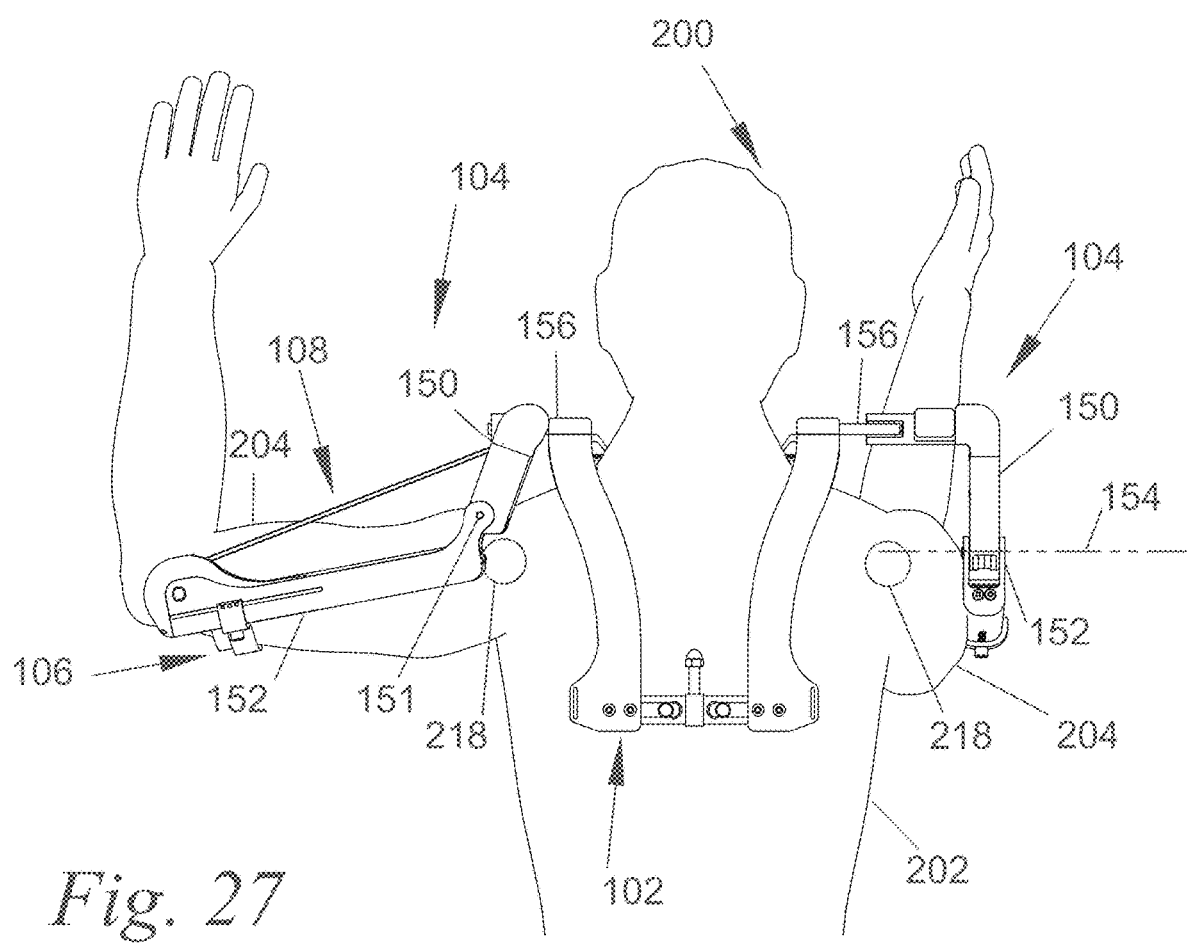
FIG. 27 is a rear view of an assist device showing a first rotational axis aligning with a person's glenohumeral joint.

FIG. 26 depicts the close up view of arm link mechanism 104. In this embodiment, first rotational axis 154 of first joint 151 approximately passes through glenohumeral joint 218 of person 200. FIG. 27 depicts a back view of this embodiment wherein arm support exoskeleton 100 contains two arm link mechanisms 104.

Figure 28:
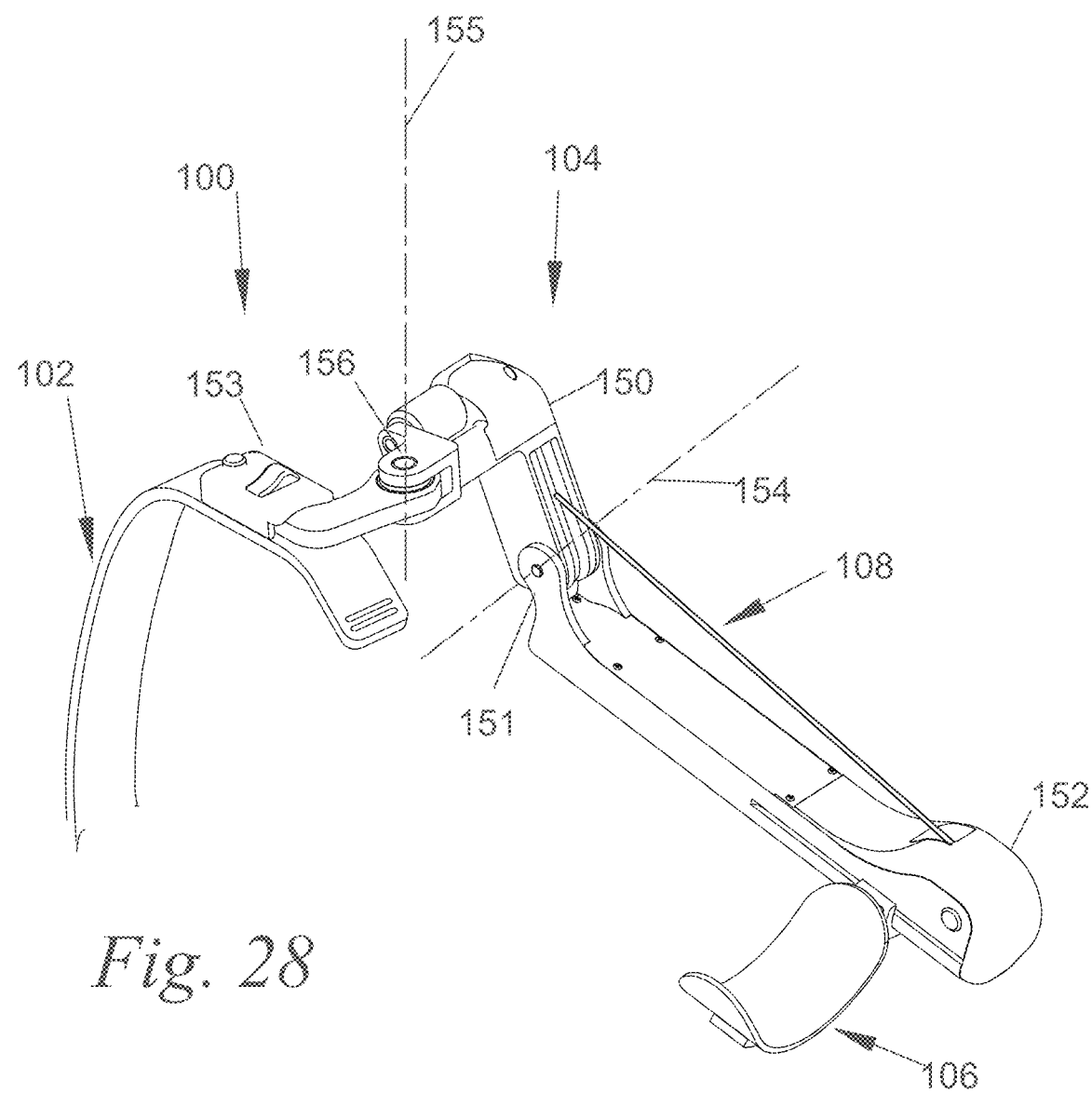
FIG. 28 is a perspective view of an arm link mechanism including a second rotational axis.
Figure 29:
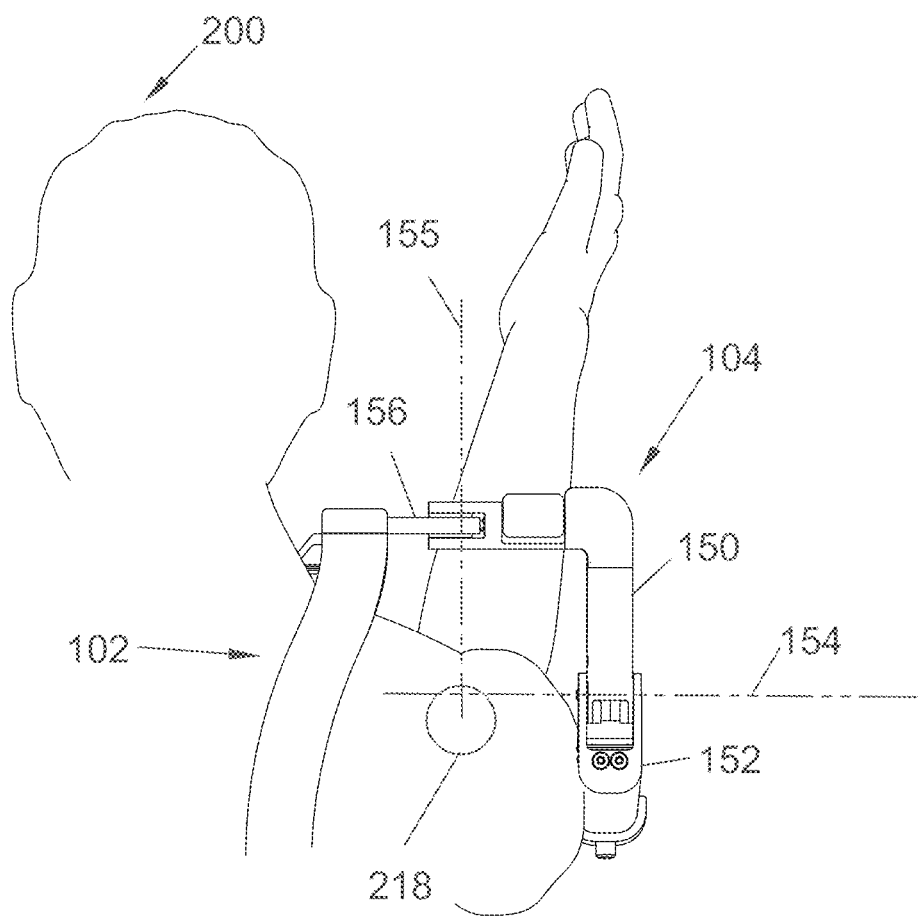
FIG. 29 is a rear close up view of the second rotational axis of FIG. 28 aligning with a person's glenohumeral joint.

FIG. 28 and FIG. 29 depict another embodiment of arm supporting exoskeleton 100 wherein arm link mechanism 104 comprises at least one horizontal rotation joint 156. Horizontal rotation joint 156 allows proximal link 150 to rotate relative to shoulder base 102 about second rotational axis 155. Second rotational axis 155 is substantially orthogonal to first rotational axis 154. FIG. 29 shows a rear view of the arm link mechanism 104, wherein the second rotational axis 155 is shown to substantially pass through glenohumeral joint 218 of person 200.

Figure 30:
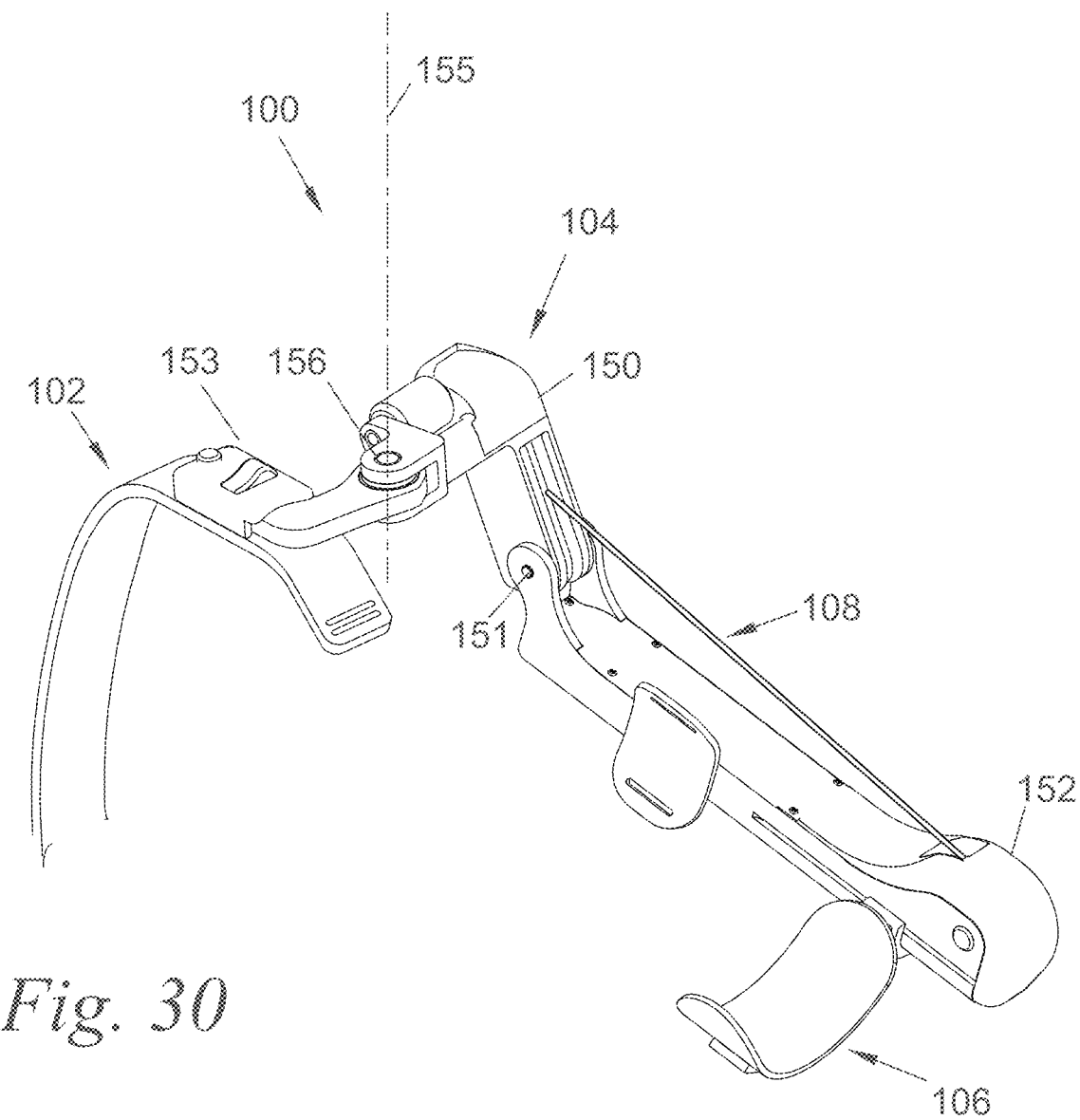
FIG. 30 is a perspective view of shoulder bracket connecting a shoulder base to arm link mechanism.
Figure 31:
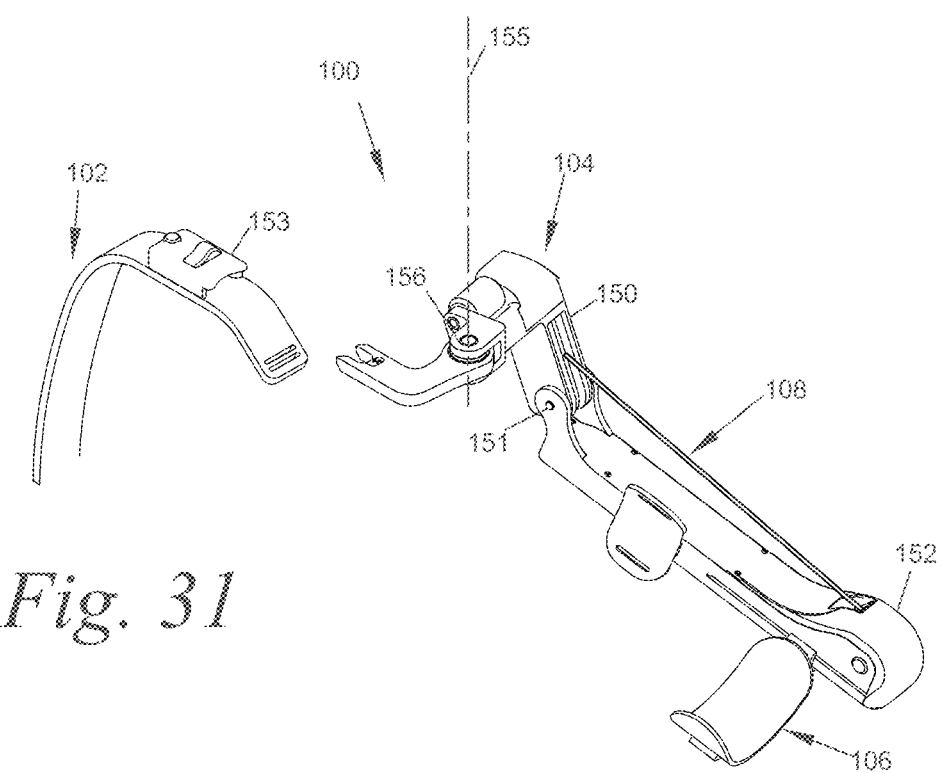
FIG. 31 is a perspective view of a shoulder bracket showing an arm link mechanism removed from a shoulder base.

FIG. 30 and FIG. 31 depict an embodiment of arm support exoskeleton 100 that comprises at least one shoulder bracket 153 coupled to shoulder base 102. Shoulder bracket 153 facilitates a quick connect and disconnect coupling between arm link mechanism 104 and shoulder base 102. FIG. 30 depicts shoulder bracket 153 coupling arm link mechanism 104 to shoulder base 102. FIG. 31 shows shoulder bracket 153 allowing arm link mechanism 104 to be removed from shoulder base 102.

FIG. 32 depicts another embodiment of arm support exoskeleton 100 that comprises at least one shoulder bracket 153 coupled to shoulder base 102. Shoulder bracket 153 can couple shoulder base 102 to arm link mechanism 104 in multiple positions to provide desirable shoulder width adjustment 237 to accommodate shoulder width 236 of person 200, referenced in FIG. 7. In another embodiment not depicted, shoulder bracket 153 can couple to arm link mechanism 104 in multiple positions to provide desirable shoulder depth adjustment 241 to accommodate shoulder depth 240 of person 200.

Figure 33:
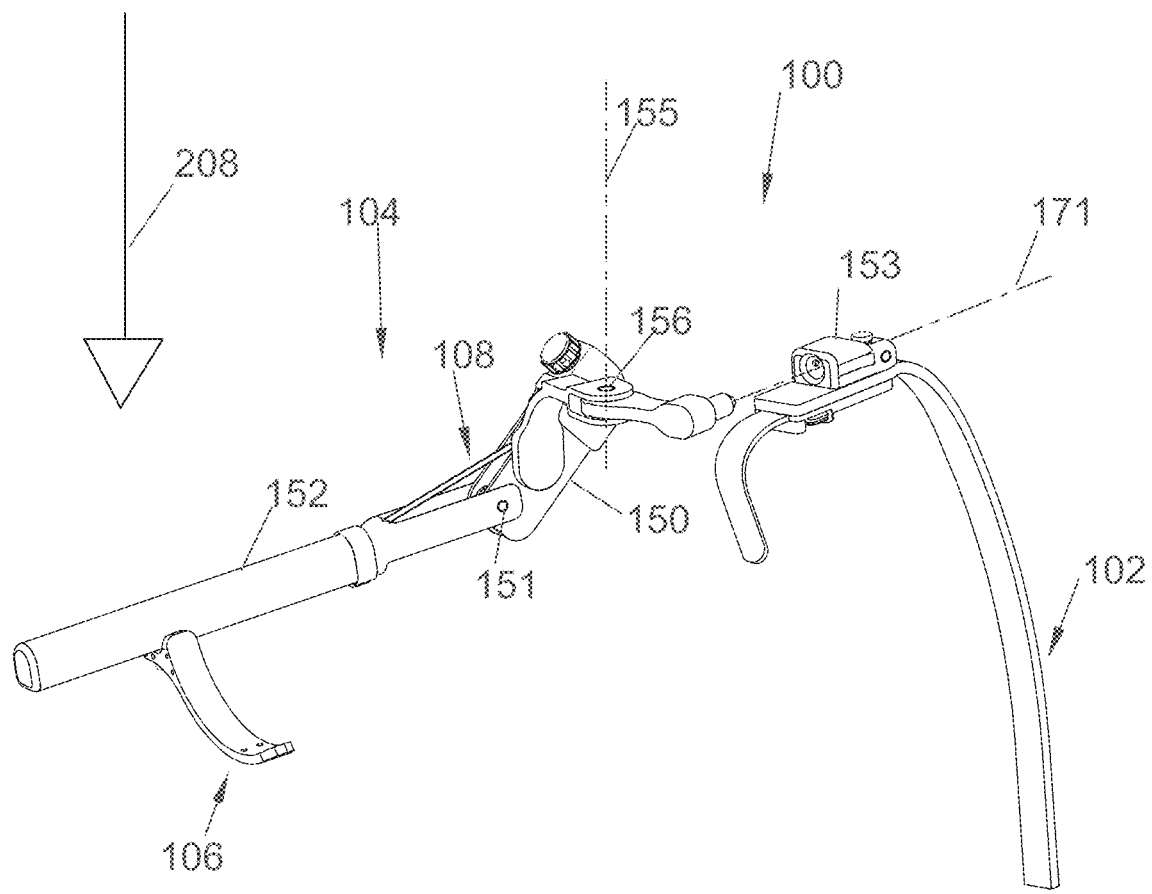
FIG. 33 is a perspective view of a shoulder bracket, showing a scapular rotation axis.

FIG. 33 depicts another embodiment of arm supporting exoskeleton 100 wherein shoulder base 102 comprises at least one shoulder bracket 153. Shoulder bracket 153 is rotatably coupled to arm link mechanism 104 along scapular rotation axis 171, wherein the scapular rotation axis 171 is substantially orthogonal to gravity line 208 when person 200 (not shown) is standing upright.

Figure 34:
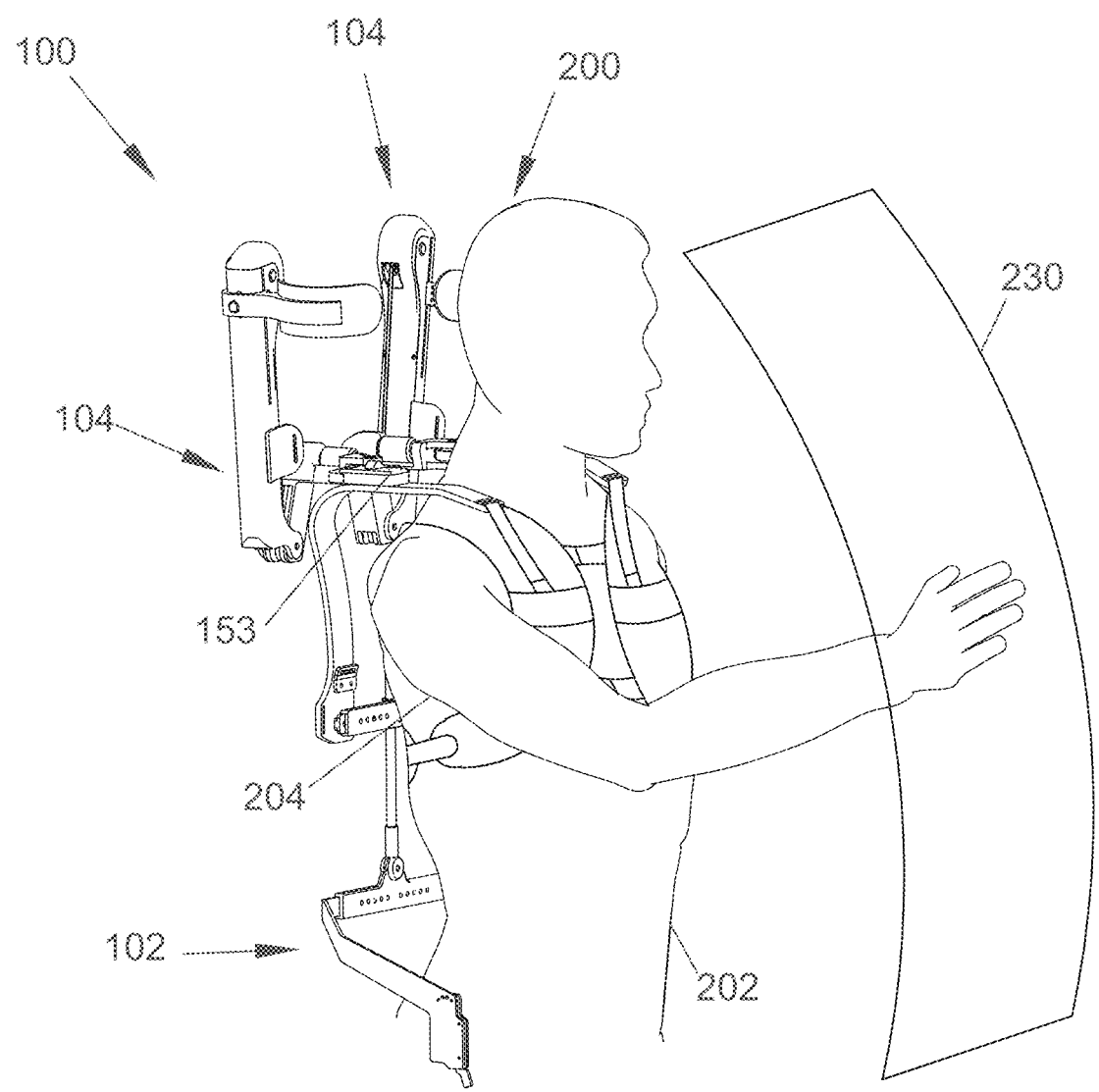
FIG. 34 is a front perspective view of a person with an arm support exoskeleton in a stowed position.
Figure 35:
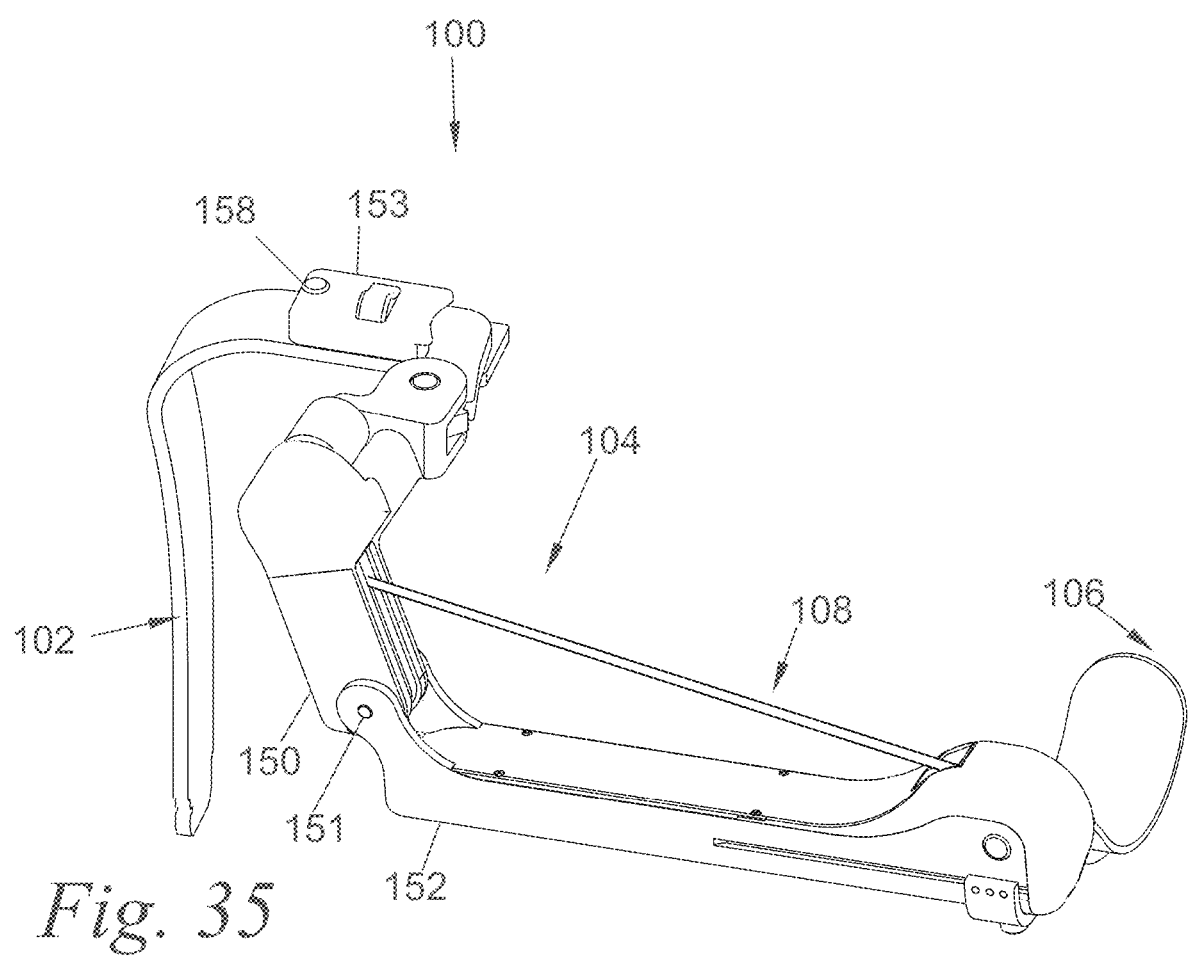
FIG. 35 is a perspective view of an arm supporting exoskeleton in a working position.
Figure 36:
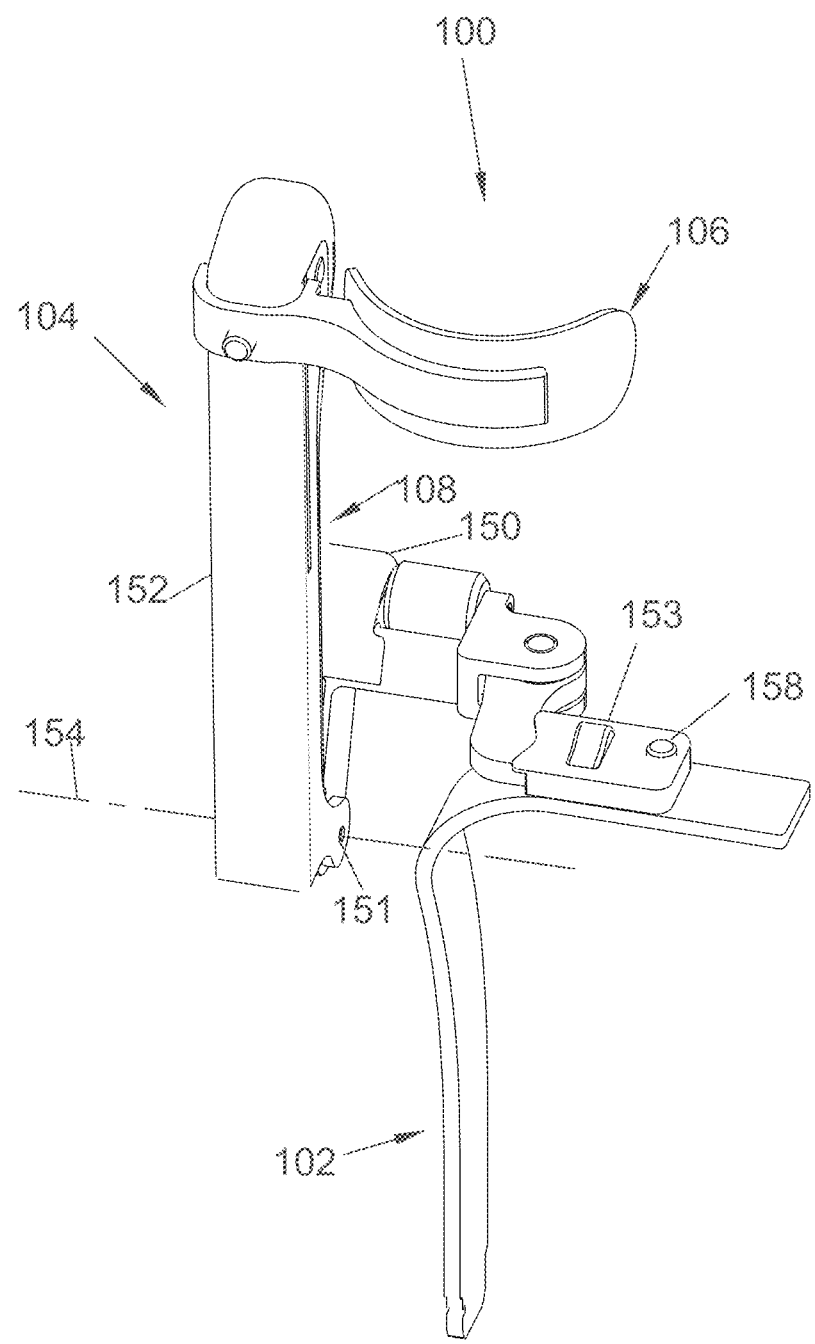
FIG. 36 is a perspective view of an arm supporting exoskeleton in a stowed position.

FIG. 34 through FIG. 36 depict another embodiment of arm support exoskeleton 100, wherein shoulder base 102 is coupled to a shoulder bracket 153. Shoulder bracket 153 couples to arm link mechanism 104. Shoulder bracket 153 contains stow joint 158 that allows shoulder bracket 153 to rotate relative to shoulder base 102 (stow joint 158 not depicted in FIG. 34). When shoulder bracket 153 rotates about stow joint 158, it may position arm link mechanism 104 substantially behind person 200. Shoulder bracket 153 can be held stationary about stow joint 158 to keep arm link mechanism 104 in the desired orientation. FIG. 34 shows person 200 wearing arm supporting exoskeleton 100 wherein arm link mechanism 104 is in a stowed position that is substantially out of workspace 230 of person. The term "workspace of person" or "person's workspace" should be understood to mean the range of motion of upper arm 204 of person 200 that may be utilized during common workplace tasks. FIG. 35 shows perspective view of shoulder bracket 153 in a working position. In the working position arm link mechanism 104 is positioned to support upper arm 204 (not shown). FIG. 36 shows a perspective of shoulder bracket 153 in a stowed position wherein arm link mechanism 104 is positioned substantially behind person 200 (not shown). In a stowed position, distal link 152 remains fully flexed relative to proximal link 150 due to torque generator 108 acting about first rotational axis 154. This serves to further secure arm link mechanism 104 out of workspace 230. It should be understood that other joints between arm link mechanism 104 and shoulder base 102 may be utilized to further secure arm link mechanism 104 out of workspace 230.

FIG. 37 through FIG. 41 depict embodiments of arm supporting exoskeleton 100 wherein arm coupler 106 further comprises a load bearing coupler 160 coupled to distal link 152 capable of imposing supporting force 212, directed upward, on upper arm 204 (shown in FIG. 1). In some embodiments, load bearing coupler 160 comprises distal link attachment 167 that attaches arm coupler 106 to distal link 152 and at least one arm cuff 168 that at least partially encircles upper arm 204 (shown in FIG. 1).

Figure 37:
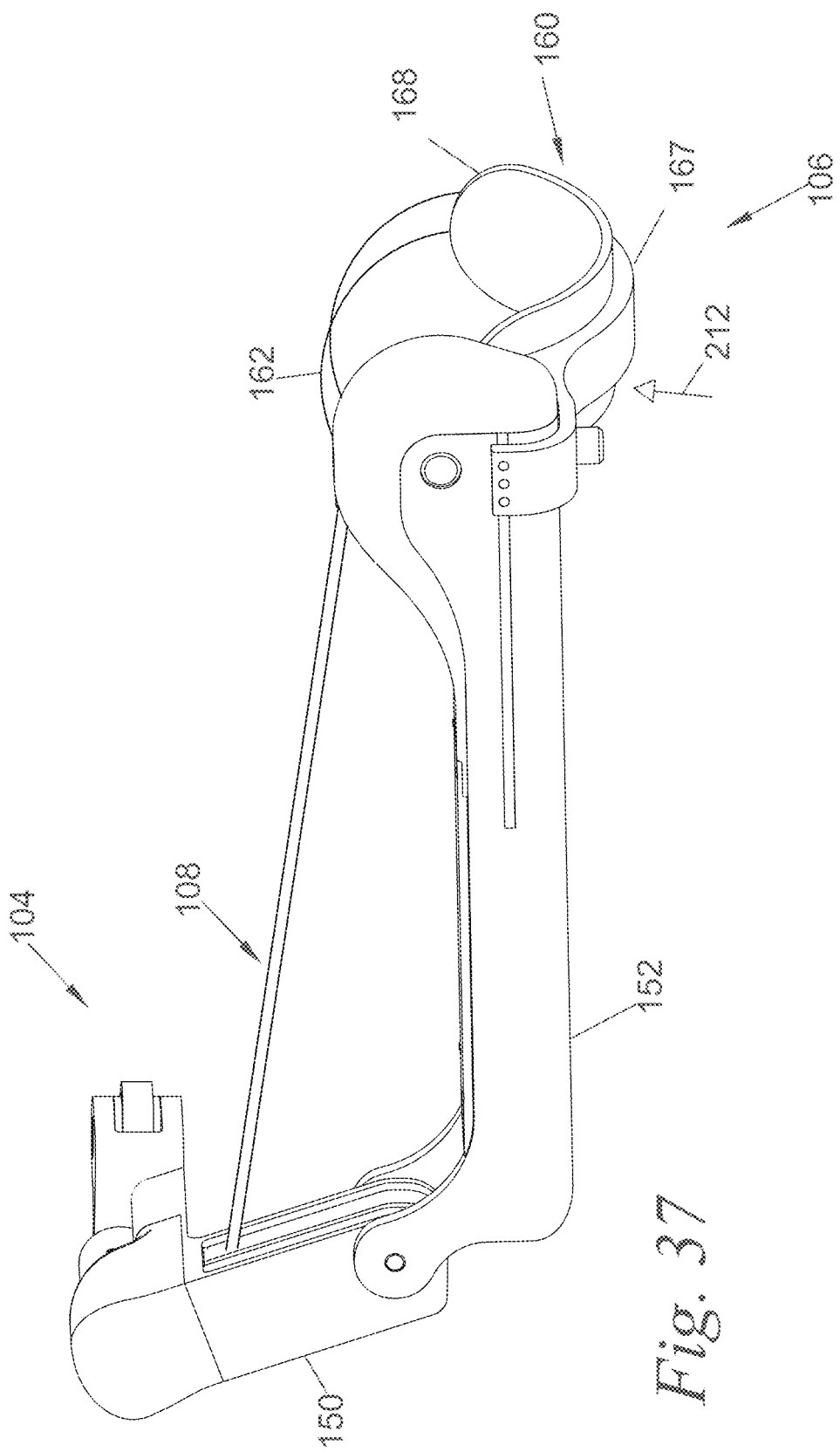
FIG. 37 is a perspective view of an arm link mechanism containing an arm coupler.

FIG. 37 depicts an embodiment of arm support exoskeleton 100 wherein arm coupler 106 further comprises an arm coupling mechanism 162. Arm coupling mechanism 162 is capable of coupling arm coupler 106 to upper arm 204 (shown in FIG. 2). Arm coupling mechanism 162 may comprise an element or combination of elements selected from a group consisting of rigid, semi-rigid, or compliant materials preventing separation of upper arm 204 (shown in FIG. 1) from arm coupler 106.

Figure 38:
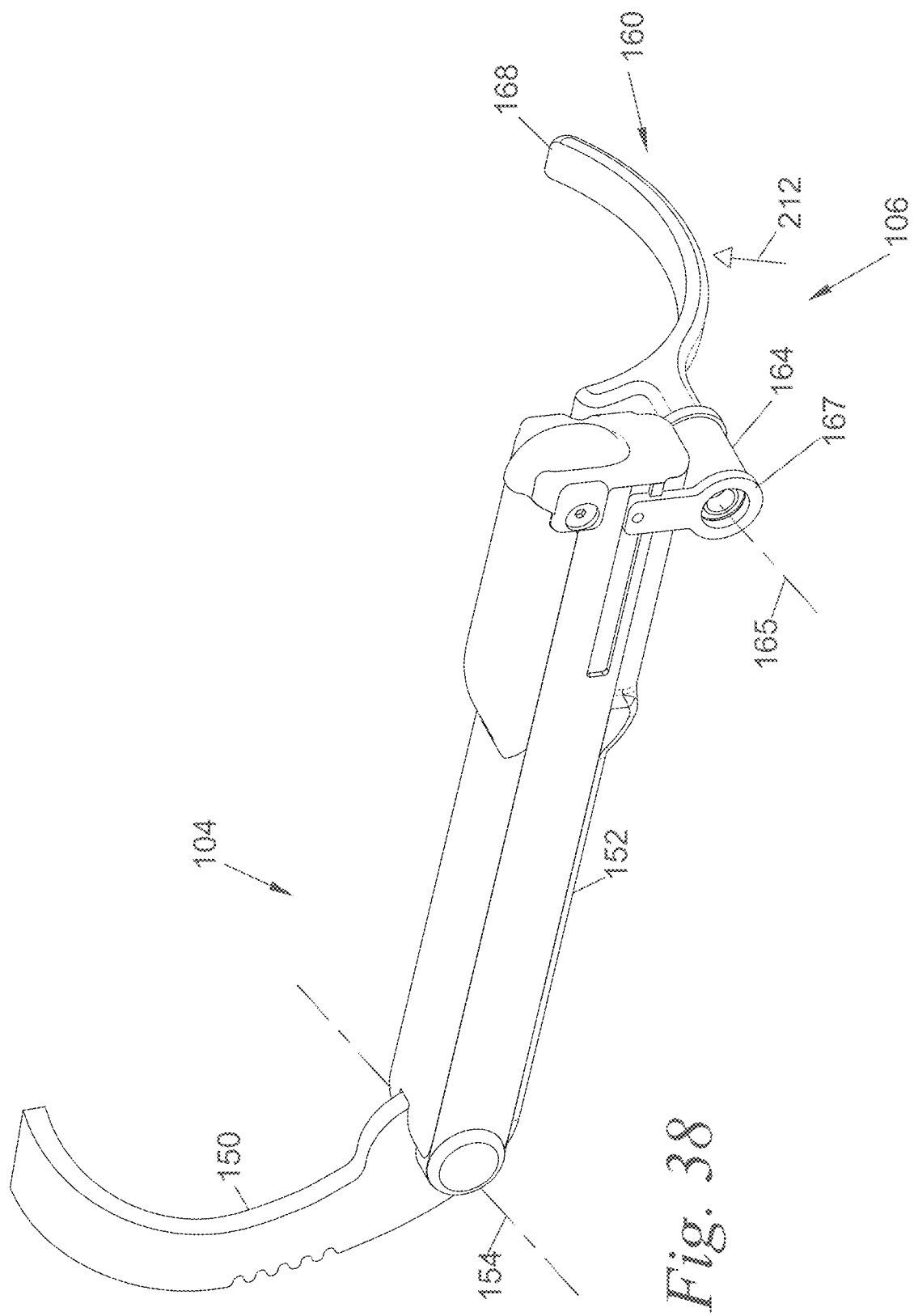
FIG. 38 is a perspective view of an arm link mechanism wherein an arm coupler contains an arm rotation joint.

FIG. 38 depicts an embodiment of arm coupler 106 wherein load bearing coupler 160 contains an arm rotation joint 164. Arm rotation joint 164 allows arm cuff 168 to rotate with respect to distal link 152 along arm cuff rotation axis 165 substantially parallel to first rotational axis 154. Arm rotation joint 164 allows arm cuff 168 to provide maximum contact with upper arm 204 (shown in FIG. 1) or compensate for movement discrepancies between distal link 152 and upper arm 204 of person 200.

Figure 39:
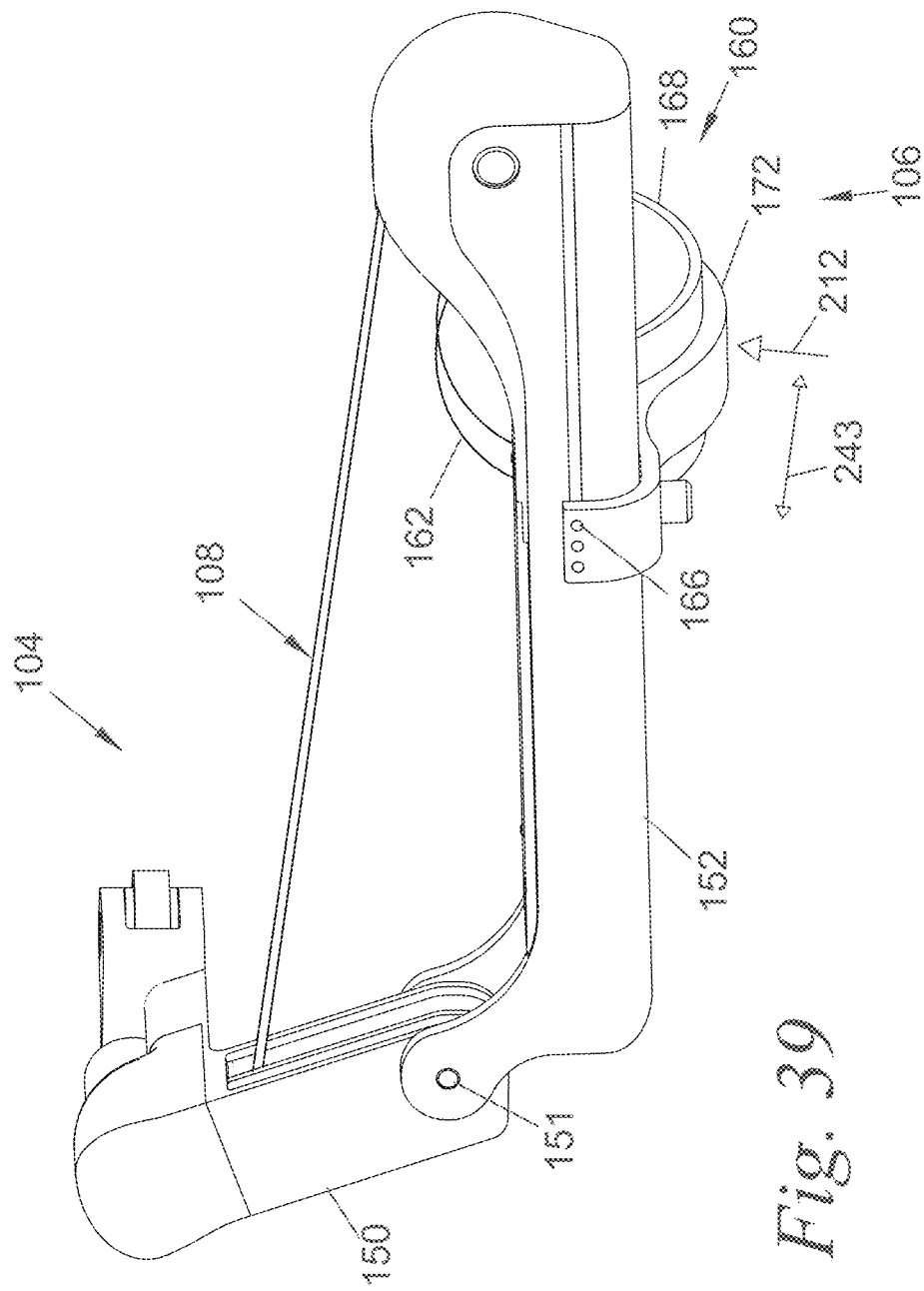
FIG. 39 is a perspective view of an arm link mechanism wherein an arm coupler contains a translation joint.
Figure 40:
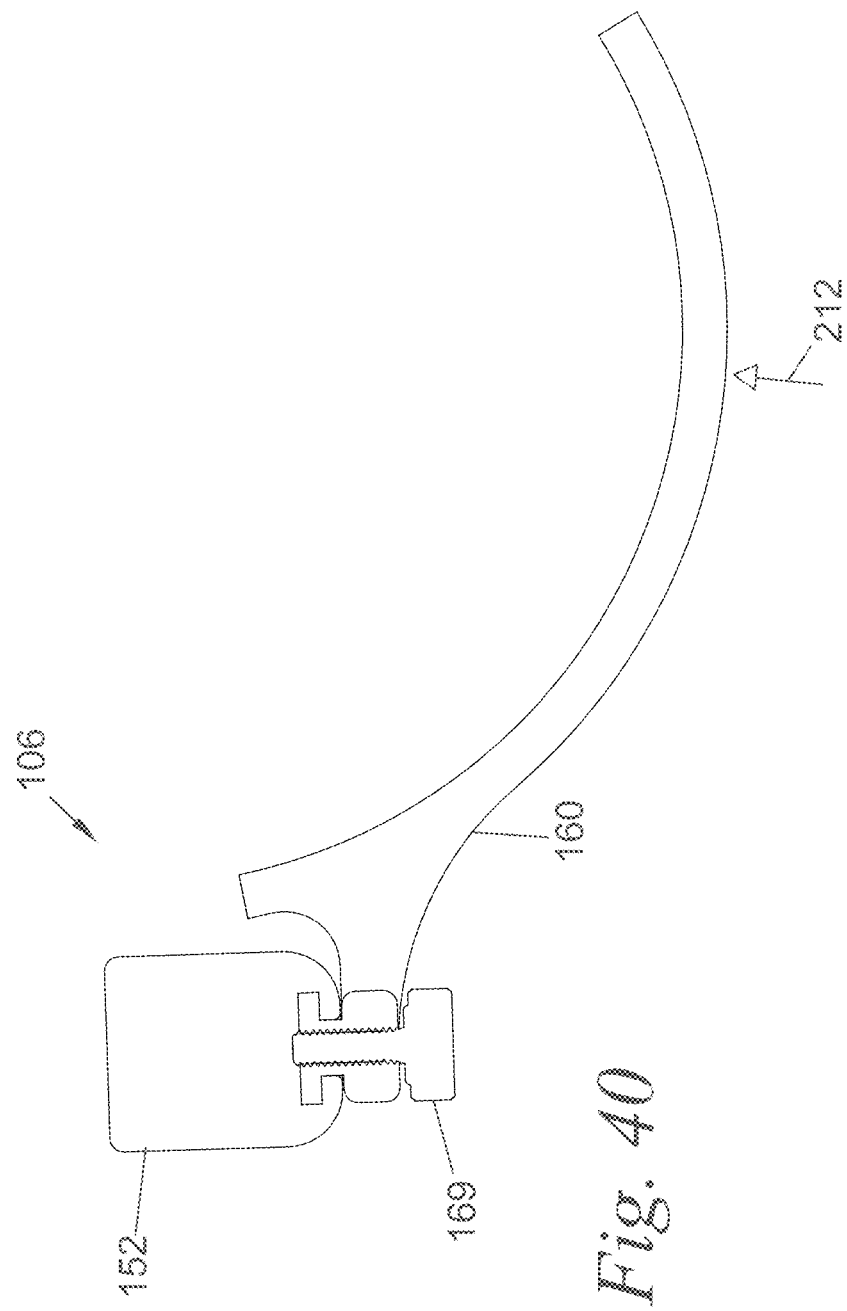
FIG. 40 is a section view of an arm coupler containing a translation joint.

FIG. 39 depicts an embodiment of arm coupler 106 wherein arm coupler 106 locations can be adjusted with respect to distal link 152. In some embodiments, load bearing coupler 160 can translate with respect to distal link 152 at translation joint 166 to allow for arm length adjustment 243 of arm link mechanism 104 to fit length 242 of upper arm 204 of person 200 (referenced in FIG. 7), or to compensate for any movement discrepancies between distal link 152 and s upper arm 204 of person 200 (depicted in FIG. 1). FIG. 40 depicts another embodiment of translation joint 166 wherein distal link 152 contains a t-slot mating with load bearing coupler 160. Load bearing 160 contains locking pin 169 that fixes the position of load bearing coupler 160 relative to distal link 152.

Figure 41:
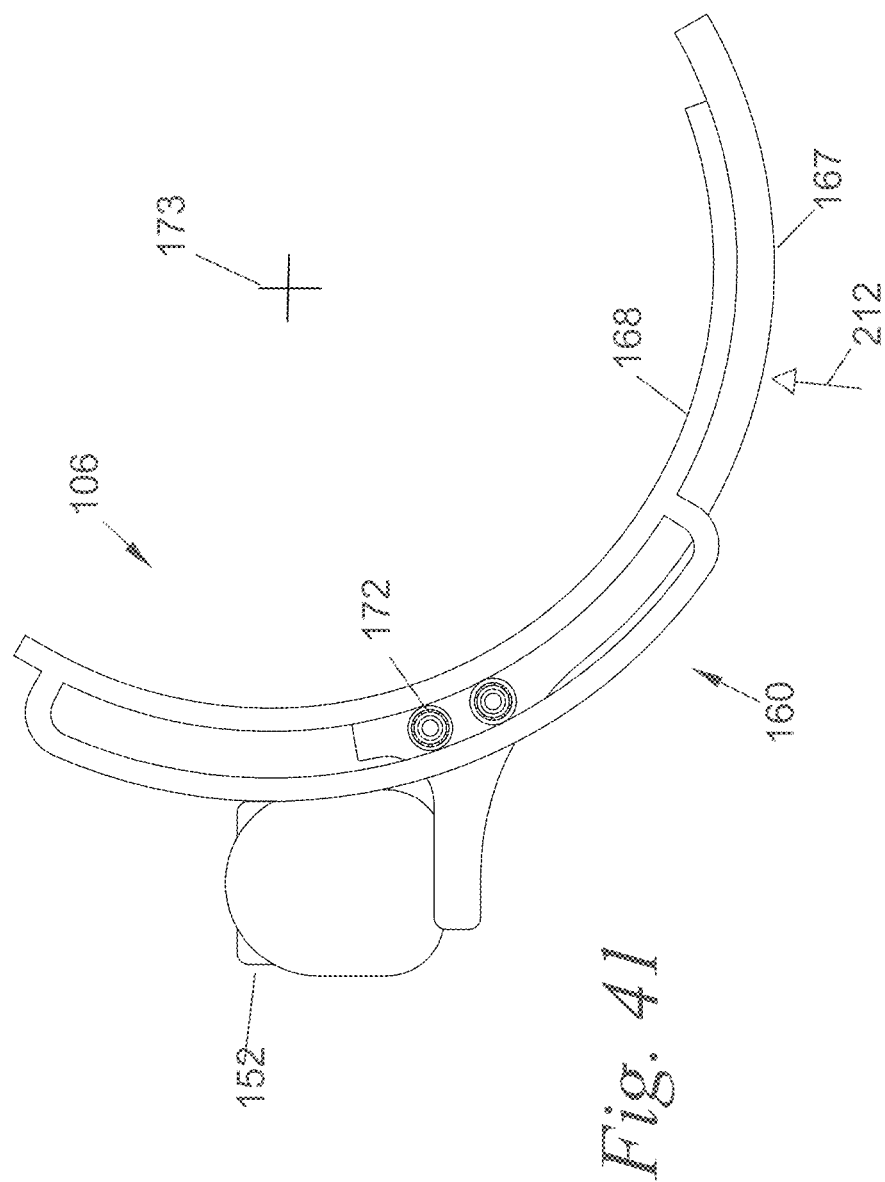
FIG. 41 is a front view of an arm coupler containing an internal external rotation joint.

FIG. 41 depicts an embodiment of arm coupler 106 wherein load bearing coupler 160 allows for internal and external rotation of upper arm 204 (shown in FIG. 1) with internal/external rotation joint 172. Internal/external rotation joint 172 is located between distal link attachment 167 and arm cuff 168. Internal/external rotation joint 172 rotates about internal external rotation axis 173. In another embodiment not depicted, sliding contact with upper arm 204 resting in arm cuff 168 allows for rotation about internal external rotation axis 173.

Figure 42:
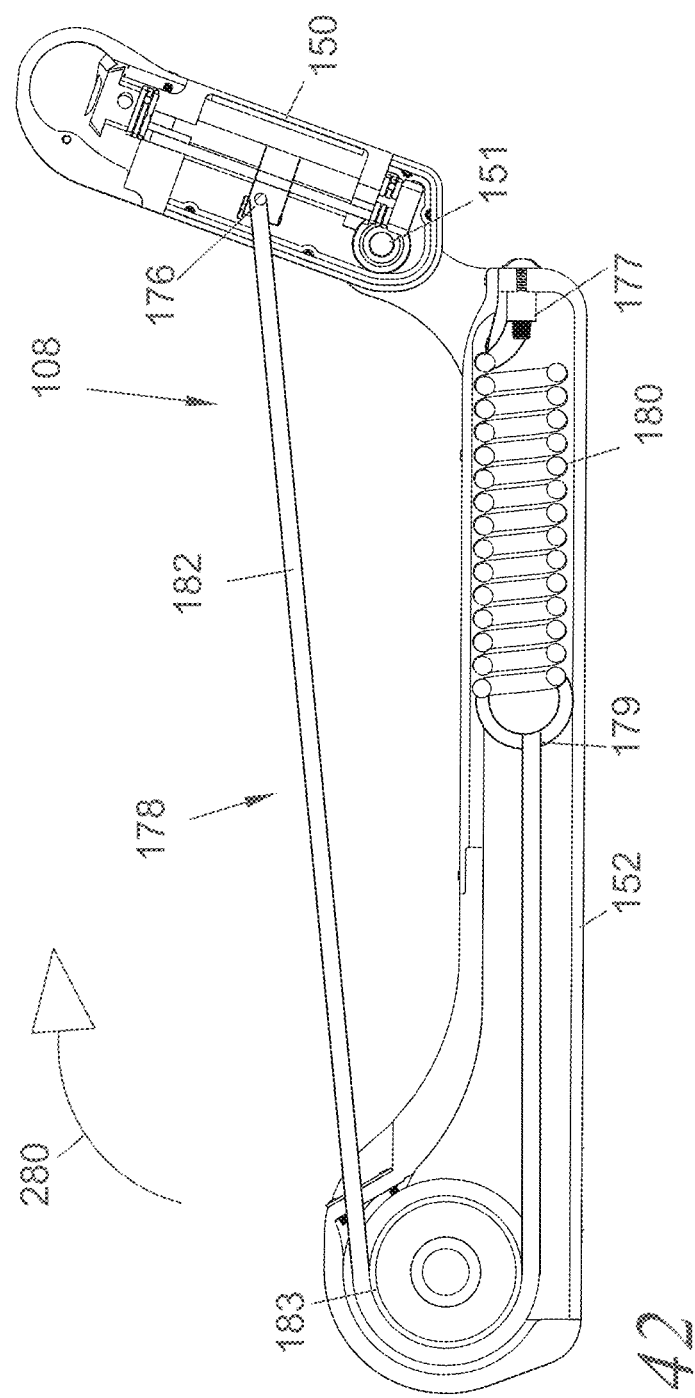
FIG. 42 is a side section view of a torque generator with an extension spring.

FIG. 42 through FIG. 46 depict various embodiments of arm supporting exoskeleton 100 wherein torque generator 108 comprises tensile force generator 178. Tensile force generator 178, as shown in FIG. 42, is coupled to proximal link 150 from its first tensile end 176 and distal link 152 from its second tensile end 177. The tensile force in tensile force generator 178 provides torque 280 to flex distal link 152 relative to proximal link 150 about first rotational joint 151. In some embodiments of torque generator 108, tensile force generator 178 comprises coil spring element 180. In some embodiments of torque generator 108, tensile force generator 178 comprises line element coupling coil spring element 180 to proximal link 150. Line element 182 comprises an element or combination of elements selected from a group consisting of wire rope, rope, cable, twine, strap, chain, or any combination thereof. In some embodiments of torque generator 108, line element 182 at least partially encircles pulley 183 coupled to distal link 152 before line element 182 is coupled to proximal link 150. In some embodiments pulley 183 does not rotate relative to distal link 152. In some embodiments, pulley 183 is a curved surface incorporated into distal link 152. FIG. 42 depicts an embodiment of torque generator 108 where coil spring element 180 is an extension spring. Coil spring element 180 is coupled to line element 182 at junction 179 and coupled to distal link 152 at second tensile end 177.

Figure 43:
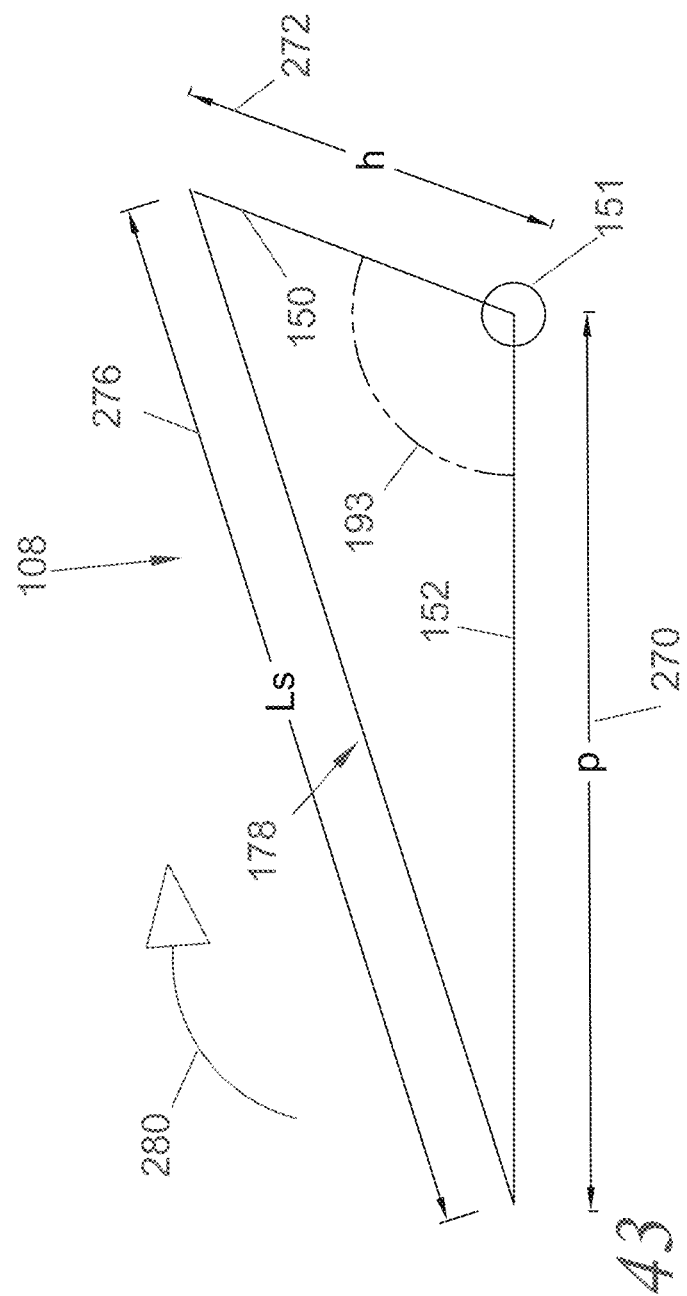
FIG. 43 is a schematic of a torque generator.

FIG. 43 shows an approximate schematic of torque generator 108. Tensile force generator 178 is coupled to proximal link 150 at first distance 272. Tensile force generator 178 acts about distal link at second distance 270. Tensile force generator effective length 276 is the distance between first distance 272 along proximal link 150 and second distance 270 along distal link 152. Tensile force generator original length is the tensile force generator effective length 276 corresponding to a zero value of first angle 193. Tensile force is a function of spring constant, spring preload, tensile force generator original length, and tensile force generator effective length 276 at a given value of first angle 193. Torque 280 causes distal link to flex relative to shoulder base 102.

Figure 44:
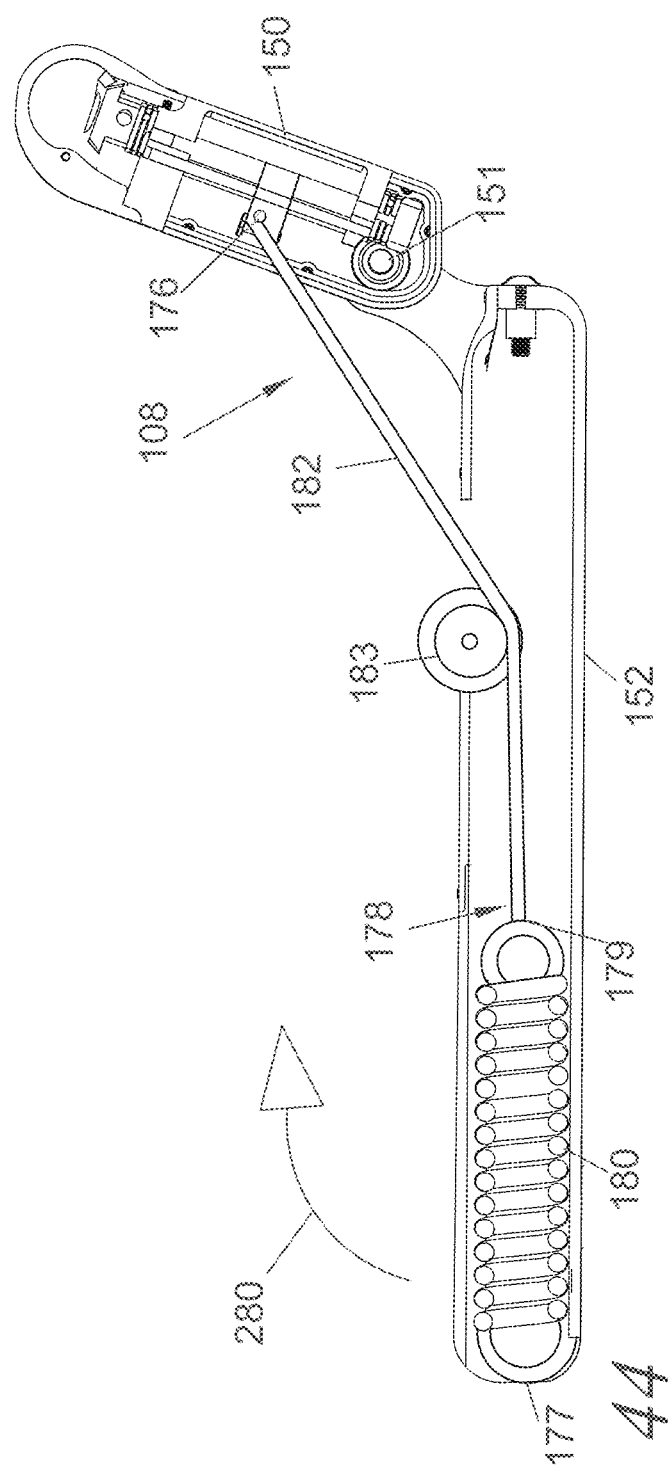
FIG. 44 is an alternative side section view of a torque generator with an extension spring.
Figure 45:
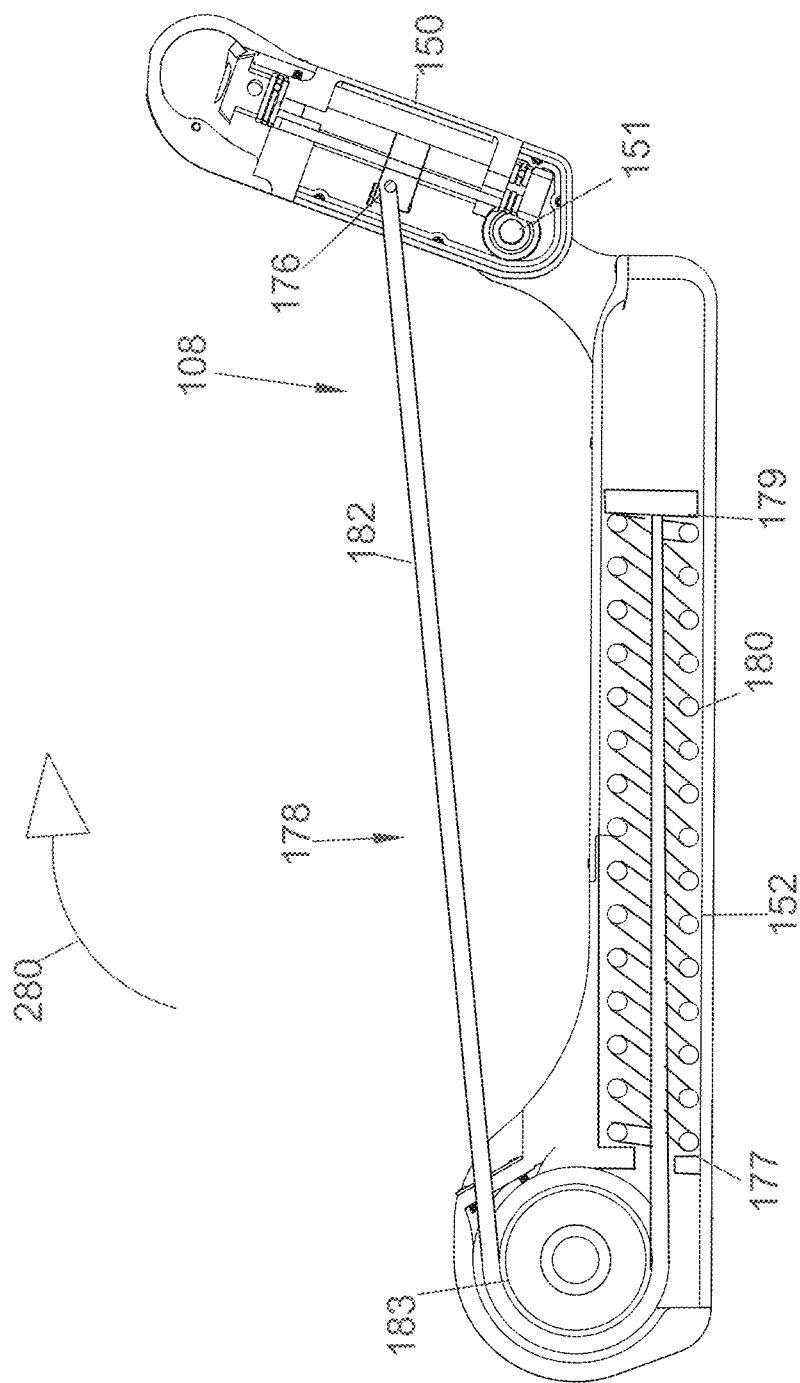
FIG. 45 is a side section view of a torque generator with a compression spring.
Figure 46:
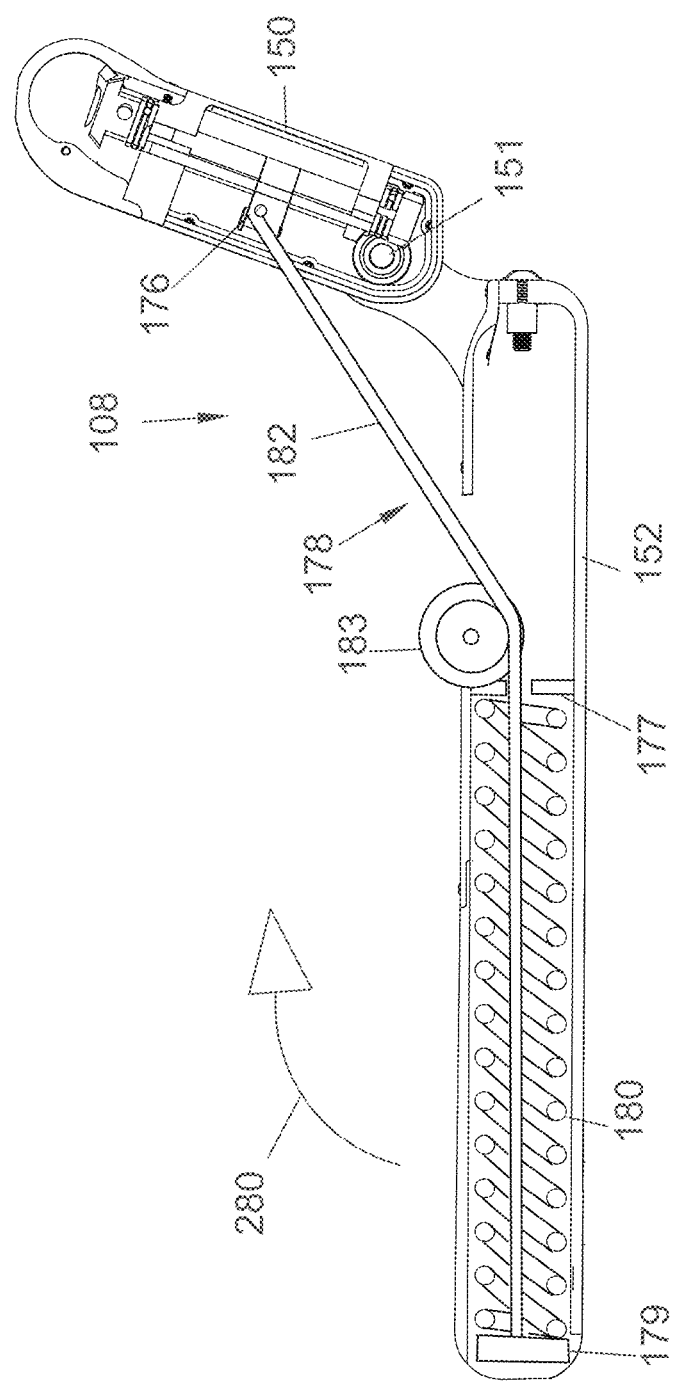
FIG. 46 is an alternative side section view of torque generator with compression spring.

FIG. 44 through FIG. 46 depicts various embodiments of torque generator 108 wherein tensile force generator 178 comprises coil spring element 180 and line element 182. Line element 182 at least partially encircles pulley 183 coupled to distal link 152. FIG. 44 depicts an embodiment of torque generator 108 where coil spring element 180 is an extension spring with a different orientation than shown in FIG. 42. Coil spring element 180 is coupled to line element 182 at junction 179 and coupled to distal link 152 at second tensile end 177. In some embodiments, line element 182 at least partially wraps around pulley 183 attached to distal link 152 before attaching to proximal link 150. FIG. 45 depicts an embodiment of torque generator 108 where coil spring element 180 is a compression spring. Coil spring element 180 is coupled to line element 182 at junction 179 and coupled to distal link 152 at second tensile end 177. In some embodiments, line element 182 at least partially wraps around pulley 183 attached to distal link 152 before attaching to proximal link 150. FIG. 46 depicts an embodiment of torque generator 108 where coil spring element 180 is a compression spring with a different orientation than shown in FIG. 45. Coil spring element 180 is coupled to line element 182 at junction 179 and coupled to distal link 152 at second tensile end 177. In some embodiments, line element 182 at least partially wraps around pulley 183 attached to distal link 152 before attaching to proximal link 150. It is understood that in all embodiments, instead of coil spring element 180, a gas spring, air spring, elastomer, or any combination that exhibits similar behavior can be utilized.

Figure 47:
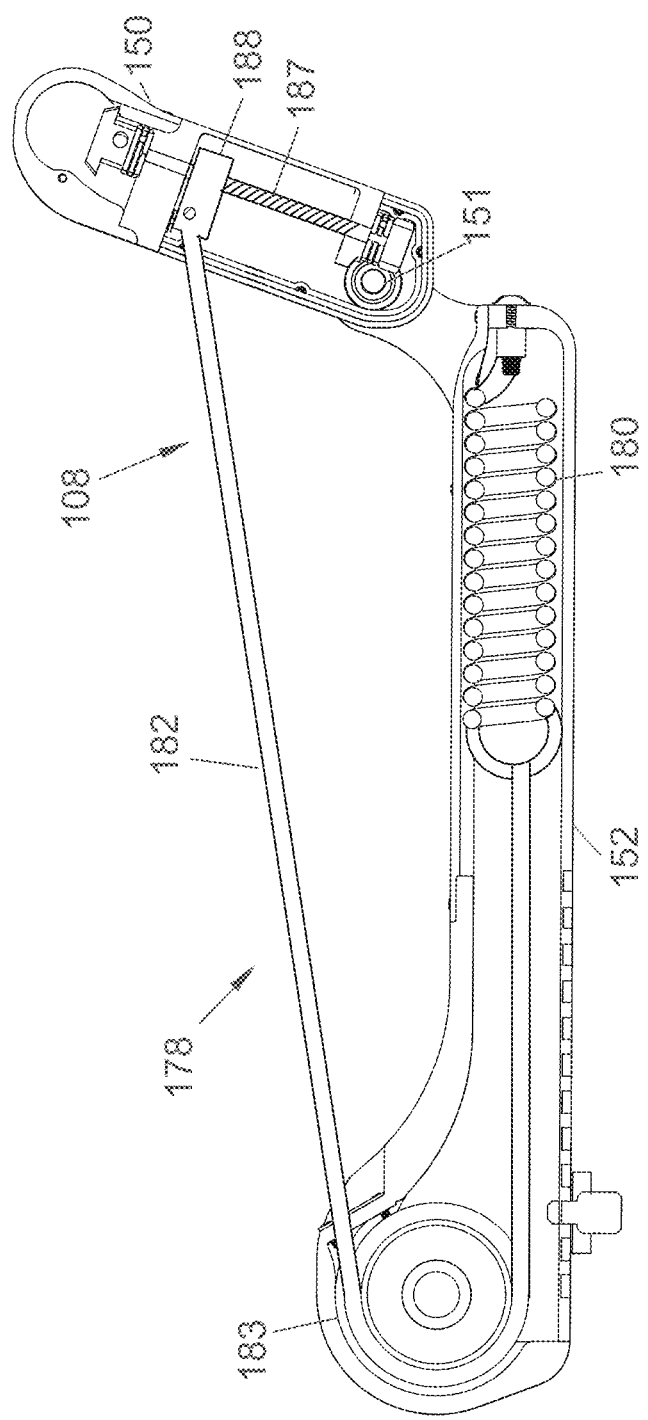
FIG. 47 is a side section view of a torque generator with an upper bracket in a raised position.
Figure 48:
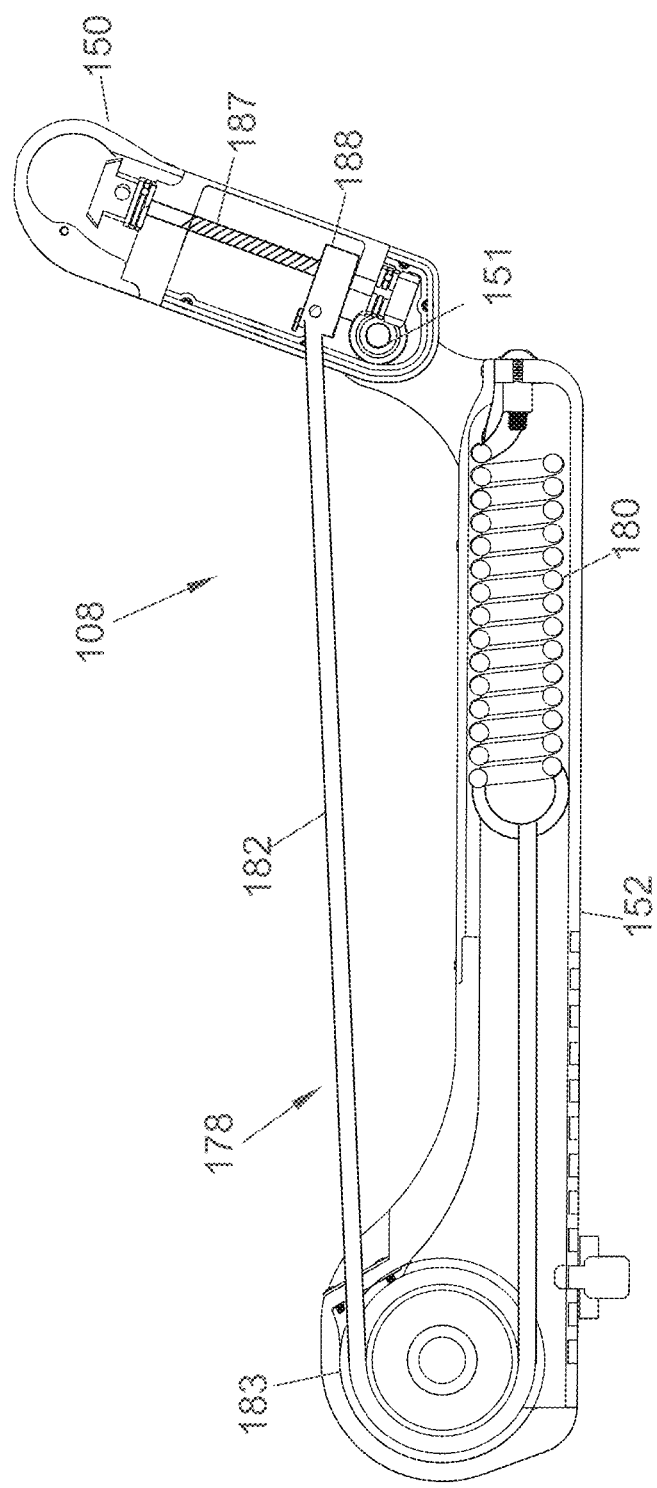
FIG. 48 is a side section view of a torque generator with an upper bracket in a lowered position.
Figure 49:
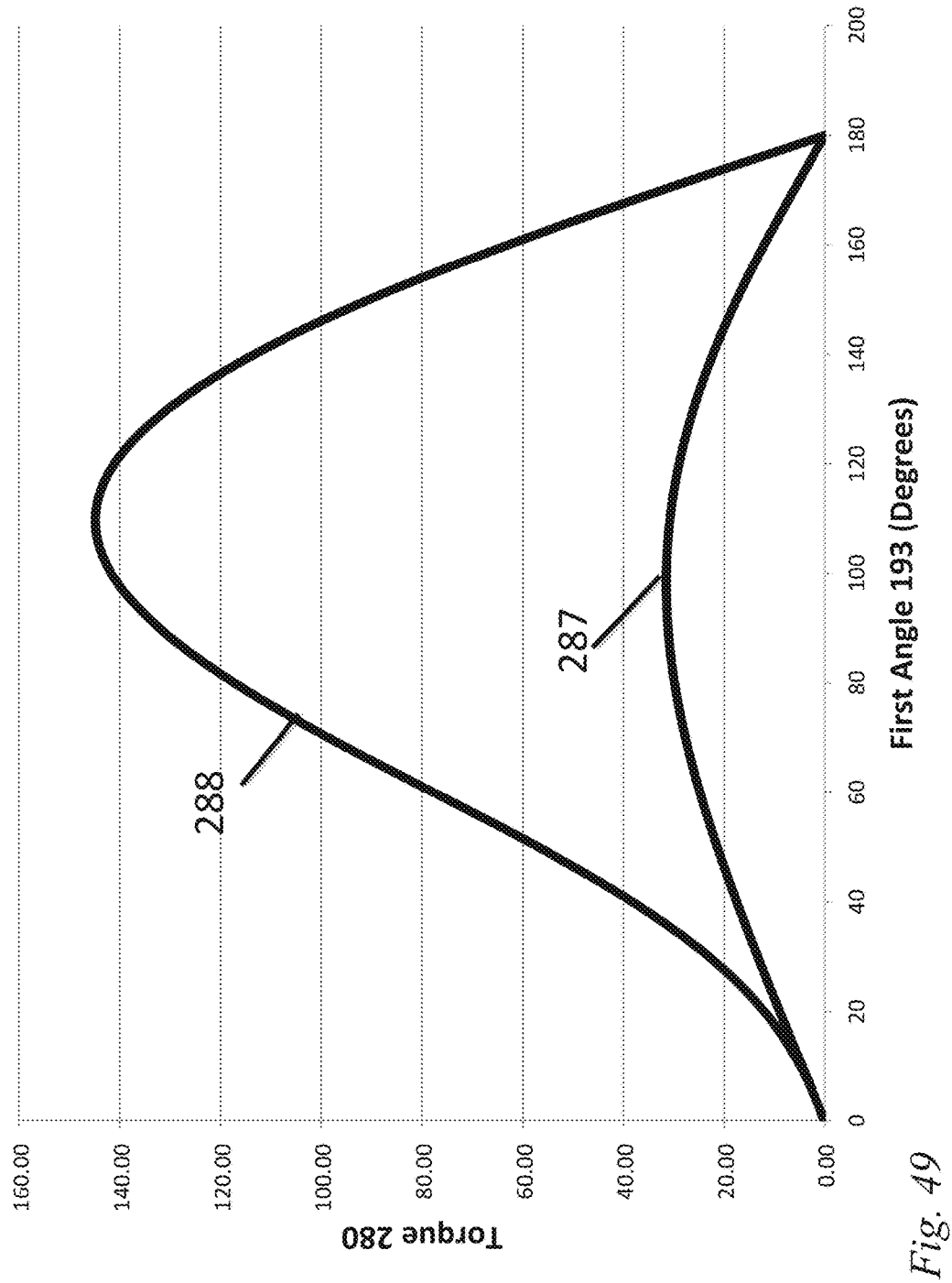
FIG. 49 is a plot of a torque generator torque profile for two positions of an upper bracket.

FIG. 47 and FIG. 48 depict an embodiment of torque generator 108 wherein proximal link 150 comprises an upper bracket 188 coupled to tensile force generator 178. The location of upper bracket 188 can be adjusted along proximal link 150 to adjust torque 280 provided by tensile force generator 178. The location of upper bracket 188 corresponds to first distance 272 in the schematic of FIG. 43. In some embodiments, the location of upper bracket 188 is adjusted relative to proximal link 150 by upper bracket screw 187 where upper bracket 188 incorporates a threaded feature that mates with upper bracket screw 187. By turning upper bracket screw 187, the location of upper bracket 188 is adjusted along proximal link 150. In general, the farther upper bracket 188 is from first joint 151, the larger the amplitude of torque 280 will be. FIG. 47 depicts upper bracket 188 in an extended position relative to first joint 151, resulting in a large first distance 272 (see FIG. 43). FIG. 48 depicts upper bracket 188 in a retracted position relative to first joint 151, resulting in a small first distance 272 (see FIG. 42). FIG. 49 depicts two plots of torque 280 created by torque generator 108 as a function of first angle 193 for two positions of upper bracket 188 described in FIG. 47 and FIG. 48. The torque profile of configuration shown in FIG. 47 is represented by torque profile 288. The torque profile of configuration shown in FIG. 48 is represented by torque profile 287. It can be seen that torque profile 288 has larger amplitude compared to torque profile 287.

Figure 50:
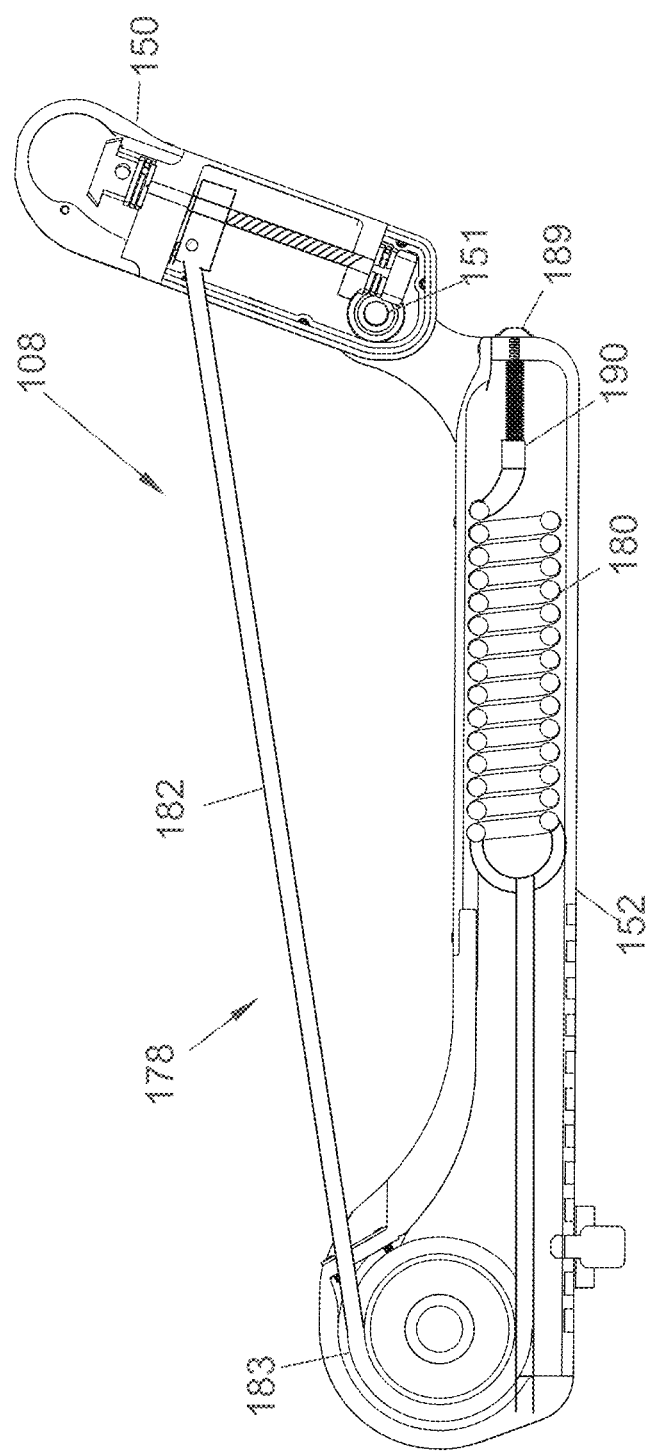
FIG. 50 is a side section view of a torque generator with a lower bracket in an extended position.
Figure 51:
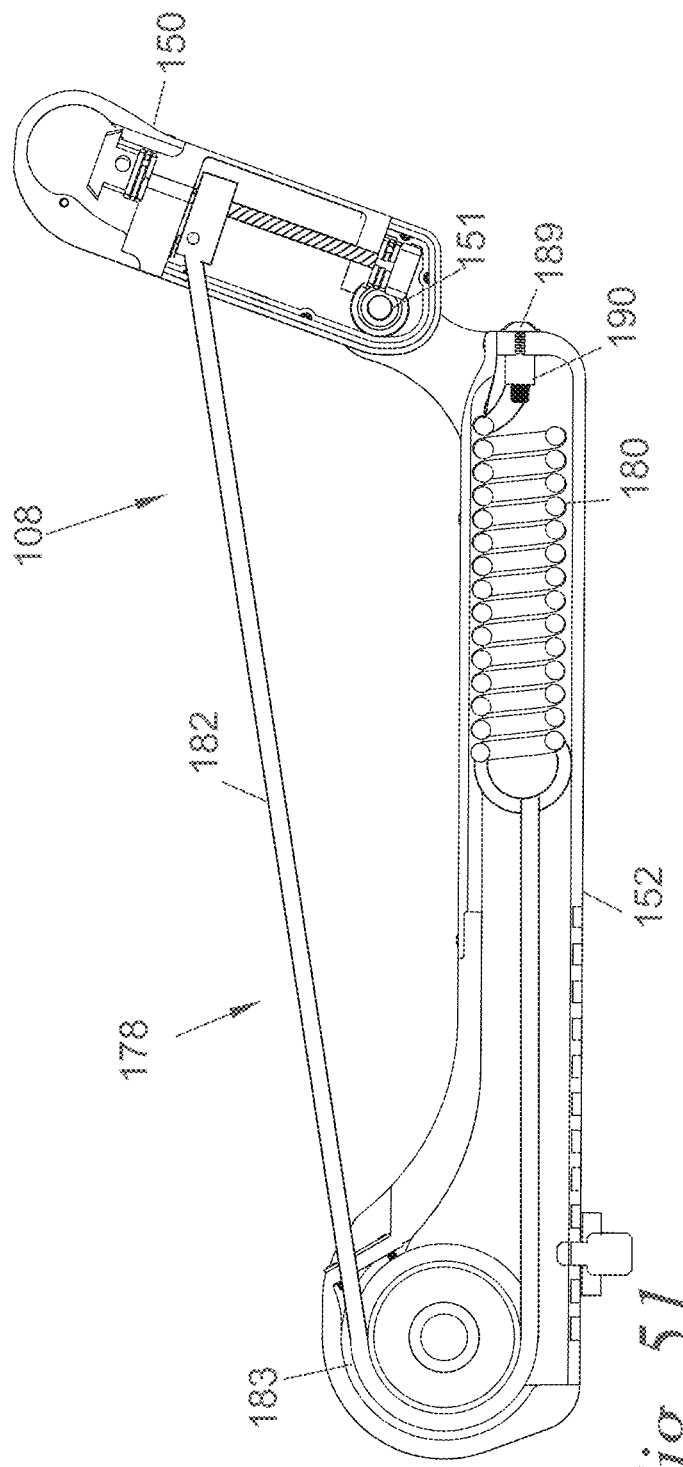
FIG. 51 is a side section view of a torque generator with a lower bracket in a retracted position.
Figure 52:
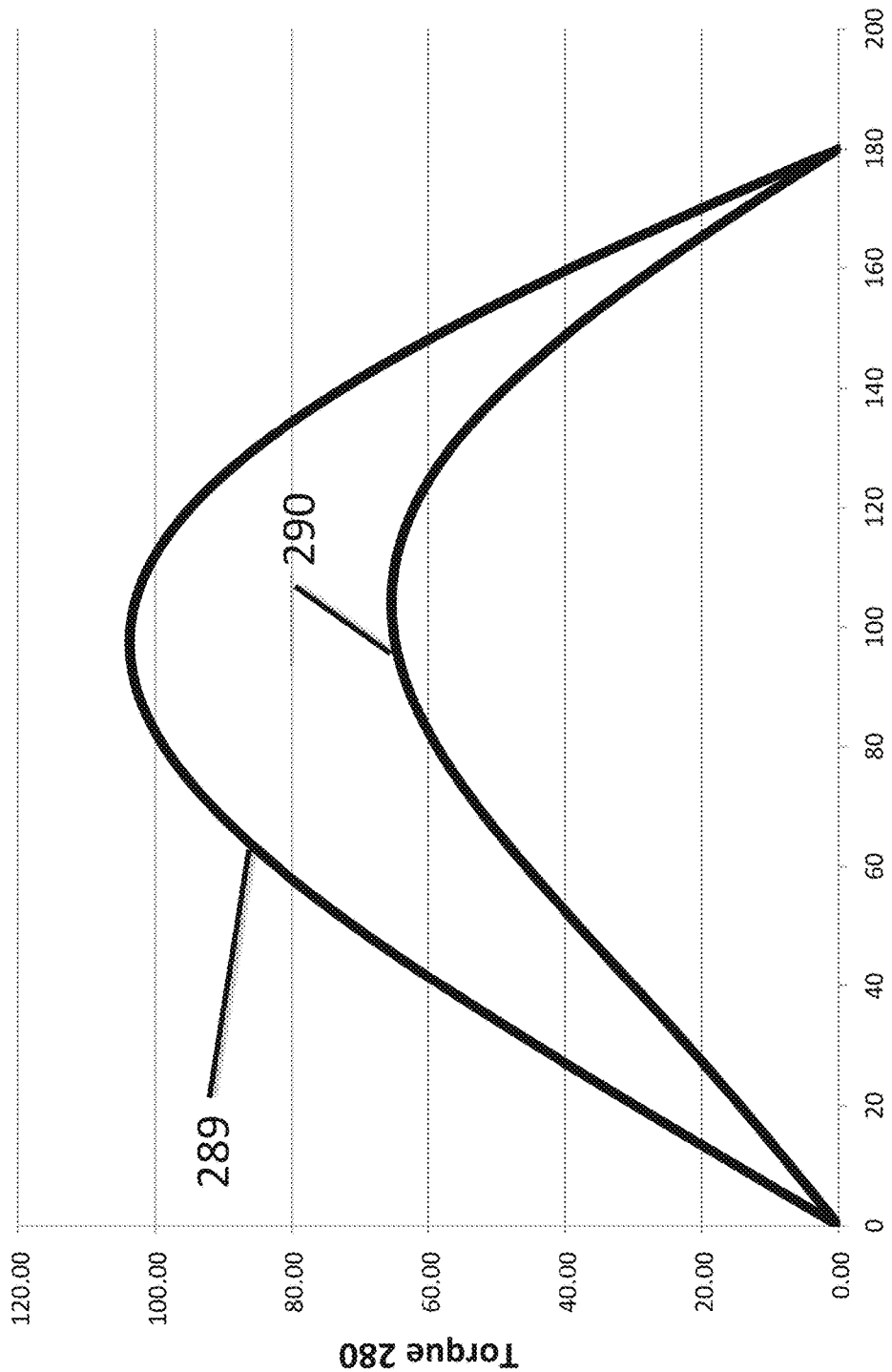
FIG. 52 is a plot of a torque generator torque profile for two positions of a lower bracket.

FIG. 50 and FIG. 51 depict an embodiment of torque generator 108 wherein distal link 152 comprises lower bracket 190 coupled to tensile force generator 178. The location of lower bracket 190 can be adjusted along distal link 152 to adjust torque 280 provided by tensile force generator 178. The location of lower bracket 190 corresponds to preload of tensile force generator 178. In some embodiments, the location of lower bracket 190 is adjusted relative to distal link 152 by lower bracket screw 189 where lower bracket 190 incorporates a threaded feature that mates with lower bracket screw 189. By turning lower bracket screw 189, the location of lower bracket 190 is adjusted along distal link 152. In general, the farther lower bracket 190 is from first joint 151, the smaller the amount of preload will be. FIG. 50 depicts lower bracket 190 in a lengthened position relative to first joint 151, resulting in a small tensile force generator 178 preload. FIG. 51 depicts lower bracket 190 in a shortened position relative to first joint 151, resulting in a large tensile force generator 178 preload. FIG. 52 depicts two plots of torque 280 created by torque generator 108 as a function of first angle 193 for two positions of lower bracket 190 described in FIG. 50 and FIG. 51. The torque profile of configuration shown in FIG. 50 is represented by torque profile 290. The torque profile of configuration shown in FIG. 51 is represented by torque profile 289. Shortened lower bracket torque profile 289 has a larger amplitude compared to lengthened lower bracket torque profile 290.

Figure 53:
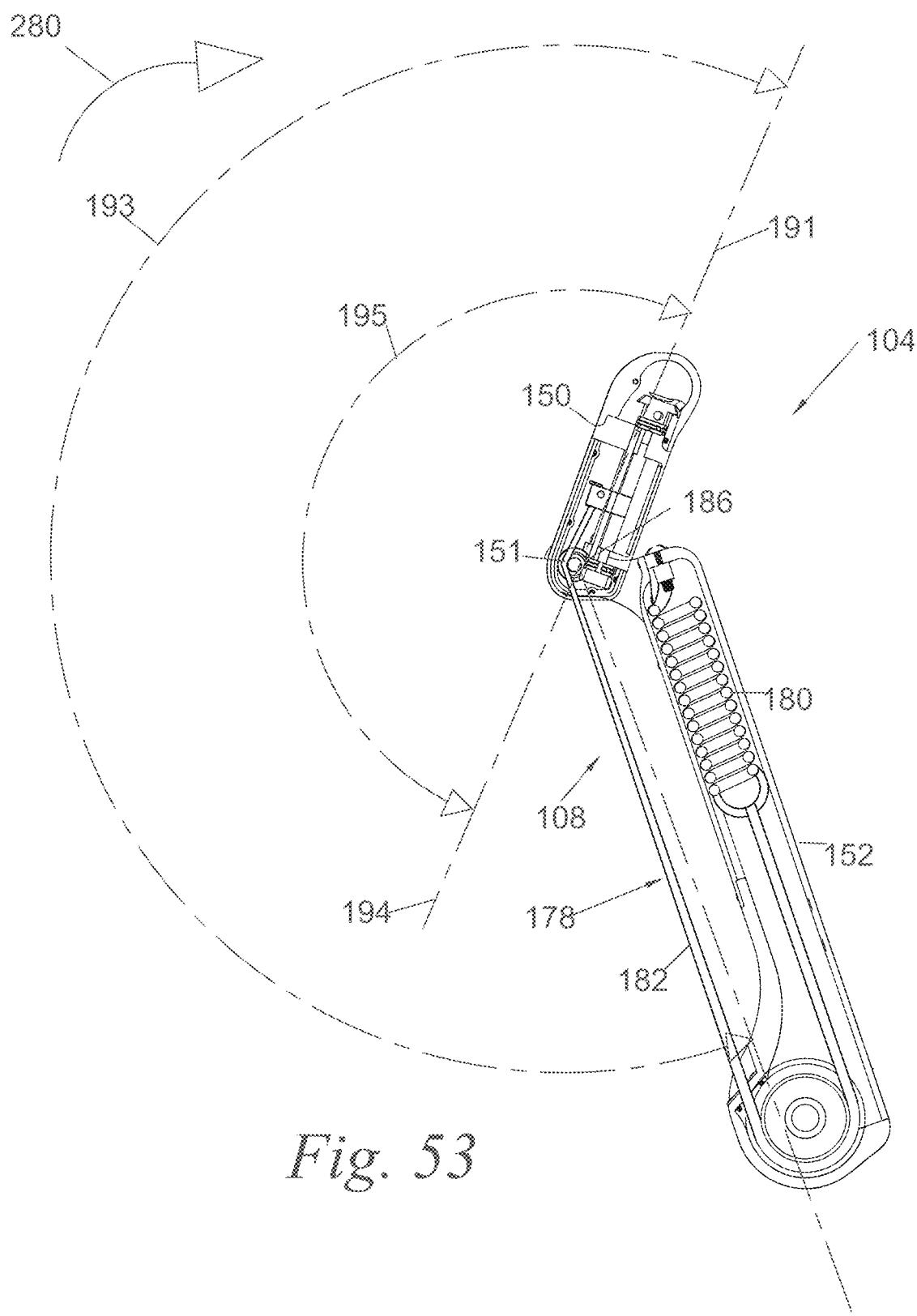
FIG. 53 is a side section view of torque generator with protrusion where first angle is larger than a toggle angle.
Figure 54:
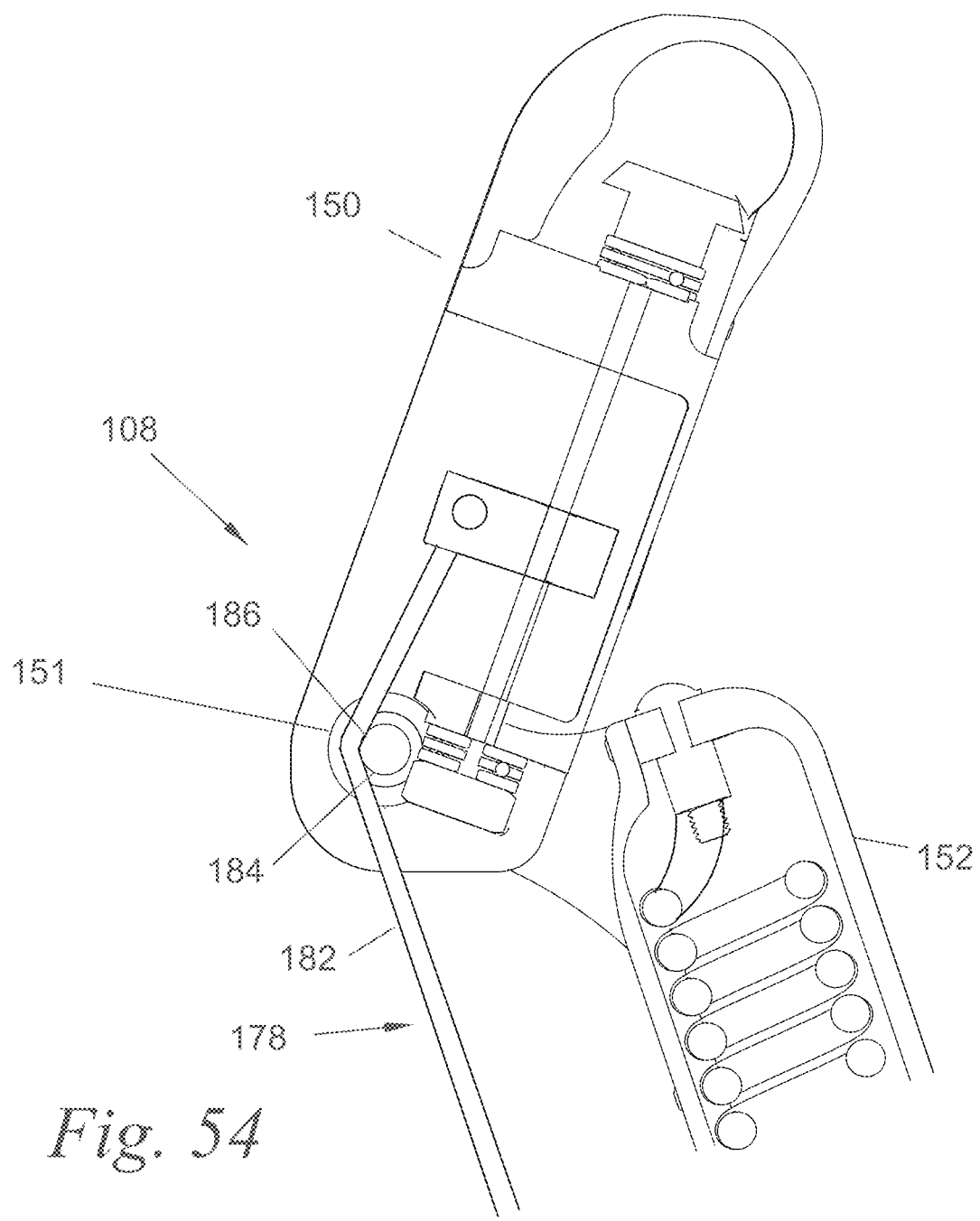
FIG. 54 is a close up side section view of a torque generator including a protrusion comprising a joint pin.
Figure 55:
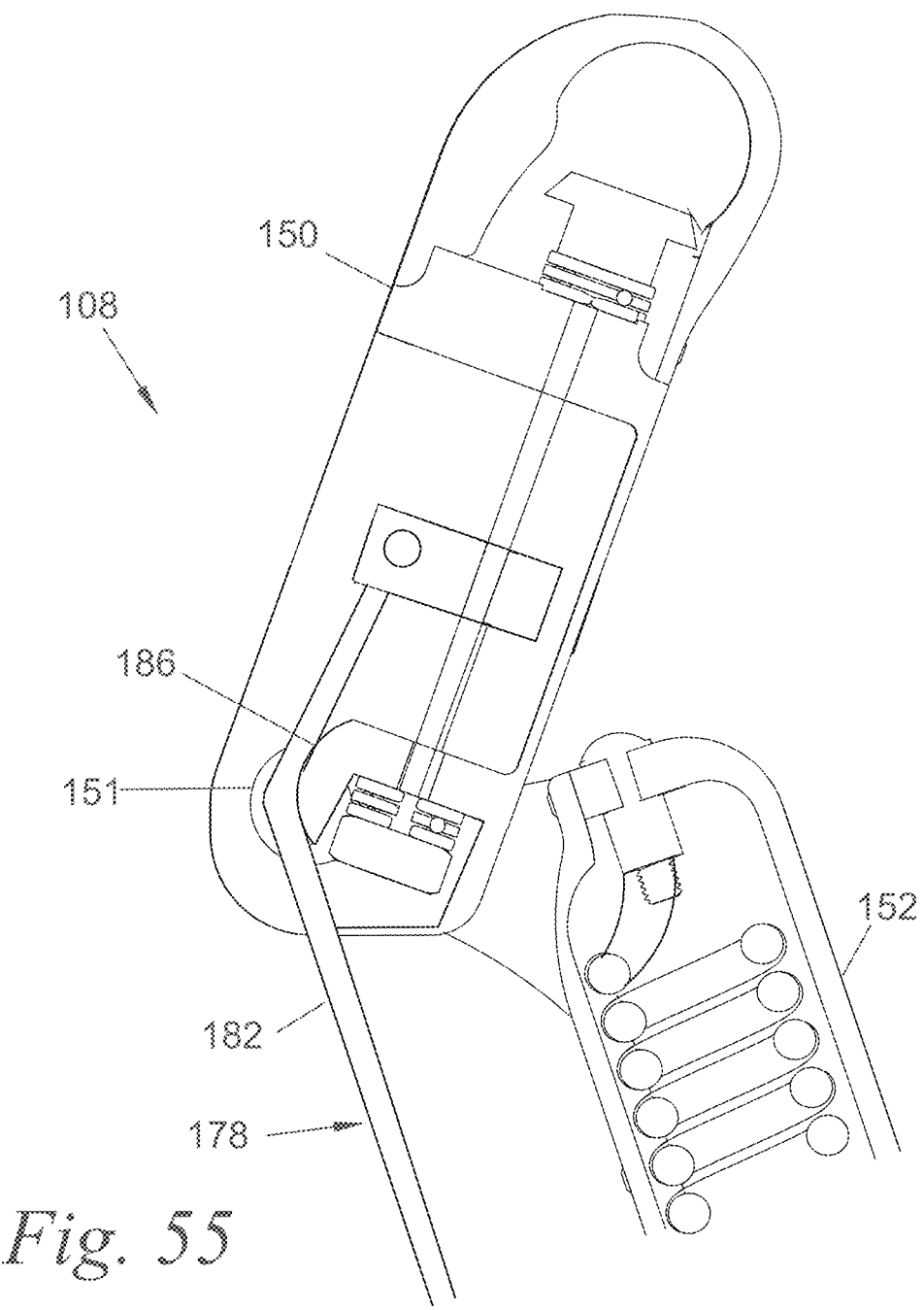
FIG. 55 is a close up side section view a torque generator including a protrusion that is part of a proximal link.

FIG. 53 through FIG. 55 depict an important characteristic where the torque 280 provided by tensile force generator 178 will automatically remain substantially small when first angle 193 is greater than or equal to toggle angle 195. That is, when a person moves their arm from a first position wherein first angle 193 is not greater than or equal to toggle angle 195, to a second position wherein first angle 193 is greater than or equal to toggle angle 195, tensile force generator 178 will automatically shift from a first torque mode wherein a first torque is provided by tensile force generator 178 (at the first position of the arm), to a second torque mode (at the second position of the arm) wherein a substantially small torque will be provided by tensile force generator 178. Likewise, when a person moves their arm back from the second position to the first position, the tensile force generator 178 will automatically shift from the second torque mode to the first torque mode.

FIG. 53 shows a configuration where first angle 193 is larger than 180 degrees, and arm link mechanism 104 comprises a protrusion 186 located substantially at first joint 151. When first angle 193 becomes equal to or greater than toggle angle 195, protrusion 186 constrains tensile force generator 178 (line element 182 of force generator 178 as shown in FIG. 53) in a position substantially centered about first joint 151. By constraining tensile force generator 178, protrusion 186 prevents tensile force generator 178 from passing over first joint 151. Torque 280 remains substantially zero since the force of the constrained tensile force generator 178 is substantially centered about first joint 151. First angle 193 being greater than toggle angle 195 corresponds to situations where person 200 intends to rest his/her upper arm 204 at his/her sides, or pick a tool from his/her tool belt. In these situations, a substantially small torque 280 is desired to allow free motion of upper arm 204 of person or to allow upper arm 204 to rest without the impedance of torque 280. This creates a greater overall comfort of person 200 during non-working postures. FIG. 54 depicts an embodiment wherein protrusion 186 is formed by first joint pin 184 forming first joint 151. FIG. 55 depicts an embodiment wherein protrusion 186 is a part of proximal link 150.

Figure 56:
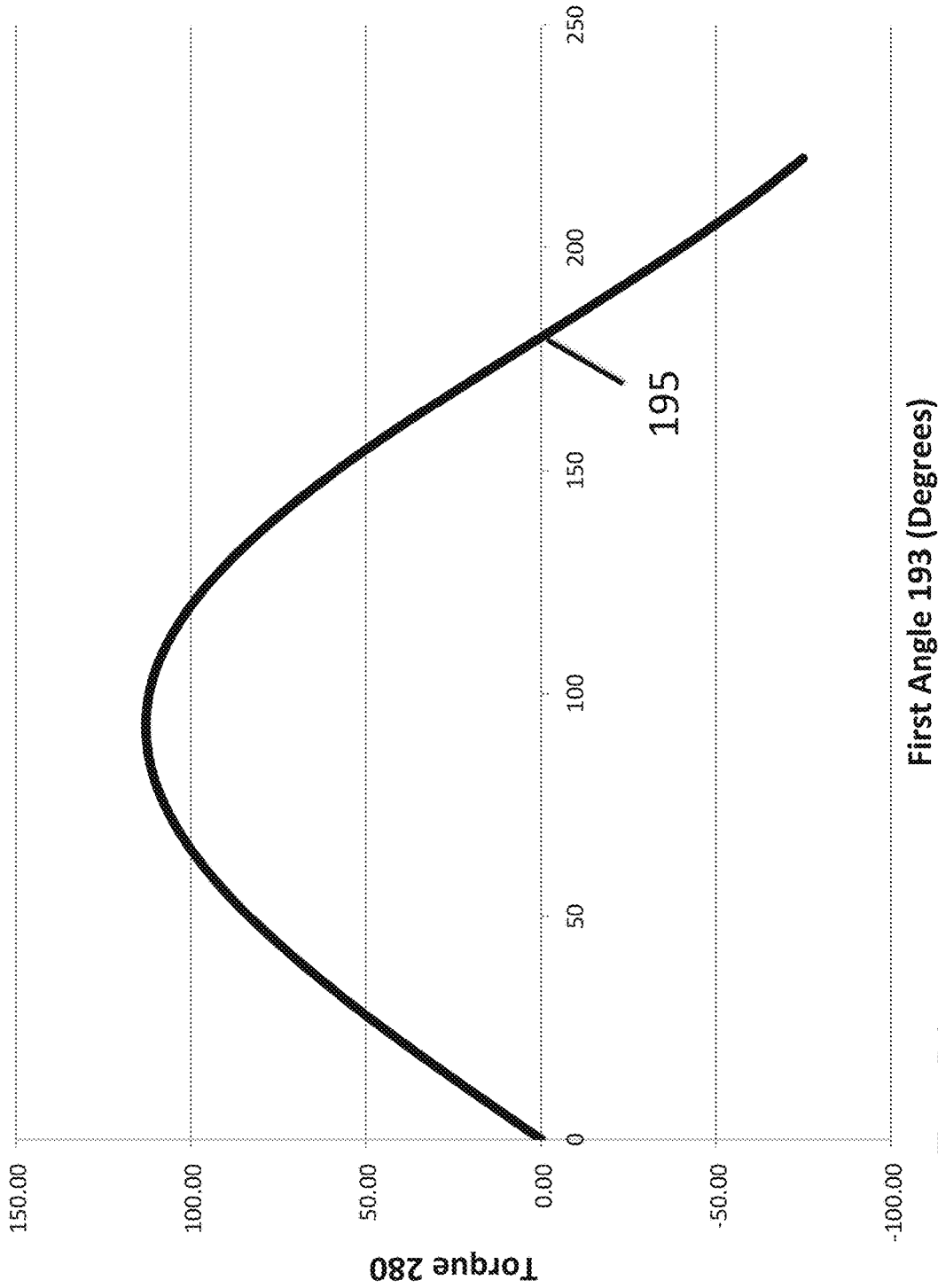
FIG. 56 is a plot of a torque generator torque profile without protrusion.
Figure 57:
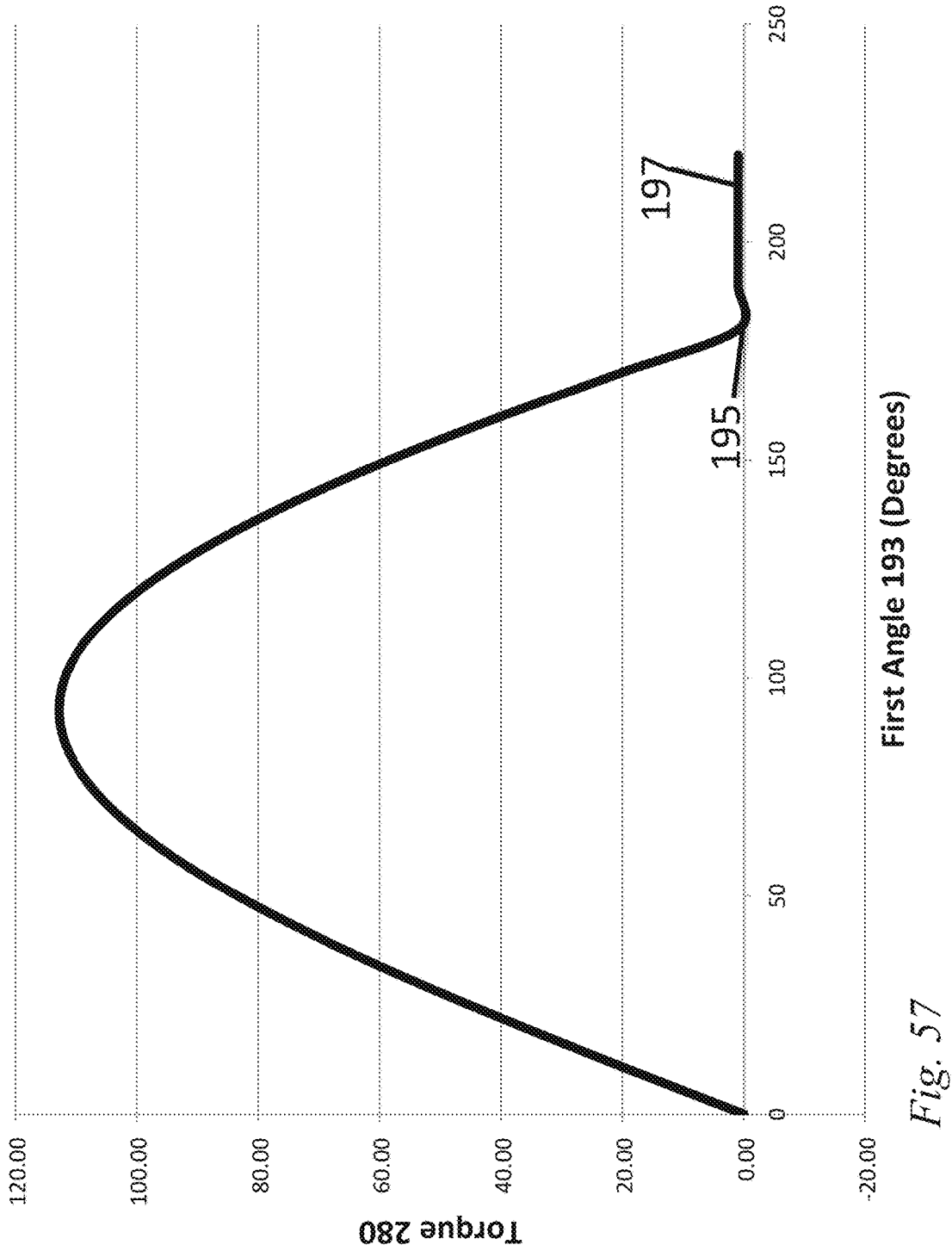
FIG. 57 is a plot of a torque generator torque profile with protrusion.

FIG. 56 depicts a graph of torque 280 created by torque generator 108 as a function of first angle 193 without protrusion 186. At toggle angle 195, torque 280 becomes negative. Negative values of torque 280 may impede movement of upper arm 204 or decrease comfort of person 200. FIG. 57 depicts a graph of torque 280 created by torque generator 108 as a function of first angle 193 when protrusion 186 is created. When first angle 193 becomes equal to or greater than toggle angle 195, protrusion 186 constrains tensile force generator 178, ensuring that the torque 280 remains substantially small (as described in FIG. 53). After toggle angle 195, torque 280 becomes substantially zero, creating neutral zone 197 for the remainder of first angle 193. Neutral zone 197 allows upper arm 204 of person 200 to move with a substantially zero applied torque 280 within first angle 193 greater than toggle angle 195. Neutral zone 197 allows person 200 to comfortably rest his/her upper arm in a neutral position or to preform secondary tasks such as reaching into pockets or a tool belt.

Figure 58:
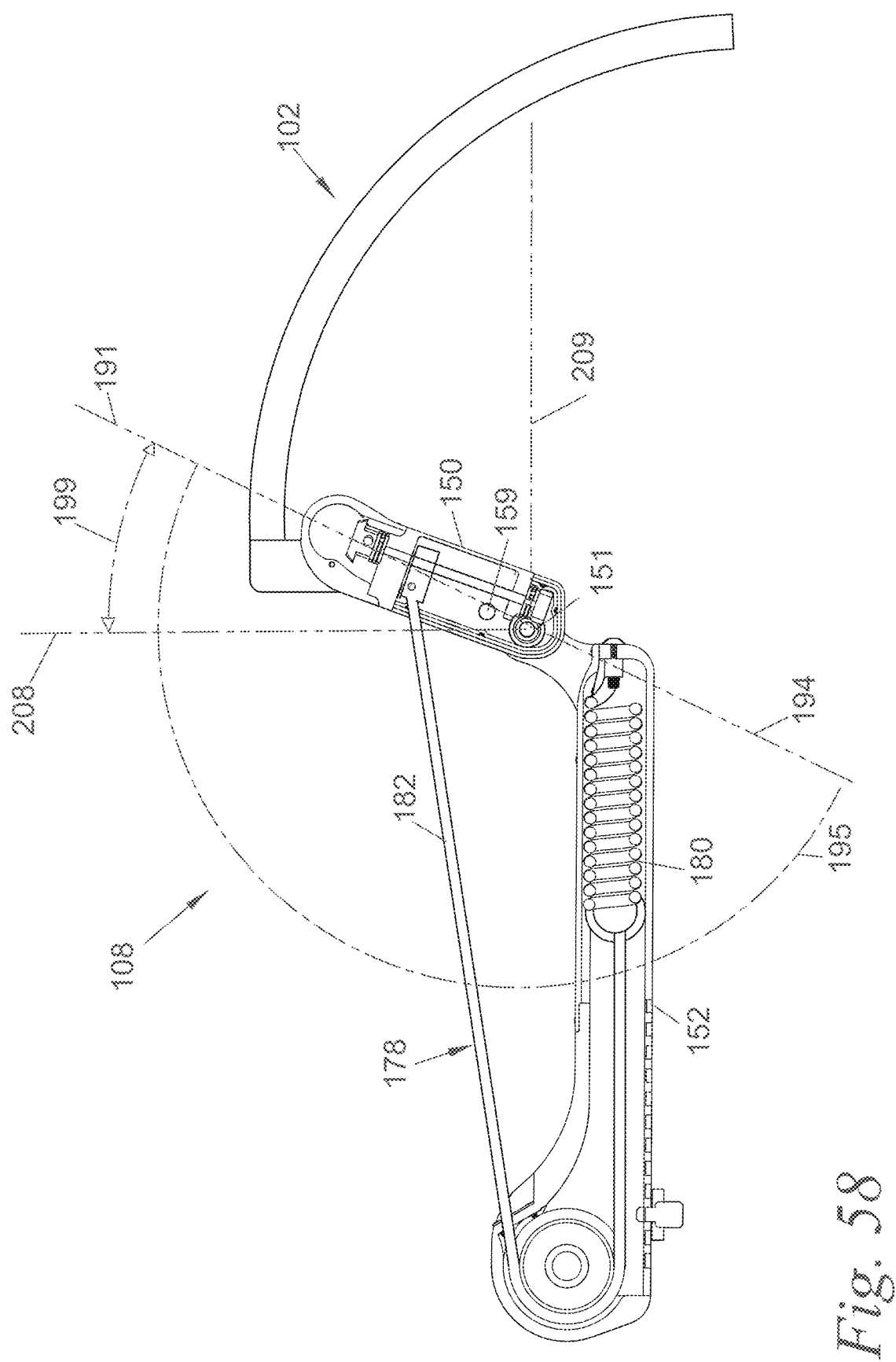
FIG. 58 is a side section view of a torque generator including an offset adjustment joint.
Figure 59:
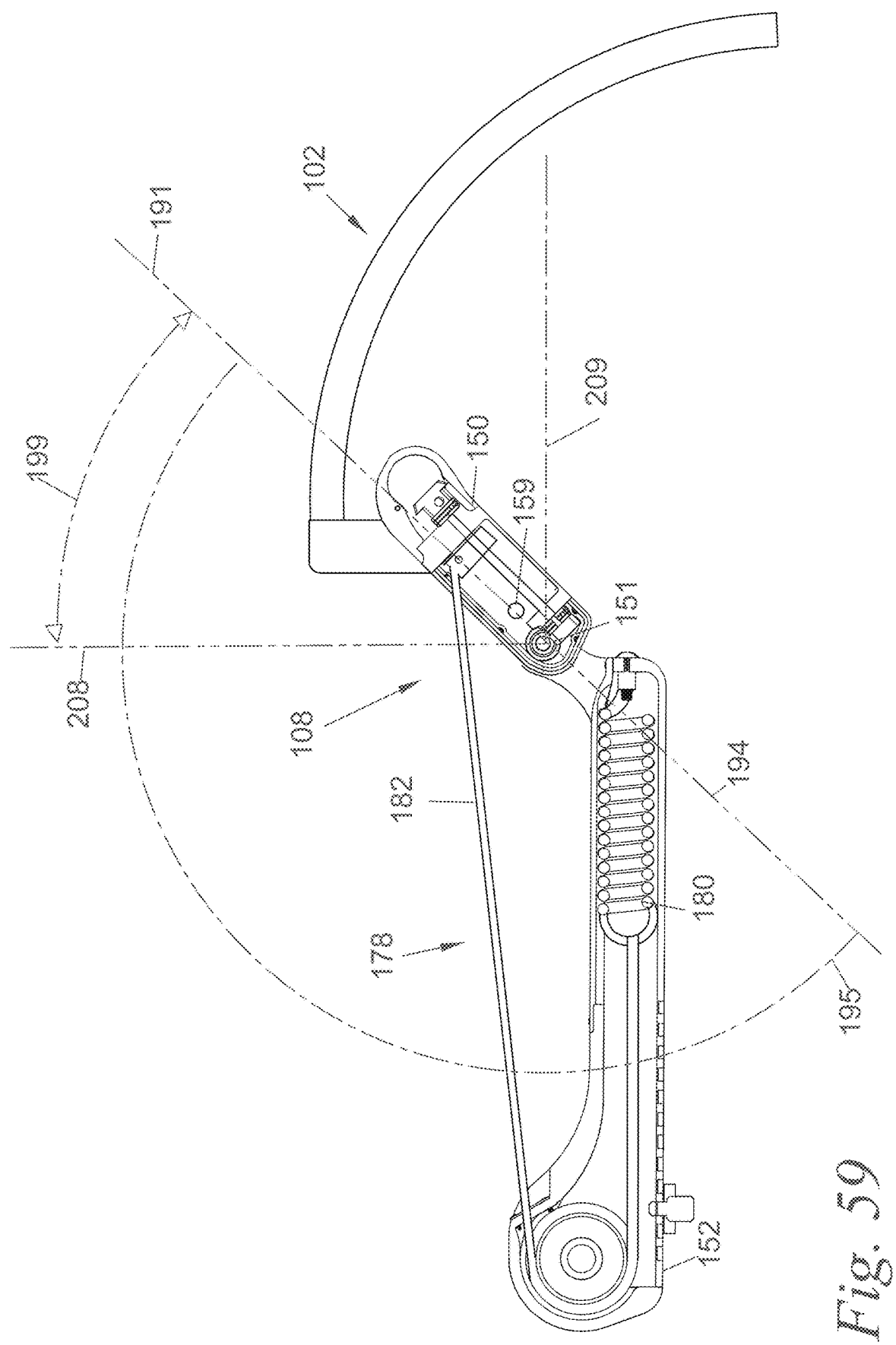
FIG. 59 is a side section view of a torque generator showing an offset position increased.
Figure 60:
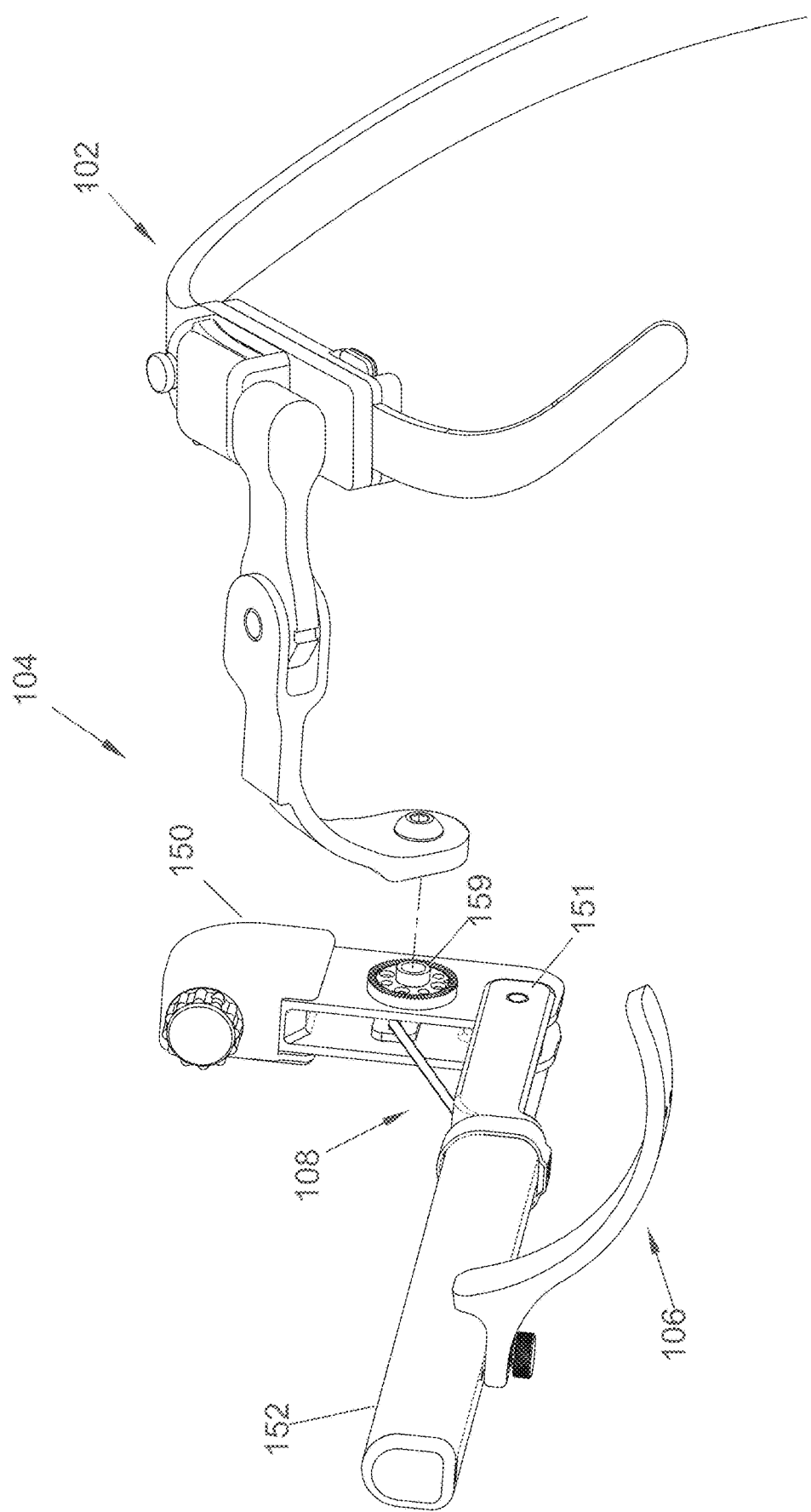
FIG. 60 is an exploded perspective view of arm link mechanism showing offset adjustment joint.

FIG. 58 and FIG. 59 depict an embodiment of arm supporting exoskeleton 100 wherein the orientation of proximal link 150 can be adjusted and held in place relative to shoulder base 102. Proximal link offset position 191 is defined as the orientation of proximal link 150 relative to gravity line 208 fixed to shoulder base 102 when person 200 is standing upright. Proximal link offset position 191 is adjusted at offset adjustment joint 159, which rotates substantially in the plane of first joint 151. Toggle position 194 represents the position of distal link 152 when first joint angle 193 has become equal to toggle angle 195. By adjusting proximal link offset position 191, toggle position 194 is adjusted relative to shoulder base 102. Offset angle 199 represents the angle between proximal link offset position 191 and gravity line 208 when person 200 is standing upright. FIG. 58 shows an embodiment wherein offset angle 199 is relatively small. FIG. 59 shows an embodiment wherein offset angle 199 is increased. FIG. 60 shows an exploded embodiment of arm link mechanism 104 comprising offset adjustment joint 159. Offset adjustment joint 159 allows proximal link 150 to rotate relative to shoulder base 102. Offset adjustment joint 159 can further lock the rotation of proximal link 150 relative to shoulder base 102 at a particular position.

Figure 61:
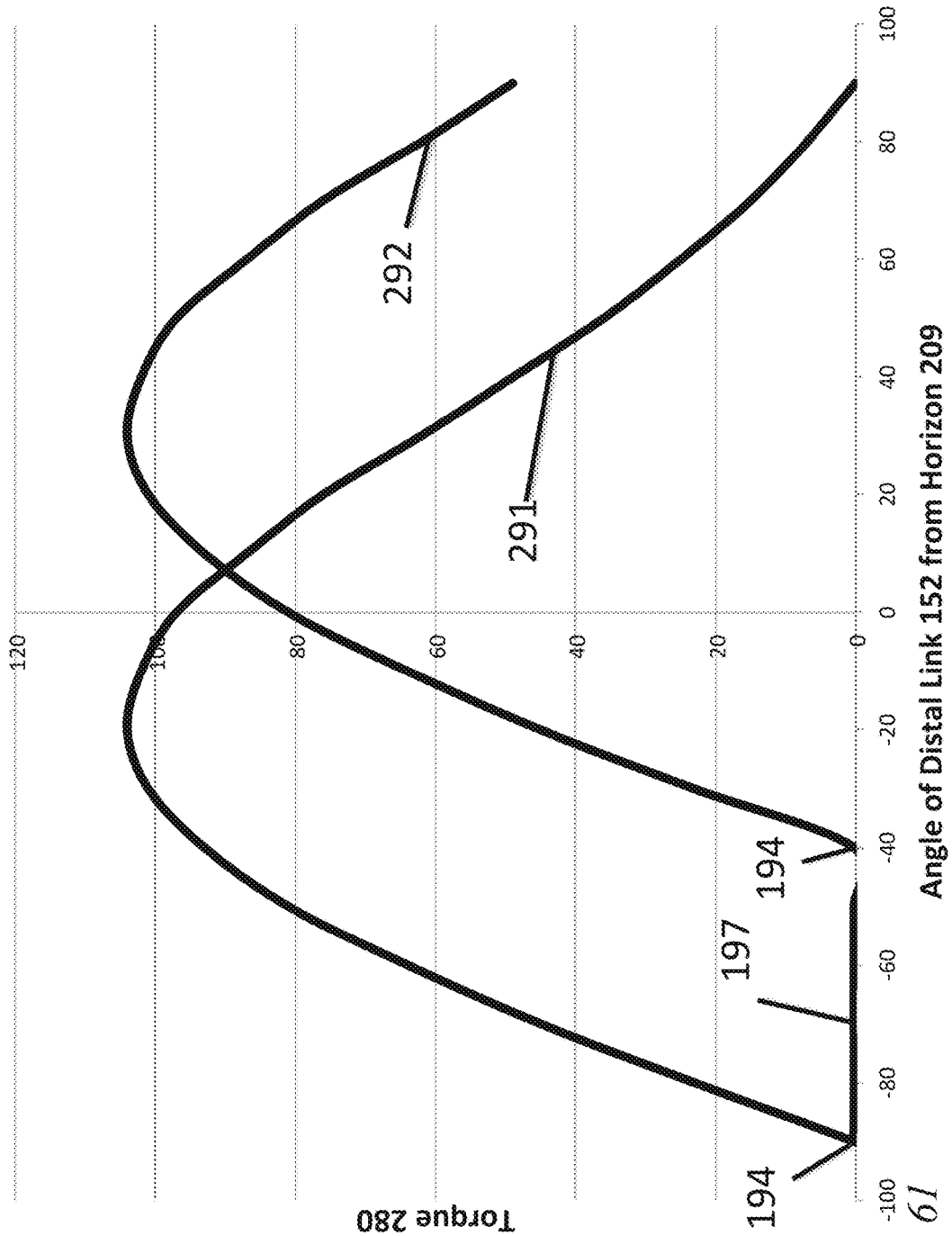
FIG. 61 is a plot of a torque generator torque profile for two values of an offset adjustment angle.

FIG. 61 depicts a graph of torque 280 created by torque generator 108 as a function of angle of distal link 152 from horizon 209. Torque profile 291 corresponds to a configuration when offset angle 199 is zero. Torque profile 292 corresponds to a configuration when offset angle 199 is fifty degrees, meaning the upward torque will not push the person's arm upward unless the angle of distal link 152 is raised relative to 40 degrees below horizon 209. It can be observed from this graph that one can move the toggle position by adjusting offset angle 199. Torque generator offset angle 199 may be adjusted in order to position toggle position 194 at a specific angle relative to horizon 209. Torque generator offset angle 199 may also be adjusted in order to create a torque profile with a specific peak position at a desired angle relative to horizon 209. When protrusion 186 is present, neutral zone 197 is formed for both curves for angles of distal link 152 past toggle position 194. When offset angle 199 is increased, a larger range of neutral zone 197 is created relative to the range of motion of upper arm 204.

Figure 62:
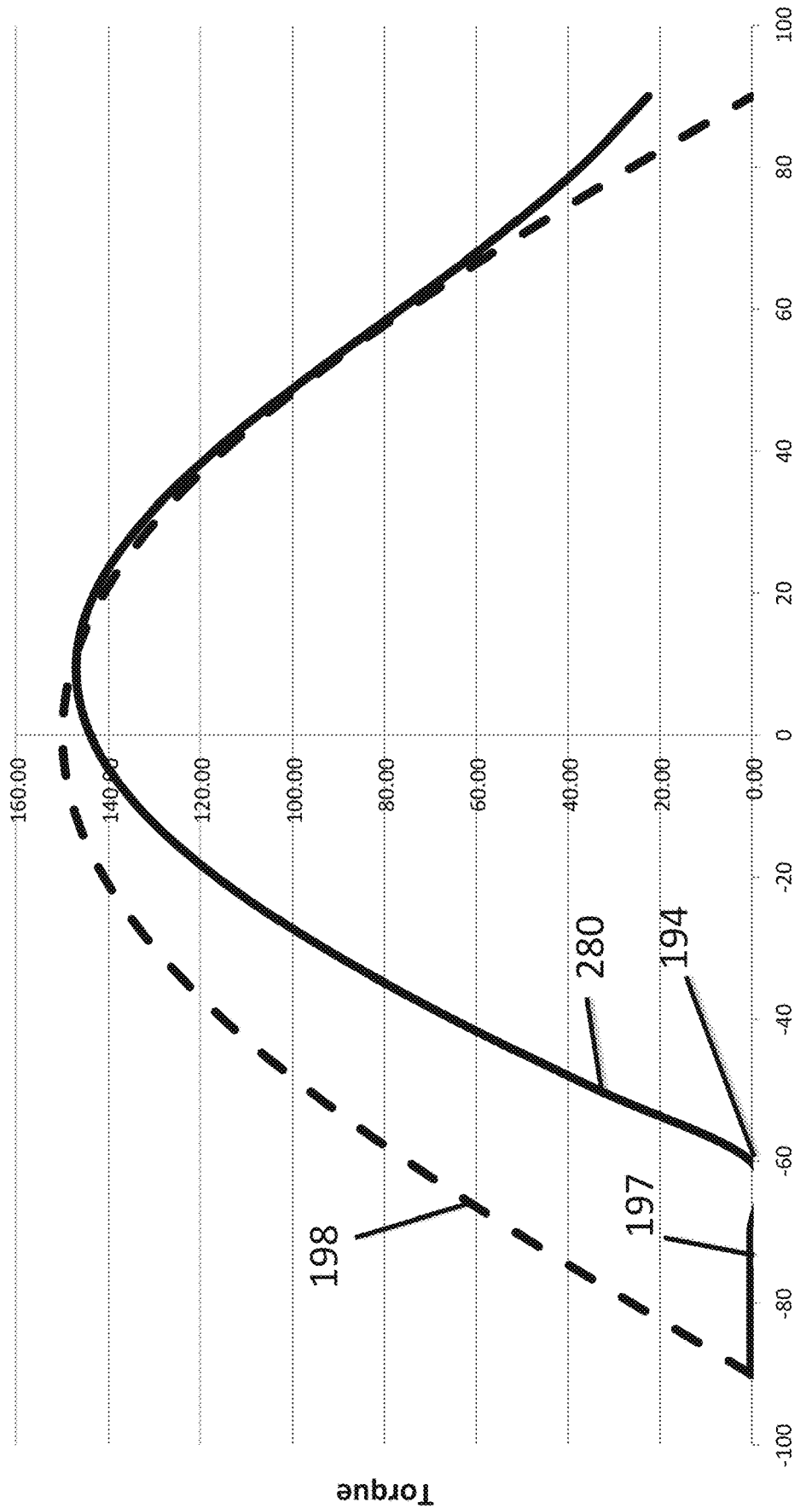
FIG. 62 is an example of a desired torque generator support torque profile compared to an arm weight torque profile.

In some embodiments, lower bracket 190, upper bracket 188, and proximal link offset position 191 can all be adjusted to create a desired support profile for torque 280. Arm weight torque profile 198 is defined as a torque to counter the weight of upper arm 204, forearm 206, hand 207, and tool 308. FIG. 62 depicts the profile of torque 280 where it matches arm weight torque profile 198 in angles substantially above horizon 209 and approximately cancels the arm weight torque profile 198. Overhead welding is a good example of an activity of a person that may require such torque. When the absolute angle of the distal link 152 is below −60 degrees from horizon 209, the profile of torque 280 enters neutral zone 197 where torque is substantially zero. This profile of torque 280 may be created with a lower bracket 190 position or upper bracket position 188 that creates torque 280 with a reduced peak amplitude compared to arm weight torque profile. Offset angle 199 may then be adjusted to shift support profile of torque 280 so that it closely matches arm weight torque profile 198 for the desired range of motion. When matched to arm weight torque profile 198, support torque 280 of reduced amplitude corresponds to a smaller range of angles in which torque 280 matches arm weight torque profile 198 and a larger size of neutral zone 197.

Figure 63:
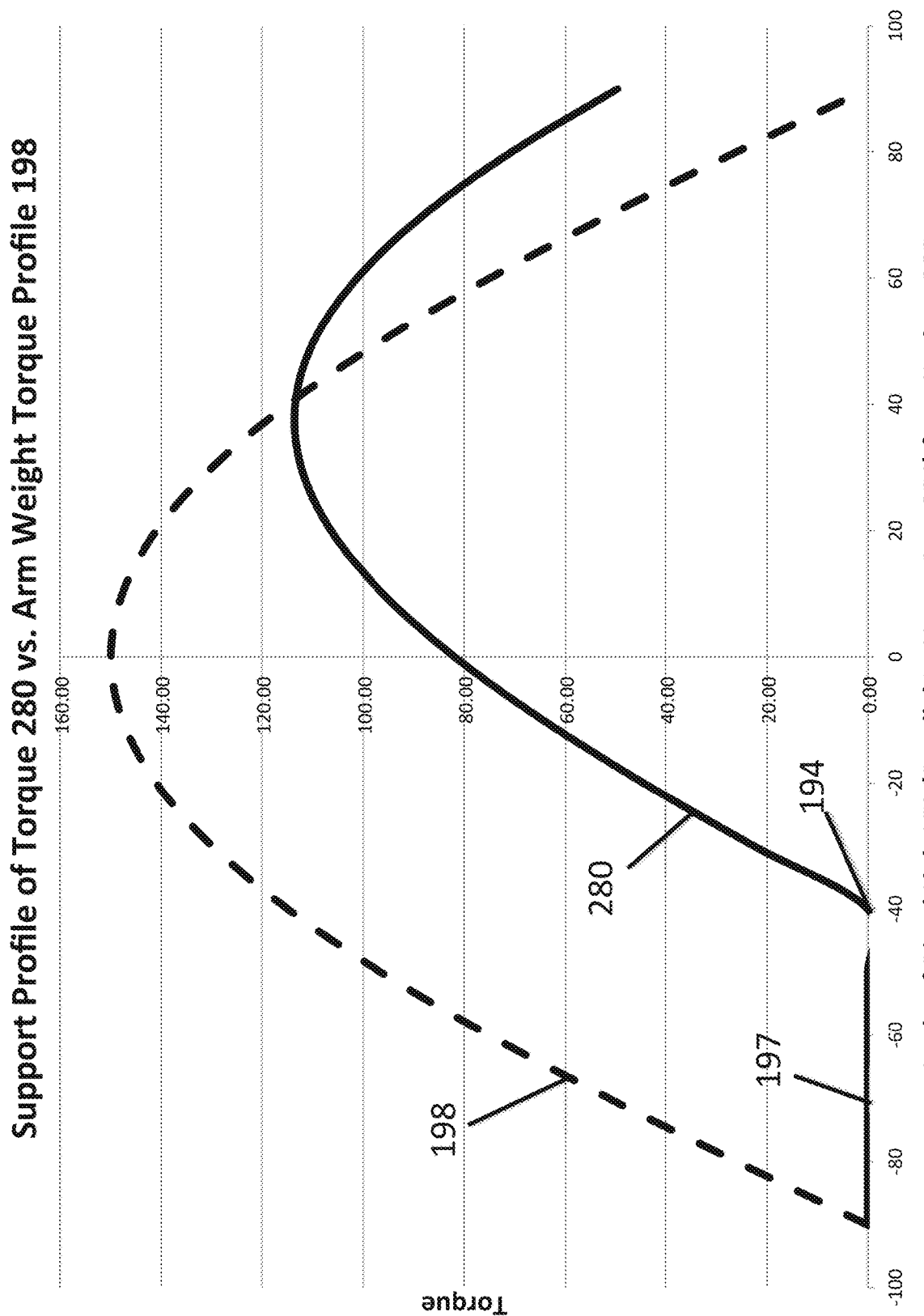
FIG. 63 is an alternative example of a desired torque generator support torque profile compared to an arm weight torque profile.

FIG. 63 depicts another support profile of torque 280 with values larger than the arm weight torque profile 198 at some angles above horizon 209. This is useful when person 200 needs to apply an upward force greater than the combined weight of upper arm 204, forearm 206, hand 207, and tool 308. Drilling into a ceiling is a good example of an activity that may require such torque. When the absolute angle of the distal link 152 is below −40 degrees from horizon 209, the profile of torque 280 enters neutral zone 197 where torque is substantially zero. This profile of torque 280 may be created with lower bracket 190 position or upper bracket position 188 that creates torque 280 with any peak amplitude compared to arm weight torque profile 198. Offset angle 199 may then be adjusted to shift profile of torque 280 so that it exceeds arm weight torque profile 198 for the desired range of motion. When adjusted to arm weight torque profile 198, support torque 280 of reduced amplitude corresponds to a smaller range of angles in which torque 280 exceeds arm weight torque profile 198 and a larger size of neutral zone 197.

Figure 64:
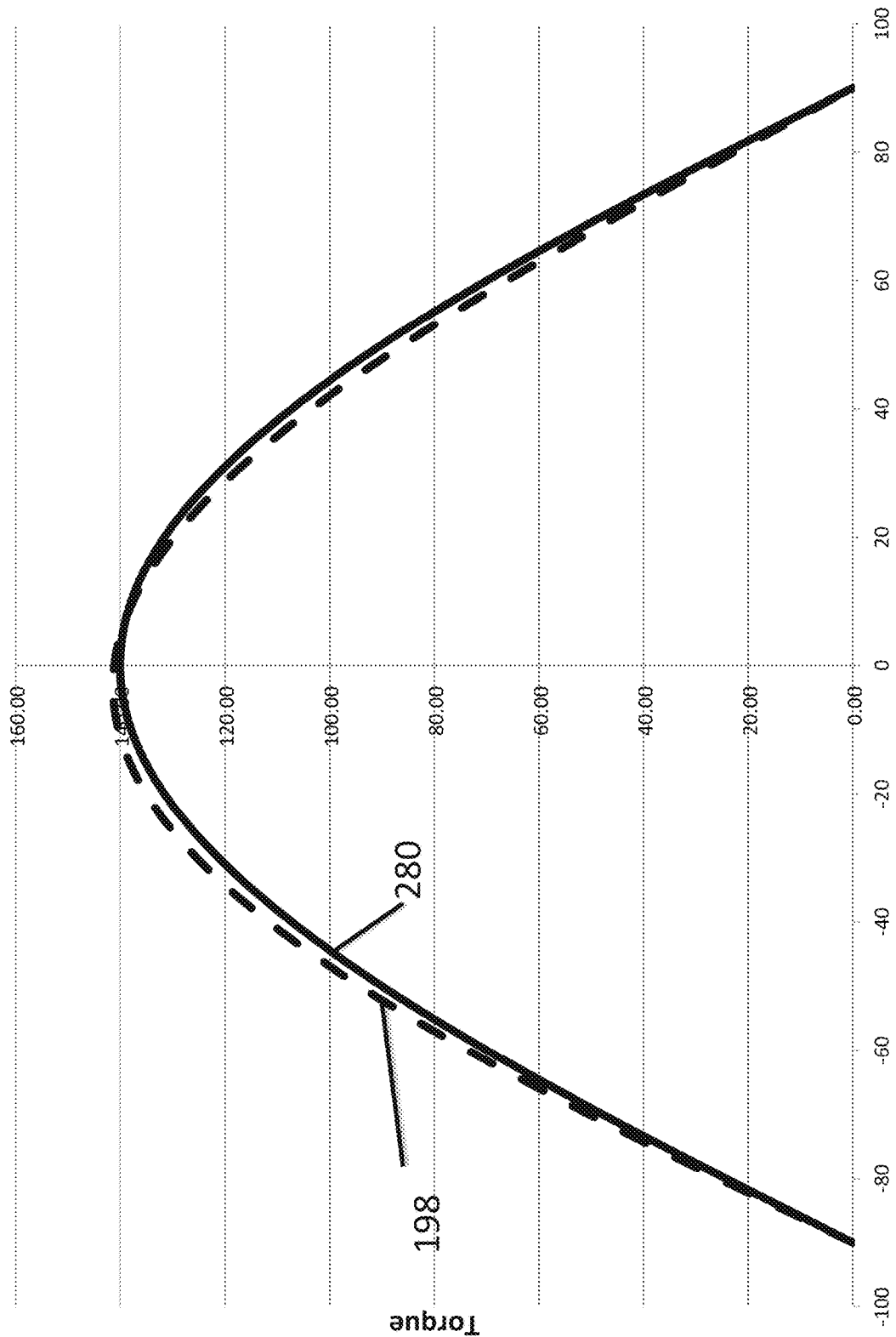
FIG. 64 is an alternative example of a desired torque generator support torque profile compared to an arm weight torque profile.

FIG. 64 depicts another possible support profile of torque 280 with values substantially equal to the arm weight torque profile 198 at all angles. Manipulating a tool throughout the entire range of motion is an example of an activity that may require such torque. This profile of torque 280 may be created with lower bracket 190 position or upper bracket position 188 that creates torque 280 with equal peak amplitude compared to arm weight torque profile 198. Offset angle 199 may then be adjusted to align profile of torque 280 peak with the peak of arm weight torque profile 198. Below −90 degrees of deviation from horizon 209, torque 280 enters neutral zone 197 (not shown) where torque 280 is substantially zero. Even with the full forward range of motion supported, neutral zone 197 provides substantially zero torque when upper arm 204 extends negatively behind trunk 202 of person 200, such as when a person's hand is reaching for a back pocket.

FIG. 65 depicts an embodiment wherein load bearing structure 112 comprises back frame 130 located substantially behind person 200 and lower extremity exoskeleton 304 coupled to back frame 130 and also coupled to legs 228 of person 200. Back frame 130 is coupled to arm link mechanism 104 and supports at least a portion of reaction forces 214 and reaction torques 215 from arm link mechanism 104. Back frame 130 transfers at least a portion of reaction forces 214 and reaction torques 215 to lower extremity exoskeleton 304. Lower extremity exoskeleton 304 transfers at least a portion of reaction forces 214 and reaction torques 215 to ground 310, resulting in ground reaction forces 311. Exoskeletons can be coupled to arm supporting exoskeletons 100, in accordance with some examples.

Figure 66:
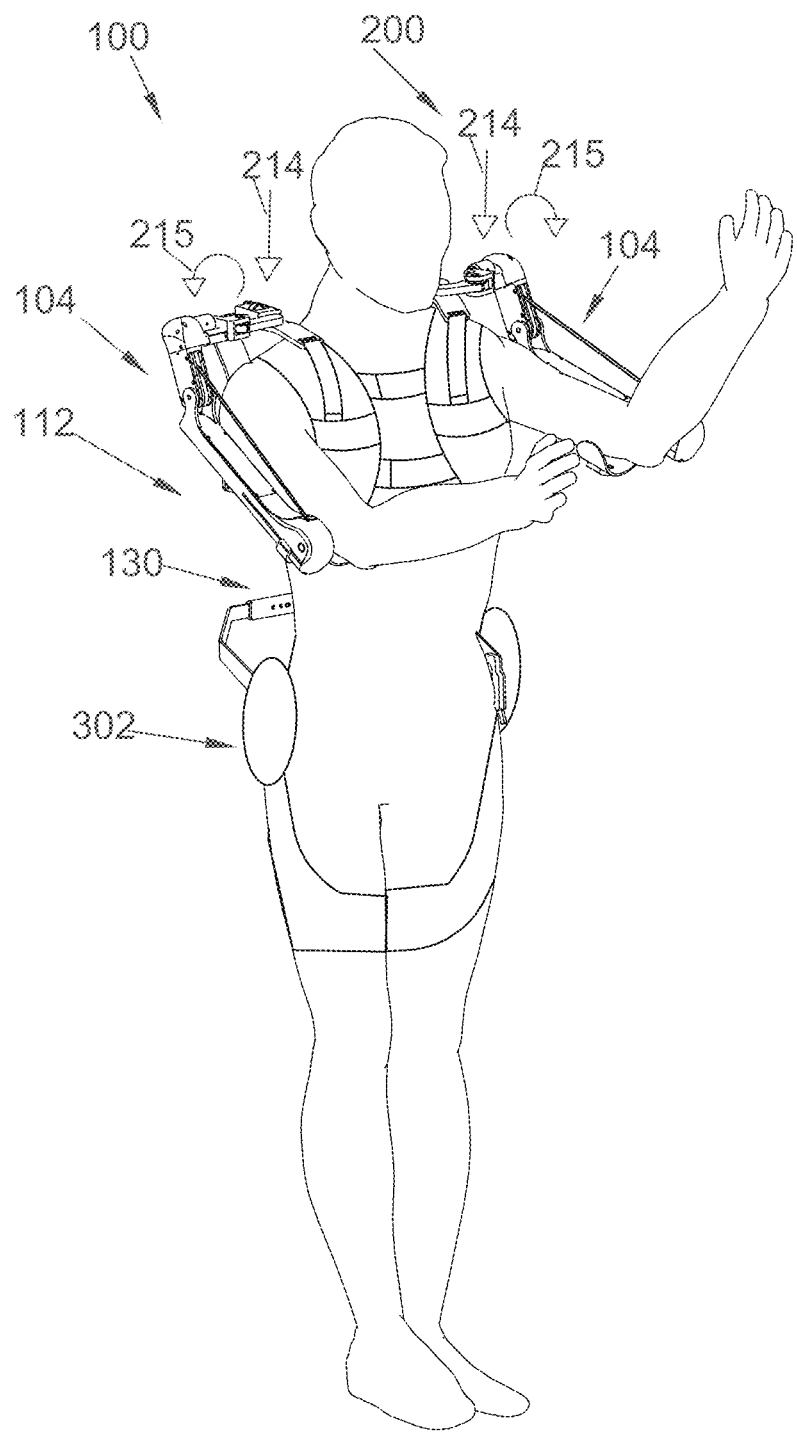
FIG. 66 is a front perspective view of a back frame coupled to a trunk exoskeleton.

FIG. 66 depicts an embodiment wherein load bearing structure 112 comprises a back frame 130 located substantially behind person 200 and a trunk supporting exoskeleton 302 coupled to back frame 130.

Figure 94:
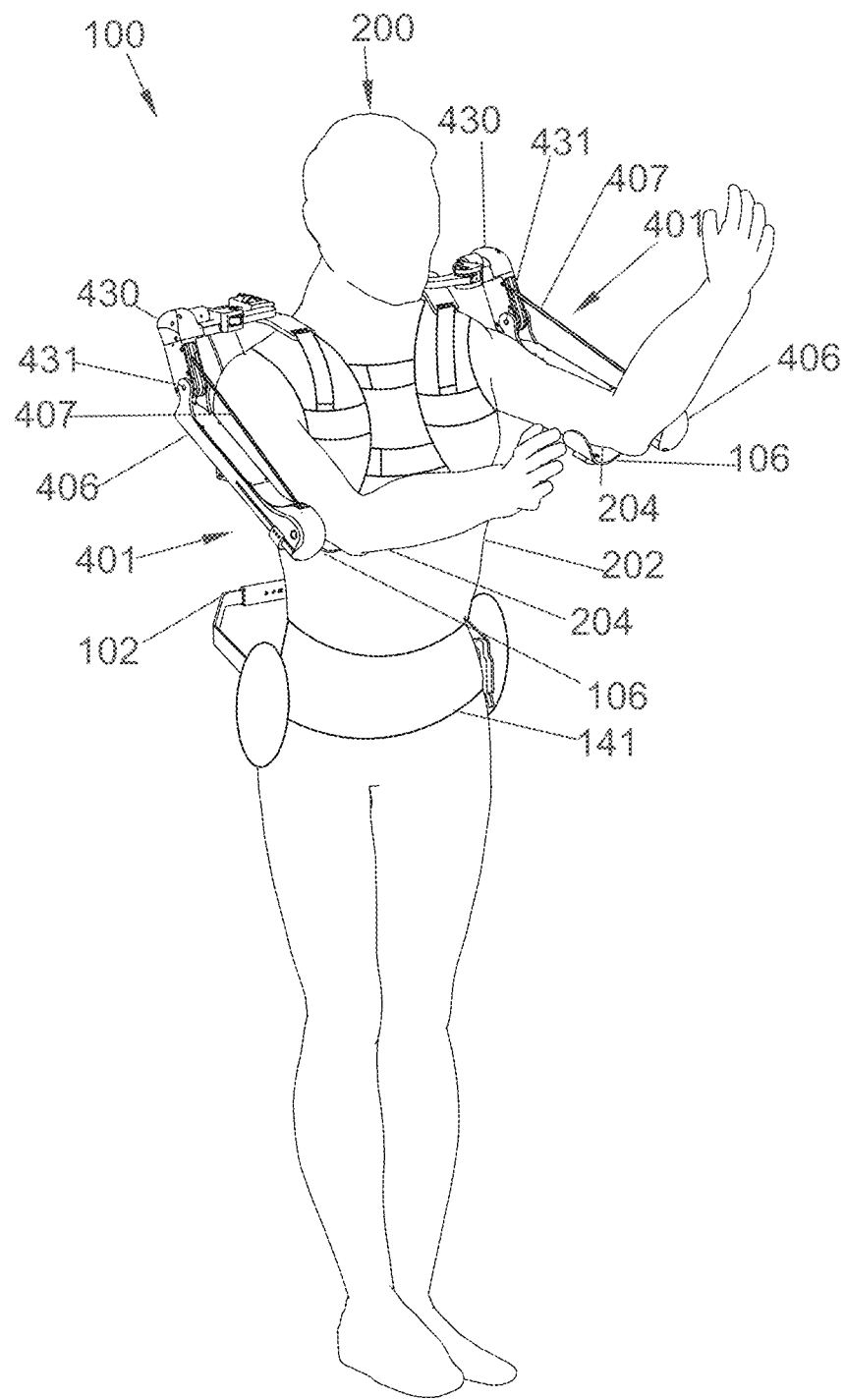
FIG. 94 is a perspective view of a variable force generator as part of an arm supporting exoskeleton.

FIG. 94 depicts a perspective view of arm supporting exoskeleton 100 utilizing variable force generator 401 configured to create a torque about first rotational joint 431 to support gravity forces on upper arm 204 of person 200. In some embodiments variable force generator 401 may be the same as tensile force generator 178 or torque generator 108, and first rotational joint 431 may be designed to rotate along first rotational axis 154. Arm coupler 106 is configured to couple to upper arm 204 and is coupled to distal link 152 or first element 406. Shoulder base 102 is configured to transfer reaction forces and torques from arm coupler 106 to trunk 202 of person 200, and is coupled to rotational base link 430 or proximal link 150. In some embodiments, rotational base link 430 may the same as proximal link 150.

In one embodiment, a variable force generator creates an "on" and "off" support mode of arm supporting exoskeleton 100. In a first force mode, variable force generator 401 exhibits a substantially small first stiffness and creates a substantially small first force 402, and a substantially small first torque 404 is applied to person's arm that compensates for the mass and friction of the arm supporting exoskeleton 100. A substantially small first torque 404 allows free, relatively unsupported movement of upper arm 204 of person 200. Small reaction forces and torques from first torque 404 are applied to trunk 202 of person through shoulder base 102 or are applied to a lower extremity exoskeleton 304 (not shown). This constitutes the off mode of arm supporting exoskeleton 100. In a second force mode, variable force generator 401 exhibits a second stiffness and creates second force 403 that is substantially larger than first force 402, and second torque 405 substantially larger than first torque 404 is applied to upper arm 204. Second torque 405 supports upper arm 204 from gravitational forces, while reaction forces and torques from second force 403 and second torque 405 are applied to trunk 202 of person 200 through shoulder base 102, or are applied to a lower extremity exoskeleton 304 (not shown). This constitutes the on mode of arm supporting exoskeleton 100.

In one embodiment, variable force generator creates a "high" and "low" support mode of arm supporting exoskeleton 100. In a first force mode, variable force generator 401 exhibits a first stiffness and creates first force 402, and first torque 404 is applied to upper arm 204, while reaction forces and torques from first force 402 and first torque 404 are applied to trunk 202 of person 200 through shoulder base 102, or are applied to a lower extremity exoskeleton 304 (not shown). First torque 404 supports upper arm 204 from gravitational forces. This constitutes a low support mode of arm supporting exoskeleton 100. In a second force mode, variable force generator 401 exhibits a second stiffness and creates second force 403 that is substantially larger than first force 402, and second torque 405 substantially larger than first torque 404 is applied to upper arm 204. Second torque 405 supports upper arm 204 from gravitational forces, while reaction forces and torques from second force 403 second torque 405 are applied to upper trunk 202 through shoulder base 102, or are applied to a lower extremity exoskeleton 304 (not shown). This constitutes the high support mode of arm supporting exoskeleton 100.

It can be appreciated that the forces and or torques applied by variable force generator 401 can be applied in a similar manner to a multitude of joints and movement mechanisms of exoskeleton, robotic, or similar applications.

Figure 67:
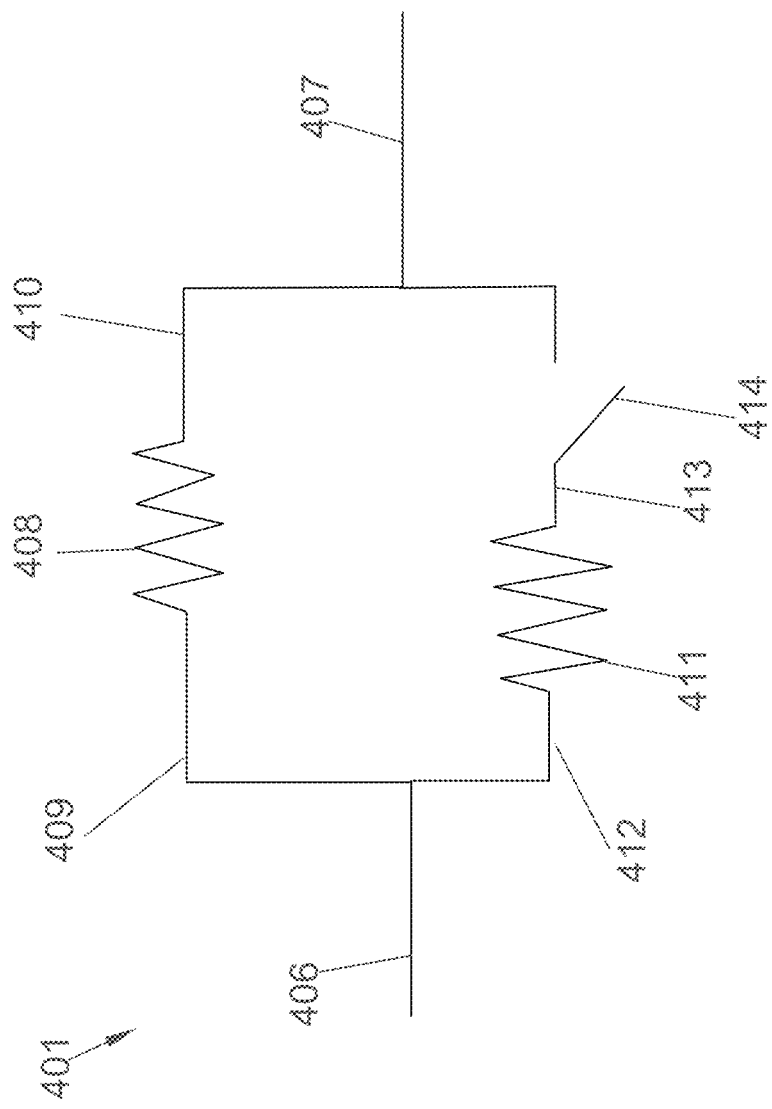
FIG. 67 is a schematic of a variable force generator.
Figure 68:
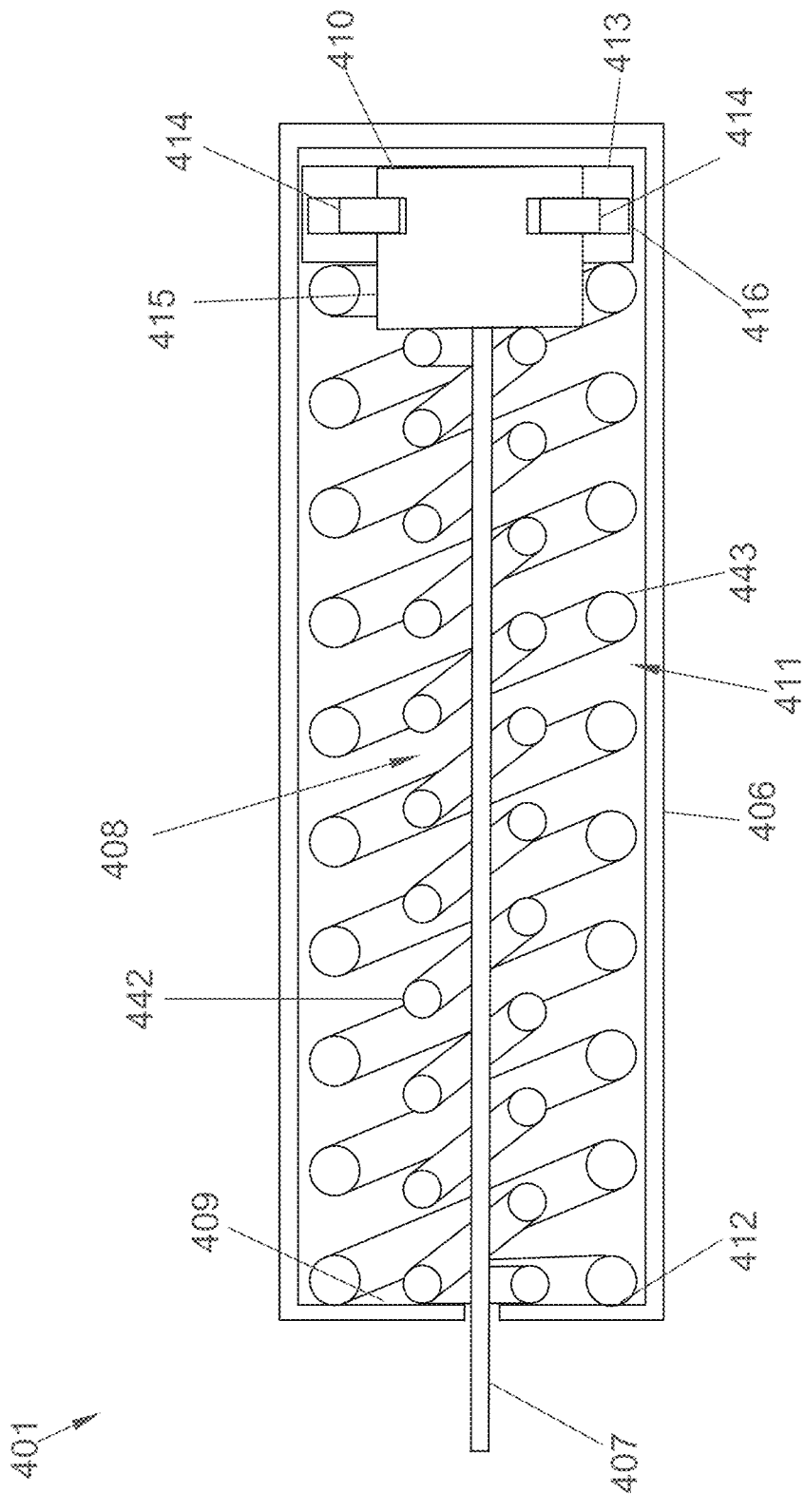
FIG. 68 is an axial section view of a variable force generator.

FIG. 67 shows a schematic embodiment of variable force generator 401. Variable force generator 401 is adaptable to exhibit two stiffness rates between first element 406 and second element 407. In some embodiments, first element 406 may be the same as distal link 152 and second element 407 may be the same as line element 182. Variable force generator 401 comprises first spring 408 that has first end 409 and second end 410. First spring 408 is constrained by first element 406 from its first end 409 and by the second element 407 from its second end 410. Variable force generator 401 further comprises second spring 411 which has first end 412 and second end 413. Second spring 411 is constrained by first element 406 from its first end 412. Variable force generator 401 further comprises at least one constraining mechanism 414 which is configurable to have at least a first position and a second position. FIG. 68 shows a hardware embodiment of variable force generator 401.

Figure 69:
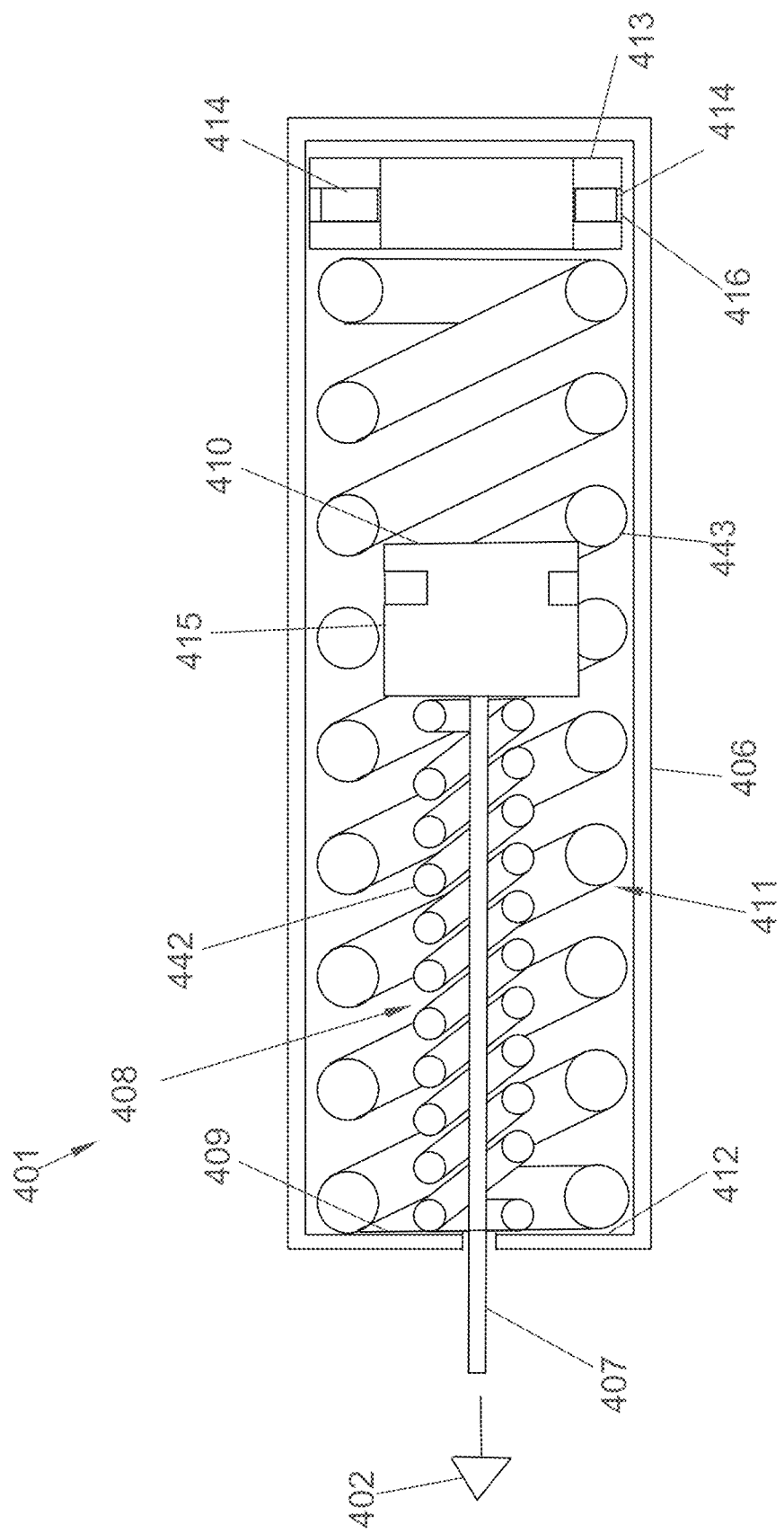
FIG. 69 is an axial section view of a variable force generator creating a first tensile force.

In operation, in the first force mode of variable force generator 401, the constraining mechanism 414 is in its first position as shown in FIG. 69, second end 413 of second spring 411 is not constrained by second element 407. This causes second spring 411 not to affect the motion between first element 406 and second element 407. In this first position the equivalent stiffness is the stiffness of first spring 408.

Figure 70:
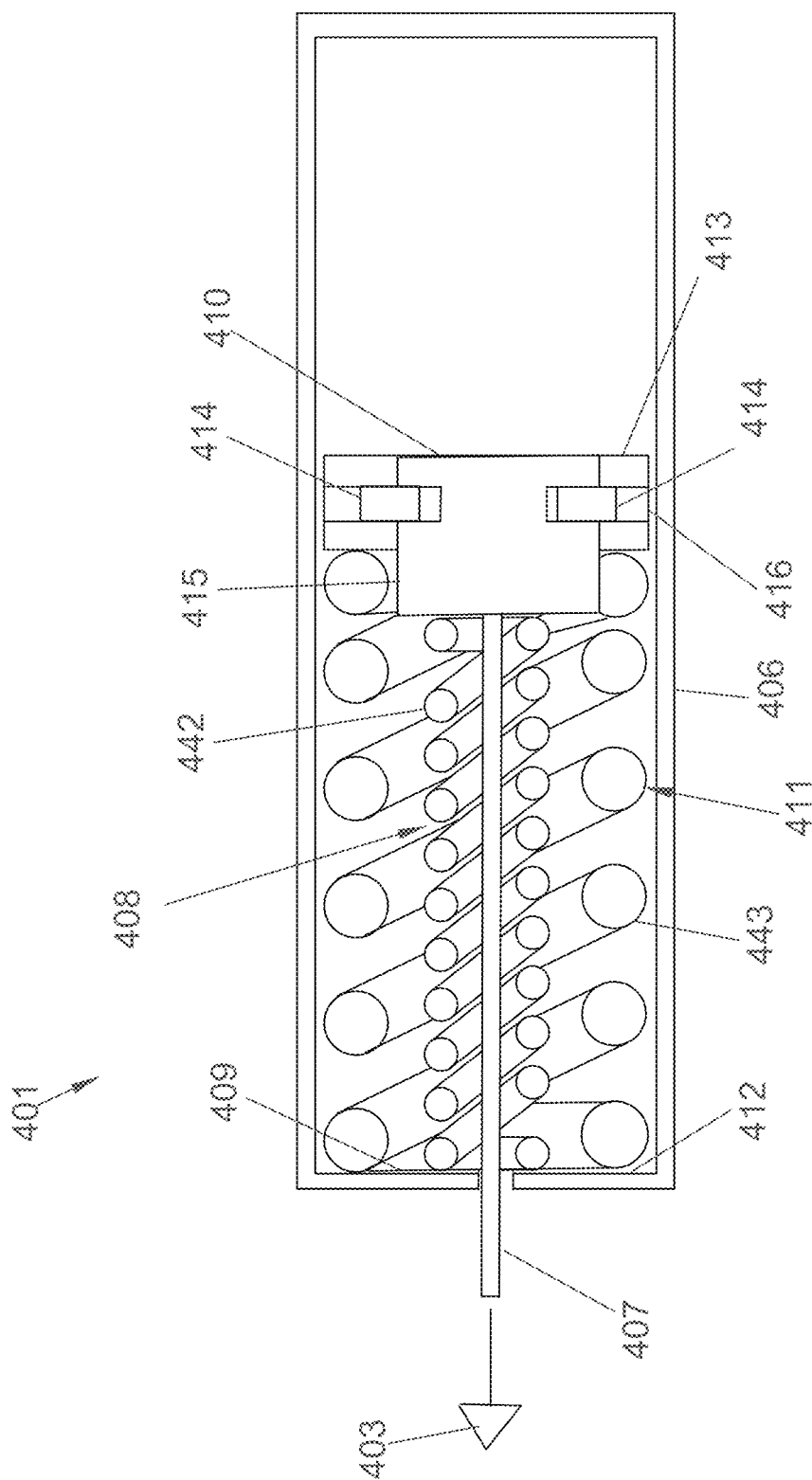
FIG. 70 is an axial section view of a variable force generator creating a second tensile force.

In the second force mode of variable force generator constraining mechanism 414 is in its second position as shown in FIG. 70, second end 413 of second spring 411 is constrained by second element 407. This causes the second spring 411 to act in parallel with first spring 408. In this second position, the equivalent stiffness is the addition of both the stiffness of first spring 408 and stiffness of second spring 411.

In some embodiments, the stiffness of first spring 408 is substantially smaller than the stiffness of second spring 411. When constraining mechanism 414 is in its first position, the motion between first element 406 and second element 407 generates a substantially small force between first element 406 and second element 407 relative to the force generated when constraining mechanism 414 is in its second position. "Substantially small force" is defined as just enough force to overcome the mass and or friction associated with the movement of variable force generator 401. With a substantially small force applied, variable force generator 401 appears to be off, or free moving, to an observer, with little to no spring force discernable. When constraining mechanism 414 is in its second position, the motion between first element 406 and second element 407 generates a force between first element 406 and second element 407 roughly equivalent to the stiffness of second spring 411.

FIG. 68, FIG. 69, and FIG. 70 show an embodiment wherein first spring 408 further comprises first spring element 442 and first spring bracket 415. First spring element 442 provides the stiffness of first spring 408. First spring element 442 may take the form of a coil spring as shown in all figures, or the form of a gas spring, rubber, or any other type of resilient element with an associated stiffness. First spring bracket 415 serves to facilitate the housing, motion, or general function of constraining mechanism 414 between its first position and second position. First spring bracket 415 may be located at first end 409 or second end 410 of the first spring 408. First spring bracket 415 may further facilitate the coupling of first spring 408 to second element 407. First spring bracket 415 may further facilitate the motion or stabilization of first spring 408 while it is undergoing compression or extension. First spring bracket 415 transfers force between first spring 442 and second element 407. First spring bracket 415 also transfers force between constraining mechanism 414 and second element 407 when constraining mechanism 414 is in its second position.

FIG. 68, FIG. 69, and FIG. 70 show an embodiment wherein second spring 411 further comprises second spring element 443 and second spring bracket 416. Second spring element 443 provides the stiffness of second spring 411. Second spring element 443 may take the form of a coil spring as shown in all figures, or the form of a gas spring, rubber, or any other type of resilient element with an associated stiffness. Second spring bracket 416 serves to facilitate the housing, motion, or general function of constraining mechanism 414 between its first position and second position. Second spring bracket 416 may be located at the first end 412 or second end 413 of second spring 411. Second spring bracket 416 may further facilitate the motion or stabilization of second spring 411 while it is undergoing compression or extension. Second spring bracket 416 transfers force between second spring element 443 and constraining mechanism 414 when constraining mechanism 414 is in its second position.

FIG. 69 and FIG. 70 show an embodiment of variable force generator 401 configured to create a tensile force between first element 406 and second element 407. To generate a tensile force, second element 407 may be made of a rigid, semi-rigid, or flexible material. In some embodiments, second element 407 comprises a flexible steel cable.

FIG. 69 shows variable force generator 401 wherein constraining mechanism 414 is in a first position. Second end 413 of second spring 411 is not constrained by second element 407. Therefore, second spring 411 does not affect the motion between first element 406 and second element 407. In this first position, the equivalent stiffness is the stiffness of first spring 408, and variable force generator 401 produces first force 402 between first element 406 and second element 407 that is tensile.

FIG. 70 shows variable force generator 401 wherein constraining mechanism 414 is in a second position. Second end 413 of second spring 411 is constrained by second element 407. This causes the second spring 411 to act in parallel with first spring 408. In this second position, the equivalent stiffness is the addition of both the stiffness of first spring 408 and stiffness of second spring 411, and variable force generator 401 produces second force 403 between first element 406 and second element 407 that is tensile.

Figure 71:
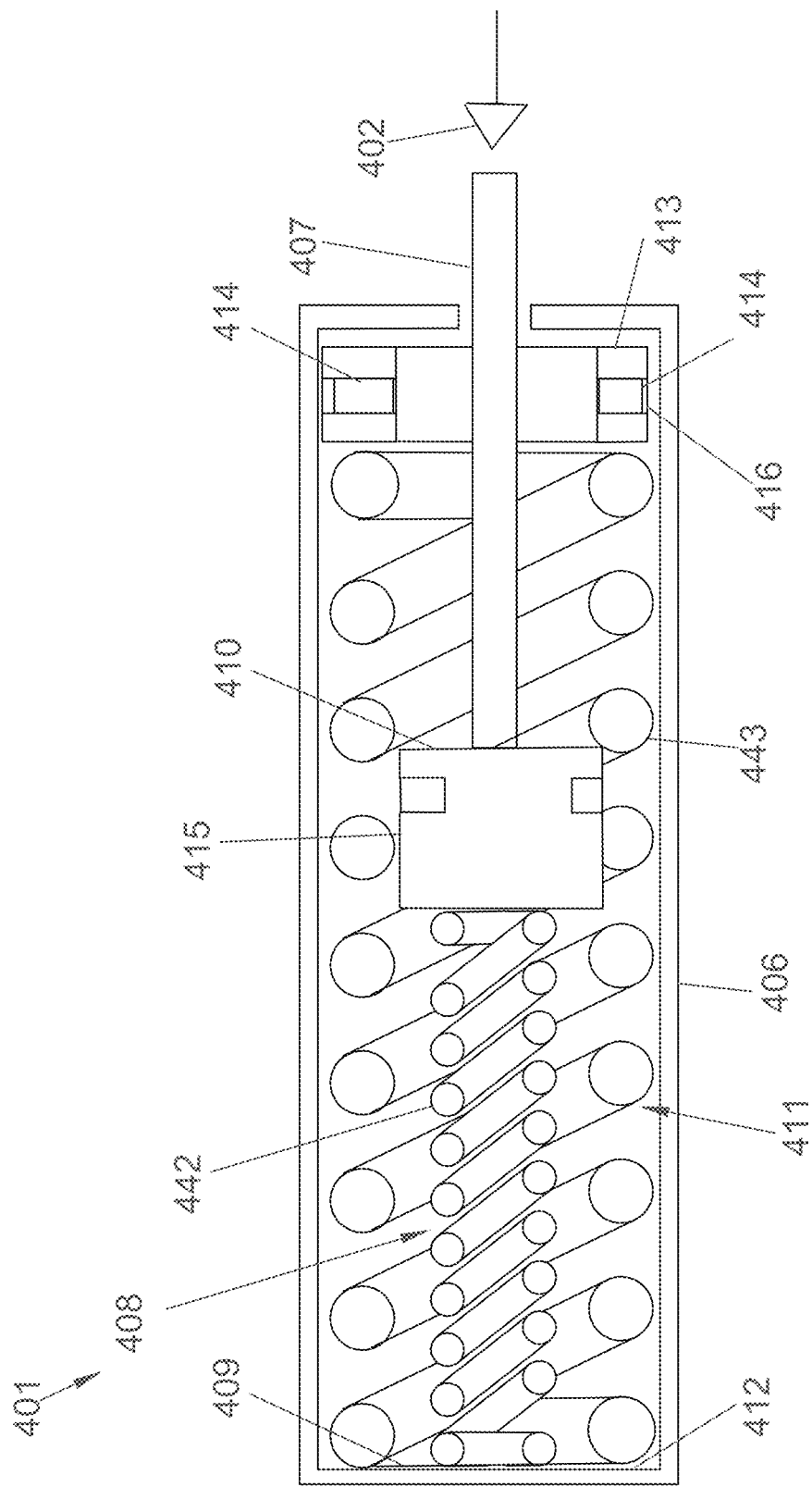
FIG. 71 is an axial section view of a variable force generator creating a first compressive force.

FIG. 71 shows an embodiment of variable force generator 401 configured to create a compressive force between first element 406 and second element 407 through a re-arrangement of components. Second element 407 may be made of a rigid or semi-rigid material in order to generate a compressive force.

In FIG. 71, constraining mechanism 414 is in a first position. Second end 413 of second spring 411 is not constrained by second element 407, so second spring 411 does not affect the motion between first element 406 and second element 407. In this first position, the equivalent stiffness is the stiffness of first spring 408, and variable force generator 401 produces a first force 402 between first element 406 and second element 407 that is compressive. It can be understood by one skilled in the art that the force produced by any embodiment herein may be made compressive by a similar re-arrangement of components.

Figure 72:
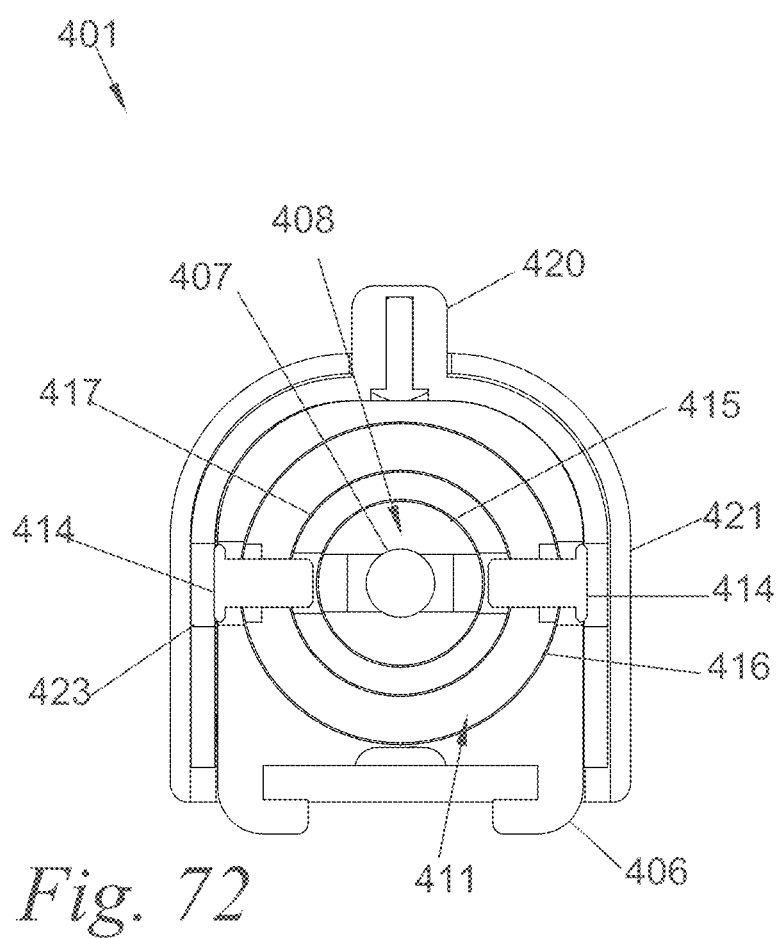
FIG. 72 is a radial section view of a variable force generator with constraining mechanism in first position.
Figure 73:
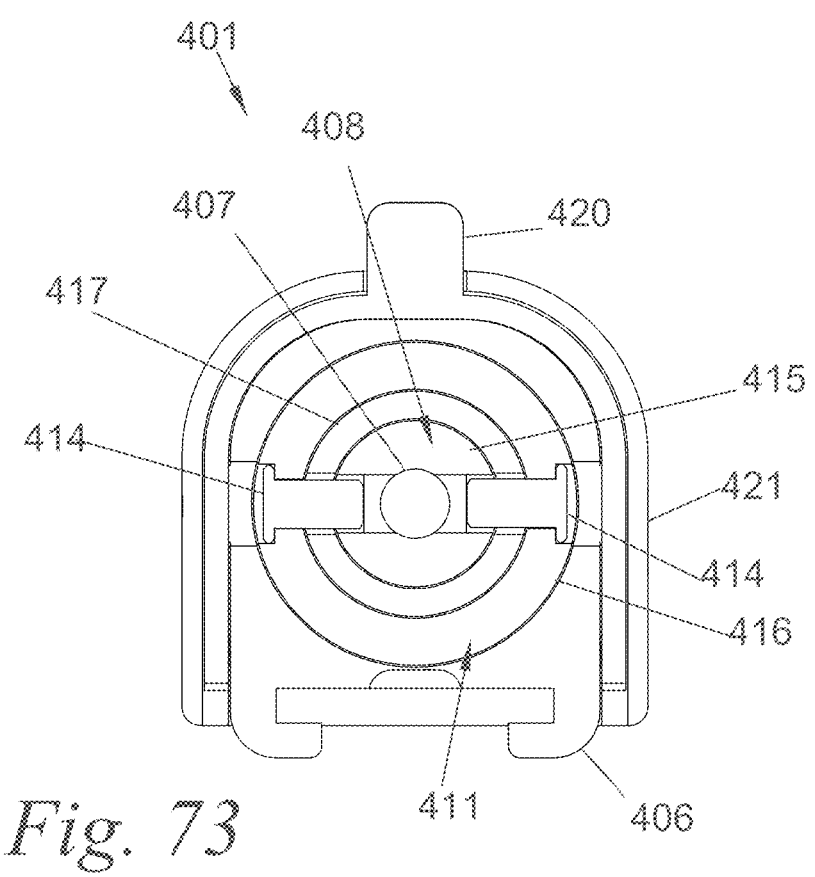
FIG. 73 is a radial section view of a variable force generator with constraining mechanism in second position.

FIG. 72 and FIG. 73 show a radial section of an embodiment wherein first spring 408 and second spring 411 are arranged concentrically. FIG. 72 shows variable force generator 401 wherein constraining mechanism 414 is in a first position. FIG. 73 shows variable force generator 401 wherein constraining mechanism 414 is in a second position.

In the embodiment of FIG. 72 and FIG. 73, second element 407 is arranged concentrically with one or a combination of the first spring 408, second spring 411, or first element 406.

In the embodiment of FIG. 72 and FIG. 73, first element 406 comprises a cylindrical opening. First spring 408 and second spring 411 are arranged concentrically within the cylindrical first element 406 while constrained by the cylindrical first element 406 from their respective first ends 409 and 412.

FIG. 72 and FIG. 73 depict a radial section of variable force generator 401 further comprising orientation sleeve 417. Orientation sleeve 417 is configured to radially constrain first spring 408 relative to second spring 411. The radial constraint may be used to facilitate smooth motion or a bearing surface, or to prevent contact between coils of first spring 408 and second spring 411.

Figure 74:
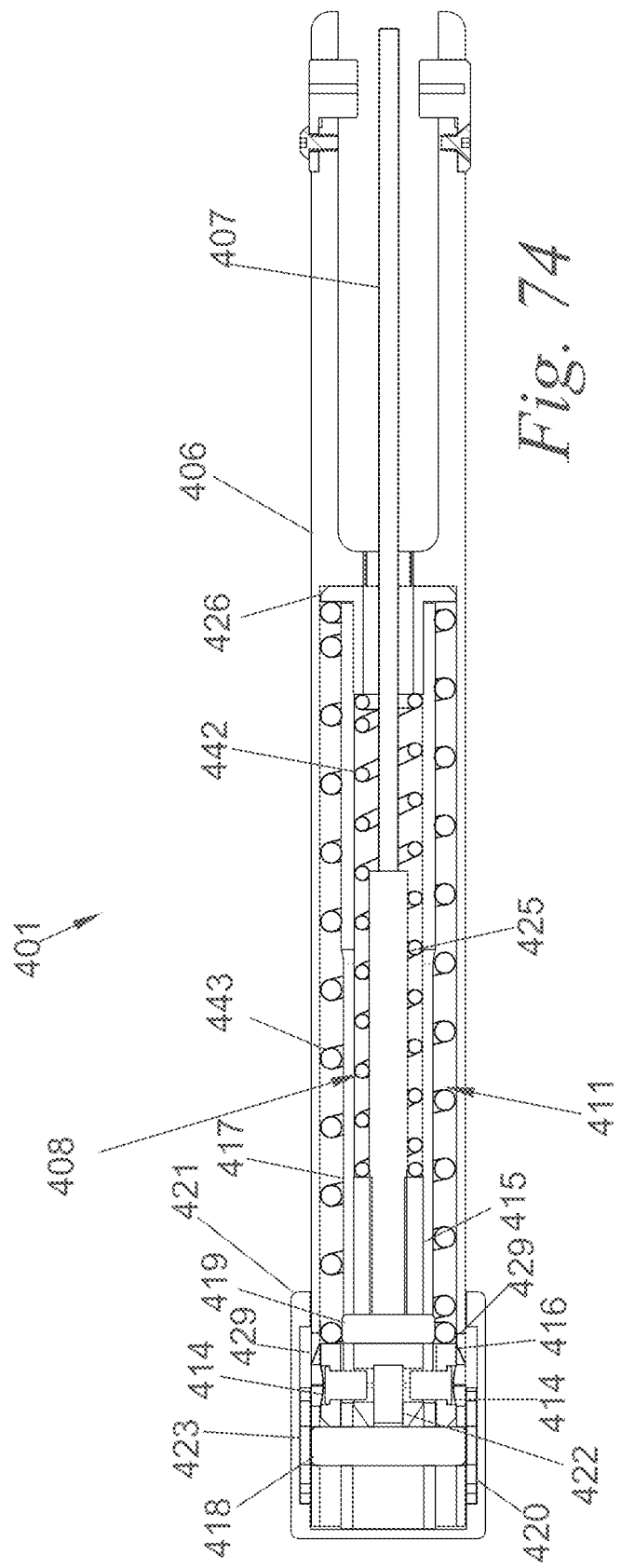
FIG. 74 is a detailed section view of a variable force generator at a transition position with constraining mechanism in a second position.

FIG. 74, FIG. 75, FIG. 76, and FIG. 77 depict a detailed axial section view of variable force generator 401. Variable force generator 401 may further comprise one or more rotational orientation elements that rotationally constrain first spring 408, second spring 411, orientation sleeve 417, or any combination thereof relative to first element 406. In the embodiment of FIG. 74, first orientation element 418 rotationally constrains orientation sleeve 417 relative to first element 406 by means of a pin, although other configurations are possible. Additionally, second orientation element 419 rotationally constrains orientation sleeve 417 relative to first spring bracket 415 by means of a pin, although other configurations are possible.

In some embodiments, orientation sleeve 417 is configured to radially constrain second spring 411 relative to first element 406. The radial constraint may be used to facilitate smooth motion or a bearing surface, or to prevent contact between coils of second spring 411 and first element 406.

In some embodiments first element 406 acts to radially constrain second spring 411. In still other embodiments, second element 407 acts to radially constrain first spring 408.

In some embodiments, a number of rotational orientation elements may be used to rotationally constrain first spring 408 and or second spring 411 relative to first element 406. Rotational constraints may be necessary to ensure proper positioning of components for the function of constraining mechanism 414 to move between its first position and second position. FIG. 72 shows an embodiment where constraining mechanism 414 further serves to rotationally constrain second spring 411 relative to first element 406 and or orientation sleeve 417 when constraining mechanism 414 is in its first position.

FIG. 73 shows an embodiment wherein constraining mechanism 414 further serves to rotationally constrain second spring 411 relative to first spring 408 or orientation sleeve 417 when constraining mechanism 414 is in its second position.

FIG. 74 depicts an embodiment of variable force generator 401 that comprises one or more axial orientation elements that axially constrain first spring 408, second spring 411, orientation sleeve 417, or any combination thereof to first element 406. Axial constraint of first spring 408 and second spring 411 relative to first element 406 serves to remove any forces on constraining mechanism 414 due to the stiffness of first spring 408 or second spring 411. Removing forces on constraining mechanism 414 allows for an easier transition between its first position and second position.

In embodiment shown in FIG. 74, first orientation element 418 axially constrains orientation sleeve 417, relative to first element 406. Furthermore, first orientation element 418 axially constrains the maximum extension of first spring 408 and second spring 411 relative to first element 406 by means of a pin, although other configurations are possible In another embodiment, second orientation element 419 axially constrains orientation sleeve 417 relative to first spring 408 by means of a pin and slot configuration, although other configurations are possible.

The axial position of first orientation element 418 and second orientation element 419 may further be used to preload first spring 408 and or second spring 411 when axially constrained by first orientation element 418 or second orientation element 419. The amount of preload of first spring 408 and or second spring 411 may be manipulated to alter the forces generated by variable force generator 401.

In some embodiments, variable force generator 401 further comprises preload element 426. Preload element 426 axially constrains first spring 408 and or second spring 411 relative to first element 406 to preload first spring 408 and or second spring 411 when axially constrained against first orientation element 418 and or second orientation element 419. When axially constrained against first orientation element 418, preload element 426 may preload first spring 408 by a different distance than second spring 411. The amount of preload provided by preload element 426 may be used to alter the force profile of variable force generator 401, allow for the use of varying types and or lengths of first spring 408 and or second spring 411, or facilitate proper positioning of components.

In some embodiments, the axial length of first spring bracket 415 and or second spring bracket 416 act to preload first spring element 442 and or second spring element 443 when axially constrained against first orientation element 418 and or second orientation element 419

In some embodiments, constraining mechanism 414 is translationally coupled to second spring 411. FIG. 72 through FIG. 77 show an embodiment of variable force generator 401 wherein constraining mechanism 414 is a pin or t-pin that slides though a hole within second spring 411. Constraining mechanism 414 is configured to slide into a profile, such as a hole or slot, within first spring 408 when constraining mechanism 414 is in its second position. When the constraining mechanism 414 has slid into the hole of first spring 408, the result is that second spring 411 is axially coupled to first spring 408, and thus second element 407, allowing stiffness from both first spring 408 and second spring 411 to be transferred between first element 406 and second element 407.

Figure 78:
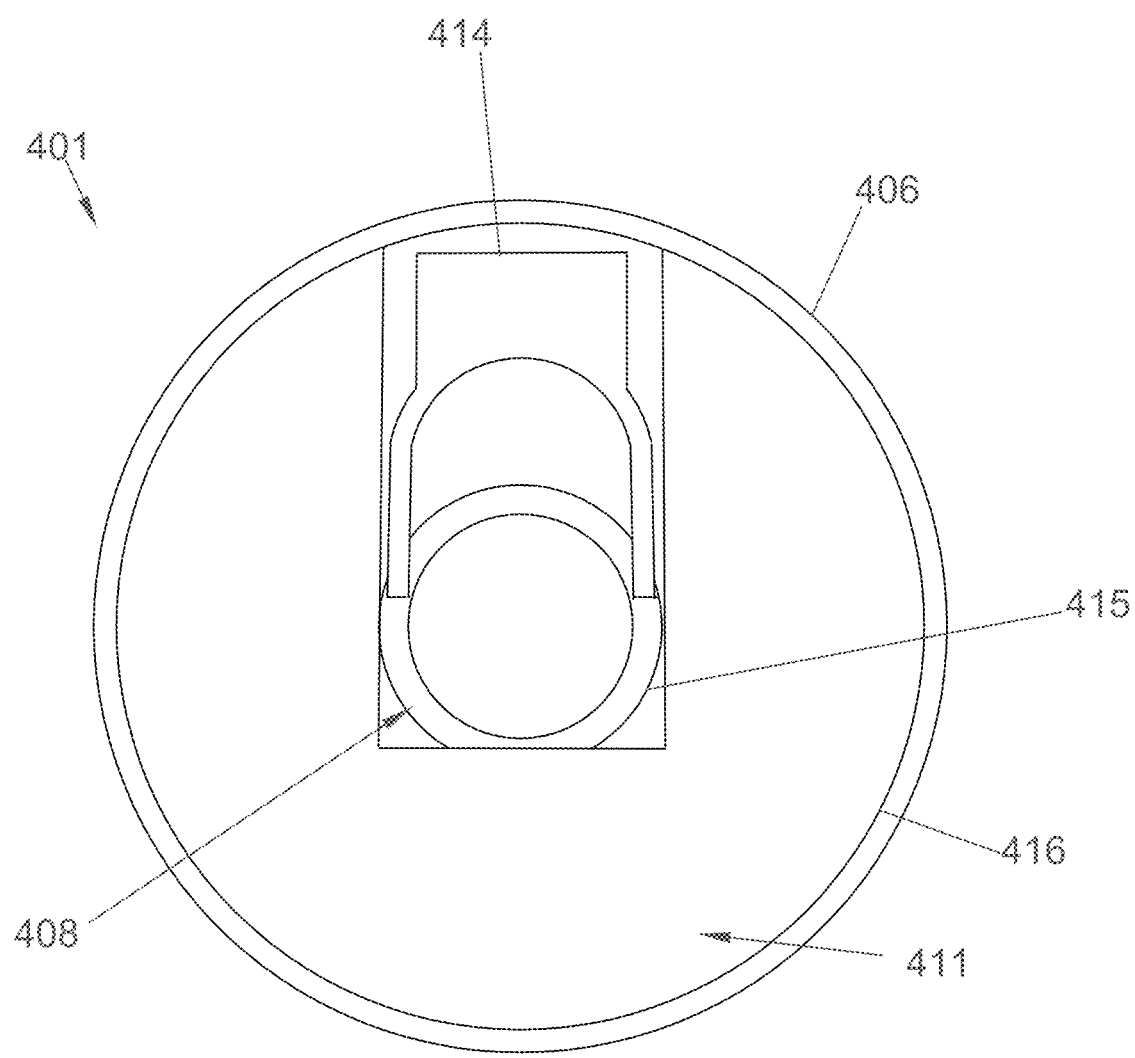
FIG. 78 is an embodiment of a retaining ring type constraining mechanism.

FIG. 78 is a radial section view of an alternative embodiment of variable force 401 wherein constraining mechanism 414 is a retaining ring translationally coupled to second spring 411 and configured to lock into a groove on first spring 408 and therefore axially couple first spring 408 to second spring 411.

In another embodiment (not shown) constraining mechanism 414 may similarly be translationally coupled to first spring 408 and slide into a profile, such as a hole or slot, in second spring 411.

Figure 79:
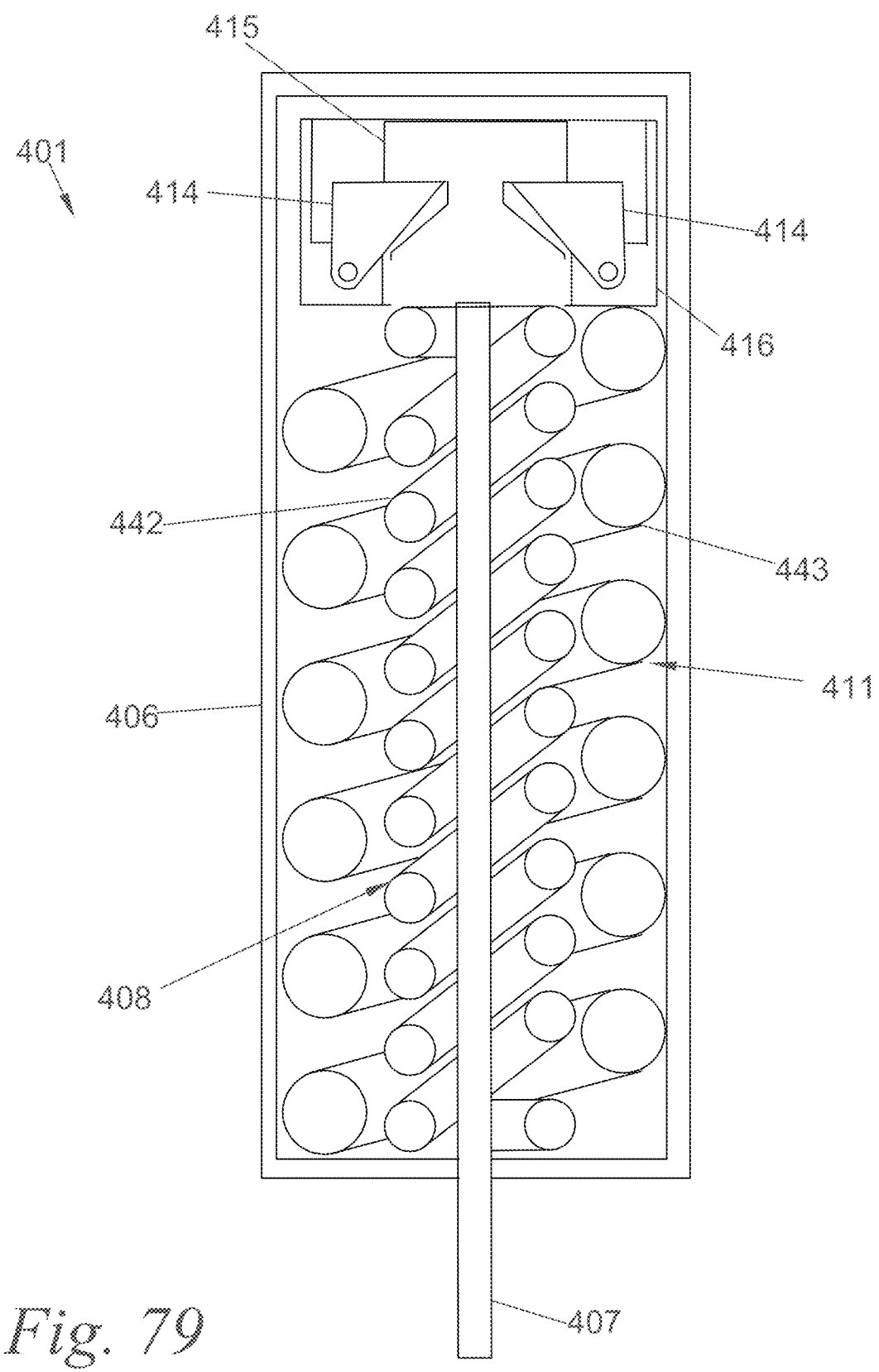
FIG. 79 is an embodiment of a rotating type constraining mechanism.

FIG. 79 is an axial section view of an alternative embodiment of variable force generator 401 wherein constraining mechanism 414 is rotatably coupled to second spring 411. In its second position, constraining mechanism 414 is configured to couple to a profile in the first spring 408 and therefore axially couple second spring 411 to first spring 408 or second element 407. When constraining mechanism 414 is in its second position, stiffness from both first spring 408 and second spring 411 is transferred between first element 406 and second element 407.

Figure 80:
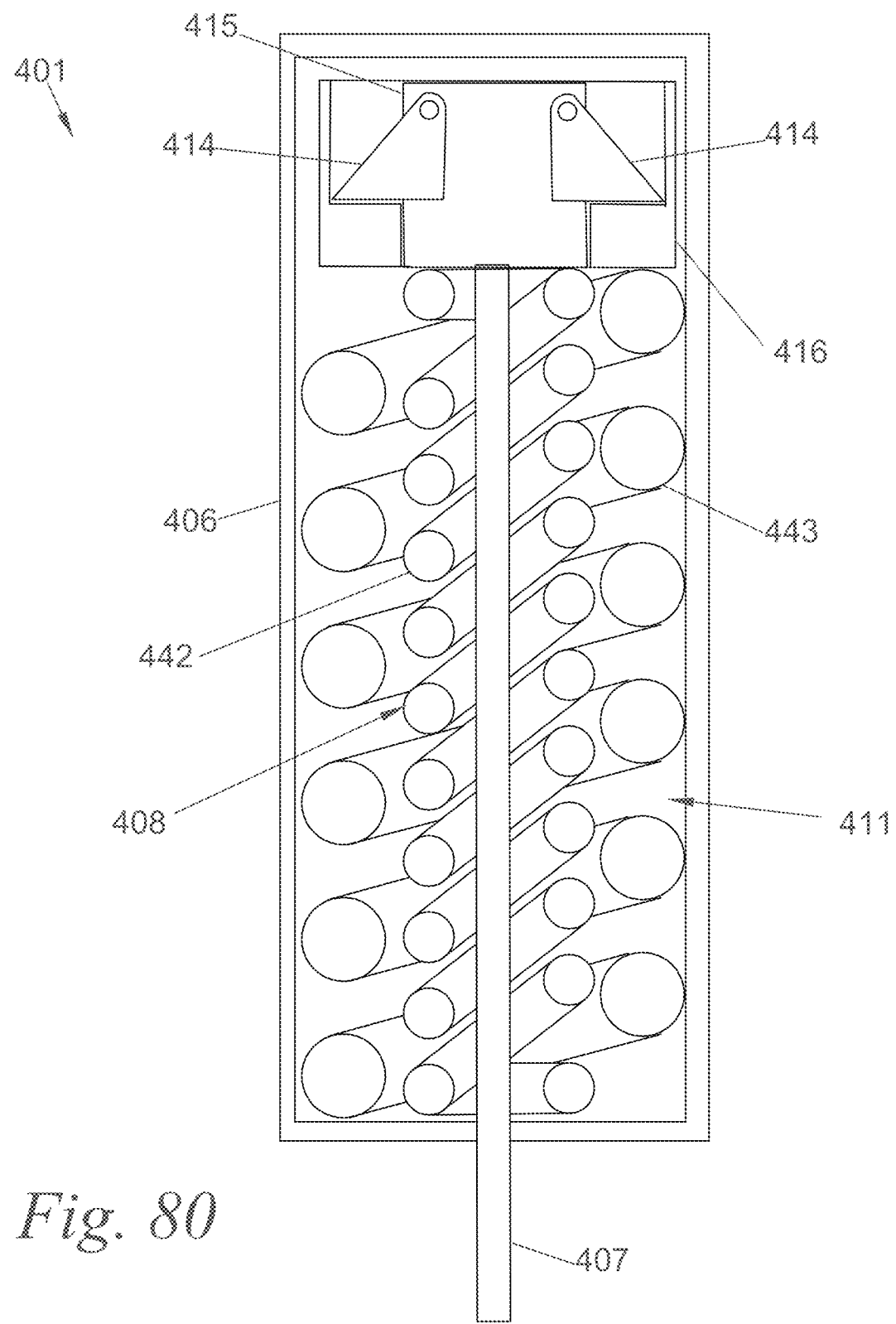
FIG. 80 is an alternate embodiment of a rotating type constraining mechanism.

FIG. 80 is an axial section view of an embodiment of variable force generator 401 wherein constraining mechanism 414 is rotatably coupled to first spring 408. In its second position, constraining mechanism 414 is configured to couple to a profile in the second spring 411 and therefore axially couple second spring 411 to first spring 408 or second element 407. When constraining mechanism 414 is in its second position, stiffness from both first spring 408 and second spring 411 is transferred between first element 406 and second element 407.

Figure 81:
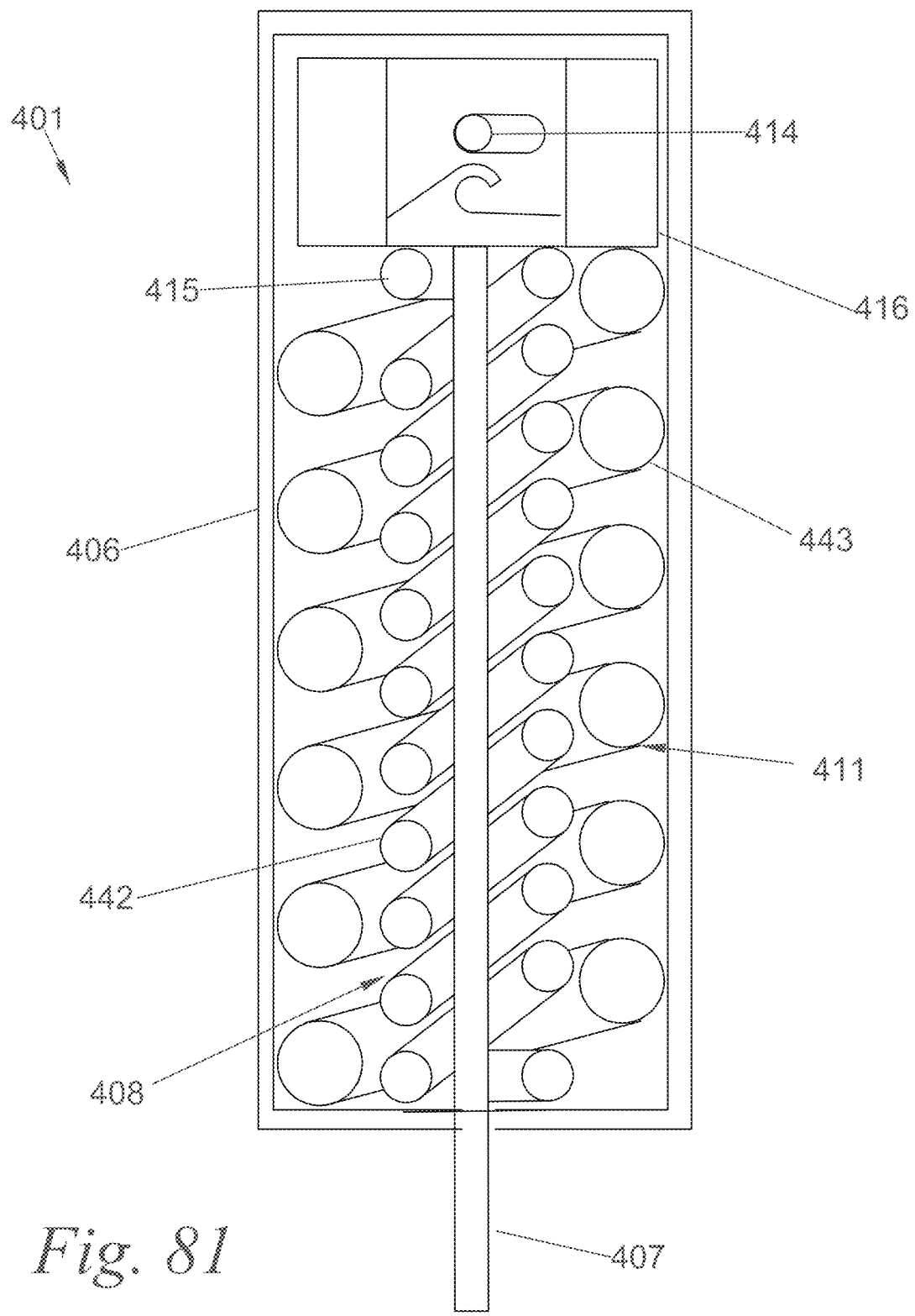
FIG. 81 is an embodiment of a hook type constraining mechanism.

FIG. 81 is an axial section view of an alternative embodiment of variable force 401 wherein constraining mechanism 414 comprises a pin translationally coupled to second spring 411 that can be selectively coupled to a hook that is coupled to or part of first spring 408. When constraining mechanism 414 is in its first position, it cannot couple to the hook. When constraining mechanism 414 is in its second position as shown, it can couple with the hook and therefore axially couple first spring 408 to second spring 411. In another embodiment (not shown), the pin can be rotatably coupled to second spring 411 or the pin and hook combination can be reversed between first spring 408 and second spring 411.

Figure 82:
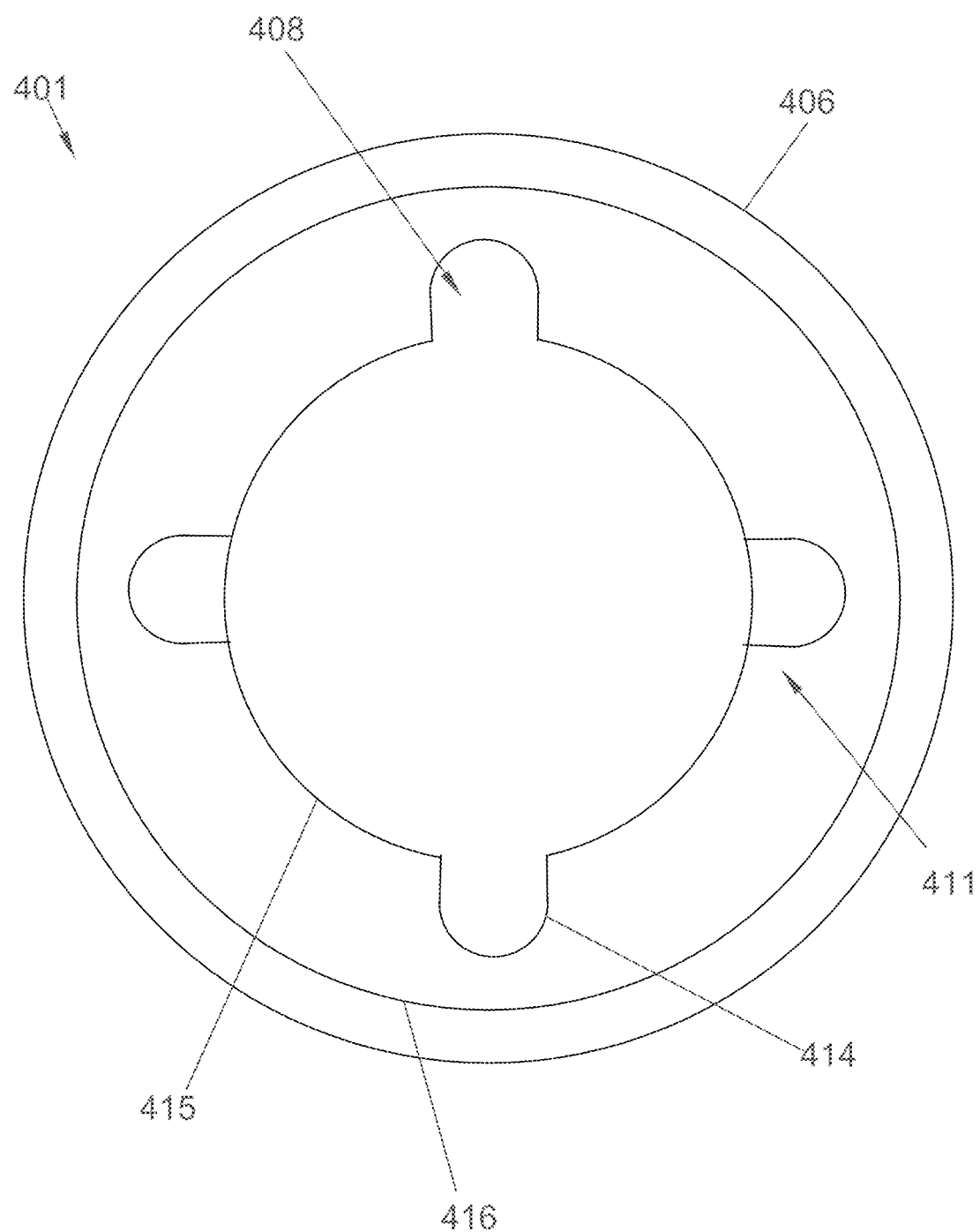
FIG. 82 is an embodiment of an integrated constraining mechanism.

FIG. 82 shows a radial section view of an embodiment of variable force generator 401 wherein the function of constraining mechanism 414 is embedded in the shape and rotational orientation of second spring 411 relative to first spring 408. In the embodiment, first spring 408 comprises a number of protrusions and second spring 411 comprises a number of profiles allowing the protrusions of first spring 408 to pass through. When the protrusions of first spring 408 and profiles of second spring 411 are aligned, constraining mechanism 414 is in its first position and second spring 411 is not coupled to first spring 408. When second spring 411 is rotated so that the protrusions of first spring 408 and profiles of second spring 411 are not aligned, constraining mechanism 414 is in its second position and first spring 408 is axially coupled to second spring 411. In another embodiment (not shown), the protrusions are on second spring 411 and the profiles are on first spring 408.

Figure 83:
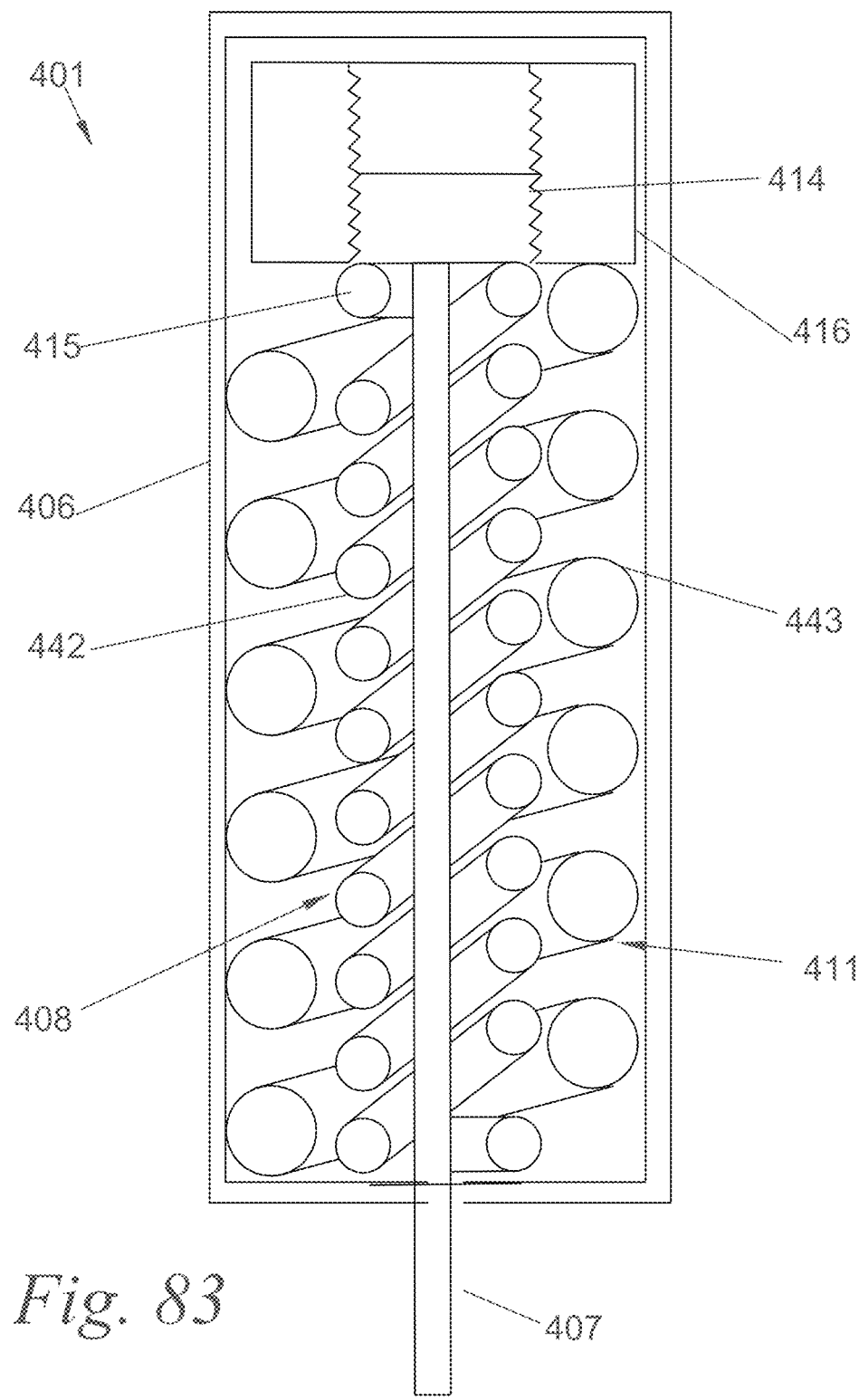
FIG. 83 is an embodiment of a screw type constraining mechanism.

FIG. 83 shows an axial section view of an embodiment of variable force generator 401 wherein the function of constraining mechanism 414 is embedded into the first spring 408 and second spring 411. First spring 408 and second spring 411 each comprise mating threads that allow first spring 408 to be axially coupled to second spring 411 when either is rotated in a manner that engages the threads. FIG. 83 shows the constraining mechanism 414 in a second position wherein the threads between first spring 408 and second spring 411 are engaged. The first position of constraining mechanism 414 would correspond to no threads between first spring 408 and second spring 411 being engaged.

Figure 84:
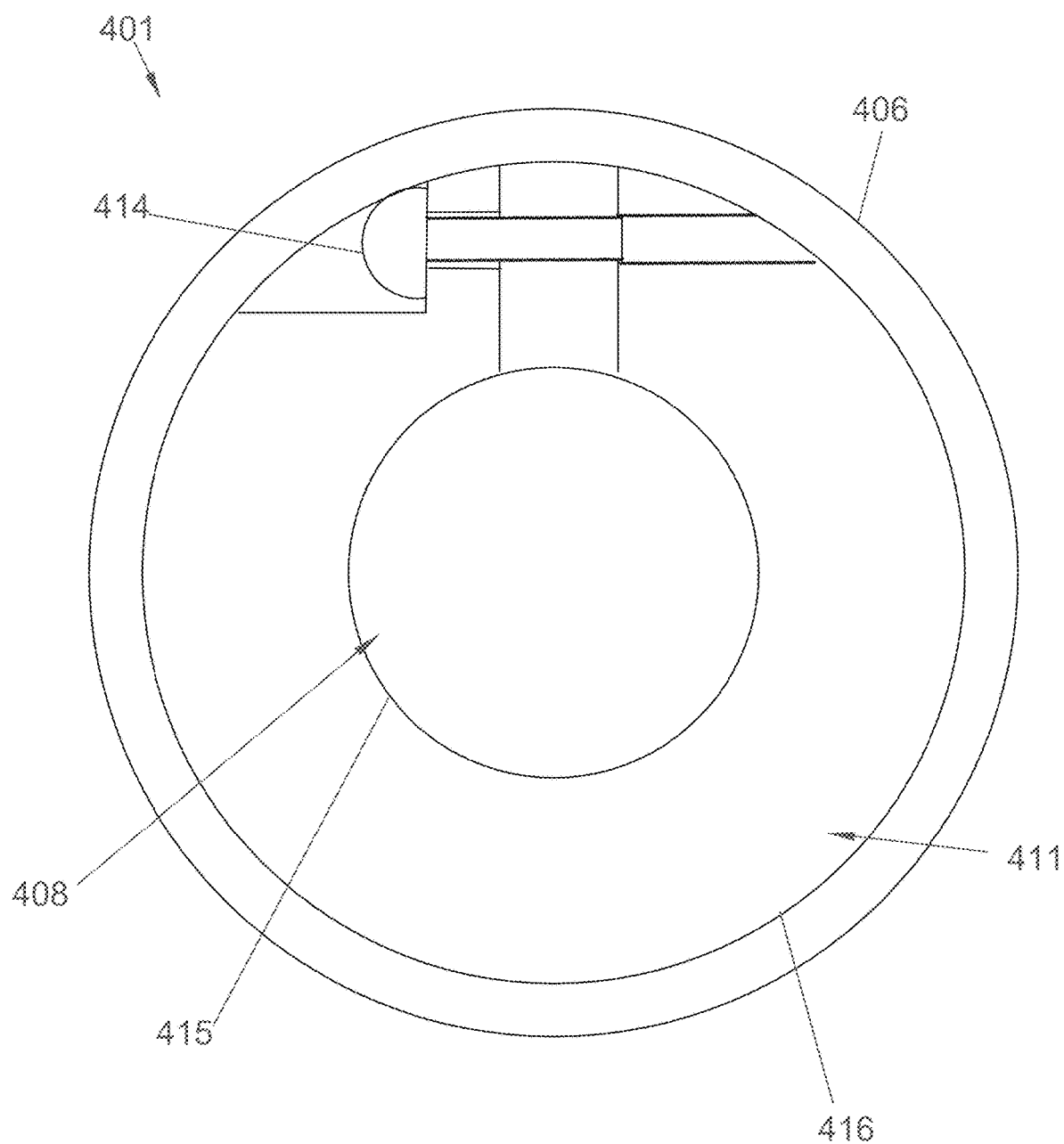
FIG. 84 is an embodiment of a clamp type constraining mechanism.

FIG. 84 shows a radial section view of an embodiment of variable force generator 401 wherein constraining mechanism 414 is a screw or cam that causes second spring 411 to clamp, or friction lock, with first spring bracket 408. When constraining mechanism 414 is in its first position, the screw or cam is loose and first spring 408 can freely pass in and out of second spring 411. When constraining mechanism 414 is in its second position, the screw or cam is tightened and first spring 408 is compressed within second spring 411. This feature couples first spring 408 to second spring 411 allowing the stiffness of second spring 411 to be transferred between first element 406 and second element 407.

It can be appreciated by one skilled in the art that all of the embodiments of constraining mechanism 414 presented herein can be applied to other spring arrangements described later in this text to constrain any combination of first spring 408, second spring 411, first element 406, or second element 407

In the embodiment shown in FIG. 74 through FIG. 77, first spring bracket 415 has a profile that when first spring bracket 415 is not constrained to second spring bracket 416, the first spring bracket 415 profile moves constraining mechanism 414 out of the way of first spring bracket 415 (i.e., into first position), allowing first spring bracket 415 to reach the transition position. In the first embodiment, first spring bracket 415 has a chamfered profile but it can be appreciated that other profiles are possible to reach similar results.

In some embodiments constraining mechanism 414 is made of a magnetic material.

In the embodiment shown in FIG. 74 through FIG. 77, variable force generator 401 further comprises at least one first magnet 422 coupled to first spring 408 that attracts constraining mechanism 414 into its second position when first spring 408 and second spring 411 are properly aligned with first element 406. When first magnet 422 attracts constraining mechanism 414, it thereby axially and/or rotationally couples first spring 408 to second spring 411.

In the embodiment shown in FIG. 74 through FIG. 77, variable force generator 401 further comprises at least one second magnet 423 coupled to first element 406 that attracts constraining mechanism 414 into its first position when first spring 408 and second spring 411 are properly aligned to first element 406. When second magnet 423 attracts constraining mechanism 414, it thereby decouples first spring 408 from second spring 411.

In some embodiments, the influence of second magnet 423 on constraining mechanism 414 is stronger than the influence of first magnet 422 on constraining mechanism 414. When first spring 408 and second spring 411 are properly positioned relative to first element 406, constraining mechanism 414 will automatically enter a first position.

In the embodiment shown in FIG. 74 through FIG. 77, variable force generator 401 further comprises switch 420 coupled to at least one second magnet 423 and translationally coupled to first element 406. In another embodiment (not shown), switch 420 may be rotatably coupled for first element 406. Switch 420 can be moved relative to first element 406 between a first position wherein the second magnet 423 does attract the constraining mechanism 414 to a second position wherein the second magnet 423 does not attract the constraining mechanism 414.

FIG. 74 shows variable force generator 401 at the transition position wherein switch 420 is in its second position. Second magnet 423 does not have influence on constraining mechanism 414; thus, first magnet 422 attracts constraining mechanism 414 to its second position and causes it to couple first spring 408 to second spring 411. Switch 420 can be moved to its second position for any position of first spring 408 and second spring 411, and when first spring 408 and second spring 411 return to the transition position, constraining mechanism 414 will move it its second position.

Figure 75:
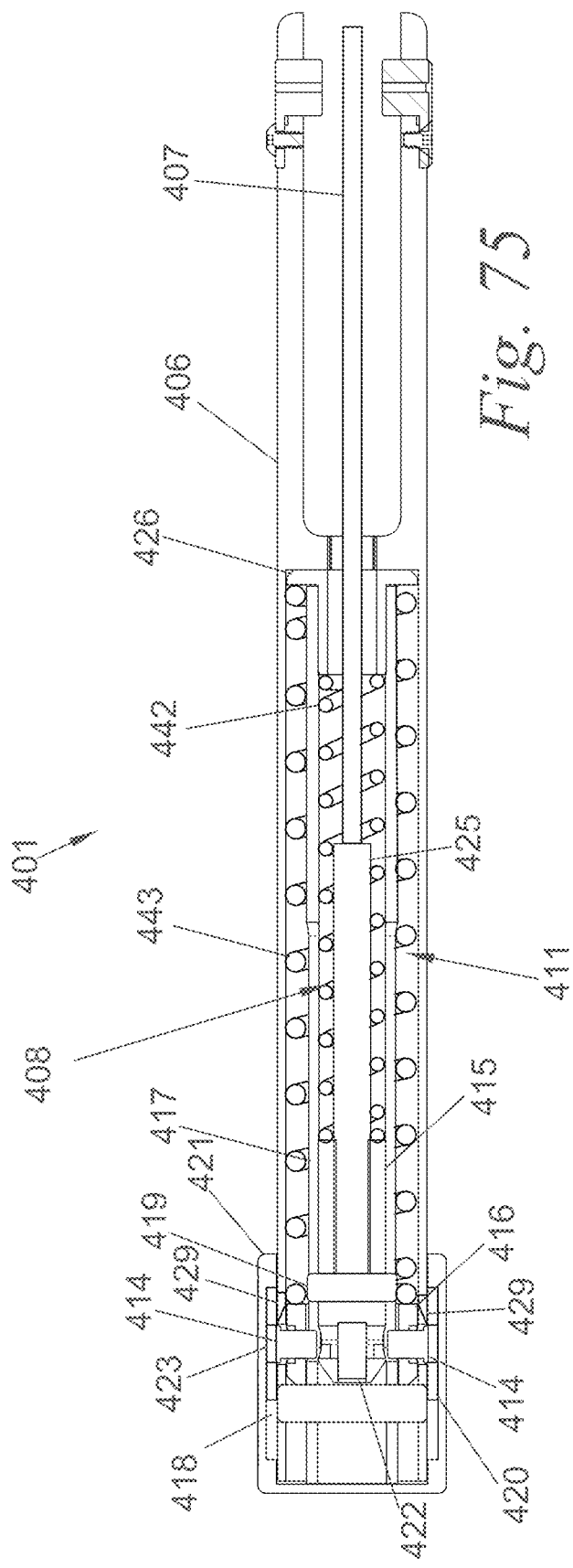
FIG. 75 is a detailed section view of a variable force generator at a transition position with constraining mechanism in a first position.

FIG. 75 shows variable force generator 401 at the transition position wherein switch 420 is in its first position. Second magnet 423 attracts constraining mechanism 414 to its first position and causes it to decouple first spring 408 from second spring 411. Switch 420 can be moved to its first position for any position of first spring 408 and second spring 411, and when first spring 408 and second spring 411 return to the transition position, constraining mechanism 414 will move it its first position. In some embodiments first element 406 further comprises cover 421 for switch 420.

Figure 85:
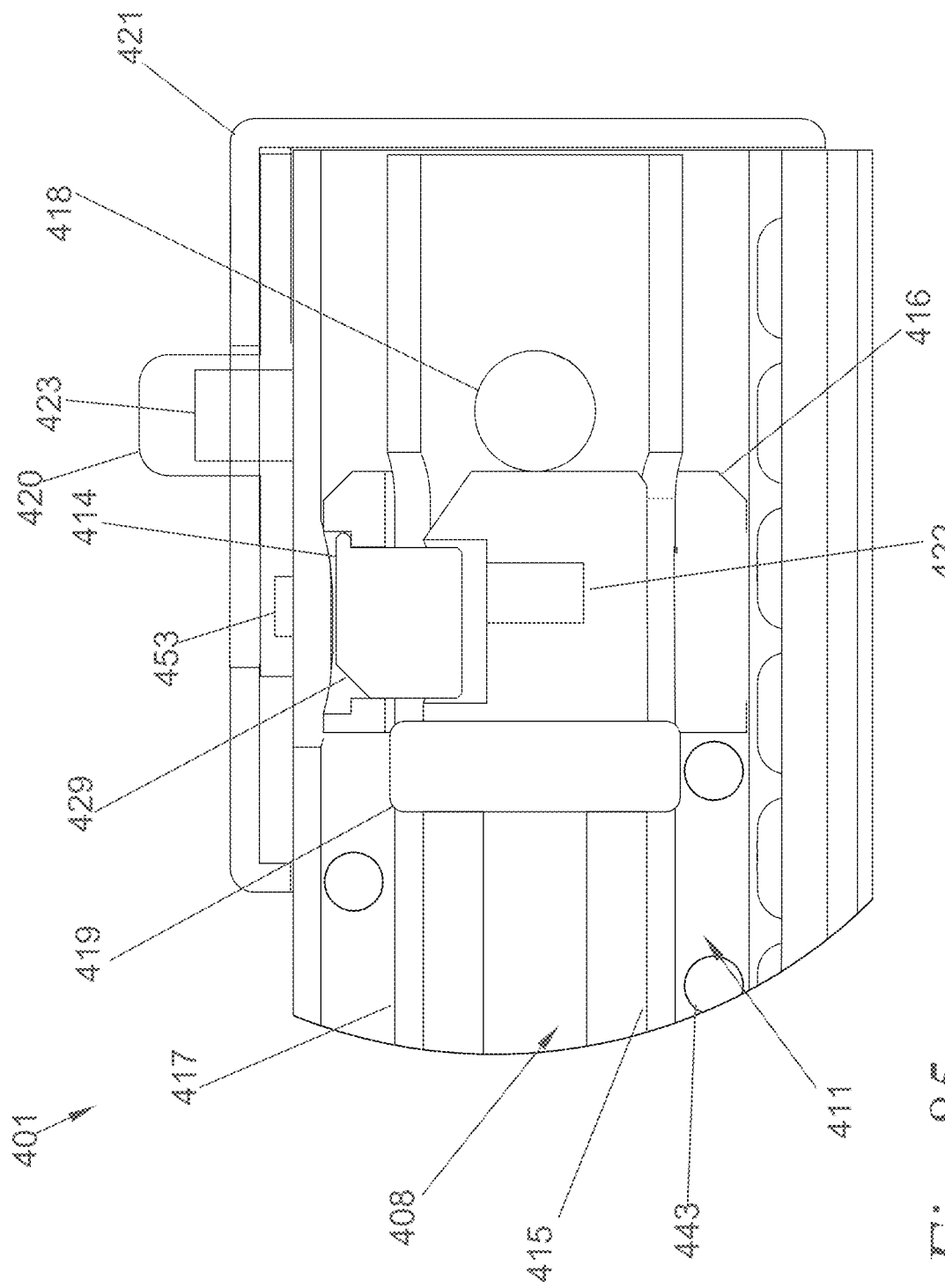
FIG. 85 is a close up section view of an embodiment of a constraining mechanism and switch.

FIG. 85 shows another embodiment of variable force generator 401 wherein switch 420 further comprises a holding magnet 453. The influence of holding magnet 453 on constraining mechanism 414 is weaker than the influence of first magnet 422 on constraining mechanism 414. Thus, when both the holding magnet 453 and first magnet 422 are exposed to constraining mechanism 414, constraining mechanism 414 will transition to a second position. Holding magnet 453 is exposed to constraining mechanism 414 when switch 420 is at a second position. Holding magnet 453 holds constraining mechanism 414 out of the way of first spring 408, allowing first spring 408 to reach a transition position. Thus when first spring 408 reaches the transition position, constraining mechanism 414 will automatically move to its second position.

Figure 86:
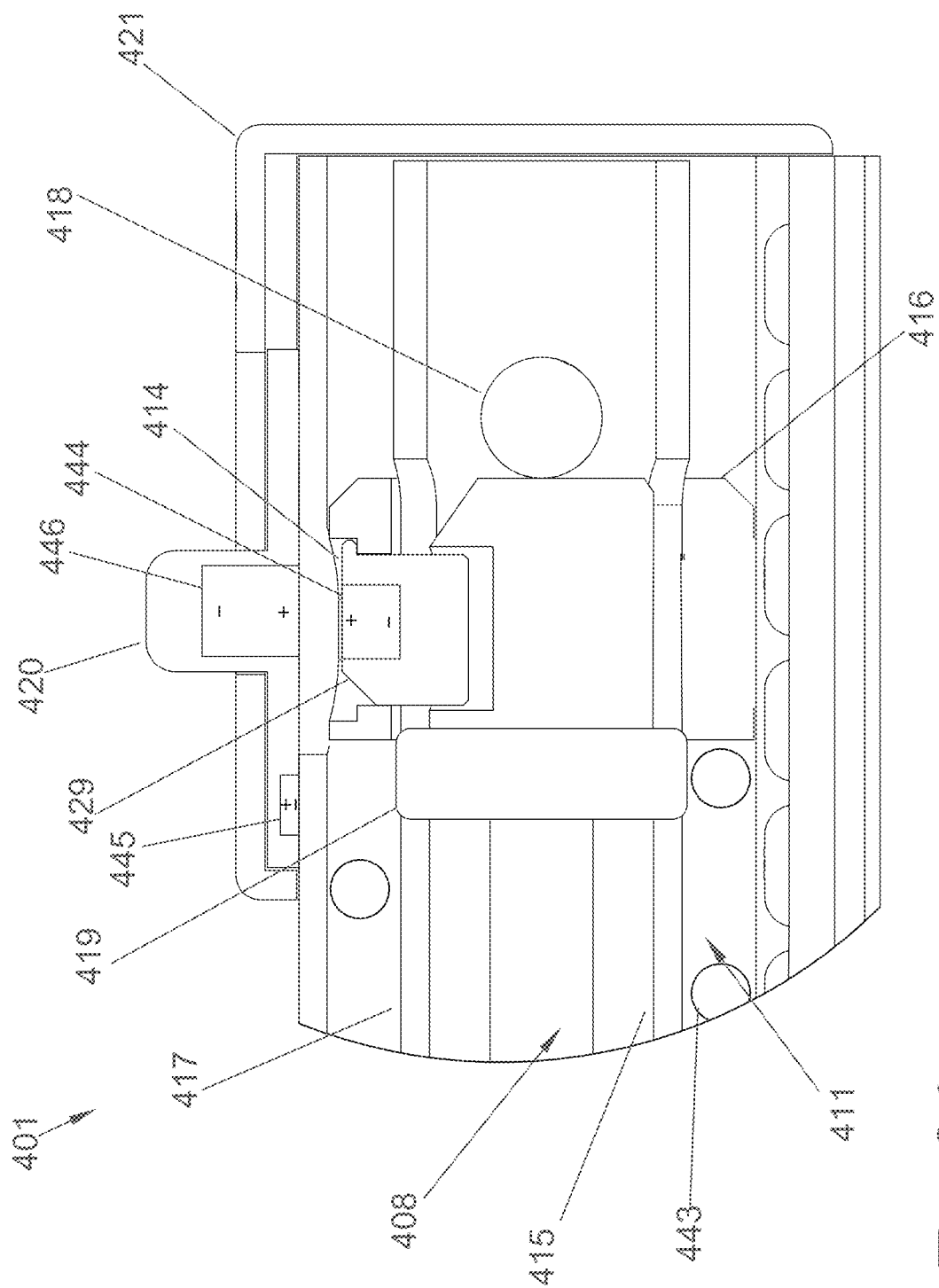
FIG. 86 is a close up section view of an alternate embodiment of a constraining mechanism and switch.

FIG. 86 shows an embodiment wherein constraining mechanism 414 houses a third magnet 444 and wherein switch 420 comprises fourth magnet 445 and fifth magnet 446. Fourth magnet 445 is configured to attract third magnet 444 housed in constraining mechanism 414. When switch 420 is positioned so that fourth magnet 445 attracts third magnet 444, constraining mechanism 414 moves to a first position wherein first 408 is decoupled from second spring 411. Fifth magnet 446 is configured to repel third magnet 444 housed in constraining mechanism 414. When switch 420 is positioned so that fifth magnet 446 repels third magnet 444, constraining mechanism 414 moves to a second position wherein first spring 408 is coupled to second spring 411.

It can be appreciated by one skilled in the art that for any of the embodiments herein, the movement of constraining mechanism 414 relative to first spring 408 or second spring 411 may be similarly biased by a spring to cause constraining mechanism 414 to move to a first position or a second position.

Figure 87:
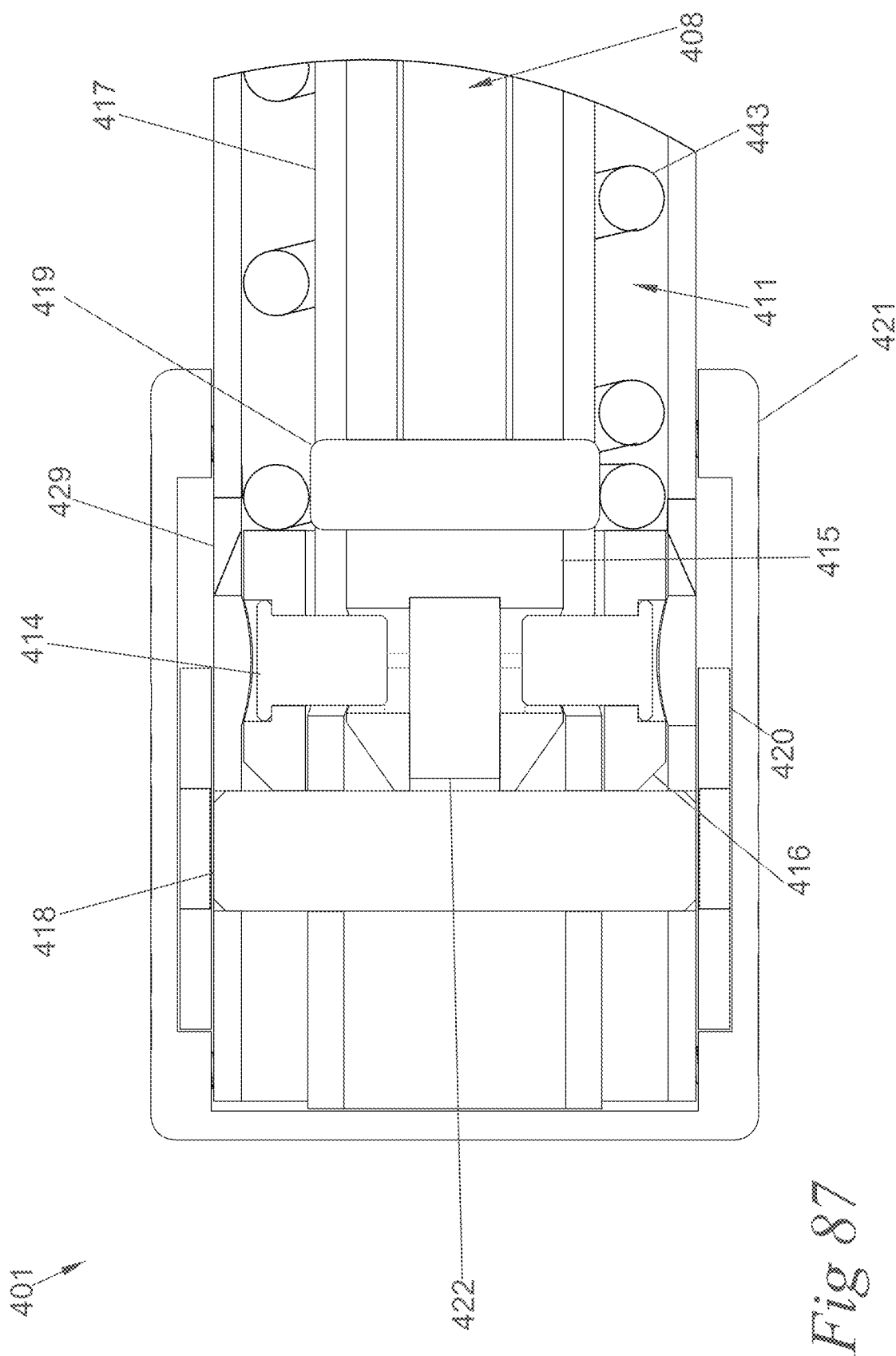
FIG. 87 is a close up section view of an embodiment of a constraining mechanism and wedge element.

FIG. 87 shows an embodiment of variable force generator 401 further comprising wedge element 429. Wedge element 429 forces constraining mechanism 414 into a second position in the event that constraining mechanism 414 is caught between first and second position and is therefore coupling first element 406 to second element 407. This prevents variable force generator 401 from locking first element 406 to second element 407.

Figure 88:
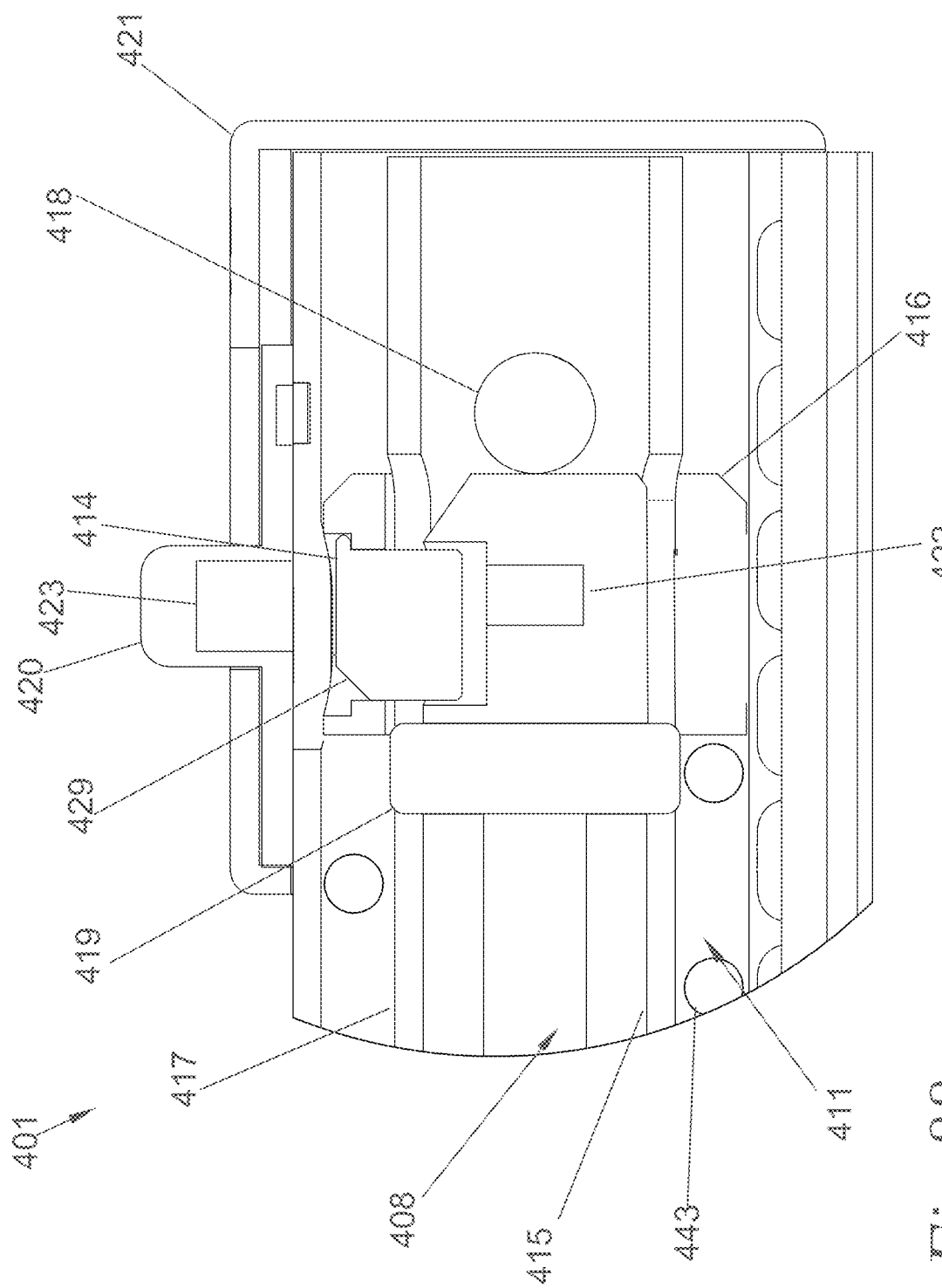
FIG. 88 is a close up section view of an alternate embodiment of a constraining mechanism and wedge element.

FIG. 88 shows an embodiment of variable force generator 401 wherein wedge element 429 is a contoured surface of constraining mechanism 414.

Figure 89:
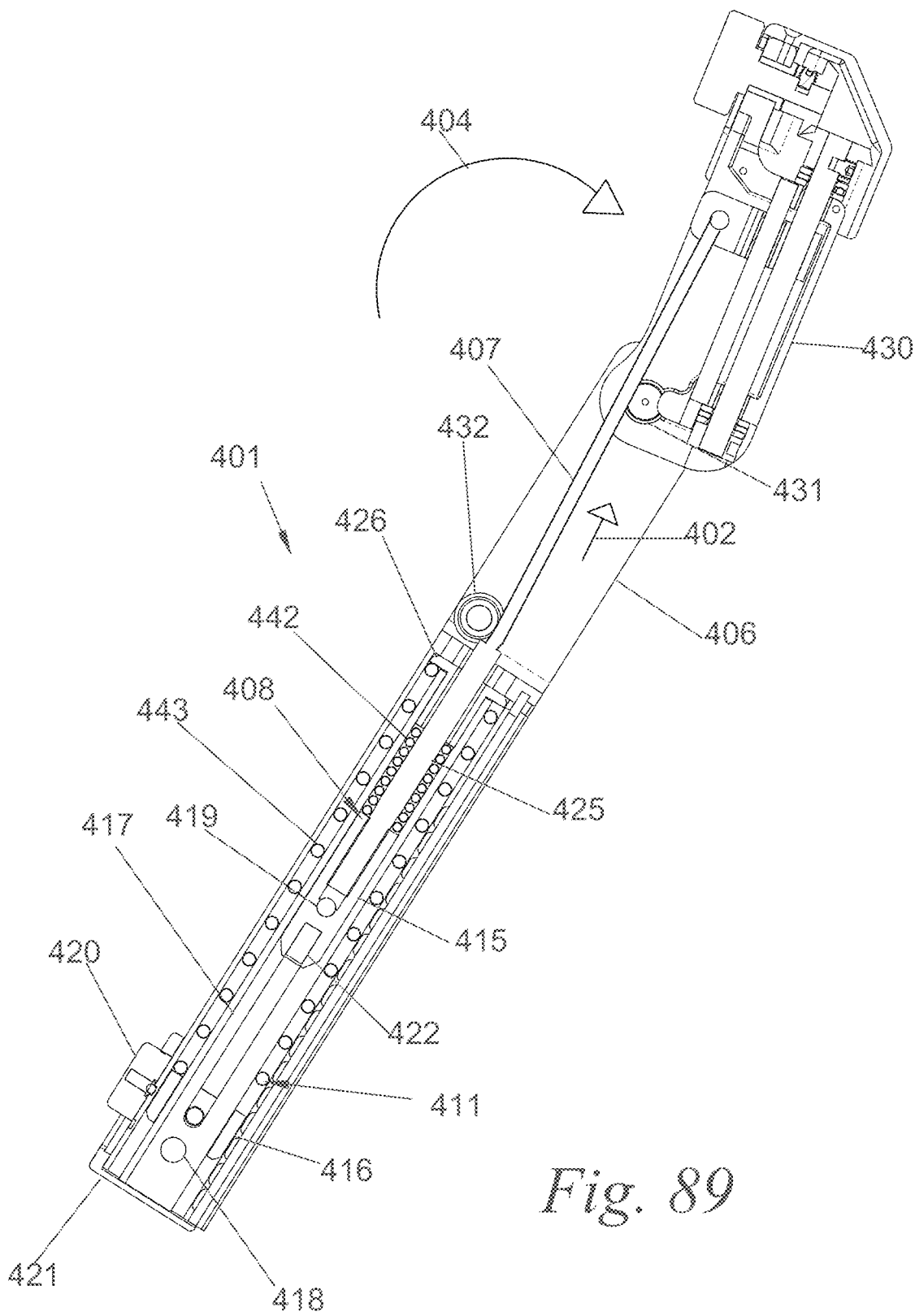
FIG. 89 is a section view of a variable force generator configured to create a first torque.

FIG. 89 depicts an axial section view of variable force generator 401 configured to create a torque about first rotational joint 431. First rotational joint 431 is formed between first element 406 and rotational base link 430. In the embodiment, variable force generator 401 further comprises pulley 432 attached to first element 406 that routes flexible second element 407 to a rotational coupling with rotational base link 430. In the embodiment shown, constraining mechanism 414 is in a first position wherein first spring 408 is decoupled from second spring 411. First force 402 is created between first element 406 and second element 407 and thus first torque 404 is created between first element 406 and rotational base link 430 about first rotational joint 431.

Figure 76:
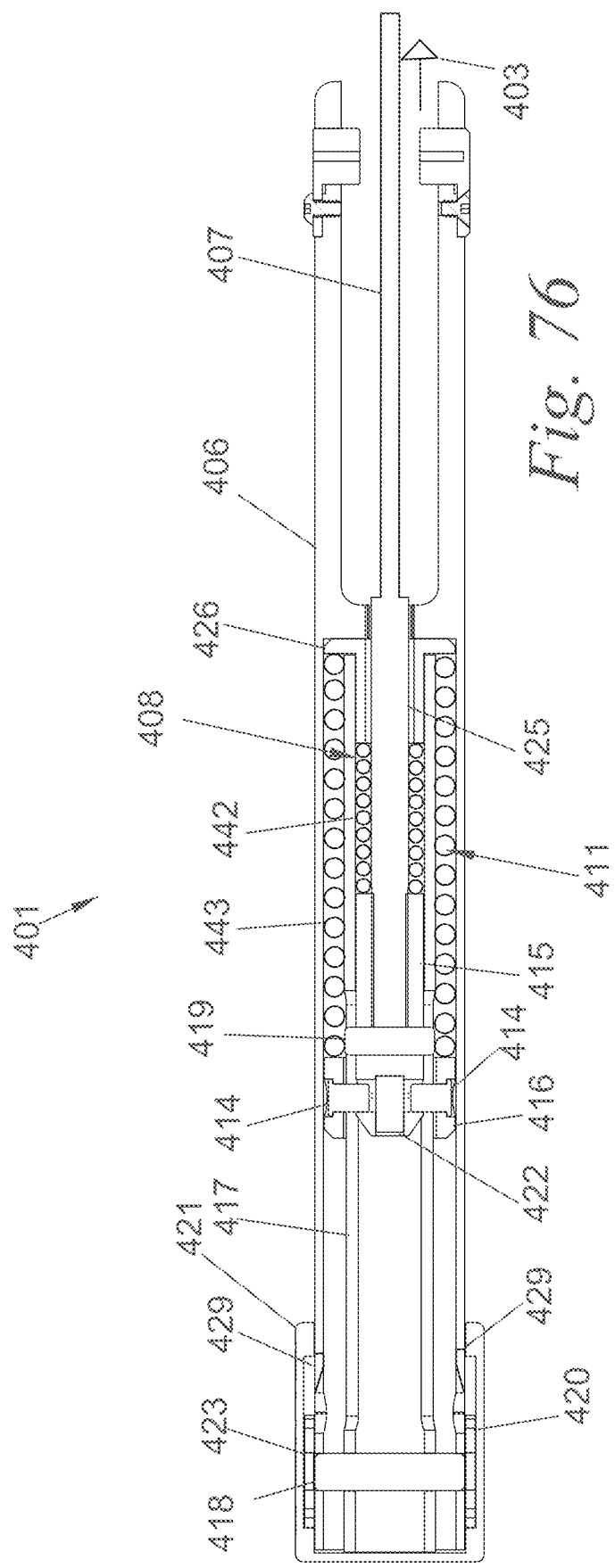
FIG. 76 is a detailed section view of a variable force generator creating a second tensile force.
Figure 77:
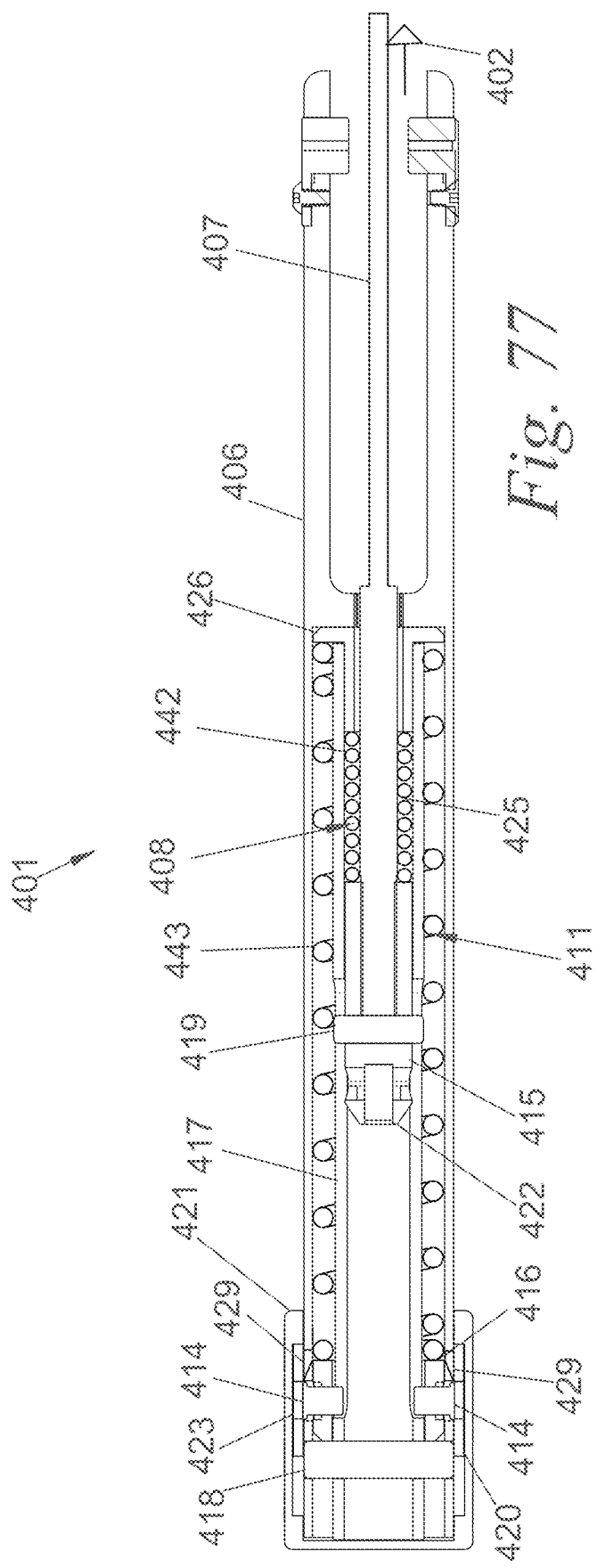
FIG. 77 is a detailed section view of a variable force generator creating a first tensile force.
Figure 90:
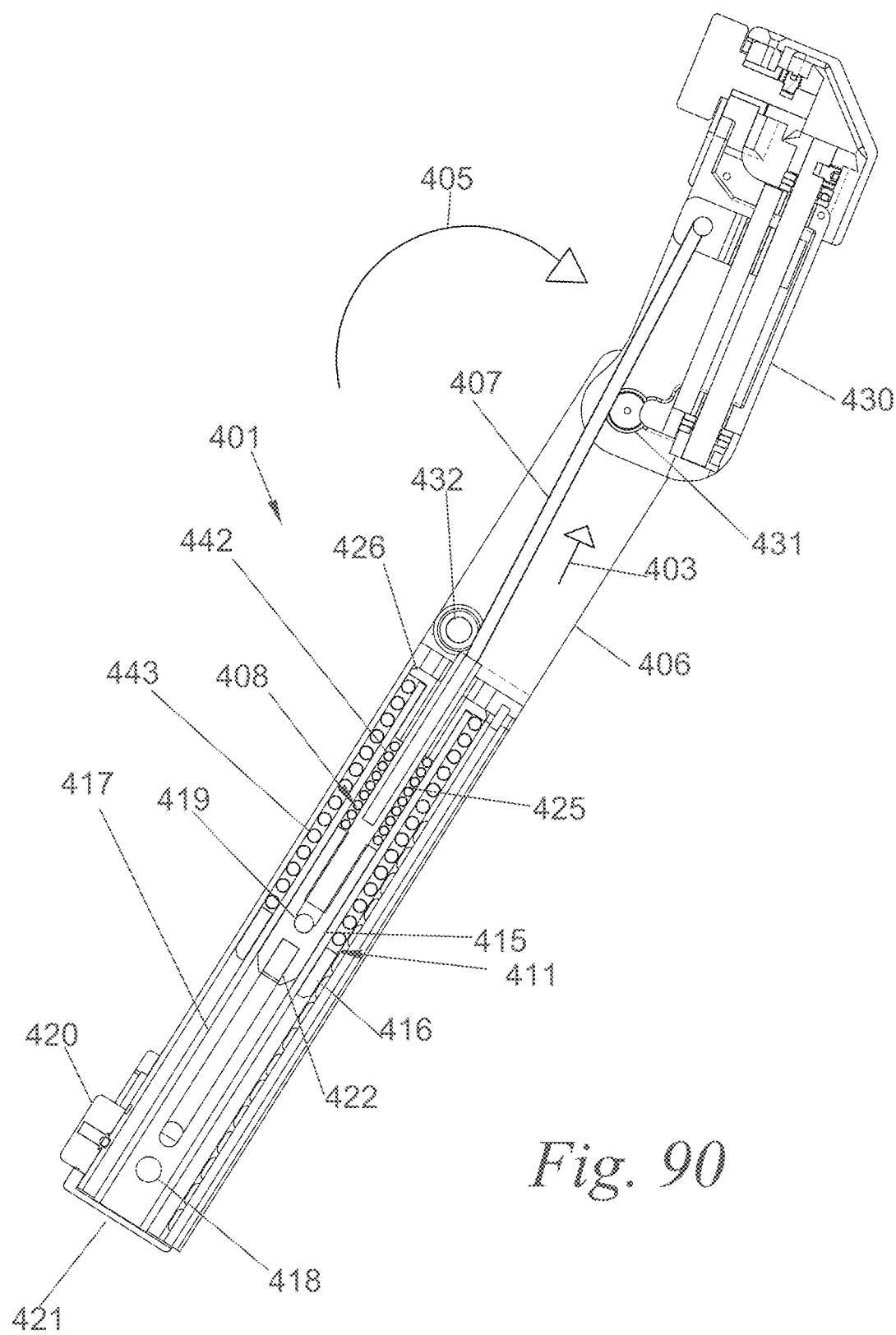
FIG. 90 is a section view of a variable force generator configured to create a second torque.

FIG. 90 depicts variable force generator 401 of FIG. 76 wherein constraining mechanism 414 is in its second position and wherein first spring 408 is coupled to second spring 411. A second force 403 is created between first element 406 and second element 407 and thus second torque 405 is created between first element 406 and rotational base link 430 about first rotational joint 431.

When the proper position (radially, axially, and/or rotationally) is achieved between first spring 408, second spring 411, and first element 406, a transition position is achieved wherein there are no forces acting on constraining mechanism 414. This allows constraining mechanism 414 to more easily transition variable force generator 401 between first force mode and second force mode.

FIG. 72, FIG. 73, FIG. 74, and FIG. 75 show variable force generator 401 in transition position wherein all forces acting on constraining mechanism 414 due to first spring 408 and or second spring 411 facilitate ease of motion of constraining mechanism 414. FIG. 73 and FIG. 74 show constraining mechanism 414 is in its second position. FIG. 72 and FIG. 75 show constraining mechanism 414 in its first position.

Figure 92:
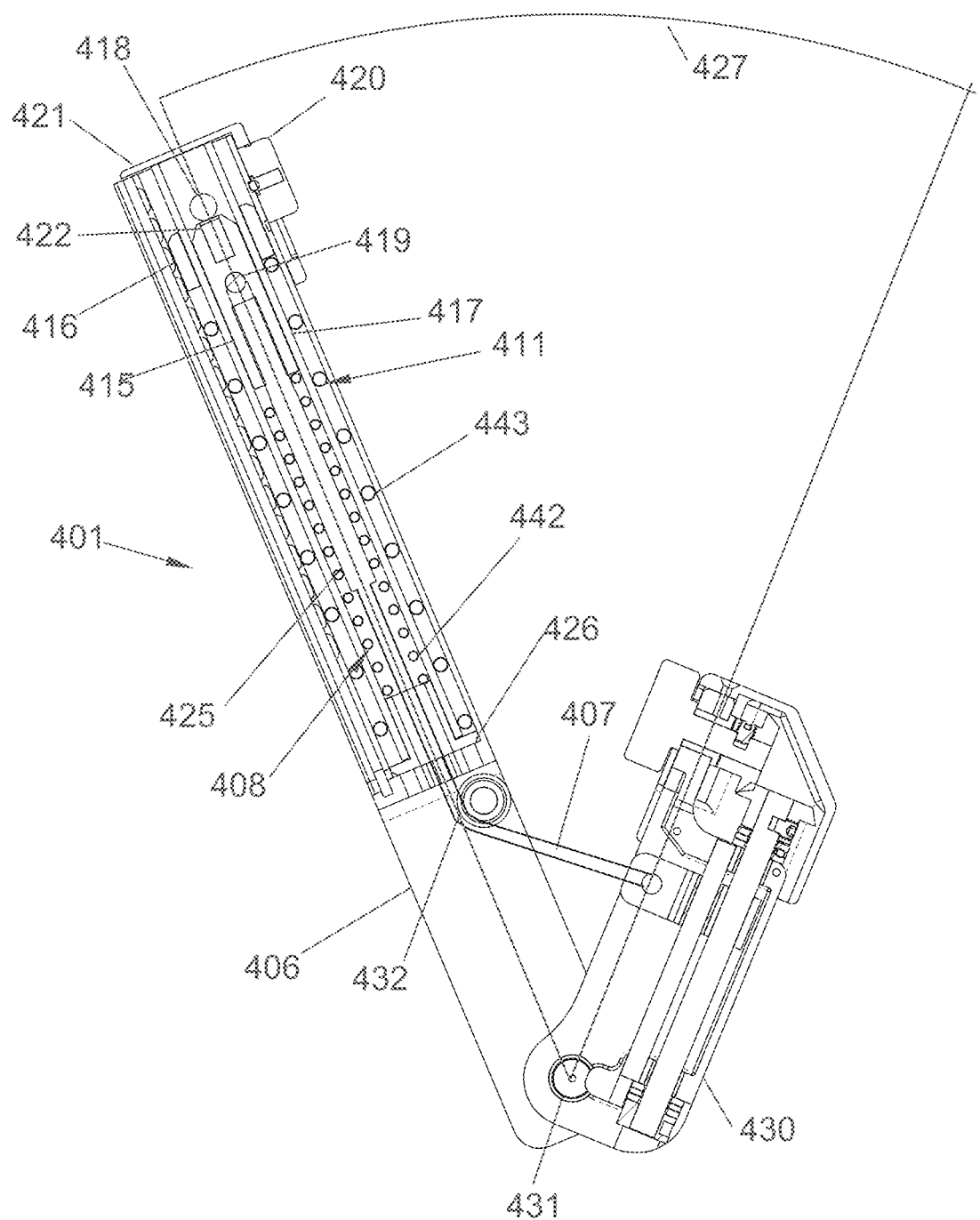
FIG. 92 is a section view of variable force generator configured to create a torque at a first transition angle.

FIG. 92 depicts variable force generator 401 of FIG. 89 and FIG. 90 at the transition position, resulting in transition angle 427 between first element 406 and rotational base link 430. When an angle of first element 406 relative to rotational base link 430 is smaller than first transition angle 427, flexible second element 407 goes slack and variable force generator 401 does not generate a force or torque about first rotational joint 431. When an angle of first element 406 relative to rotational base link 430 is larger than first transition angle 427, variable force generator 401, depending on the position of constraining mechanism 414, generates either first force 402 and thus first torque 404 or second force 403 and thus second torque 405.

Figure 93:
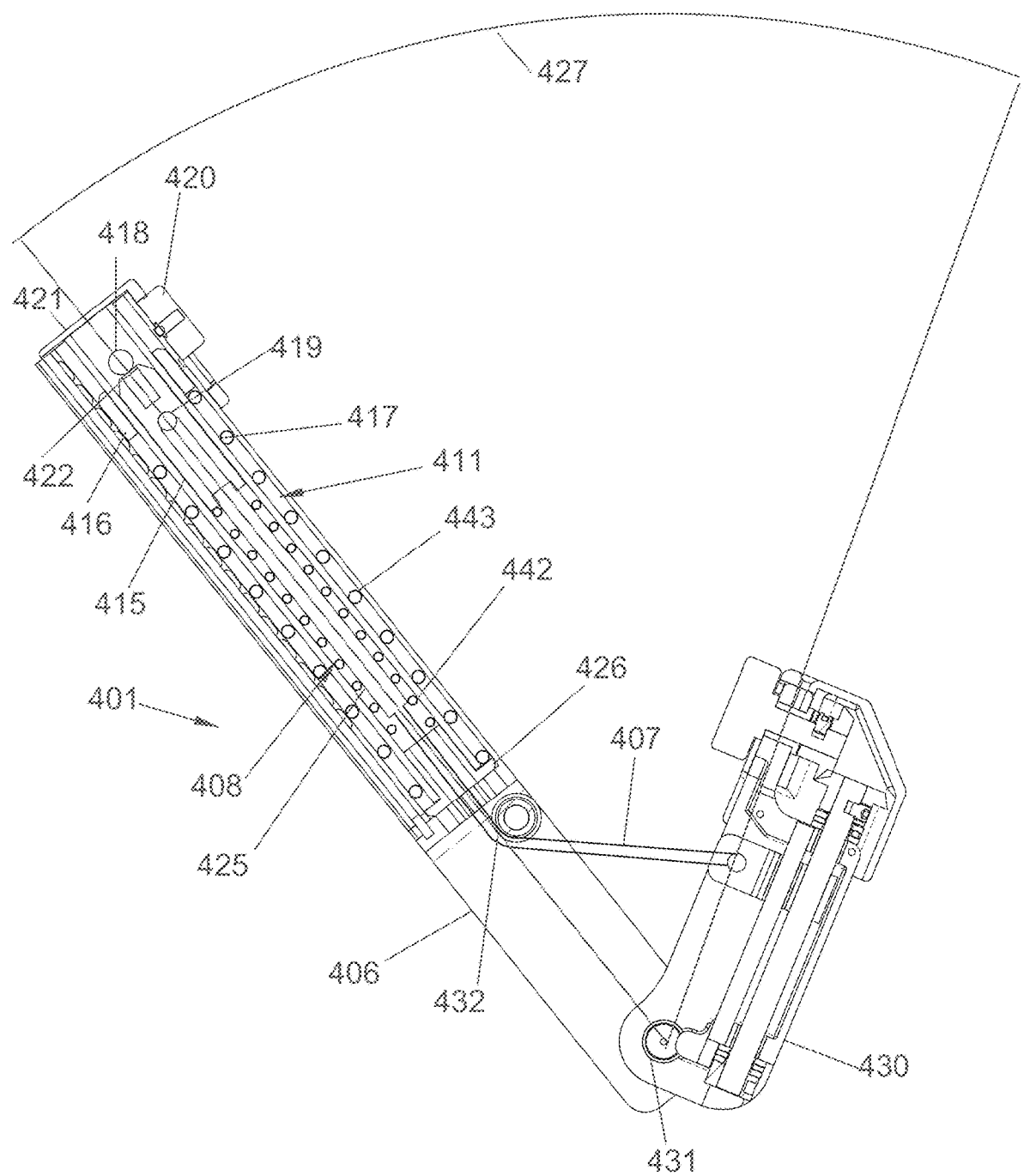
FIG. 93 is a section view of a variable force generator configured to create a torque at a second transition angle.

In some embodiments, it is possible to change the length of second element 407 by means of its coupling to first spring 408. In the embodiment of FIGS. 92 and 93, this is done by threaded end 425 on second element 407 meshing with a female thread on first spring bracket 415.

FIG. 93 depicts variable force generator 401 of FIG. 89 at the transition position. The length of second element 407 has been increased relative to FIG. 92 resulting in a larger transition angle 427. It can be appreciated by one skilled in the art that the length of second element 407 may be increased or decreased to increase or decrease the transition angle 427.

In other embodiments (not shown), second element 407 may have a similar screw connection with rotational base link 430 to achieve the same adjustment to transition angle 427. In still other embodiments, second element 407 may comprise the ability to change length, such as with a turnbuckle, without an adjustable connection to first spring 408 or rotational base link 430 to achieve the same adjustment to transition angle 427.

Figure 91:
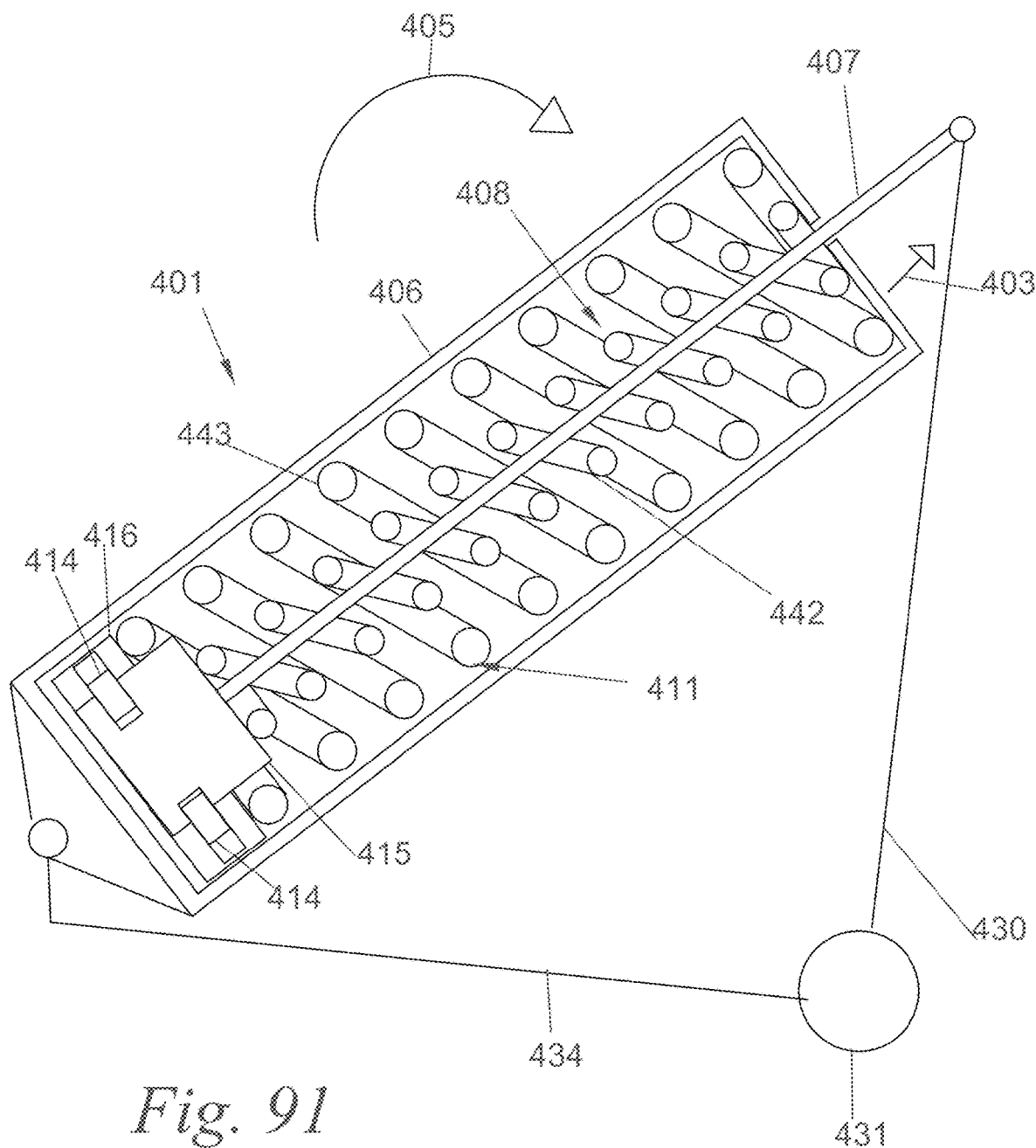
FIG. 91 is a section view of an alternate embodiment of a variable force generator configured to create a second torque.

FIG. 91 depicts an axial section view of an alternative embodiment of variable force generator 401 configured to create a torque about first rotational joint 431 formed between first rotating link 434 and rotational base link 430. First element 406 is rotatably and/or translationally coupled to first rotating link 434, and second element 407 is rotationally and/or translationally coupled to rotational base link 430. In the embodiment shown, constraining mechanism 414 is in its second position wherein first spring 408 is coupled to second spring 411. Second force 403 is created between first element 406 and second element 407 and thus second torque 405 is created between first element 406 and rotational base link 430 about first rotational joint 431.

In some embodiments, variable force generator 401 may be mounted to the shoulder base 102 of arm supporting exoskeleton 100 and transfer forces to the arm link mechanism 104 by means of control cables. This be done to move the mass of the arm supporting exoskeleton 100 as close to the torso as possible. The control cables may be situated as to not inhibit motion of the arm link mechanism 104 or shoulder base 102.

Figure 101:
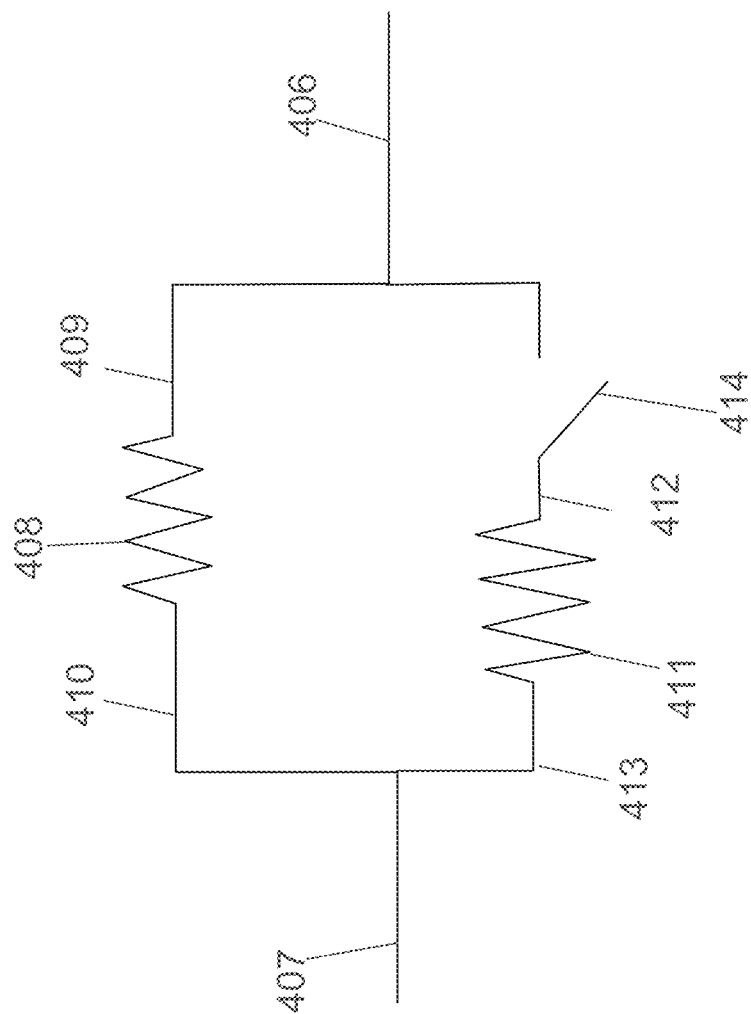
FIG. 101 is a schematic of an alternate embodiment of a variable force generator with extension springs.
Figure 102:
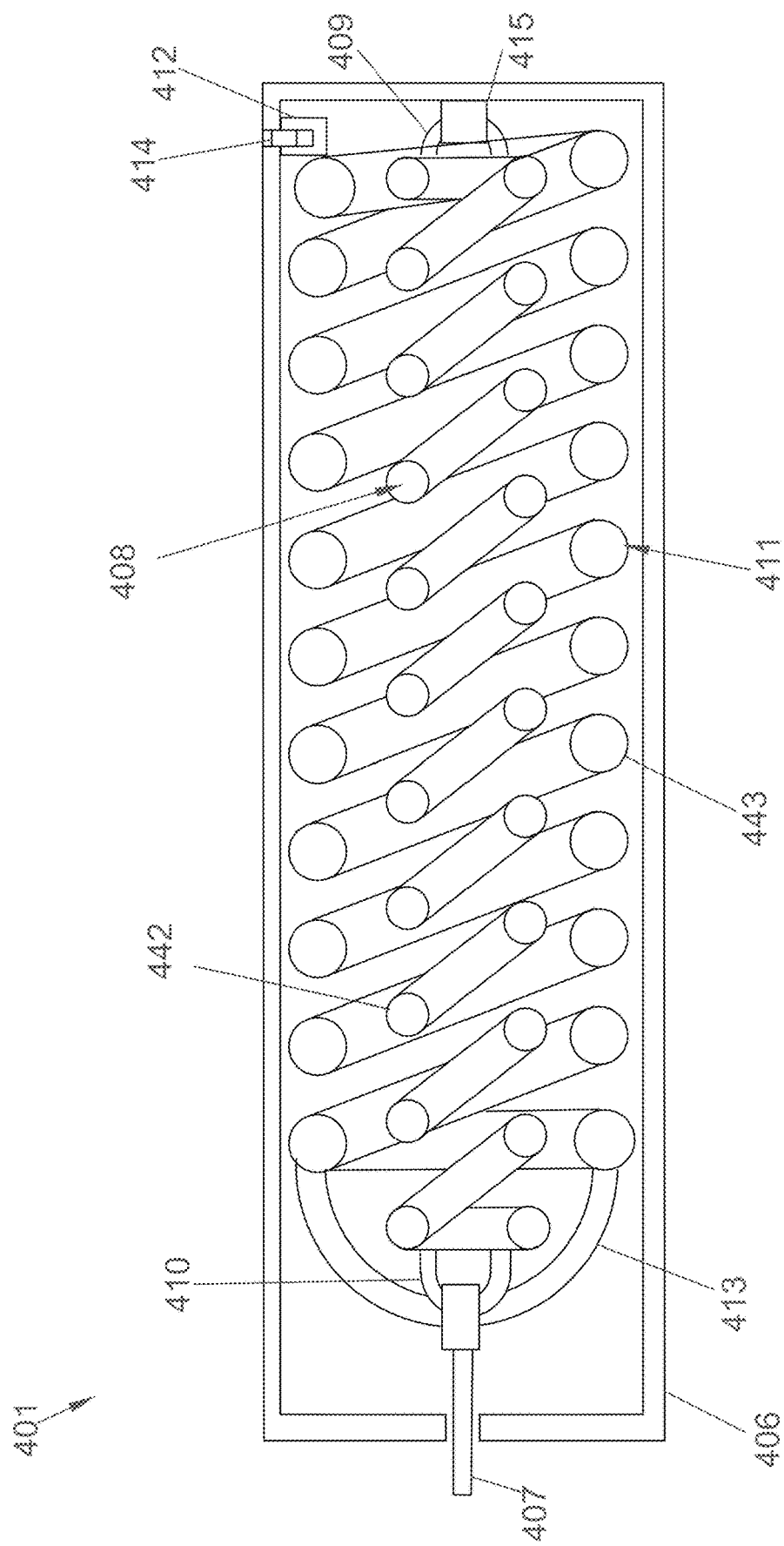
FIG. 102 is a section view of an alternate embodiment of a variable force generator with extension springs generating a second force.

FIG. 101 shows a schematic embodiment of variable force generator 401 designed to utilize extension springs rather than compression springs as previously shown. Variable force generator 401 is adaptable to exhibit two stiffness rates between first element 406 and second element 407. Variable force generator 401 comprises first spring 408 that has first end 409 and second end 410. First spring 408 is constrained by first element 406 from its first end 409 and by the second element 407 from its second end 410. Variable force generator 401 further comprises second spring 411 which has first end 412 and second end 413. Second spring 411 is constrained by second element 407 from its second end 413. Variable force generator 401 further comprises at least one constraining mechanism 414 which is configurable to have at least a first position and a second position. FIG. 102 shows a hardware embodiment of variable force generator 401.

Figure 103:
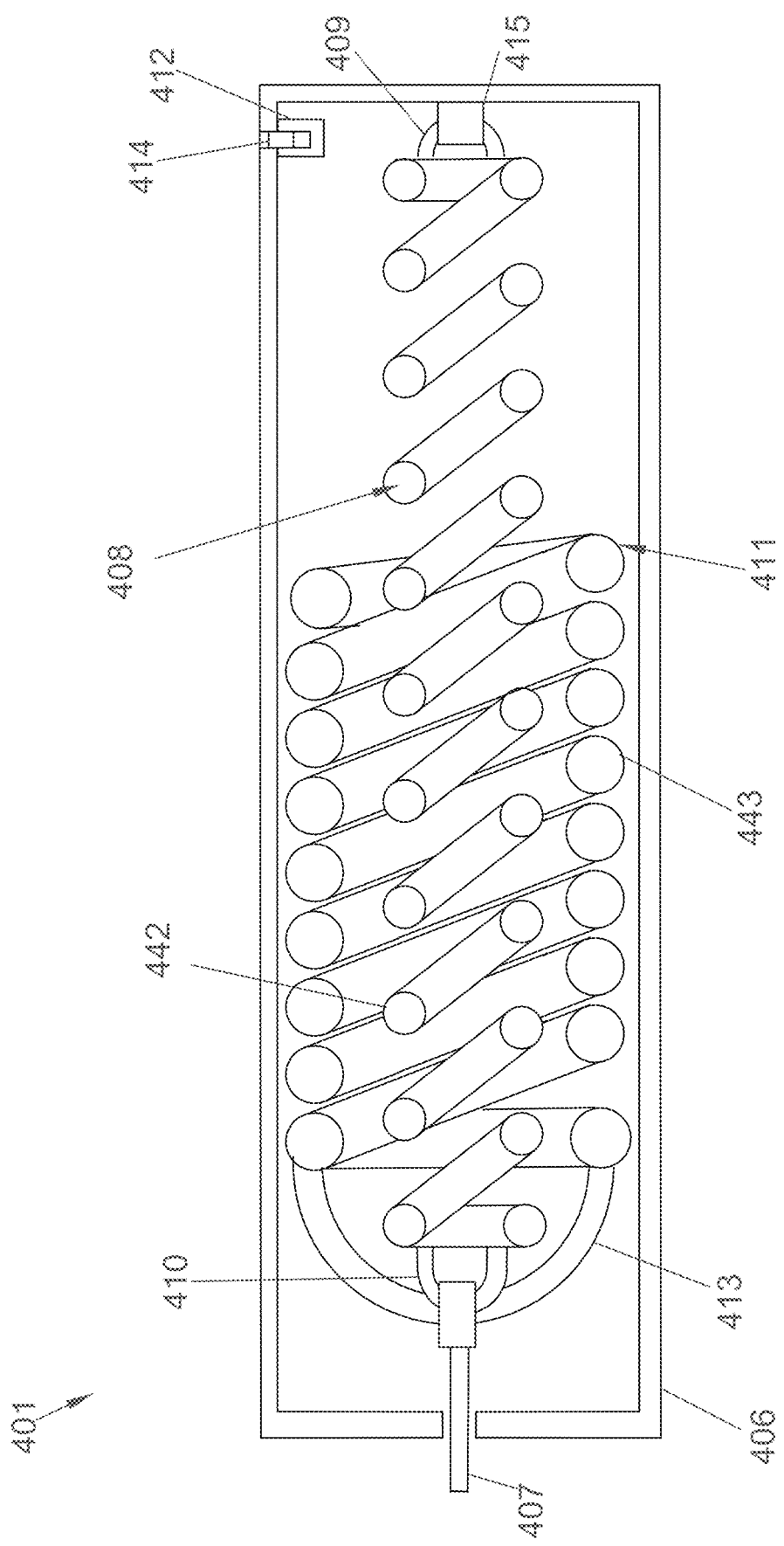
FIG. 103 is a section view of an alternate embodiment of a variable force generator with extension springs generating a first force.

In operation, when the constraining mechanism 414 is in its first position, as shown in FIG. 103, first end 412 of second spring 411 is not constrained by first element 406. This causes second spring 411 not to affect the motion between first element 406 and second element 407. In this first position, the equivalent stiffness is the stiffness of first spring 408.

When constraining mechanism 414 is in its second position as shown in FIG. 102, first end 412 of second spring 411 is constrained by first element 406. This causes the second spring 411 to act in parallel with first spring 408. In this second position, the equivalent stiffness is the addition of both the stiffness of first spring 408 and stiffness of second spring 411.

FIG. 102 and FIG. 103 depict a translational coupling arrangement of constraining mechanism 414 between second spring 411 and first element 406 similar in function to the embodiment of FIG. 68, the only difference being between the two components constrained by constraining mechanism 414.

Figure 104:
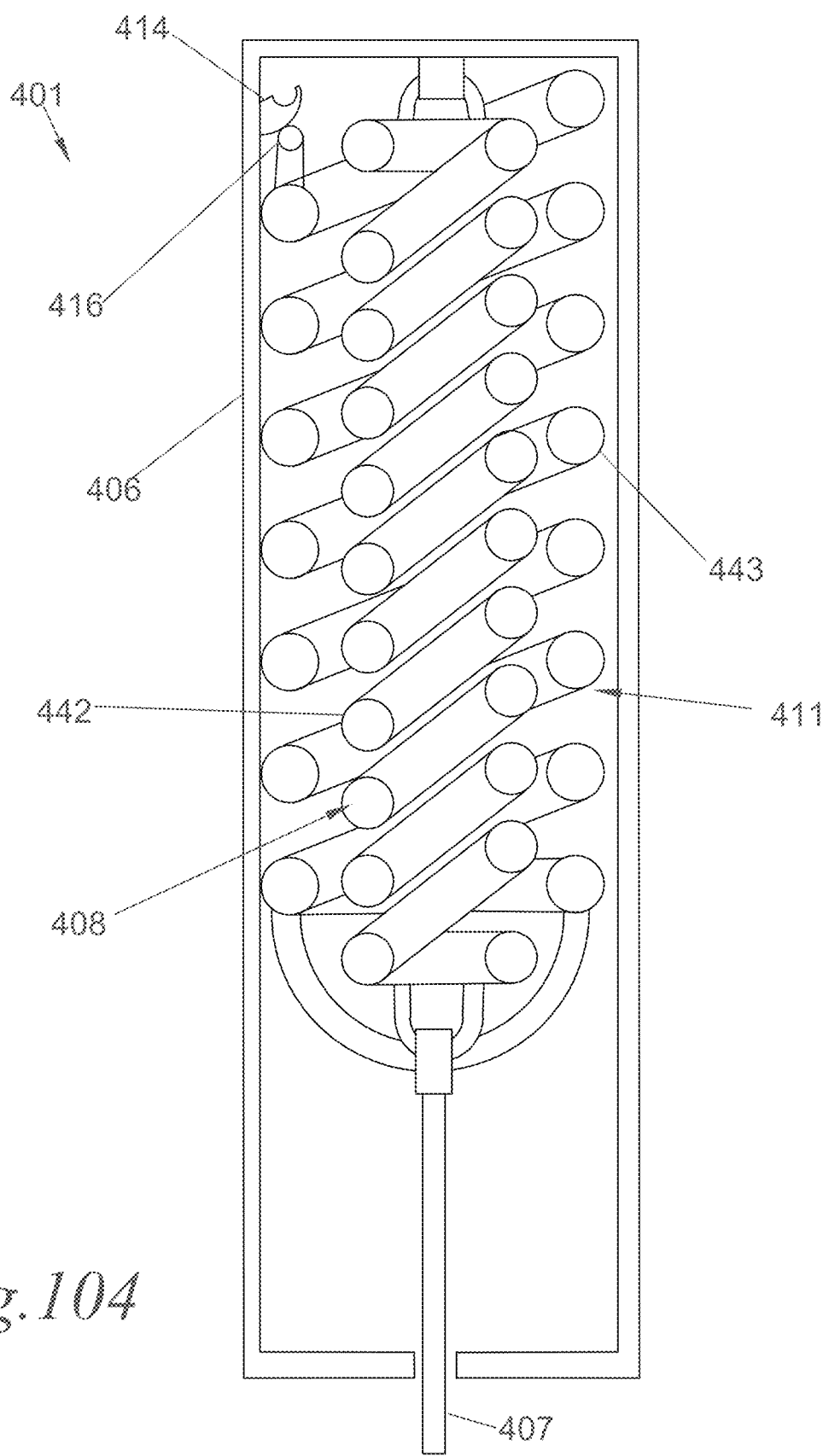
FIG. 104 is a section view of an alternate embodiment of a variable force generator with extension springs with a hook type constraining mechanism.

FIG. 104 depicts a pin and hook arrangement of constraining mechanism 414 between second spring 411 and first element 406 similar in form to the embodiment of FIG. 81, the only difference being between the two components constrained by constraining mechanism 414.

Figure 105:
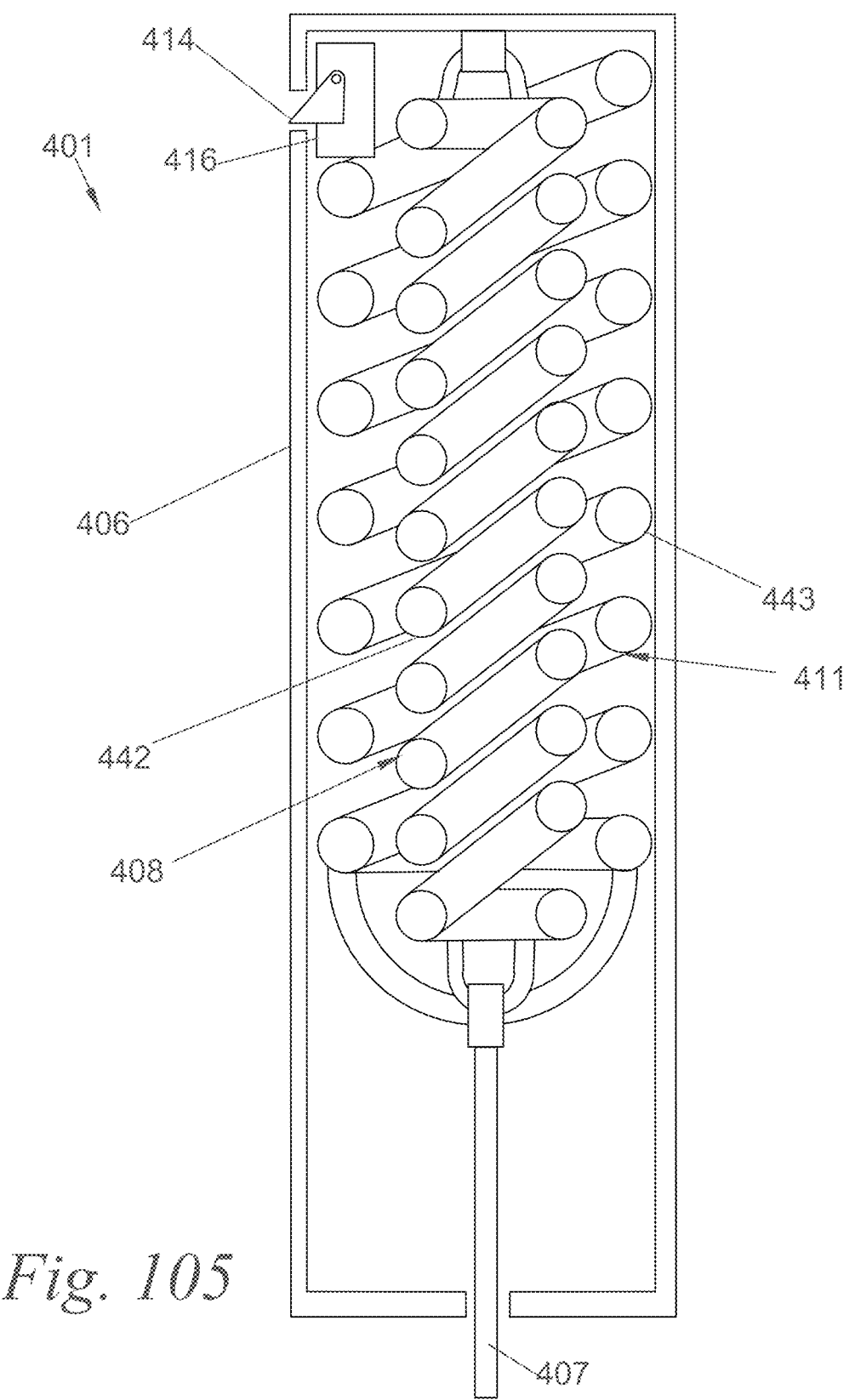
FIG. 105 is a section view of an alternate embodiment of a variable force generator with extension springs with a rotating type constraining mechanism.

FIG. 105 depicts a rotatable coupling arrangement of constraining mechanism 414 between second spring 411 and first element 406 similar in form to the embodiment of FIG. 80, the only difference being between the two components constrained by constraining mechanism 414.

It can be appreciated by one skilled in the art that all of the embodiments of constraining mechanism 414 presented herein can be applied to other spring arrangements described later in this text to constrain any combination of first spring 408, second spring 411, first element 406, or second element 407.

Figure 106:
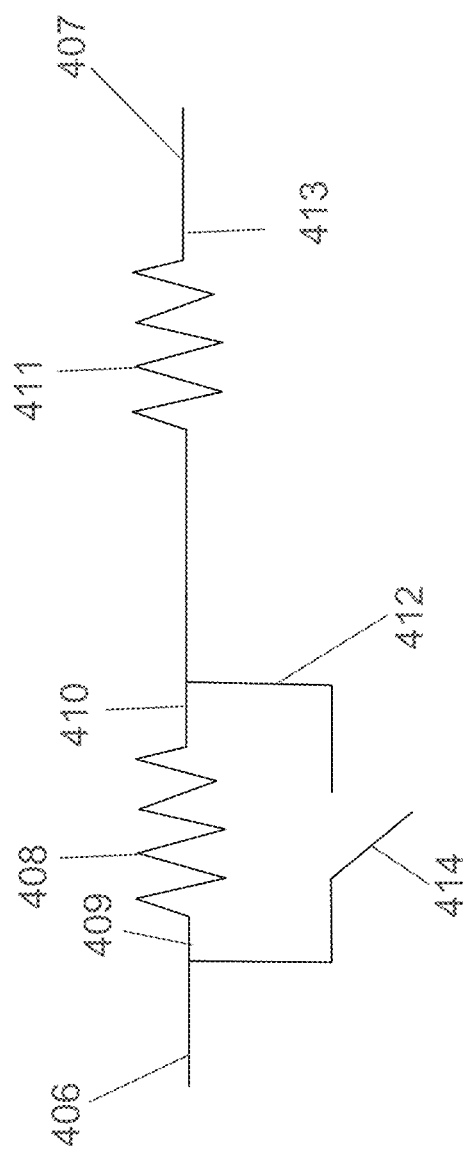
FIG. 106 is a schematic of a first alternate embodiment of a variable force generator with series springs.
Figure 107:
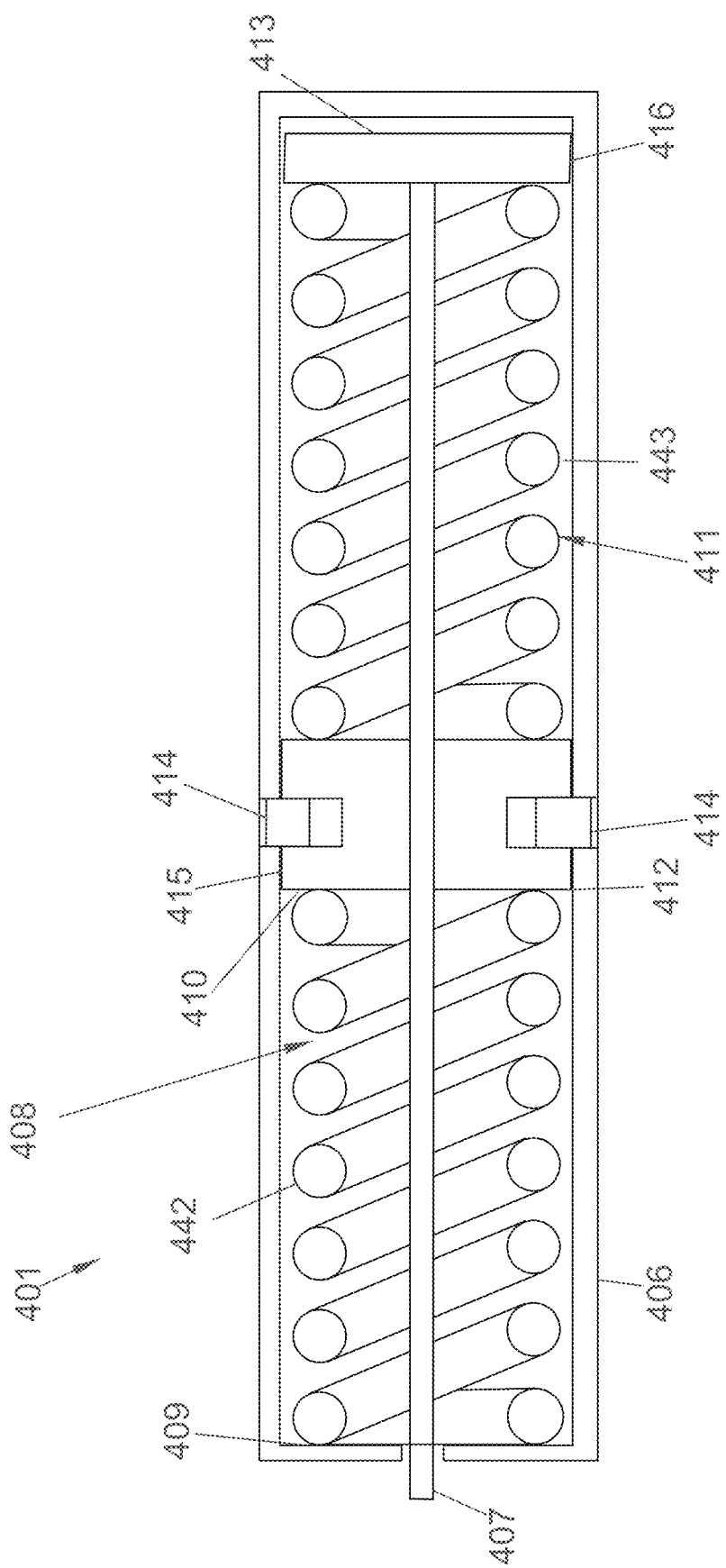
FIG. 107 is a section view of a first alternate embodiment of a variable force generator with series.

FIG. 106 shows a schematic embodiment of variable force generator 401 utilizing first spring 408 and second spring 411 in series. Variable force generator 401 is adaptable to exhibit two stiffness rates between first element 406 and second element 407. Variable force generator 401 comprises first spring 408 that has first end 409 and second end 410. First spring 408 is constrained by first element 406 from its first end 409 and by the second spring 411 from its second end 410. Variable force generator 401 further comprises second spring 411, which has first end 412 and second end 413. Second spring 411 is constrained by first spring 408 from its first end 412 and by second element 407 from its second end. Variable force generator 401 further comprises at least one constraining mechanism 414, which is configurable to have at least a first position and a second position. FIG. 107 shows a hardware embodiment of this embodiment of variable force generator 401.

In operation, when the constraining mechanism 414 is in its first position, first end 412 of second spring 411 is not constrained by first element 406. This causes second spring 411 to act in series with first spring 411. In this first position, the equivalent stiffness is the stiffness of first spring 408 and second spring 411 in series. In this first position, the equivalent deflection is the deflection of first spring 408 and second spring 411 in series. When constraining mechanism 414 is in its second position, first end 412 of second spring 411 is constrained by first element 406. This causes the second spring 411 to act alone. In this second position, the equivalent stiffness is the stiffness of second spring 411, and the equivalent deflection is the deflection of second spring 411. In the series combination shown, first spring 408 or second spring 411 may be compression or extension springs.

Figure 108:
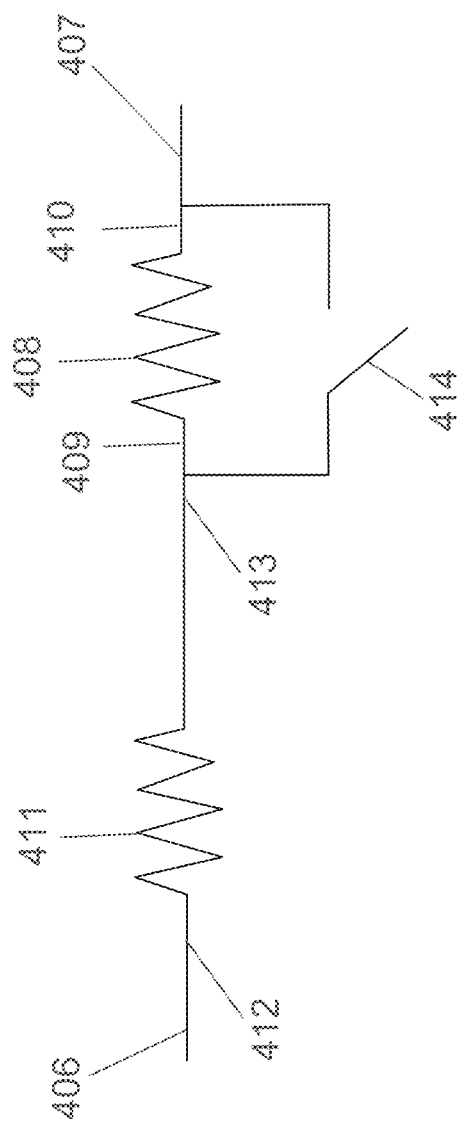
FIG. 108 is a schematic of a second alternate embodiment of a variable force generator with series springs.

FIG. 108 shows an alternative embodiment of variable force generator 401 with first spring 408 and second spring 411 in series. Variable force generator 401 is adaptable to exhibit two stiffness rates between first element 406 and second element 407. Variable force generator 401 comprises first spring 408 that has first end 409 and second end 410. First spring 408 is constrained by second spring 411 from its first end 409 and by the second element 407 from its second end 410. Variable force generator 401 further comprises second spring 411, which has first end 412 and second end 413. Second spring 411 is constrained by first element 406 from its first end 412 and by first spring 408 from its second end 413. Variable force generator 401 further comprises at least one constraining mechanism 414, which is configurable to have at least a first position and a second position.

In operation, when the constraining mechanism 414 is in its first position, second end 413 of second spring 411 is not constrained by second end 410 of first spring 408. This causes second spring 411 to act in series with first spring 408. In this first position, the equivalent stiffness is the stiffness of first spring 408 and second spring 411 in series. In this first position, the equivalent deflection is the deflection of first spring 408 and second spring 411 in series. When constraining mechanism 414 is in its second position, second end 413 of second spring 411 is constrained by second end 410 of first spring 408. This causes the second spring 411 to act alone. In this second position, the equivalent stiffness is the stiffness of second spring 411, and the equivalent deflection is the deflection of second spring 411.

Figure 109:
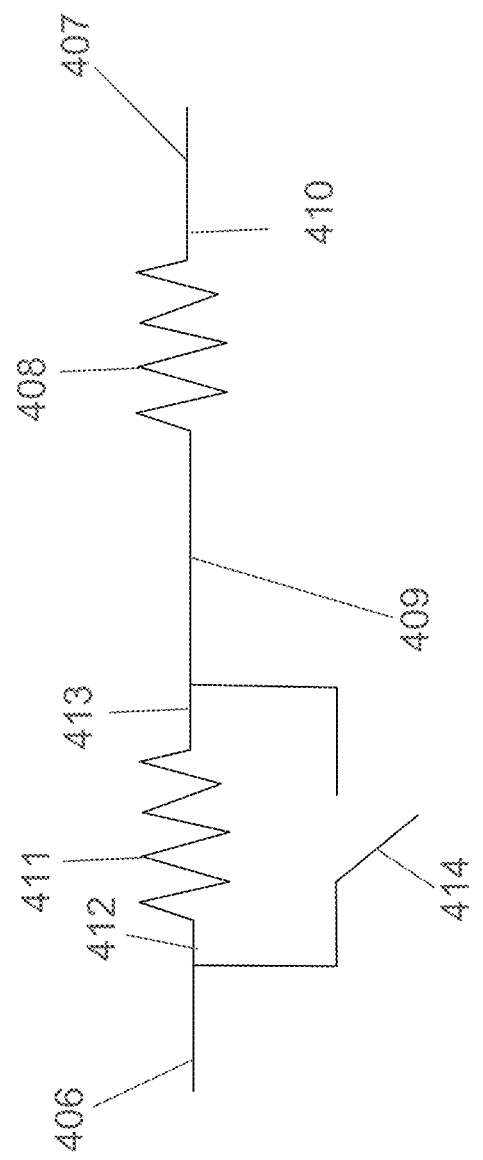
FIG. 109 is a schematic of a third alternate embodiment of a variable force generator with series springs.

FIG. 109 shows an alternative embodiment of variable force generator 401 with first spring 408 and second spring 411 in series. Variable force generator 401 is adaptable to exhibit two stiffness rates between first element 406 and second element 407. Variable force generator 401 comprises first spring 408 that has first end 409 and second end 410. First spring 408 is constrained by second spring 411 from its first end 409 and by the second element 407 from its second end 410. Variable force generator 401 further comprises second spring 411, which has first end 412 and second end 413. Second spring 411 is constrained by first element 406 from its first end 412 and by first spring 408 from its second end 413. Variable force generator 401 further comprises at least one constraining mechanism 414, which is configurable to have at least a first position and a second position.

In operation, when the constraining mechanism 414 is in its first position, second end 413 of second spring 411 is not constrained by first element 406. This causes second spring 411 to act in series with first spring 411. In this first position, the equivalent stiffness is the stiffness of first spring 408 and second spring 411 in series. In this first position, the equivalent deflection is the deflection of first spring 408 and second spring 411 in series. When constraining mechanism 414 is in its second position, second end 413 of second spring 411 is constrained by first element 406. This causes the first spring 408 to act alone. In this second position, the equivalent stiffness is the stiffness of first spring 408, and the equivalent deflection is the deflection of first spring 408.

Figure 110:
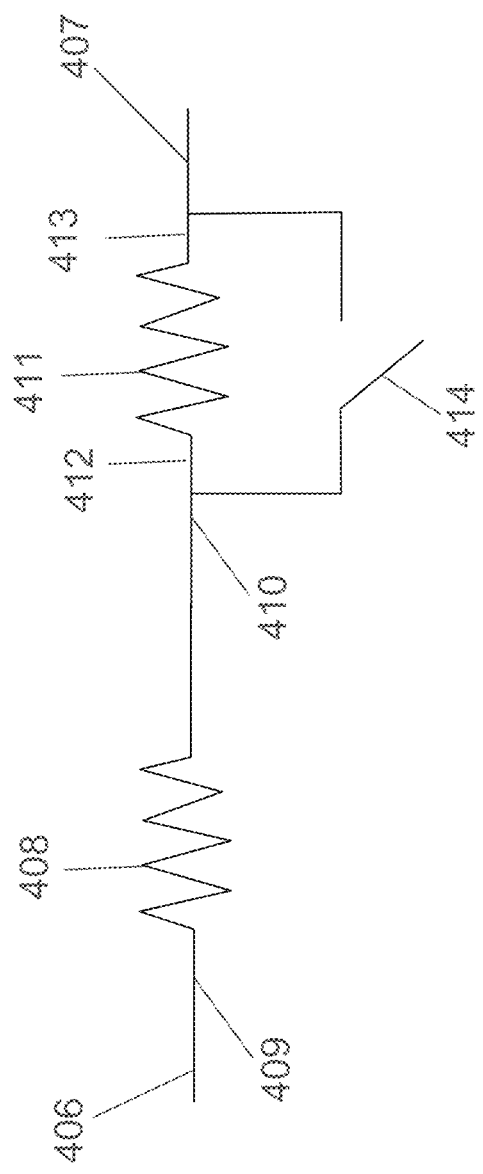
FIG. 110 is a schematic of a fourth alternate embodiment of a variable force generator with series springs.

FIG. 110 shows a schematic embodiment of a variable force generator 401 utilizing first spring 408 and second spring 411 in series. Variable force generator 401 is adaptable to exhibit two stiffness rates between first element 406 and second element 407. Variable force generator 401 comprises first spring 408 that has first end 409 and second end 410. First spring 408 is constrained by first element 406 from its first end 409 and by the second spring 411 from its second end 410. Variable force generator 401 further comprises second spring 411, which has first end 412 and second end 413. Second spring 411 is constrained by first spring 408 from its first end 412 and by second element 407 from its second end. Variable force generator 401 further comprises at least one constraining mechanism 414, which is configurable to have at least a first position and a second position.

In operation, when the constraining mechanism 414 is in its first position, second end 413 of second spring 411 is not constrained by second end 410 of first spring 408. This causes second spring 411 to act in series with first spring 411. In this first position, the equivalent stiffness is the stiffness of first spring 408 and second spring 411 in series. In this first position, the equivalent deflection is the deflection of first spring 408 and second spring 411 in series.

When constraining mechanism 414 is in its second position, second end 413 of second spring 411 is constrained by second end 410 of first spring 408. This causes the first spring 408 to act alone. In this second position, the equivalent stiffness is the stiffness of first spring 408, and the equivalent deflection is the deflection of first spring 408.

Figure 95:
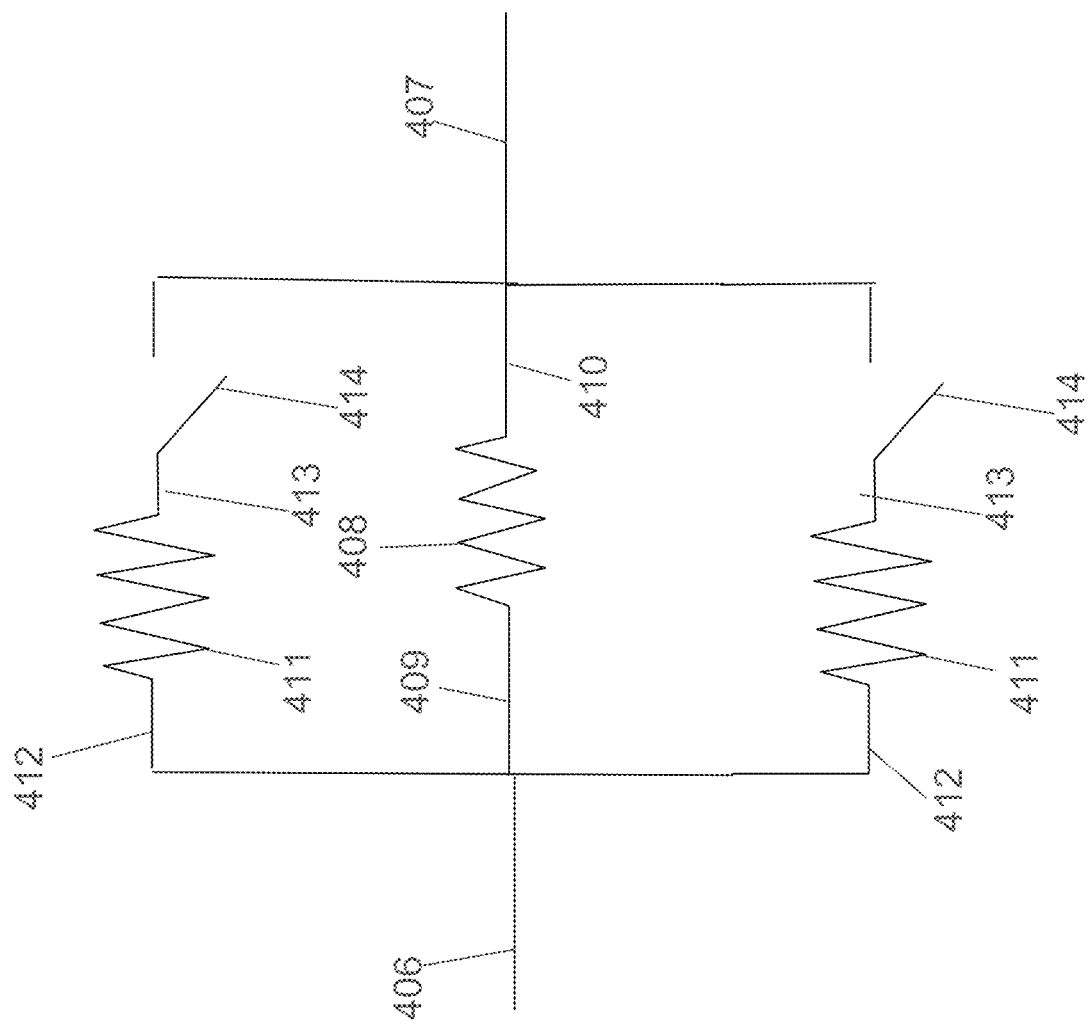
FIG. 95 is a schematic of a first alternate embodiment of a variable force generator with three stiffness settings.
Figure 96:
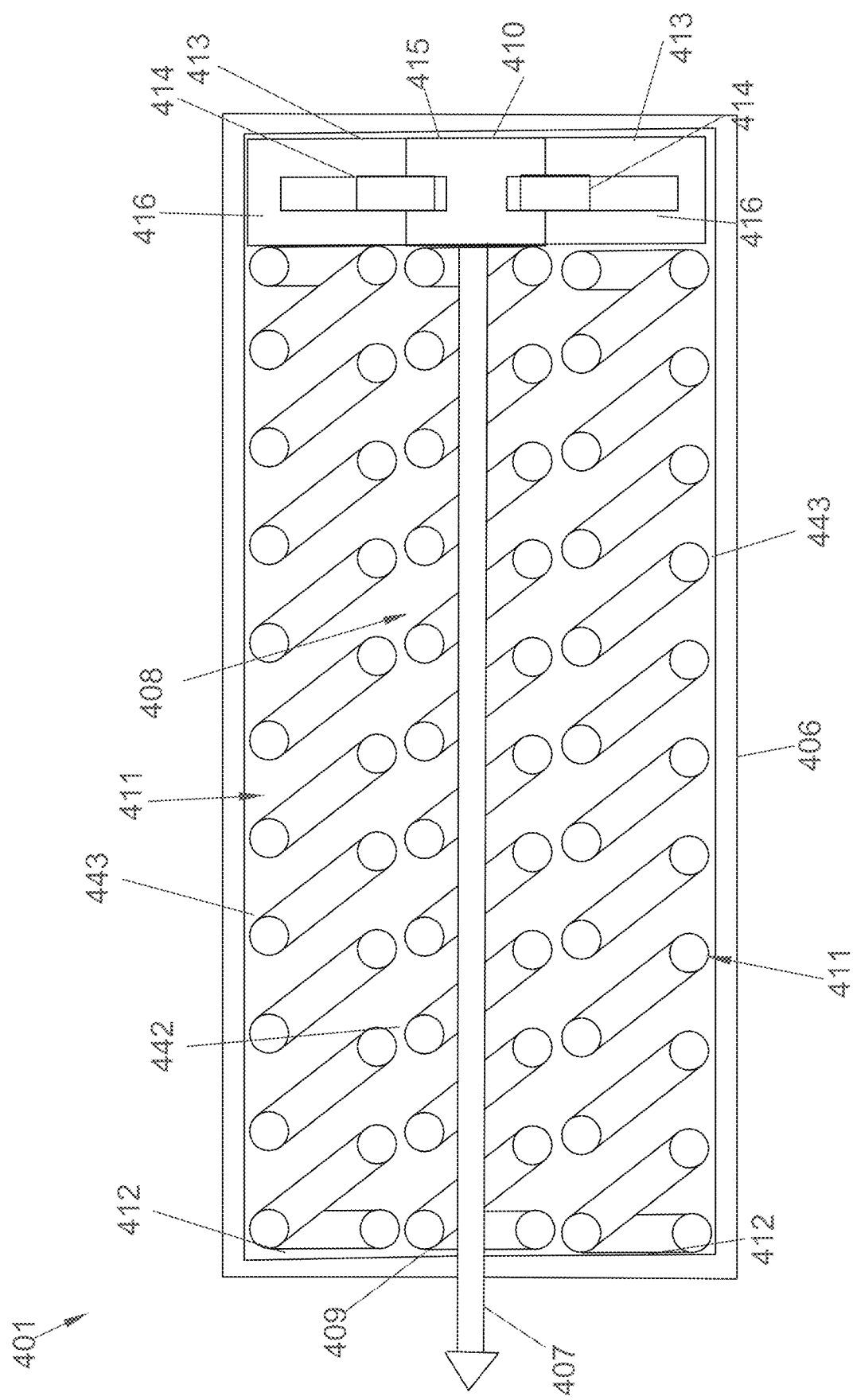
FIG. 96 is a section view of a first alternate embodiment of a variable force generator with three stiffness settings.

FIG. 95 shows a schematic embodiment of variable force generator 401. Variable force generator 401 is adaptable to exhibit three stiffness rates between first element 406 and second element 407. Variable force generator 401 comprises first spring 408 that has a first end 409 and second end 410. First spring 408 is constrained by first element 406 from its first end 409 and by the second element 407 from its second end 410. Variable force generator 401 further comprises two second springs 411 which have first end 412 and second end 413. Second springs 411 are constrained by first element 406 from their first end 412. Variable force generator 401 further comprises at least two constraining mechanisms 414 which are configurable to have at least a first position and a second position. FIG. 96 shows a hardware embodiment of variable force generator 401.

In operation, when both constraining mechanisms 414 are in their first position, second end 413 of both second springs 411 are not constrained by second element 407. This causes second springs 411 not to affect the motion between first element 406 and second element 407. In this first position, the equivalent stiffness is the stiffness of first spring 408. When one constraining mechanism 414 is in its second position and one constraining mechanism 414 is in its first position, second end 413 of one second spring 411 is constrained by second element 407 and second end 413 of the other second spring 411 is not constrained by second element 407. This causes one second spring 411 to act in parallel with first spring 408. In this second position, the equivalent stiffness is the addition of both the stiffness of first spring 408 and stiffness of one second spring 411. When both constraining mechanisms 414 are in their second position, second end 413 of both second springs 411 are constrained by second element 407. This causes both second springs 411 to act in parallel with first spring 408. In this second position, the equivalent stiffness is the addition of both the stiffness of first spring 408 and stiffness of both second springs 411.

It may be appreciated by one skilled in the art that a greater number of second springs 411 may be added to increase the number of stiffness rates between first element 406 and second element 407.

Figure 97:
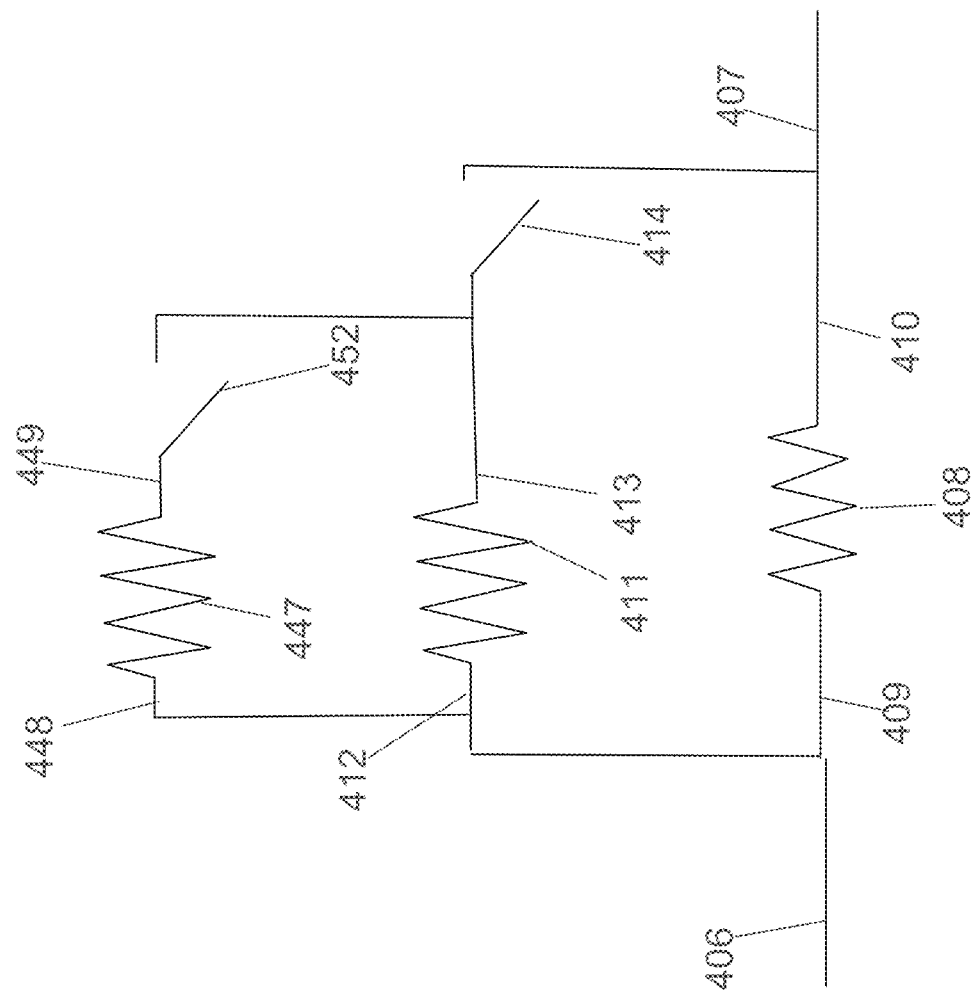
FIG. 97 is a schematic of a second alternate embodiment of a variable force generator with three stiffness settings.

FIG. 97 shows a schematic embodiment of variable force generator 401. Variable force generator 401 is adaptable to exhibit three stiffness rates between first element 406 and second element 407. Variable force generator 401 comprises first spring 408 that has a first end 409 and second end 410. First spring 408 is constrained by first element 406 from its first end 409 and by the second element 407 from its second end 410. Variable force generator 401 further comprises second spring 411, which has first end 412 and second end 413. Second spring 411 is constrained by first element 406 from its first end 412. Variable force generator further comprises third spring 447 which has first end 448 and second end 449. Third spring 447 is constrained by first element 406 from its first end 448. Variable force generator 401 further comprises constraining mechanism 414, which is configurable to have at least a first position and a second position. Variable force generator further comprises a second constraining mechanism 452, which is configurable to have at least a first position and a second position.

Figure 98:
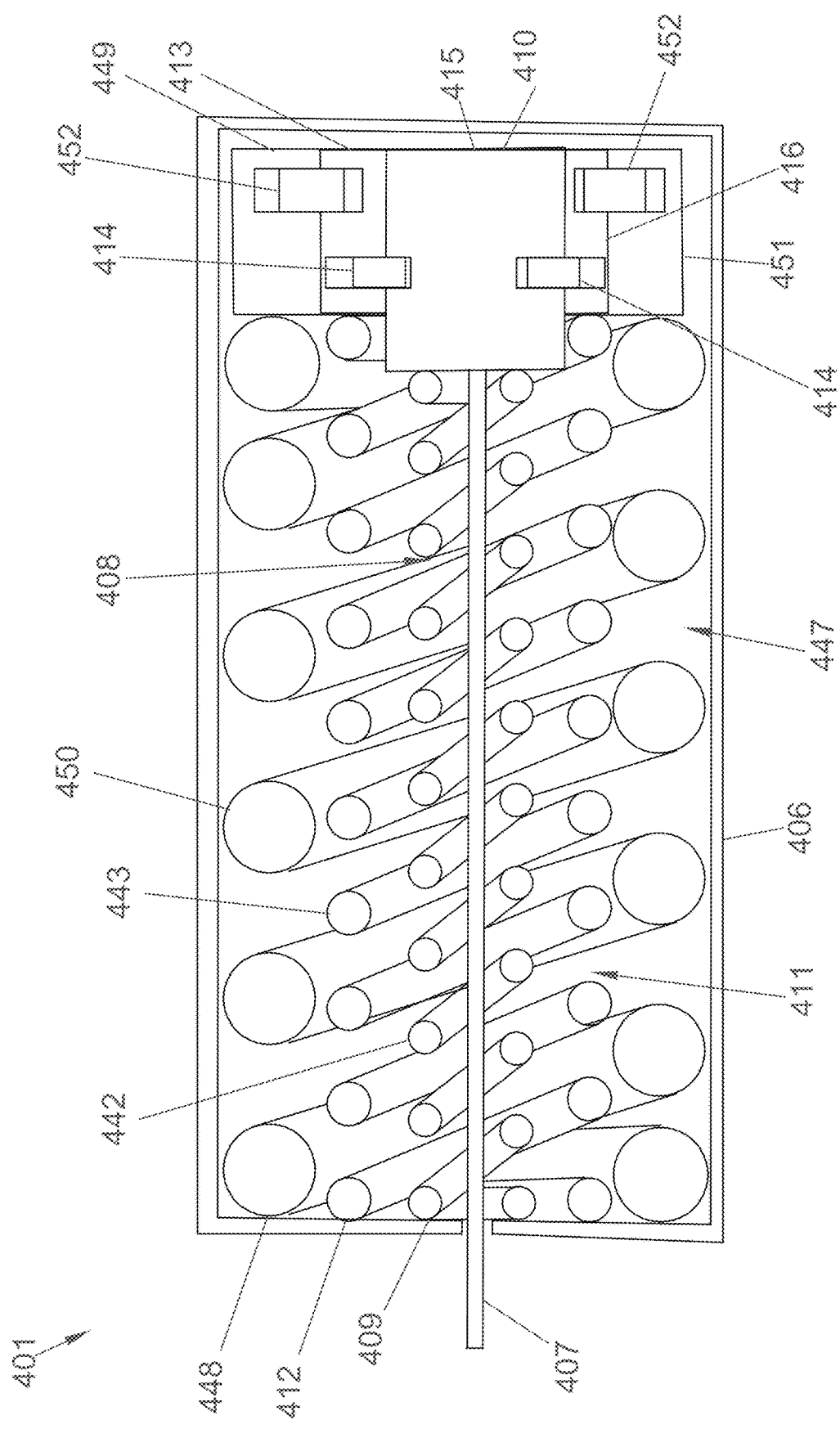
FIG. 98 is a section view of a second alternate embodiment of a variable force generator with three stiffness settings.

FIG. 98 shows a hardware embodiment of variable force generator 401 wherein first spring 408 further comprises first spring element 442 and first spring bracket 415, second spring 411 further comprises second spring element 443 and second spring bracket 416, and third spring 447 further comprises third spring element 450 and third spring bracket 451. The function of each spring element is to provide the stiffness of the respective spring. The function of each spring bracket is to transfer force, facilitate the housing, motion, or general function of constraining mechanism 414 or second constraining mechanism 452, facilitate the coupling between components, or facilitate the motion or stabilization of its respective spring.

In operation, when constraining mechanism 414 is in its first position, second end 413 of second spring 411 and of third spring 447 are not constrained by second element 407. This causes second spring 411 and third spring 447 not to affect the motion between first element 406 and second element 407. In this first position, the equivalent stiffness is the stiffness of first spring 408. When constraining mechanism 414 is in its second position and second constraining mechanism 452 is in its first position, second end 413 of second spring 411 is constrained by second element 407 and second end 413 of third spring 447 is not constrained by second element 407. This causes second spring 411 to act in parallel with first spring 408. In this second position, the equivalent stiffness is the addition of both the stiffness of first spring 408 and stiffness of one second spring 411. When constraining mechanisms 414 and second constraining mechanism 452 are in their second positions, second end 413 of second springs 411 and of third spring 447 are constrained by second element 407. This causes second spring 411 and third spring 447 to act in parallel with first spring 408. In this second position, the equivalent stiffness is the addition of the stiffness of first spring 408 the stiffness of second springs 411, and the stiffness of third spring 447.

Figure 99:
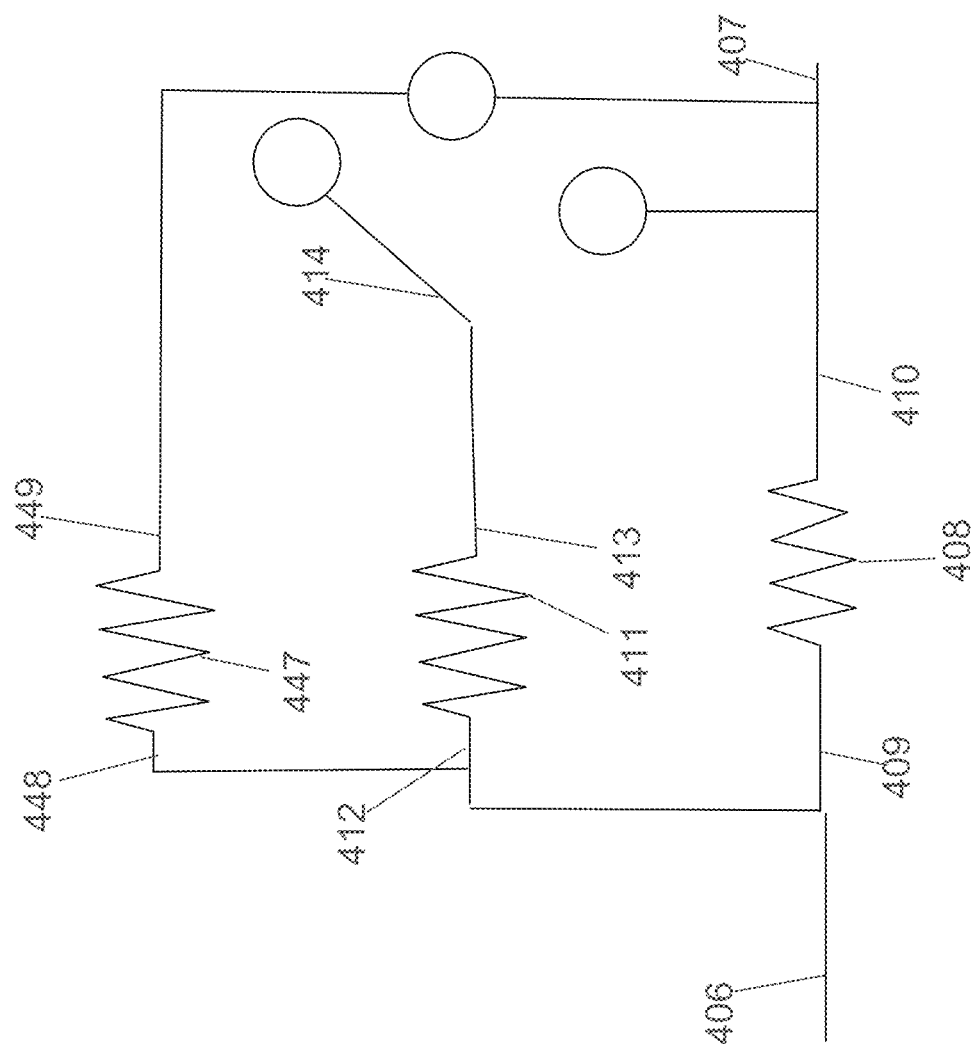
FIG. 99 is a schematic of a third alternate embodiment of a variable force generator with three stiffness settings.

FIG. 99 shows a schematic embodiment of variable force generator 401. Variable force generator 401 is adaptable to exhibit three stiffness rates between first element 406 and second element 407. Variable force generator 401 comprises first spring 408 that has first end 409 and second end 410. First spring 408 is constrained by first element 406 from its first end 409 and by the second element 407 from its second end 410. Variable force generator 401 further comprises second spring 411, which has first end 412 and second end 413. Second spring 411 is constrained by first element 406 from its first end 412. Variable force generator further comprises third spring 447, which has first end 448 and second end 449. Third spring 447 is constrained by first element 406 from its first end 448. Variable force generator 401 further comprises constraining mechanism 414, which is configurable to have at least a first position, a second position, and a third position.

Figure 100:
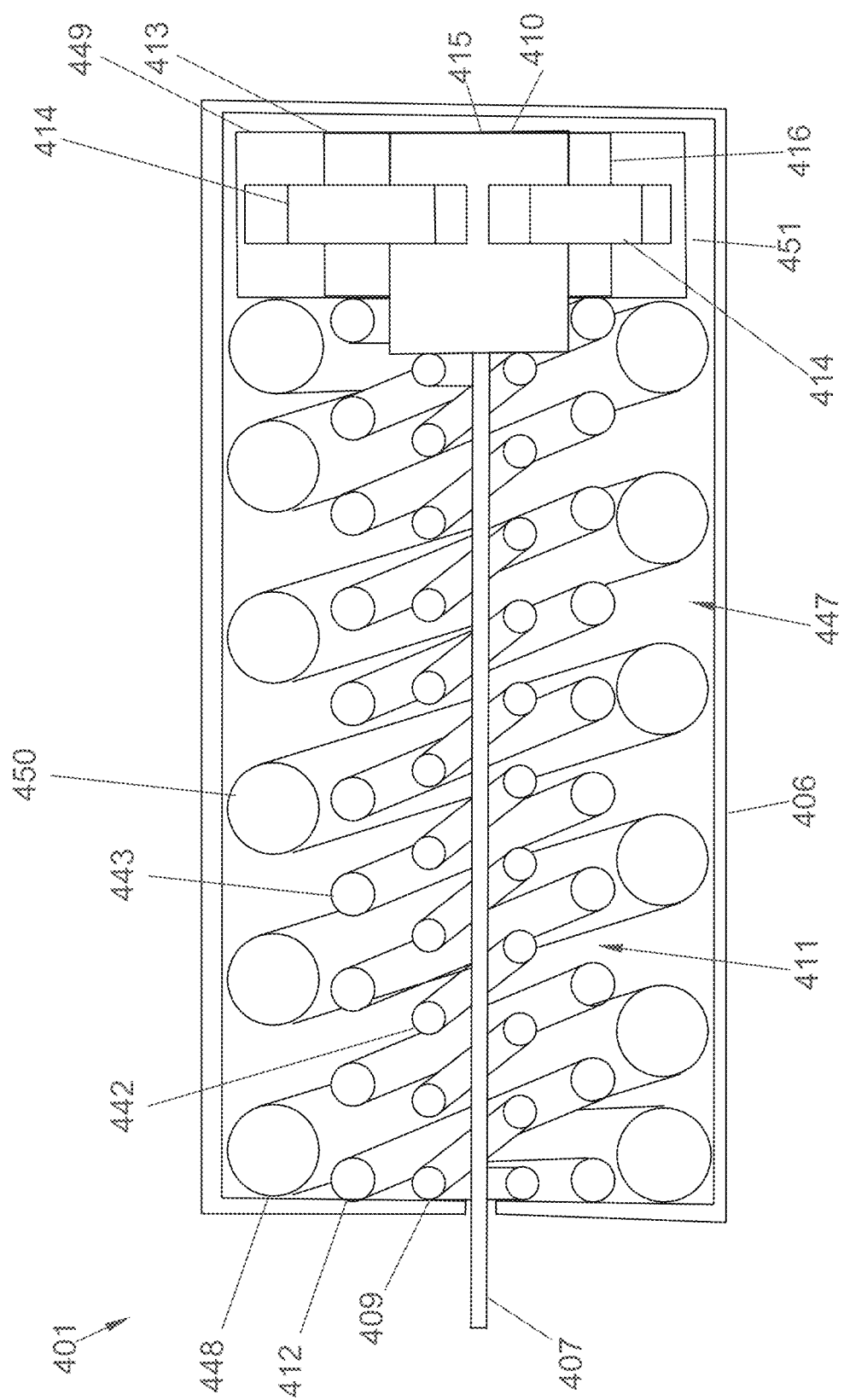
FIG. 100 is a section view of a third alternate embodiment of a variable force generator with three stiffness settings.

FIG. 100 shows a hardware embodiment of variable force generator 401 wherein first spring 408 further comprises first spring element 442 and first spring bracket 415, second spring 411 further comprises second spring element 443 and second spring bracket 416, and third spring 447 further comprises third spring element 450 and third spring bracket 451. The function of each spring element is to provide the stiffness of the respective spring. The function of each spring bracket is to transfer force, facilitate the housing, motion, or general function of constraining mechanism 414, facilitate the coupling between components, or facilitate the motion or stabilization of its respective spring.

In operation, when constraining mechanism 414 is in its first position, second end 413 of second spring 411 and of third spring 447 are not constrained by second element 407. This causes second spring 411 and third spring 447 not to affect the motion between first element 406 and second element 407. In this first position, the equivalent stiffness is the stiffness of first spring 408. When constraining mechanism 414 is in its second position, second end 413 of second spring 411 is constrained by second element 407 and second end 413 of third spring 447 is not constrained by second element 407. This causes second spring 411 to act in parallel with first spring 408. In this second position, the equivalent stiffness is the addition of both the stiffness of first spring 408 and stiffness of one second spring 411. When constraining mechanisms 414 is in a third position, second end 413 of second springs 411 and of third spring 447 are constrained by second element 407. This causes second spring 411 and third spring 447 to act in parallel with first spring 408. In this third position, the equivalent stiffness is the addition of the stiffness of first spring 408, the stiffness of second springs 411, and the stiffness of third spring 447.

It can be understood that the various embodiments of spring element arrangements and types of spring elements described can be combined to form embodiments with multiple force modes not explicitly described herein, and that the mechanisms described herein can be modified by a rearrangement of parts to selectively couple first 406, second element 407, first spring 408, second spring 411, first spring bracket 415, second spring bracket 416 or any combination thereof to accomplish multiple stiffness rates of the variable force generator 401 as described in through various series and parallel spring arrangements with compression and extension spring elements.

What is claimed is:

1. An arm supporting exoskeleton configured to be coupled to a person to reduce shoulder forces required to raise an upper arm of the person, the arm supporting exoskeleton comprising:
    a distal link configured to rotate about a first rotational axis crossing approximately through a shoulder joint of the person,
    an arm coupler coupled to the distal link and configured to couple the distal link to an upper arm of the person,
    a tensile force generator coupled to the distal link and configured to provide a torque to flex the distal link about the first rotational axis thereby producing a supporting force on the upper arm of the person, and
    a protrusion located substantially at the first rotational axis, the protrusion configured to constrain the tensile force generator to prevent the tensile force generator from passing over the first rotational axis, wherein:
    when the protrusion does not constrain the tensile force generator, the torque flexes the distal link as a function of an angle of the distal link along a torque profile to support the upper arm of the person, and
    when the protrusion constrains the tensile force generator, a neutral zone is created in the torque profile that allows the upper arm of the person to move with a substantially small applied torque.

2. The arm supporting exoskeleton of claim 1, wherein the torque profile is equivalent to an arm weight torque profile of the upper arm of the person for angles of the distal link being substantially above a horizon line.

3. The arm supporting exoskeleton of claim 1 further comprising a bracket coupling the tensile force generator to the distal link, wherein location of the bracket is adjustable to adjust amplitude of the torque profile.

4. The arm supporting exoskeleton of claim 3, wherein the location of the bracket adjusts a distance corresponding to a lever arm of the tensile force generator.

5. The arm supporting exoskeleton of claim 3, wherein the location of the bracket does not substantially affect the neutral zone of the torque profile.

6. The arm supporting exoskeleton of claim 1, wherein the arm coupler further comprises:
    an arm cuff configured to at least partially encircle the upper arm of the person, and
    an arm rotation joint allowing the arm cuff to rotate relative to the distal link.

7. The arm supporting exoskeleton of claim 1, wherein the protrusion is configured to constrain the tensile force generator when the distal link rotates past a toggle angle relative to a proximal link.

8. The arm supporting exoskeleton of claim 1, wherein the protrusion is a pin forming a first joint at the first rotational axis.

9. The arm supporting exoskeleton of claim 1 further comprising a proximal link rotatably coupled to the distal link about the first rotational axis at a first joint.

10. The arm supporting exoskeleton of claim 9, wherein the tensile force generator is coupled to the proximal link.

11. The arm supporting exoskeleton of claim 10 further comprising a bracket coupling the tensile force generator to the distal link or the proximal link, wherein location of the bracket adjusts an effective length of the tensile force generator.

12. The arm supporting exoskeleton of claim 10 further comprising a shoulder base coupled to the proximal link, wherein the shoulder base is configured to be coupled to a trunk of the person and transfer at least a portion of a reaction force from the torque to hips of the person.

13. The arm supporting exoskeleton of claim 12 further comprising an offset adjustment joint configured to adjust and fix a position of the proximal link relative to the shoulder base about an axis parallel to the first rotational axis for adjusting the neutral zone or a peak torque position of the torque profile.

14. The arm supporting exoskeleton of claim 12 further comprising at least one horizontal rotation joint configured to allow the proximal link to rotate relative to the shoulder base about a second rotational axis.

15. The arm supporting exoskeleton of claim 1, wherein:
    the tensile force generator comprises at least one line element selected from the group consisting of a wire rope, a rope, a cable, a twine, a strap, a chain, or any combination thereof, and
    the protrusion constrains the at least one line element.

16. The arm supporting exoskeleton of claim 1, wherein:
    the tensile force generator comprises a plurality of spring elements, and
    at least one of the plurality of spring elements is configured to be activated individually or collectively.

17. An arm supporting exoskeleton configured to be coupled to a person to reduce shoulder forces required to raise an upper arm of the person, the arm supporting exoskeleton comprising:
    a distal link configured to rotate about a first rotational axis crossing approximately through a shoulder joint of the person, and
    a tensile force generator coupled to the distal link and configured to provide a torque to flex the distal link about the first rotational axis, and
    a protrusion located substantially at the first rotational axis and configured to constrain the tensile force generator in a position substantially centered about the first rotational axis, wherein:
    the torque flexes the distal link when the protrusion does not constrain the tensile force generator, and
    the torque remains substantially small when the protrusion constrains the tensile force generator.

18. The arm supporting exoskeleton of claim 17 further comprising a bracket coupling the tensile force generator to the distal link, wherein location of the bracket is adjustable to adjust the torque.

19. The arm supporting exoskeleton of claim 18, wherein the location of the bracket adjusts a lever arm of the tensile force generator.

20. The arm supporting exoskeleton of claim 17 further comprising an arm coupler, configured to couple the distal link to the upper arm of the person, wherein:

the arm coupler is configured to apply the torque as a supporting force to the upper arm of the person thereby reducing forces required to raise the upper arm of the person, and when the torque remains substantially small the person is able move the upper arm freely.

21. The arm supporting exoskeleton of claim 17, wherein the protrusion is configured to constrain the tensile force generator when the distal link rotates past a toggle angle relative to a proximal link.

22. The arm supporting exoskeleton of claim 17 further comprising a proximal link, wherein the distal link is configured to rotate relative to the proximal link about the first rotational axis.

23. The arm supporting exoskeleton of claim 22, wherein an end of the tensile force generator is coupled to the proximal link.

24. The arm supporting exoskeleton of claim 23 further comprising an offset adjustment joint configured to adjust orientation of the proximal link relative to a gravity line.

25. The arm supporting exoskeleton of claim 23 further comprising a bracket coupling the tensile force generator to the distal link or the proximal link, wherein:
- an effective length of the tensile force generator is a distance between a first distance and a second distance,
- the first distance is defined along the proximal link from the first rotational axis where the tensile force generator is coupled to the proximal link,
- the second distance is defined along the distal link from the first rotational axis where the tensile force generator is coupled to the distal link, and
- location of the bracket adjusts the effective length of the tensile force generator.

26. The arm supporting exoskeleton of claim 22 further comprising a shoulder base coupled to the proximal link, wherein the shoulder base is configured to be coupled to a trunk of the person and transfer at least a portion of a reaction force from the torque to hips of the person.

27. The arm supporting exoskeleton of claim 26, wherein:
- the proximal link, the distal link, the protrusion, and the tensile force generator are parts of an arm link mechanism,
- the arm link mechanism further comprises at least one horizontal rotation joint configured to rotate about a second rotational axis substantially orthogonal to the first rotational axis.

28. The arm supporting exoskeleton of claim 27, further comprising a shoulder bracket configured to provide a quick connect and disconnect coupling between the shoulder base and the arm link mechanism.

29. The arm supporting exoskeleton of claim 17, wherein:
- the tensile force generator comprises at least one line element and at least one spring element,
- the at least one spring element is configured to generate the torque,
- the at least one line element is selected from the group consisting of a wire rope, a rope, a cable, a twine, a strap, a chain, or any combination thereof, and
- the protrusion constrains the at least one line element.

30. The arm supporting exoskeleton of claim 17, wherein:
- the tensile force generator comprises a plurality of spring elements, and
- at least one of the plurality of spring elements is configured to be activated individually or collectively.

* * * * *